US012551558B2

United States Patent
(12) United States Patent
Spencer et al.

(10) Patent No.: US 12,551,558 B2
(45) Date of Patent: Feb. 17, 2026

(54) COMPOSITIONS AND METHODS FOR PROMOTING HEMATOPOIETIC CELL CYTOTOXICITY

(71) Applicants: EMORY UNIVERSITY, Atlanta, GA (US); CHILDREN'S HEALTHCARE OF ATLANTA, INC., Atlanta, GA (US); EXPRESSION THERAPEUTICS LLC, Tucker, GA (US)

(72) Inventors: Harold Trent Spencer, Atlanta, GA (US); Christopher Doering, Atlanta, GA (US); Shanmuganathan Chandrakasan, Atlanta, GA (US); Lauren Fleischer, Atlanta, GA (US); Jaquelyn Zoine, Atlanta, GA (US); Gianna Branella, Atlanta, GA (US); Harrison C. Brown, Tucker, GA (US)

(73) Assignees: Emory University, Atlanta, GA (US); Children's Healthcare of Atlanta, Inc., Atlanta, GA (US)

( * ) Notice: Subject to any disclaimer, the term of this patent is extended or adjusted under 35 U.S.C. 154(b) by 1114 days.

(21) Appl. No.: 17/602,593

(22) PCT Filed: Apr. 12, 2020

(86) PCT No.: PCT/US2020/027865

§ 371 (c)(1),
(2) Date: Oct. 8, 2021

(87) PCT Pub. No.: WO2020/210774

PCT Pub. Date: Oct. 15, 2020

(65) Prior Publication Data

US 2022/0378827 A1 Dec. 1, 2022

Related U.S. Application Data

(60) Provisional application No. 62/838,468, filed on Apr. 25, 2019, provisional application No. 62/833,011, filed on Apr. 12, 2019.

(51) Int. Cl.

| | |
|---|---|
| ***A61K 40/31*** | (2025.01) |
| ***A61K 35/28*** | (2015.01) |
| ***A61K 38/00*** | (2006.01) |
| ***A61K 40/11*** | (2025.01) |
| ***A61K 40/42*** | (2025.01) |
| ***A61K 45/06*** | (2006.01) |
| ***A61P 35/02*** | (2006.01) |
| ***C07K 14/55*** | (2006.01) |
| ***C07K 14/705*** | (2006.01) |
| ***C07K 14/715*** | (2006.01) |
| ***C07K 14/72*** | (2006.01) |

(Continued)

(52) U.S. Cl.

CPC .............. *A61K 40/31* (2025.01); *A61K 35/28* (2013.01); *A61K 40/11* (2025.01); *A61K 40/4211* (2025.01); *A61K 40/4224* (2025.01); *A61K 45/06* (2013.01); *A61P 35/02* (2018.01); *C07K 14/55* (2013.01); *C07K 14/7051* (2013.01); *C07K 14/70517* (2013.01); *C07K 14/7153* (2013.01); *C07K 14/7155* (2013.01); *C07K 14/72* (2013.01); *C07K 16/28* (2013.01); *C12N 5/0636* (2013.01); *C12N 15/625* (2013.01); *C12N 15/86* (2013.01); *A61K 38/00* (2013.01); *A61K 2239/28* (2023.05); *A61K 2239/31* (2023.05); *A61K 2239/38* (2023.05); *A61K 2239/48* (2023.05); *C07K 14/70521* (2013.01); *C07K 2317/622* (2013.01); *C12N 2740/15043* (2013.01)

(58) Field of Classification Search

CPC .............. C07K 14/70521; C07K 14/55; C07K 14/7051; C07K 14/70517; C07K 14/7153; C07K 14/7155; C07K 14/72; C07K 16/28; C07K 2317/622; C07K 14/705; C07K 16/2803; C07K 16/2896; C07K 2317/73; C07K 2319/03; C07K 2319/33; A61K 35/28; A61K 39/4611; A61K 39/4631; A61K 39/464412; A61K 39/464429; A61K 45/06; A61K 2239/28; A61K 2239/31; A61K 2239/38; A61K 2239/48; A61K 38/00; A61K 48/00; A61P 35/02; C12N 5/0636; C12N 15/625; C12N 15/86; C12N 2740/15043; C12N 2800/22; C12N 15/62; C12N 15/85

See application file for complete search history.

(56) References Cited

U.S. PATENT DOCUMENTS 5,843,423 A 12/1998 Lyman et al.
2016/0053017 A1* 2/2016 Orentas ............ G01N 33/57492 435/254.11

(Continued)

FOREIGN PATENT DOCUMENTS

WO WO-03017944 A2 * 3/2003 ......... A61K 38/2013
WO 2016154588 9/2016

(Continued)

OTHER PUBLICATIONS

Rudikoff et al., PNAS, 79:1979-1983, March (Year: 1982).*

(Continued)

*Primary Examiner* — Anand U Desai
*Assistant Examiner* — Kathleen Cunningchen
(74) *Attorney, Agent, or Firm* — Emory Patent Group

(57) ABSTRACT

Provided herein are compositions and methods for promoting hematopoietic cell cytotoxicity.

17 Claims, 73 Drawing Sheets

Specification includes a Sequence Listing.

(51) Int. Cl.

| | |
|---|---|
| ***C07K 14/725*** | (2006.01) |
| ***C07K 16/28*** | (2006.01) |
| ***C12N 5/0783*** | (2010.01) |
| ***C12N 15/62*** | (2006.01) |
| ***C12N 15/86*** | (2006.01) |

(56) References Cited

U.S. PATENT DOCUMENTS

2017/0258835 A1 9/2017 Zhao et al.
2018/0305452 A1 10/2018 Orentas et al.

FOREIGN PATENT DOCUMENTS

WO 2016164502 10/2016
WO WO-2018102795 A2 * 6/2018 ............. A61K 35/17
WO WO-2019079569 A1 * 4/2019 ........... A61K 31/138
WO 2020026284 A1 2/2020

OTHER PUBLICATIONS

Credo reference, Encyclopedia of the Human Genome (Year: 2005).*
Wang et al. Journal of Hematology & Oncology (2018) 11:60 https://doi.org/10.1186/s 13045-018-0603-7 published May 2, 2018 (Year: 2018).*
Johannessen M, Møller S, Hansen T, Moens U, Van Ghelue M. The multifunctional roles of the four-and-a-half-LIM only protein FHL2. Cell Mol Life Sci. Feb. 2006;63(3):268-84. doi: 10.1007/s00018-005-5438-z. PMID: 16389449; PMCID: PMC11136317 (Year: 2006).*
Riewald M, Petrovan RJ, Donner A, Mueller BM, Ruf W. Activation of endothelial cell protease activated receptor 1 by the protein C pathway. Science. 2002; 296:1880-1882 (Year: 2002).*
Guryanov I, Fiorucci S, Tennikova T. Receptor-ligand interactions: Advanced biomedical applications. Mater Sci Eng C Mater Biol Appl. Nov. 1, 2016;68:890-903. doi: 10.1016/j.msec.2016.07.072. Epub Jul. 28, 2016. PMID: 27524092 (Year: 2016).*
Verdoliva et al. "A New Ligand for Immunoglobulin G Subdomains by Screening of a Synthetic Peptide Library", ChemBioChem, 2005, 6: 1242-1253. https://doi.org/10.1002/cbic.200400368 (Year: 2005).*
Sturm et al. J. Chem. Inf. Model. 2012, 52, 9, 2410-2421 (Year: 2012).*
Bausch-Fluck et al. "A Mass Spectrometric-Derived Cell Surface Protein Atlas" PLoS One 10(4): e0121314. doi: 10.1371/journal.pone.0121314 (Year: 2015).*
Shaffer et al. Med. Sci. 2014, 2, 23-36; doi: 10.3390/medsci2010023 (Year: 2014).*
Han et al. Mol. Therapy "Adnectin-Based Design of Chimeric Antigen Receptor for T Cell Engineering" vol. 25, 11, Nov. 1, 2017, pp. 2466-2476 (Year: 2017).*
Hanahan D et al. Cell 2011 144(5) p. 646-674 (Year: 2011).*
Batlle and Clevers "Cancer stem cells revisited", Nature Medicine vol. 23, 10, p. 1124-1134 doi:10.1038/nm.4409 (Year: 2017).*
GenBank: AAA50553.1 "megakaryocyte growth and development factor [*Homo sapiens*]" (Accessed Mar. 26, 2025) (Year: 2025).*
Lichtman MA et al. The Oncologist2017; 22(5); 542-548 (Year: 2017).*
Carton JM, et al. Codon engineering for improved antibody expression in mammalian cells. Protein Expr Purif. Oct. 2007;55(2):279-86. doi: 10.1016/j.pep.2007.05.017. Epub Jun. 16, 2007. PMID: 17646110 (Year: 2007).*
Bridgeman , et al., "CD3[zeta]-based Chimeric Antigen Receptors Mediate T Cell Activation Via Cis- and Trans-signalling Mechanisms: Implications for Optimization of Receptor Structure for Adoptive Cell Therapy", Clinical and Experimental Immunology, vol. 175, No. 2, Jan. 3, 2014, pp. 258-267.
Demoulin , et al., "Exploiting natural killer group 2D receptors for CAR T-cell therapy", Future Oncology, vol. 13, No. 18, Aug. 1, 2017, pp. 1593-1605.
EP20787621.0 , "Extended European Search Report", Apr. 5, 2023, 12 pages.
Fleischer, et al., "Non-Signaling Chimeric Antigen Receptors Enhance Antigen-Directed Killing by γδ T Cells in Contrast to αβ T Cells", Molecular Therapy—Oncolytics, vol. 18, Sep. 1, 2020, pp. 149-160.
Lawand , et al., "Key Features of Gamma-Delta T-Cell Subsets in Human Diseases and Their Immunotherapeutic Implications", Frontiers in Immunology, vol. 8, No. 761, Jun. 30, 2017, 9 pages.
"Office Action", issued by the Canadian Patent Office on Aug. 16, 2023 for Canadian Application No. CA3,136,626, 7 pages.
Lijima et al. Expression of thrombopoietin receptor and its functional role in human B-precursor leukemia cells with 11q23 translocation or Philadelphia chromosome, Leukemia, 2000, 14, 1598-1605.
Murad et al. Advances in the use of Natural Receptor- or Ligand-Based Chimeric Antigen Receptors (CARs) in haematologic malignancies, Best Pract Res Clin Haematol. 2018, 31(2): 176-18.
Palchaudhuri et al. Non-genotoxic conditioning for hematopoietic stem cell transplantation using a hematopoietic-cell-specific internalizing immunotoxin, Nat Biotechnol, 2016, 34(7):738-45.
Abdullah et al., Mechanisms of Chemoresistance in Cancer Stem Cells, Clinical and Translational Medicine, vol. 2, No. 3, Jan. 17, 2013, 9 pages.
Albitar et al., Correlation Between Lower C-MPL Protein Expression and Favorable Cytogenetic Groups in Acute Myeloid Leukemia, Leukemia Research, vol. 23, No. 1, Jan. 1999, pp. 63-69.
Aleksandrova et al., Functionality and Cell Senescence of CD4/CD8-Selected CD20 CAR T Cells Manufactured Using the Automated CliniMACS Prodigy® Platform, Transfusion Medicine and Hemotherapy, vol. 46, No. 1, Jan. 2019, pp. 47-54.
Alessio et al., CD38 Molecule: Structural and Biochemical Analysis on Human T Lymphocytes, Thymocytes, and Plasma Cells, Journal of Immunology, vol. 145, No. 3, Aug. 1, 1990, pp. 878-884.
Arai et al., Myeloid Conditioning with C-kit-targeted CAR-T Cells Enables Donor Stem Cell Engraftment, Molecular Therapy, vol. 26, No. 5, May 2, 2018, pp. 1181-1197.
Bach et al., FDA Approval of Tisagenlecleucel Promise and Complexities of a $475 000 Cancer Drug, JAMA, vol. 318, No. 19, Nov. 21, 2017, pp. 1861-1862.
Bennouna et al., Phase-I Study of Innacell Gammadelta, an Autologous Cell-therapy Product Highly Enriched in Gamma9delta2 T Lymphocytes, in Combination with IL-2, in Patients with Metastatic Renal Cell Carcinoma, Cancer Immunology, Immunotherapy, vol. 57, No. 11, Nov. 2008, pp. 1599-1609.
Born et al., The Function of Gammadelta T Cells in Innate Immunity, Current Opinion in Immunology, vol. 18, No. 1, Feb. 2006, pp. 31-38.
Bouchkouj et al., FDA Approval Summary: Axicabtagene Ciloleucel for Relapsed or Refractory Large B-cell Lymphoma, Clinical Cancer Research, vol. 25, No. 6, Mar. 15, 2019, pp. 1702-1708.
Bouscary et al., c-mpl Expression in Hematologic Disorders, Leukemia & Lymphoma, vol. 17, No. 1-2, Mar. 1995, pp. 19-26.
Boyd et al., Identification of Chemotherapy-induced Leukemic-regenerating Cells Reveals a Transient Vulnerability of Human AML Recurrence, Cancer Cell, vol. 34, No. 3, Sep. 10, 2018, pp. 483-498.
Breems et al., Prognostic Index for Adult Patients with Acute Myeloid Leukemia in First Relapse, Journal of Clinical Oncology, vol. 23, No. 9, Mar. 20, 2005, pp. 1969-1978.
Brentjens et al., CD19-Targeted T Cells Rapidly Induce Molecular Remissions in Adults with Chemotherapy-Refractory Acute Lymphoblastic Leukemia, Science Translational Medicine, vol. 5, No. 177, Mar. 20, 2013, pp. 1-19.
Brown et al., Target-Cell-Directed Bioengineering Approaches for Gene Therapy of Hemophilia A, Molecular Therapy—Methods & Clinical Development, vol. 9, Jan. 31, 2018, pp. 57-69.
Budde et al., Combining a CD20 Chimeric Antigen Receptor and an Inducible Caspase 9 Suicide Switch to Improve the Efficacy and Safety of T Cell Adoptive Immunotherapy For Lymphoma, PLoS One, vol. 8, No. 12, Dec. 17, 2013, pp. 1-10.
Burnett et al., Curability of Patients with Acute Myeloid Leukemia Who Did Not Undergo Transplantation in First Remission, Journal of Clinical Oncology, vol. 31, No. 10, Apr. 1, 2013, pp. 1293-1301.

(56) References Cited

OTHER PUBLICATIONS

Callahan et al., Pediatric Survivorship: Considerations Following Car T-cell Therapy, Clinical Journal of Oncology Nursing, vol. 23, No. 2, Apr. 1, 2019, pp. 35-41.
Chang et al., CARs: Synthetic Immunoreceptors for Cancer Therapy and Beyond, Trends in Molecular Medicine, vol. 23, No. 5, May 2017, pp. 430-450.
Chaturvedi et al., T Cell Activation Profiles Distinguish Hemophagocytic Lymphohistiocytosis and Early Sepsis, Blood, vol. 137, No. 17, Apr. 29, 2021, pp. 2337-2346.
Chen et al., Novel Anti-CD3 Chimeric Antigen Receptor Targeting of Aggressive T Cell Malignancies, Oncotarget, vol. 7, No. 35, Aug. 2, 2016, pp. 56219-56232.
Chen et al., Targeting Oxidative Stress in Embryonal Rhabdomyosarcoma, Cancer Cell, vol. 24, No. 6, Dec. 9, 2013, pp. 710-724.
Chmielewski et al., TRUCKs: The Fourth Generation of CARs, Expert Opinion on Biological Therapy, vol. 15, No. 8, 2015, pp. 1145-1154.
Costello et al., Human Acute Myeloid Leukemia CD34+/CD38− Progenitor Cells Have Decreased Sensitivity to Chemotherapy and Fas-induced Apoptosis, Reduced Immunogenicity, And Impaired Dendritic Cell Transformation Capacities, Cancer Research, vol. 60, No. 16, Aug. 15, 2000, pp. 4403-4411.
Deniger et al., Clinical Applications of Gamma Delta T Cells with Multivalent Immunity, Frontiers in Immunology, vol. 5, No. 636, Dec. 11, 2014, 10 pages.
Doering et al., Preclinical Development of a Hematopoietic Stem and Progenitor Cell Bioengineered Factor VIII Lentiviral Vector Gene Therapy for Hemophilia A, Human Gene Therapy, vol. 29, No. 10, Oct. 1, 2018, pp. 1183-1201.
Dong-Feng et al., The TPO/c-MPL Pathway in the Bone Marrow May Protect Leukemia Cells from Chemotherapy in AML Patients, Pathology and Oncology Research, vol. 20, No. 2, Apr. 2014, pp. 309-317.
Downing et al., The Pediatric Cancer Genome Project, Nature Genetics, vol. 44, No. 6, May 29, 2012, pp. 619-622.
Duong et al., Two-Dimensional Regulation of CAR-T Cell Therapy with Orthogonal Switches, Molecular Therapy—Oncolytics, vol. 12, Dec. 20, 2018, pp. 124-137.
Feese et al., Structure of the Receptor-Binding Domain of Human Thrombopoietin Determined by Complexation with a Neutralizing Antibody Fragment, PNAS, vol. 101, No. 7, Feb. 17, 2004, pp. 1816-1821.
Fox et al., Thrombopoietin Expands Hematopoietic Stem Cells after Transplantation, The Journal of Clinical Investigation, vol. 110, No. 3, Aug. 2002, pp. 389-394.
Gallucci et al., Danger Signals: SOS to the Immune System, Current Opinion in Immunology, vol. 13, No. 1, Feb. 1, 2001, pp. 114-119.
Ganzel et al., Very Poor Long-Term Survival in Past and More Recent Studies for Relapsed AML Patients: The ECOG-ACRIN Experience, American Journal of Hematology, vol. 93, No. 8, Aug. 2018, pp. 1074-1081.
Gardner et al., Acquisition of a CD19-negative Myeloid Phenotype Allows Immune Escape of MLL-rearranged Ball from CD19 CAR-T-cell Therapy, Blood, vol. 127, No. 20, May 19, 2016, pp. 2406-2410.
Gomes-Silva et al., CD7-edited T Cells Expressing a CD7-specific Car for the Therapy of T-cell Malignancies, Blood, vol. 130, No. 3, Jul. 20, 2017, pp. 285-296.
Grupp et al., Chimeric Antigen Receptor-Modified T Cells for Acute Lymphoid Leukemia, The New England Journal of Medicine, vol. 368, No. 16, Apr. 18, 2013, pp. 1509-1518.
Guan et al., Detection, Isolation, and Stimulation of Quiescent Primitive Leukemic Progenitor Cells from Patients with Acute Myeloid Leukemia (AML), Blood, vol. 101, No. 8, Apr. 15, 2003, pp. 3142-3149.
Gust et al., Endothelial Activation and Blood-Brain Barrier Disruption in Neurotoxicity after Adoptive Immunotherapy with CD19 CAR-T Cells, Cancer Discovery, vol. 7, No. 12, Dec. 2017, pp. 1404-1419.
Han et al., Adnectin-Based Design of Chimeric Antigen Receptor for T Cell Engineering, Molecular Therapy, vol. 25, No. 11, Nov. 1, 2017, pp. 2466-2476.
Hebbar et al., Detection of Circulating Soluble CD28 in Patients with Systemic Lupus Erythematosus, Primary Sjogren's Syndrome and Systemic Sclerosis, Clinical and Experimental Immunology, vol. 136, No. 2, May 2004, pp. 388-392.
Holmfeldt et al., The Genomic Landscape of Hypodiploid Acute Lymphoblastic Leukemia, Nature Genetics, vol. 45, No. 3, Mar. 2013, pp. 242-252.
Hombach et al., An Anti-CD30 Chimeric Receptor That Mediates CD3-zeta-independent T-cell Activation Against Hodgkin's Lymphoma Cells in the Presence of Soluble CD30, Cancer Research, vol. 58, No. 6, Mar. 15, 1998, pp. 1116-1119.
Hombach et al., Characterization of a Chimeric T-cell Receptor with Specificity for the Hodgkin's Lymphoma-associated CD30 Antigen, Journal of Immunotherapy, vol. 22, No. 6, Nov. 1999, pp. 473-480.
Hoyos et al., Engineering CD19-specific T Lymphocytes with Interleukin-15 and a Suicide Gene to Enhance their Anti-lymphoma/leukemia Effects and Safety, Leukemia, vol. 24, No. 6, Jun. 2010, pp. 1160-1170.
Huang et al., Genetically Modified T Cells Targeting Interleukin-11 Receptor A—Chain Kill Human Osteosarcoma Cells and Induce the Regression of Established Osteosarcoma Lung Metastases, Cancer Research, vol. 72, No. 1, Jan. 1, 2012, pp. 271-281.
Huston, et al., Protein Engineering of Single-Chain Fv Analogs and Fusion Proteins, Methods Enzymol, 1991, pp. 46-52.
Kahlon et al., Specific Recognition and Killing of Glioblastoma Multiforme by Interleukin 13-Zetakine Redirected Cytolytic T Cells, Cancer Research, vol. 64, No. 24, Dec. 15, 2004, pp. 9160-9166.
Kaushansky et al., Promotion of Megakaryocyte Progenitor Expansion and Differentiation by the C-MPL Ligand Thrombopoietin, Nature, vol. 369, No. 6481, Jun. 16, 1994, pp. 568-571.
Klingemann, Challenges of Cancer Therapy with Natural Killer Cells, Cytotherapy, vol. 17, No. 3, Mar. 2015, pp. 245-249.
Kochenderfer et al., Donor-Derived CD19-targeted T Cells Cause Regression of Malignancy Persisting After Allogeneic Hematopoietic Stem Cell Transplantation, Blood, vol. 122, No. 25, Dec. 12, 2013, pp. 4129-4139.
Koneru et al., A phase I Clinical trial of Adoptive T Cell Therapy using IL-12 Secreting MUC-16(ecto) Directed Chimeric Antigen Receptors for Recurrent Ovarian Cancer, Journal of Translational Medicine, vol. 13, No. 102, Mar. 28, 2015, 11 pages.
Kuter, The Biology of Thrombopoietin and Thrombopoietin Receptor Agonists, International Journal of Hematology, vol. 98, No. 1, Jul. 2013, pp. 10-23.
Lanca et al., The MHC Class IB Protein Ulbp1 is a Nonredundant Determinant of Leukemia/lymphoma Susceptibility to Gammadelta T-cell Cytotoxicity, Blood, vol. 115, No. 12, Mar. 25, 2010, pp. 2407-2411.
Lange, The Management of Neoplastic Disorders of Hematopoiesis in Children with Down's Syndrome, British Journal of Haematology, vol. 110, No. 3, Sep. 2000, pp. 512-524.
Levine et al., Global Manufacturing of CAR T Cell Therapy, Molecular Therapy—Methods & Clinical Development, vol. 4, Mar. 17, 2017, pp. 92-101.
Li et al., c-MPL is a Candidate Surface Marker and Confers Self-Renewal, Quiescence, Chemotherapy Resistance, and Leukemia Initiation Potential in Leukemia Stem Cells, Stem Cells, vol. 36, No. 11, Nov. 2018, pp. 1685-1696.
Li et al., Expression of MPL in Leukemia Stem Cells and Its Role in Stemness Maintainance, Blood, vol. 128, No. 22, Dec. 2, 2016, pp. 1723-1723.
Lok et al., Cloning and Expression of Murine Thrombopoietin cDNA and Stimulation of Platelet Production in vivo, Nature, vol. 369, No. 6481, Jun. 1994, pp. 565-568.

(56) References Cited

OTHER PUBLICATIONS

Lok et al., The Structure, Biology and Potential Therapeutic Applications of Recombinant Thrombopoietin, Stem Cells, vol. 12, No. 6, Nov. 1994, pp. 586-598.
Ma et al., Targeting T Cell Malignancies Using CD4CAR T-Cells and Implementing a Natural Safety Switch, Stem Cell Reviews and Reports, vol. 15, No. 3, Jun. 2019, pp. 443-447.
Maciocia et al., Targeting the T Cell Receptor B-chain Constant Region for Immunotherapy of T Cell Malignancies, Nature Medicine, vol. 23, No. 12, Dec. 2017, pp. 1416-1423.
Mamonkin et al., A T-cell Directed Chimeric Antigen Receptor for the Selective Treatment of T-cell Malignancies, Blood, vol. 126, No. 8, Aug. 20, 2015, pp. 983-992.
Mamonkin et al., Reversible Transgene Expression Reduces Fratricide and Permits 4-1BB Costimulation of CAT T Cells Directed to T-cell Malignancies, Cancer Immunology Research, vol. 6, No. 1, Jan. 2018, pp. 47-58.
Martinez et al., CAR T Cells for Solid Tumors: New Strategies for Finding, Infiltrating, and Surviving in the Tumor Microenvironment, Frontiers in Immunology, vol. 10, No. 128, Feb. 5, 2019, 21 pages.
Maude et al., CD19-targeted Chimeric Antigen Receptor T-cell Therapy for Acute Lymphoblastic Leukemia, Blood, vol. 125, No. 26, Jun. 25, 2015, pp. 4017-4023.
Meravglia et al., In Vivo Manipulation of Vgamma9Vdelta2 T Cells with Zoledronate and Low-dose Interleukin-2 for Immunotherapy of Advanced Breast Cancer Patients, Clinical & Experimental Immunology, vol. 161, No. 2, Aug. 2010, pp. 290-297.
Moot et al., Genetic Engineering of Chimeric Antigen Receptors Using Lamprey Derived Variable Lymphocyte Receptors, Molecular Therapy Oncolytics, vol. 3, No. 16026, Dec. 7, 2016, pp. 1-7.
Morita et al., Direct Presentation of Nonpeptide Prenyl Pyrophosphate Antigens to Human γδ T cells, Immunity, vol. 3, No. 4, Oct. 1995, pp. 495-507.
Morsut et al., Engineering Customized Cell Sensing and Response Behaviors Using Synthetic Notch Receptors, Cell, vol. 164, No. 4, Feb. 11, 2016, pp. 780-791.
Mullard et al., Second Anticancer CAR T Therapy Receives FDA Approval, Nature Reviews Drug Discovery, vol. 16, No. 12, Nov. 28, 2017, p. 818.
Murad et al., Advances in the use of Natural Receptor- or Ligand-based Chimeric Antigen Receptors (CARs) in Haematologic Malignancies, Best Practice & Research: Clinical Haematology, vol. 31, No. 2, Jun. 2018, pp. 176-183.
Nakajima et al., A Phase I Study of Adoptive Immunotherapy for Recurrent Non-small-cell Lung Cancer Patients with Autologous Gammadelta T Cells, European Journal of Cardio-Thoracic Surgery, vol. 37, No. 5, May 2010, pp. 1191-1197.
Nakazawa et al., Anti-Proliferative Effects of T Cells Expressing a Ligand-Based Chimeric Antigen Receptor Against CD116 on CD34(+) Cells of Juvenile Myelomonocytic Leukemia, Journal of Hematology & Oncology, vol. 9, No. 27, Mar. 16, 2016, 11 pages.
Neron et al., Whole-Blood Leukoreduction Filters are a Source for Cryopreserved Cells for Phenotypic and Functional Investigations on Peripheral Blood Lymphocytes, Transfusion, vol. 46, No. 4, Apr. 2006, pp. 537-544.
Nicholson et al., Construction and Characterisation of a Functional CD19 Specific Single Chain Fv Fragment for Immunotherapy of B Lineage Leukaemia and Lymphoma, Molecular Immunology, vol. 34, No. 16-17, Nov.-Dec. 1997, pp. 1157-1165.
Ninos et al., The Thrombopoietin Receptor, c-MPL, is a Selective Surface Marker for Human Hematopoietic Stem Cells, Journal of Translational Medicine, vol. 4, No. 9, Feb. 16, 2006, pp. 1-18.
Park et al., A Phase 1b/2 Study of CD30-specific Chimeric Antigen Receptor T-cell (CAR-T) Therapy in Combination with Bendamustine in Patients with CD30+ Hodgkin and Non-hodgkin Lymphoma, Journal of Clinical Oncology, vol. 35, No. 15, 2017, Abstract.
Park et al., Long-Term Follow-up of CD19 CAR Therapy in Acute Lymphoblastic Leukemia, New England Journal of Medicine, vol. 378, Feb. 1, 2018, pp. 449-459.
Patel et al., Beyond CAR T Cells: Other Cell-Based Immunotherapeutic Strategies Against Cancer, Frontiers in Oncology, vol. 9, No. 196, Apr. 10, 2019, 15 pages.
Perales-Puchalt et al., Follicle-Stimulating Hormone Receptor is Expressed by Most Ovarian Cancer Subtypes and is a Safe and Effective Immunotherapeutic Target, Clinical Cancer Research, vol. 23, No. 2, Jan. 15, 2017, pp. 441-453.
Philip et al., A Highly Compact Epitope-Based Marker/Suicide Gene for Easier and Safer T-Cell Therapy, Blood, vol. 124, No. 8, Aug. 21, 2014, pp. 1277-1287.
PCT/US2020/027865 , International Preliminary Report on Patentability, Mailed On Oct. 21, 2021, 7 pages.
PCT/US2020/027865 , International Search Report and Written Opinion, Mailed On Jul. 21, 2020, 10 pages.
Pinz et al., Targeting T-Cell Malignancies Using Anti-CD4 CAR NK-92 Cells, Oncotarget, vol. 8, No. 68, Dec. 22, 2017, pp. 112783-112796.
Png et al., Blockade of CD7 Expression in T Cells for Effective Chimeric Antigen Receptor Targeting of T-cell Malignancies, Blood Advances, vol. 1, No. 25, Nov. 28, 2017, pp. 2348-2360.
Qian et al., Critical Role of Thrombopoietin in Maintaining Adult Quiescent Hematopoietic Stem Cells, Cell Stem Cell, vol. 1, No. 6, Dec. 13, 2007, pp. 671-684.
Quentmeier et al., Expression of the Receptor MPL and Proliferative Effects of Its Ligand Thrombopoietin on Human Leukemia Cells, Leukemia, vol. 10, No. 2, Feb. 1996, pp. 297-310.
Raikar et al., Development of Chimeric Antigen Receptors Targeting T-cell Malignancies Using Two Structurally Different Anti-CD5 Antigen Binding Domains in NK and CRISPR-Edited T Cell Lines, Oncoimmunology, vol. 7, No. 3, Dec. 26, 2017, 14 pages.
Ramos et al., Clinical and Immunological Responses after CD30-specific Chimeric Antigen Receptor-redirected Lymphocytes, Journal of Clinical Investigation, vol. 127, No. 9, Sep. 1, 2017, pp. 3462-3471.
Ramos et al., Anti-CD30 CAR-T Cell Therapy in Relapsed and Refractory Hodgkin Lymphoma, Journal of Clinical Oncology, vol. 38, No. 32, 2020, pp. 3794-3804.
Rasaiyaah et al., TCRαβ/CD3 Disruption Enables CD3-specific Antileukemic T Cell Immunotherapy, JCI Insight, vol. 3, No. 13, Jul. 12, 2018, 13 pages.
Rauch et al., MPL Expression on AML Blasts Predicts Peripheral Blood Neutropenia and Thrombocytopenia, Blood, vol. 128, No. 18, Nov. 3, 2016, pp. 2253-2257.
Rincon-Orozco et al., Activation of V Gamma 9V Delta 2 T Cells by NKG2D, Journal of Immunology, vol. 175, No. 4, Aug. 15, 2005, pp. 2144-2151.
Robinson et al., Novel Mutations Target Distinct Subgroups of Medulloblastoma, Nature, vol. 488, No. 7409, Aug. 2, 2012, pp. 43-48.
Rosenberg et al., Adoptive Cell Transfer: A Clinical Path to Effective Cancer Immunotherapy, Nature Reviews Cancer, vol. 8, No. 4, Apr. 2008, pp. 299-308.
Ruella et al., Induction of Resistance to Chimeric Antigen Receptor T Cell Therapy by Transduction of a Single Leukemic B Cell, Nature Medicine, vol. 24, No. 10, Oct. 2018, pp. 1499-1503.
Sadelain et al., The Basic Principles of Chimeric Antigen Receptor Design, Cancer Discovery, vol. 3, No. 4, Apr. 2, 2013, pp. 388-398.
Sakashita et al., In Vitro Expansion of CD34(+)CD38(−) Cells Under Stimulation with Hematopoietic Growth Factors on AGM-S3 Cells in Juvenile Myelomonocytic Leukemia. Leukemia, Leukemia, vol. 29, No. 3, Mar. 2015, pp. 606-614.
Salmikangas et al., Chimeric Antigen Receptor T-Cells (CAR T-Cells) for Cancer Immunotherapy—Moving Target for Industry?, Pharmaceutical Research, vol. 35, No. 8, May 31, 2018, 8 pages.
Scarfo et al., Anti-CD37 Chimeric Antigen Receptor T Cells are Active against B- and T-cell Lymphomas, Blood, vol. 132, No. 14, Oct. 4, 2018, pp. 1495-1506.
Schuster et al., Tisagenlecleucel in Adult Relapsed or Refractory Diffuse Large B-Cell Lymphoma, New England Journal of Medicine, vol. 380, Jan. 3, 2019, pp. 45-56.
Sheridan, First Approval in Sight for Novartis' CAR-T Therapy after Panel Vote, Nature Biotechnology, vol. 35, No. 8, Aug. 8, 2017, pp. 691-693.

(56) References Cited

OTHER PUBLICATIONS

Shubinsky et al., The CD38 Lymphocyte Differentiation Marker: New Insight into its Ectoenzymatic Activity and its Role as a Signal Transducer, Immunity, vol. 7, No. 3, Sep. 1997, pp. 315-324.
Sutton et al., Bioengineering and Serum Free Expansion of Blood-Derived γδ T Cells, Cytotherapy, vol. 18, No. 7, Jul. 2016, pp. 881-892.
Townsend et al., The Expansion of Targetable Biomarkers for CAR T Cell Therapy, Journal of Experimental & Clinical Cancer Research, vol. 37, No. 1, Jul. 21, 2018, 23 pages.
Urban et al., Repertoire Development and the Control of Cytotoxic/effector Function in Human Gammadelta T Cells, Clinical and Developmental Immunology, vol. 2010, Apr. 13, 2010, 11 pages.
Mgon et al., Expression of the C-MPL Proto-oncogene in Human Hematologic Malignancies, Blood, vol. 82, No. 3, Aug. 1, 1993, pp. 877-883.
Wang et al., A Transgene-encoded Cell Surface Polypeptide for Selection, In Vivo Tracking, and Ablation of Engineered Cells, Blood, vol. 118, No. 5, Aug. 4, 2011, pp. 1255-1263.
Wang et al., Autologous T Cells Expressing CD30 Chimeric Antigen Receptors for Relapsed or Refractory Hodgkin Lymphoma: An Open-Label Phase I Trial, Clinical Cancer Research, vol. 23, No. 5, Mar. 1, 2017, pp. 1156-1166.
Watanabe et al., Fine-tuning the CAR Spacer Improves T-cell Potency, Oncoimmunology, vol. 5, No. 12, Nov. 8, 2016, 14 pages.
Wegehaupt et al., Recovery and Assessment of Leukocytes from LR Express Filters, Biologicals, vol. 49, Sep. 2017, pp. 15-22.
Wetzler et al., Expression of C-MPL mRNA, the Receptor for Thrombopoietin, in Acute Myeloid Leukemia Blasts Identifies a Group of Patients with Poor Response to Intensive Chemotherapy, Journal of Clinical Oncology, vol. 15, No. 6, Jun. 1997, pp. 2262-2268.
Wu et al., Remote Control of Therapeutic T Cells Through a Small Molecule-Gated Chimeric Receptor, Science, vol. 350, No. 6258, Oct. 16, 2015, 21 pages.
Xu et al., 2B4 Costimulatory Domain Enhancing Cytotoxic Ability of anti-CD5 Chimeric Antigen Receptor Engineered Natural Killer Cells Against T Cell Malignancies, Journal of Hematology & Oncology, vol. 12, No. 49, May 16, 2019, pp. 1-13.
Yogarajah et al., Leukemic Transformation in Myeloproliferative Neoplasms: A Literature Review on Risk, Characteristics, and Outcome, Mayo Clinic Proceedings, vol. 92, No. 7, Jul. 2017, pp. 1118-1128.
Yoshihara et al., Thrombopoietin/MPL Signaling Regulates Hematopoietic Stem Cell Quiescence and Interaction with the Osteoblastic Niche, Cell Stem Cell, vol. 1, No. 6, Dec. 13, 2007, pp. 685-697.
You et al., A Novel CD7 Chimeric Antigen Receptor-modified NK-92MI Cell Line Targeting T-cell Acute Lymphoblastic Leukemia, American Journal of Cancer Research, vol. 9, No. 1, Jan. 1, 2019, pp. 64-78.
Yu et al., Expression of c-MPL in Leukemic Stem Cells from Acute Myeloid Leukemia Patients, Zhongguo Shi Yan Xue Ye Xue Za Zhi, vol. 20, No. 5, Oct. 2012, pp. 1052-1055. (only abstract available and provided herewith).
Zhang et al., A Novel Retinoblastoma Therapy from Genomic and Epigenetic Analyses, Nature, vol. 481, No. 7381, Jan. 11, 2012, pp. 329-334.
Zhang et al., The Genetic Basis of Early T-cell Precursor Acute Lymphoblastic Leukaemia, Nature, vol. 481, No. 7380, Jan. 11, 2012, pp. 157-163.
Zhang et al., Whole-genome Sequencing Identifies Genetic Alterations in Pediatric Low-grade Gliomas, Nature Genetics, vol. 45, No. 6, Apr. 14, 2013, pp. 602-612.
Zoine et al., Ex Vivo Expanded Patient-derived GD T-cell Immunotherapy Enhances Neuroblastoma Tumor Regression in a Murine Model, OncoImmunology, vol. 8, No. 8, May 27, 2019, 13 pages.
Zoine et al. Thrombopoietin-based CAR-T cells demonstrate in vitro and in vivo cytotoxicity to MPL positive acute myelogenous leukemia and hematopoietic stem cells, Gene Therapy (2022) 29:247-258.

* cited by examiner

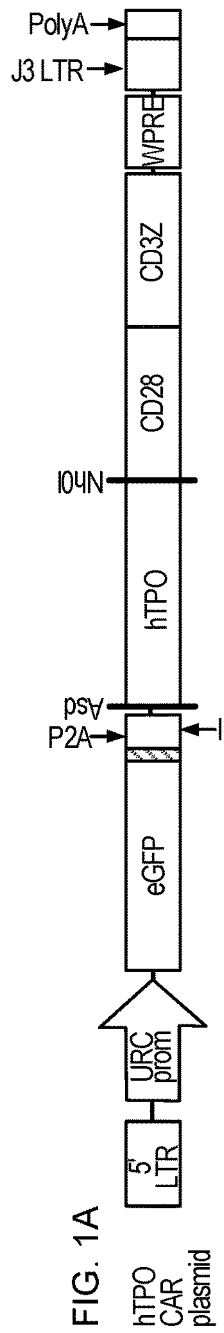
FIG. 1A
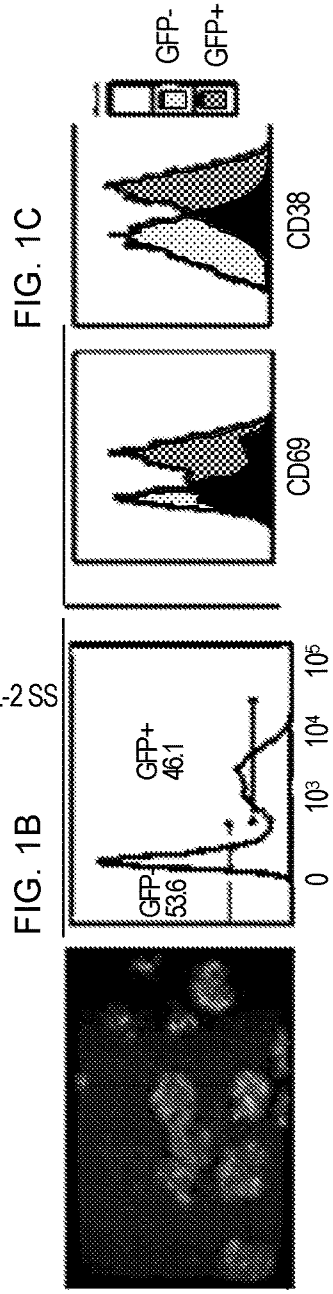
FIG. 1B
FIG. 1C
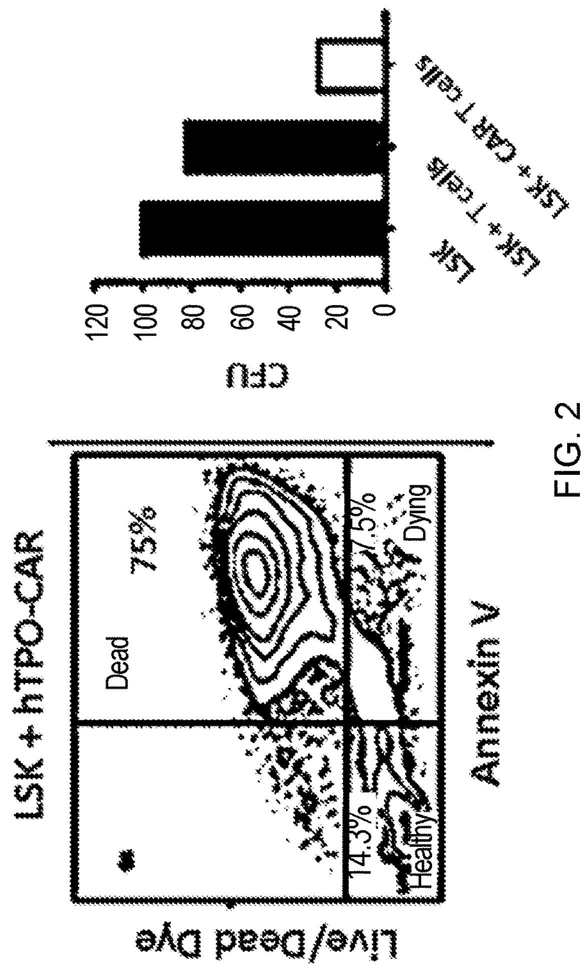
FIG. 2

FIGS. 6A-B

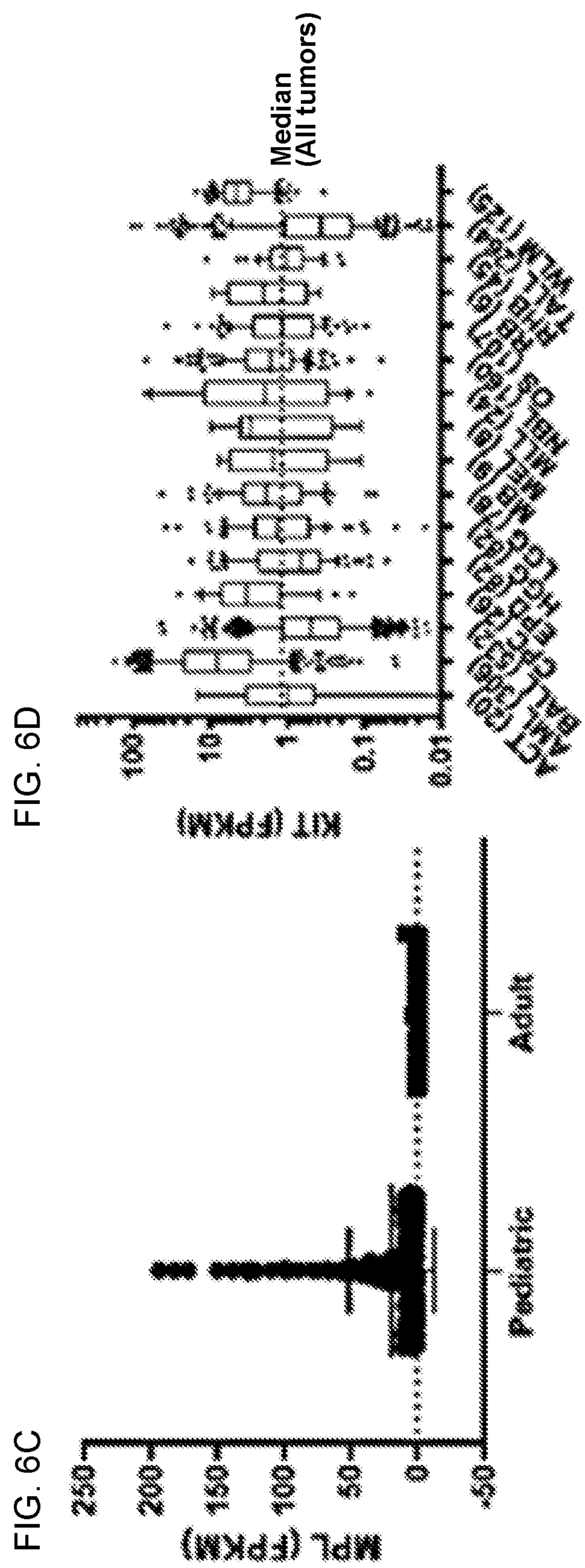
FIGS. 6C-D

FIGS. 6E-G

FIG. 6H
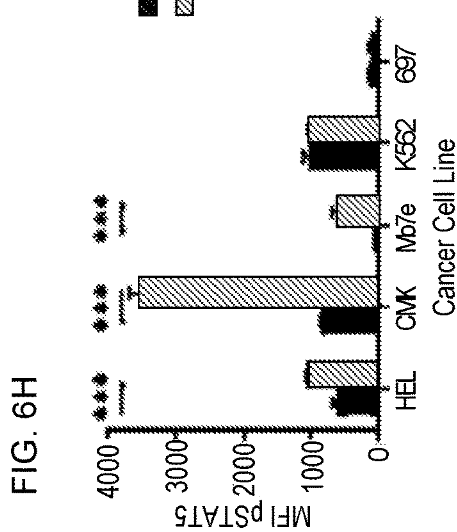
FIG. 6I
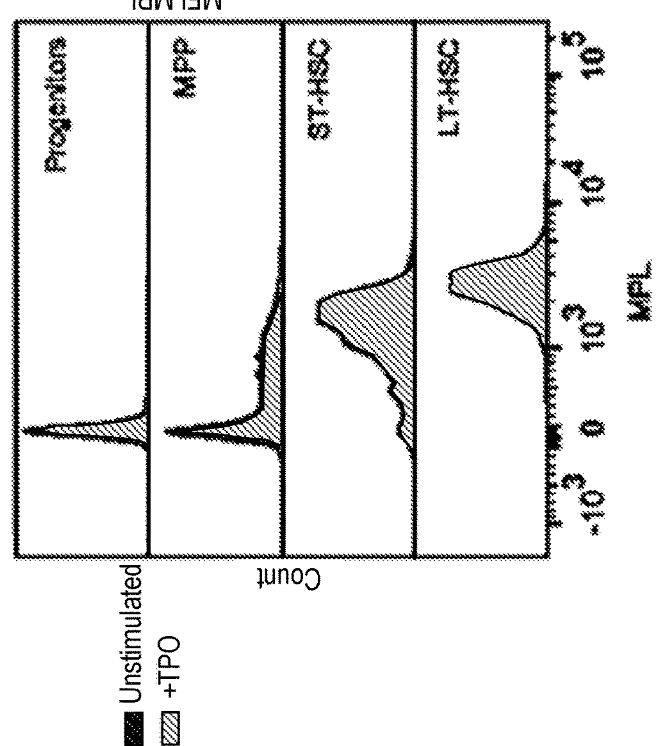
FIG. 6J
MFI MPL
4000
3000
2000
1000
0
****
Progenitors MPP ST-HSC LT-HSC
FIGS. 6H-J

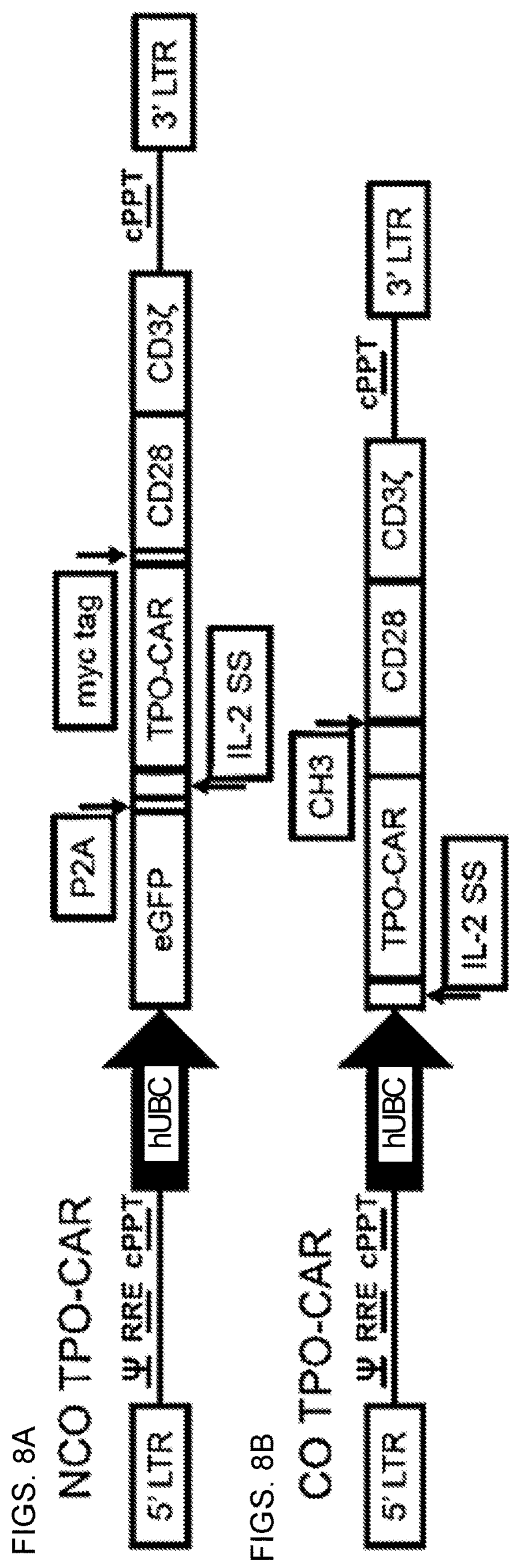
FIGS. 8A-B

Genomic Copies / 50ng DNA
2.0
1.5
1.0
0.5
0.0
*
NCO TPO-CAR
CO TPO-CAR
CD19 CAR

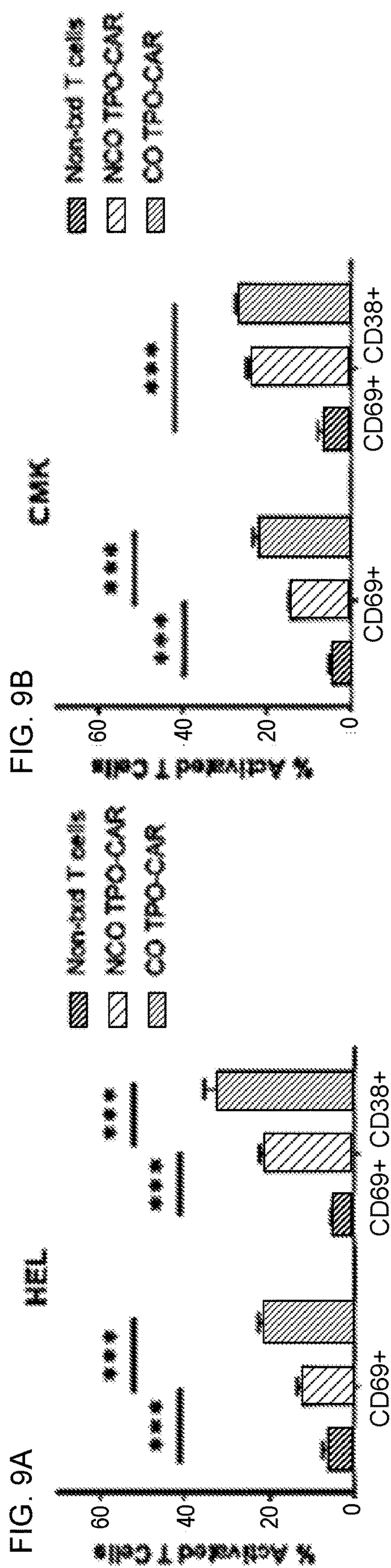
FIG. 9A
FIG. 9B
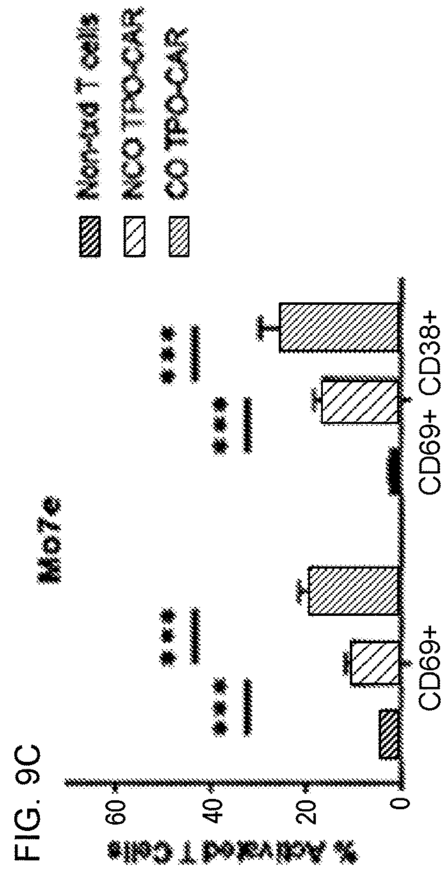
FIG. 9C
FIGS. 9A-C

FIGS. 9D-F

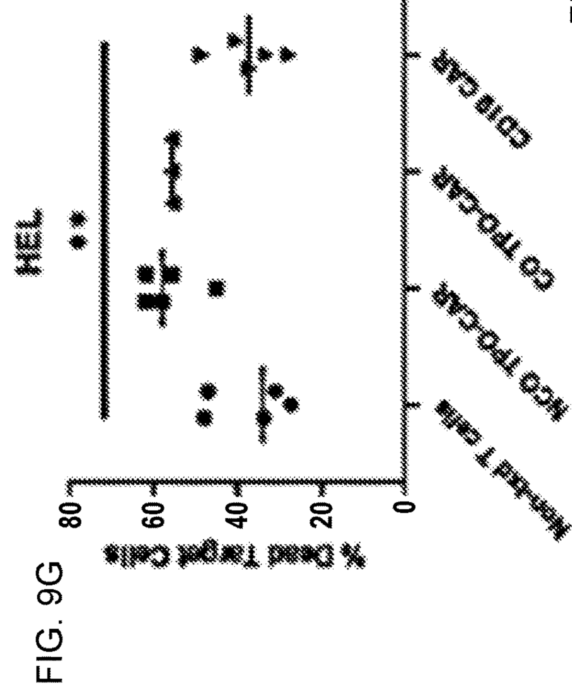
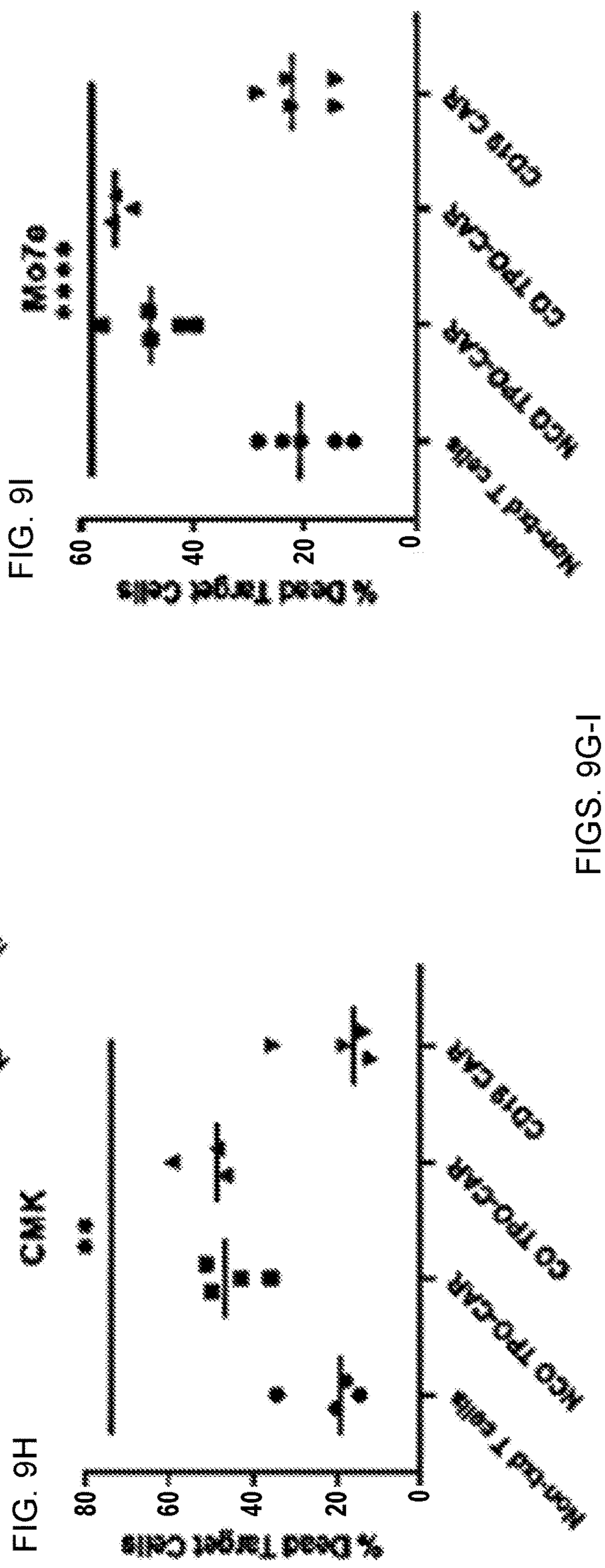
FIGS. 9G-I

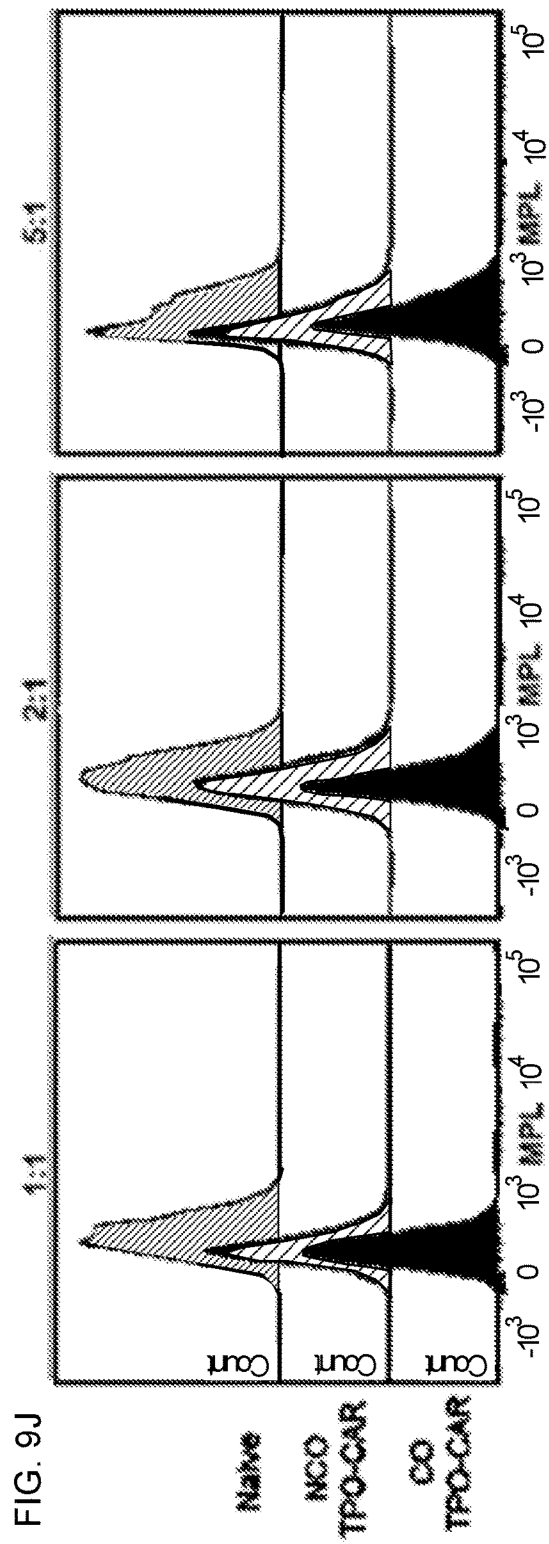
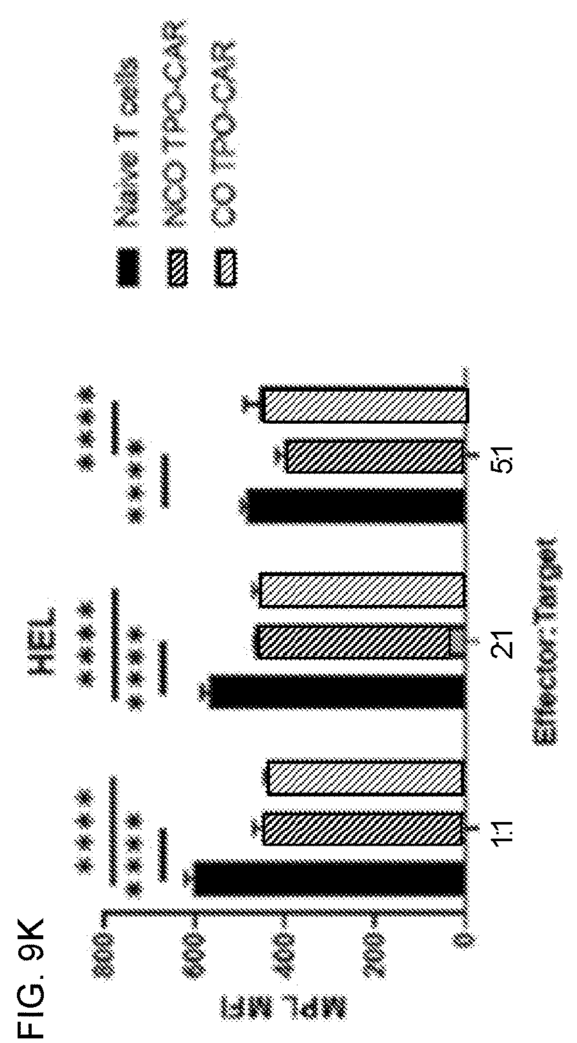
FIGS. 9J-K

FIGS. 9L-M

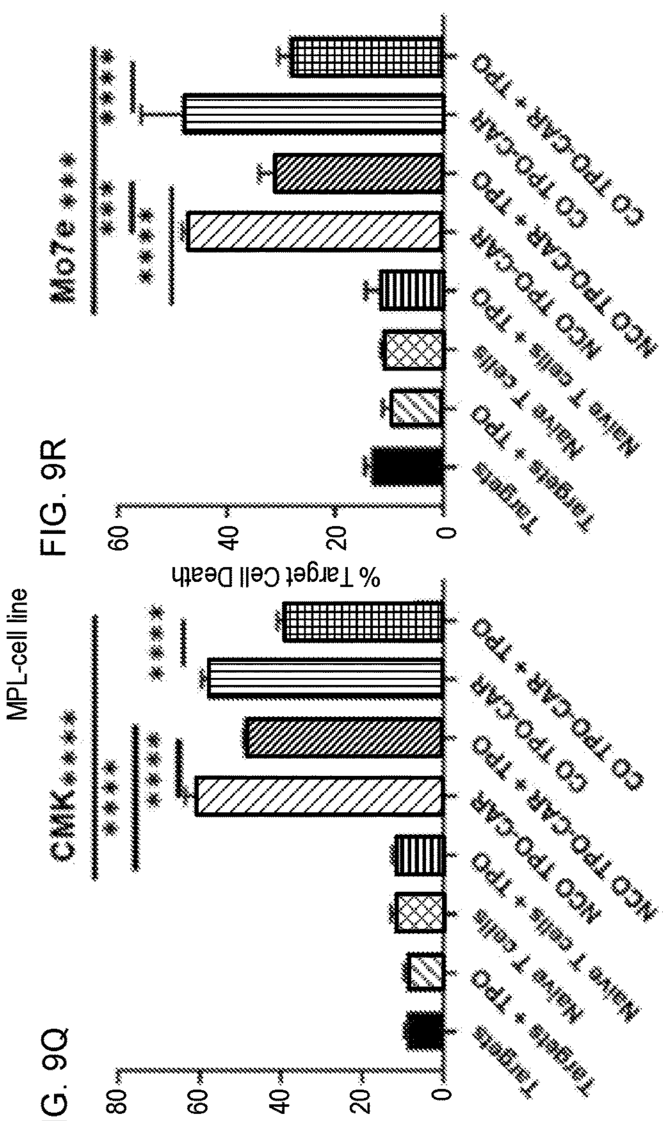
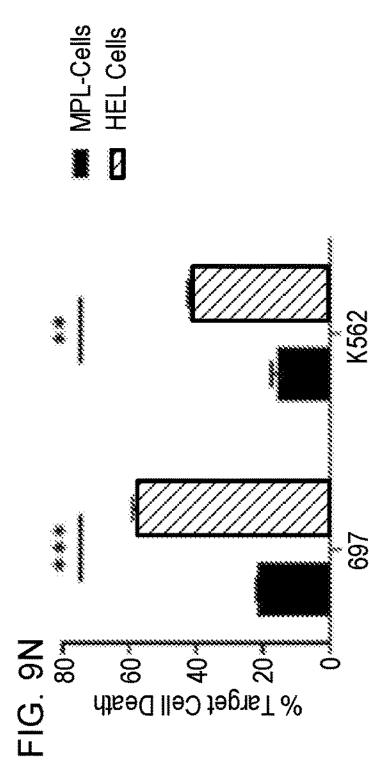
FIGS. 9N-R

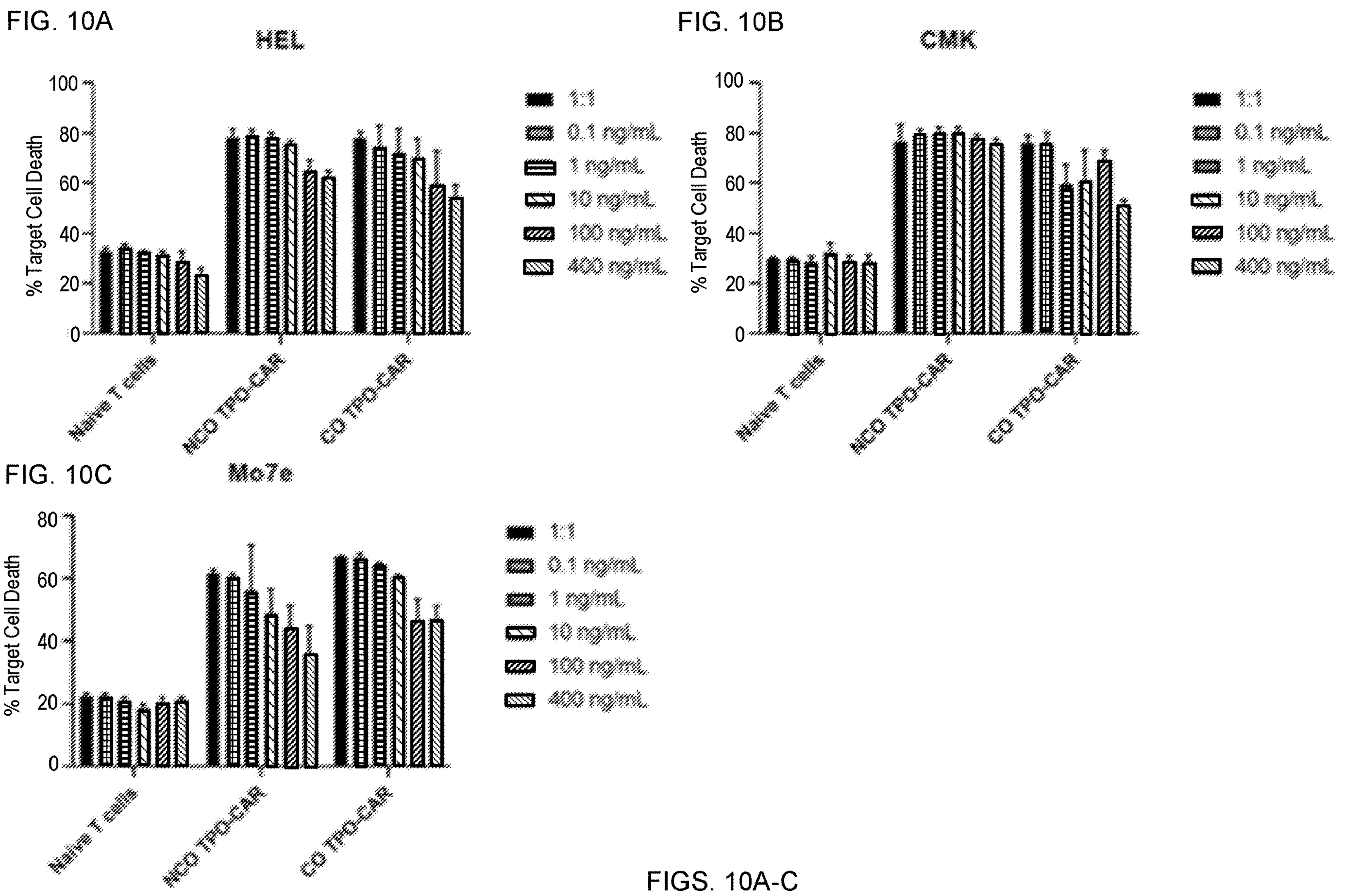
FIGS. 10A-C

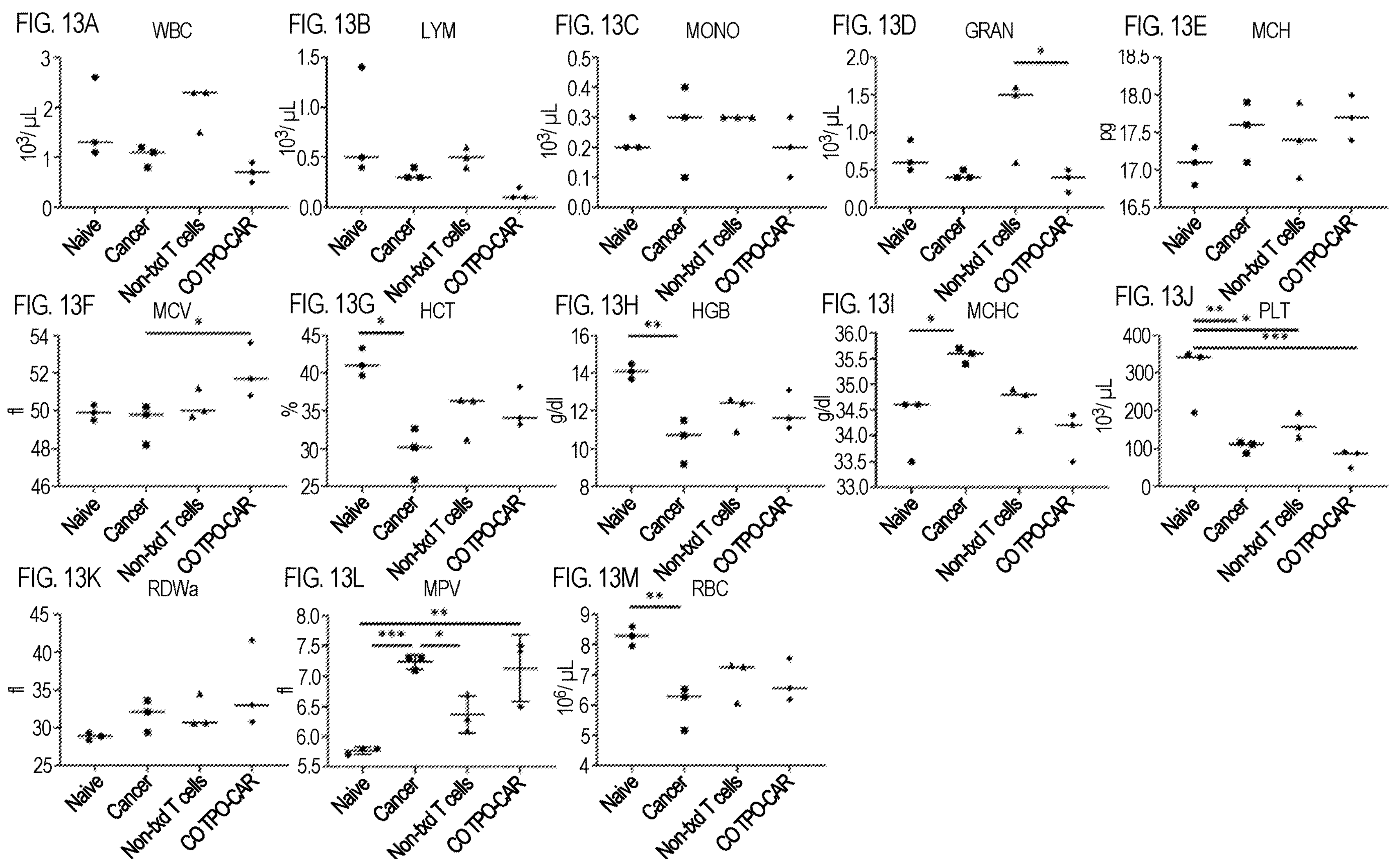
FIGS. 13A-M

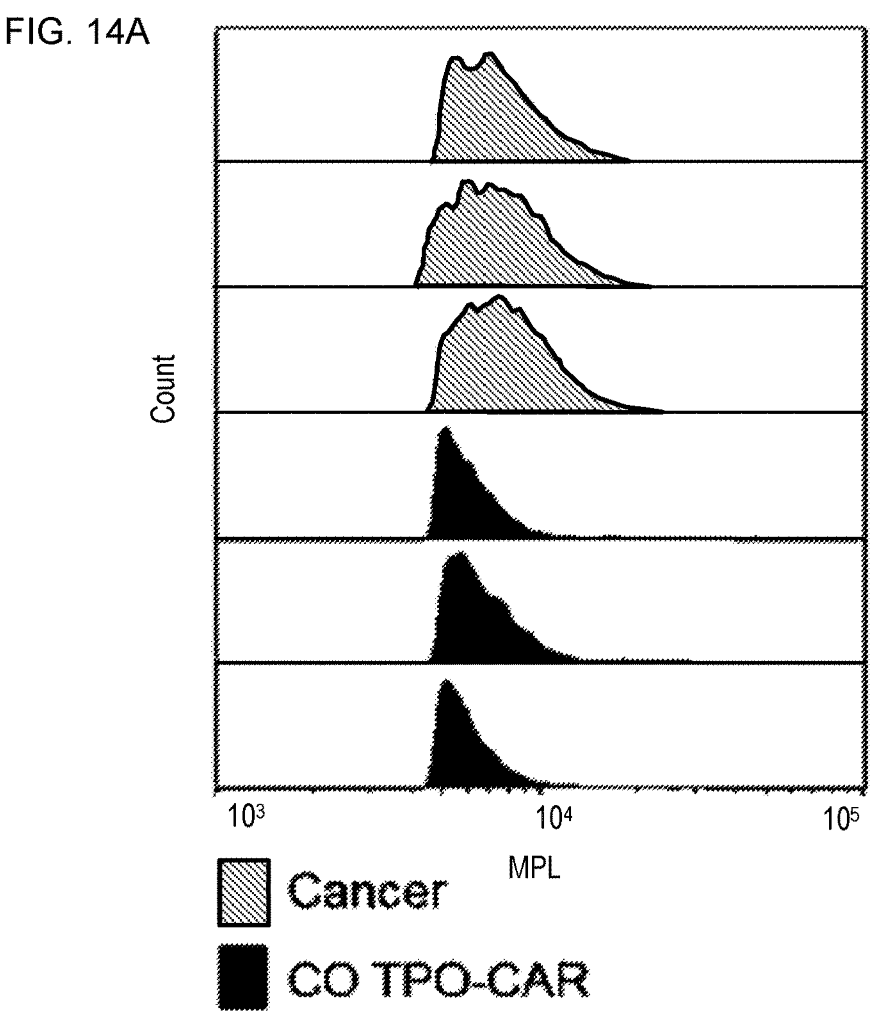
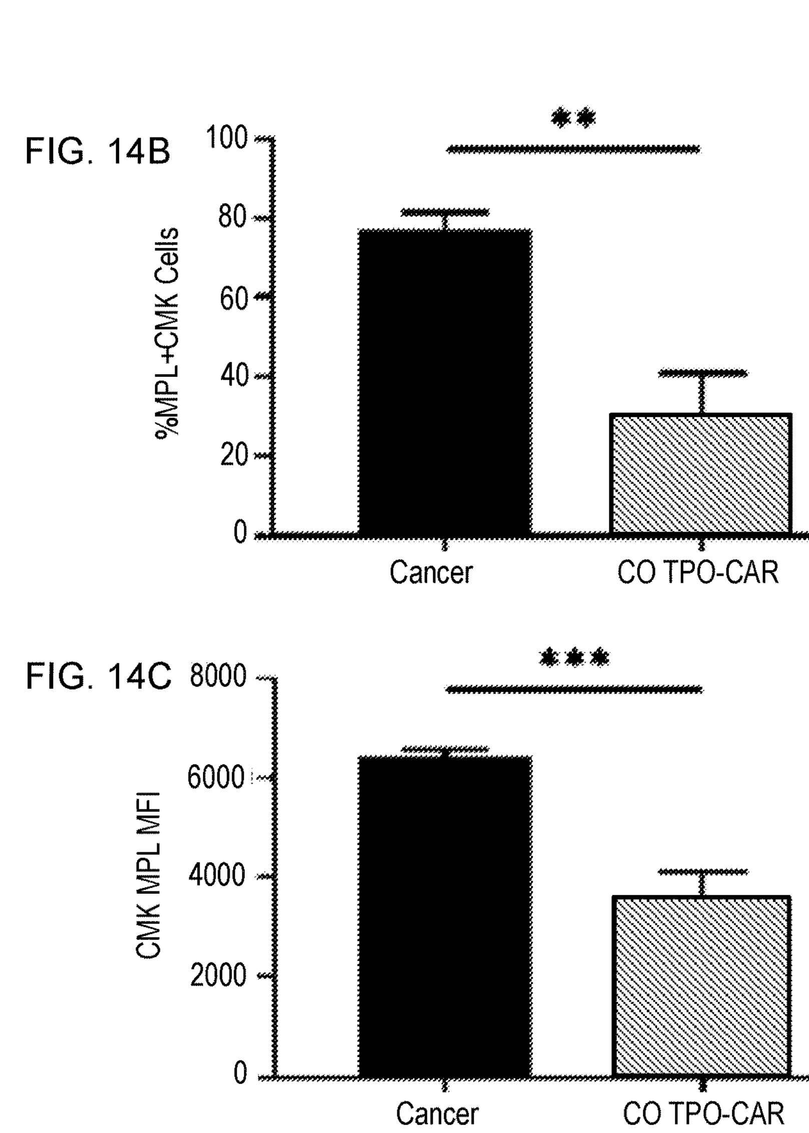
FIGS. 14A-C

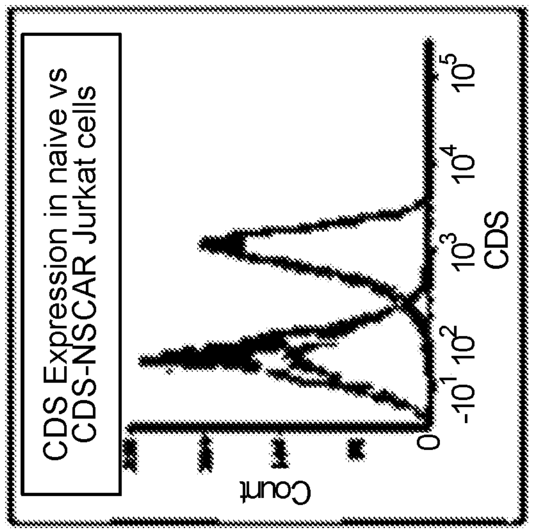
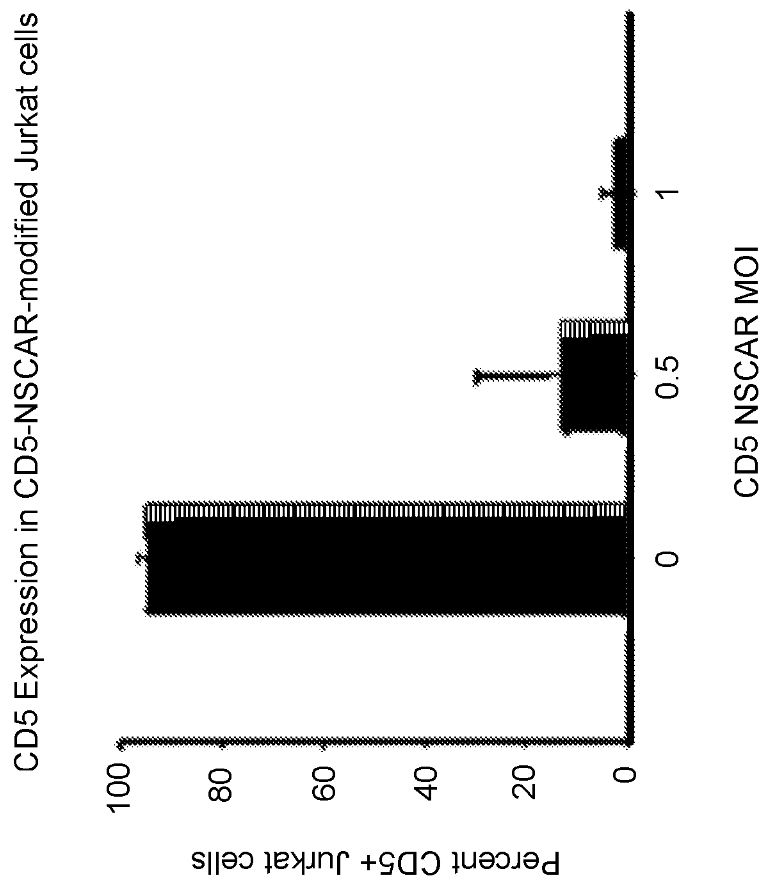
FIG. 33A

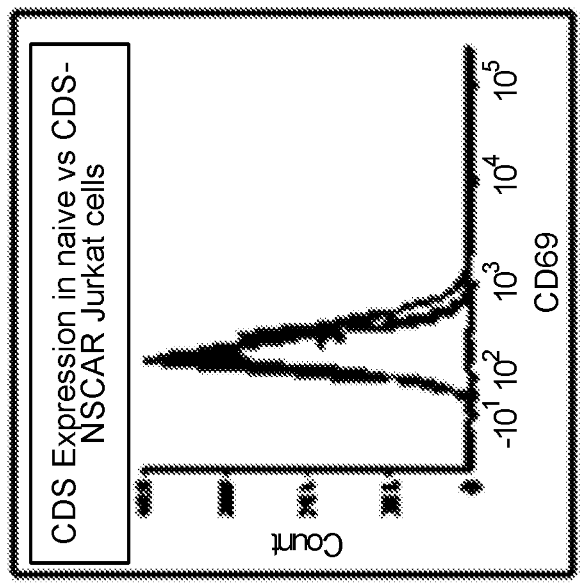
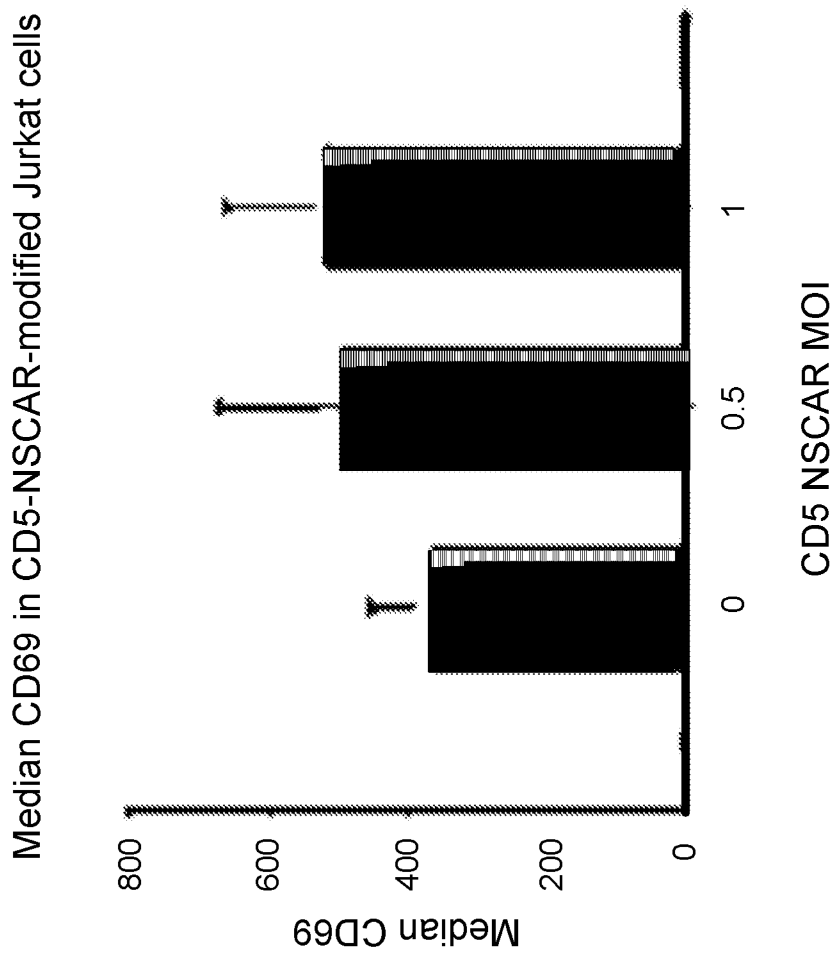
FIG. 33B

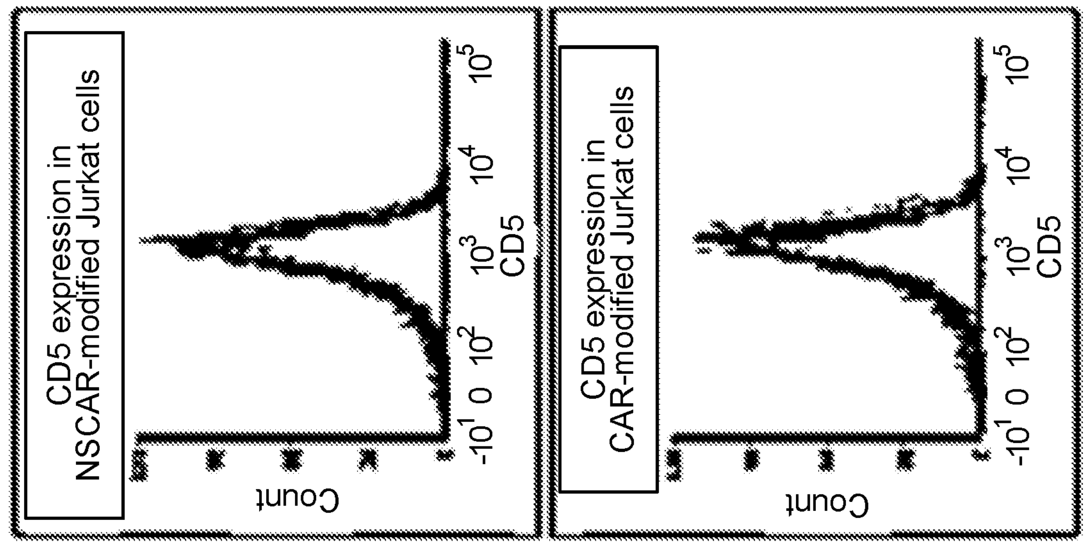
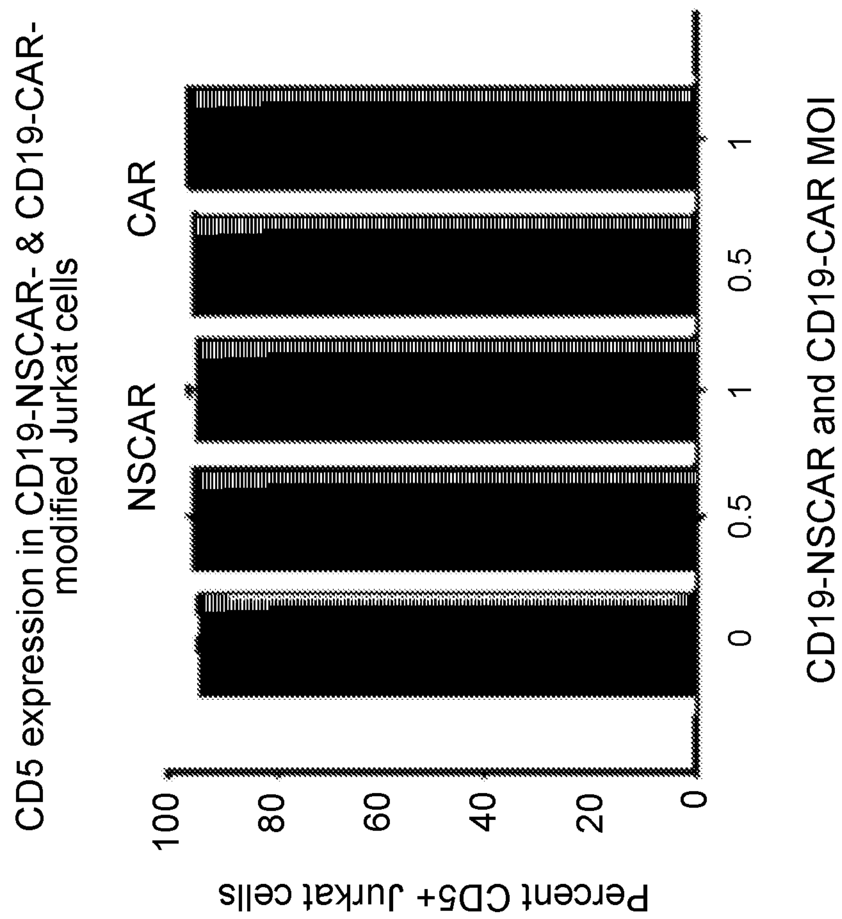
FIG. 33C

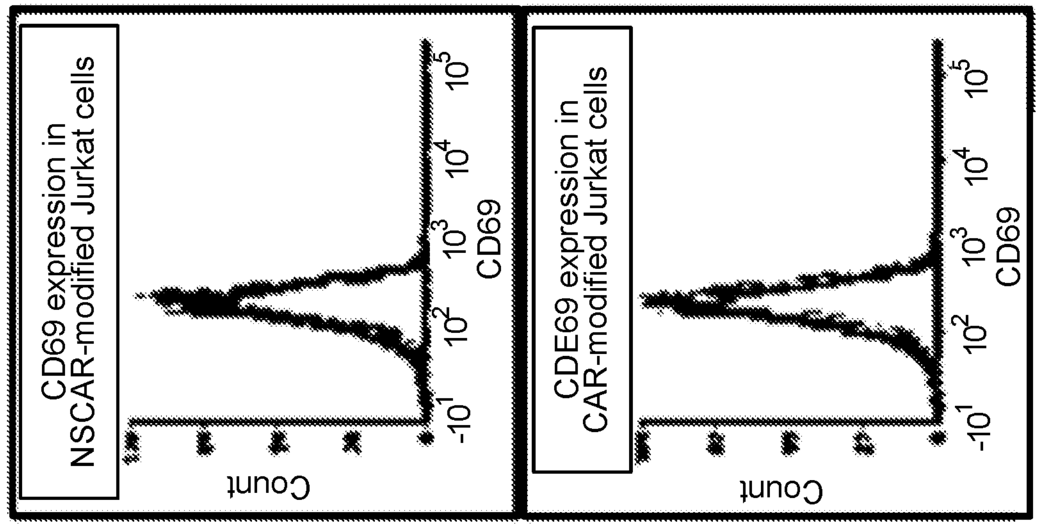
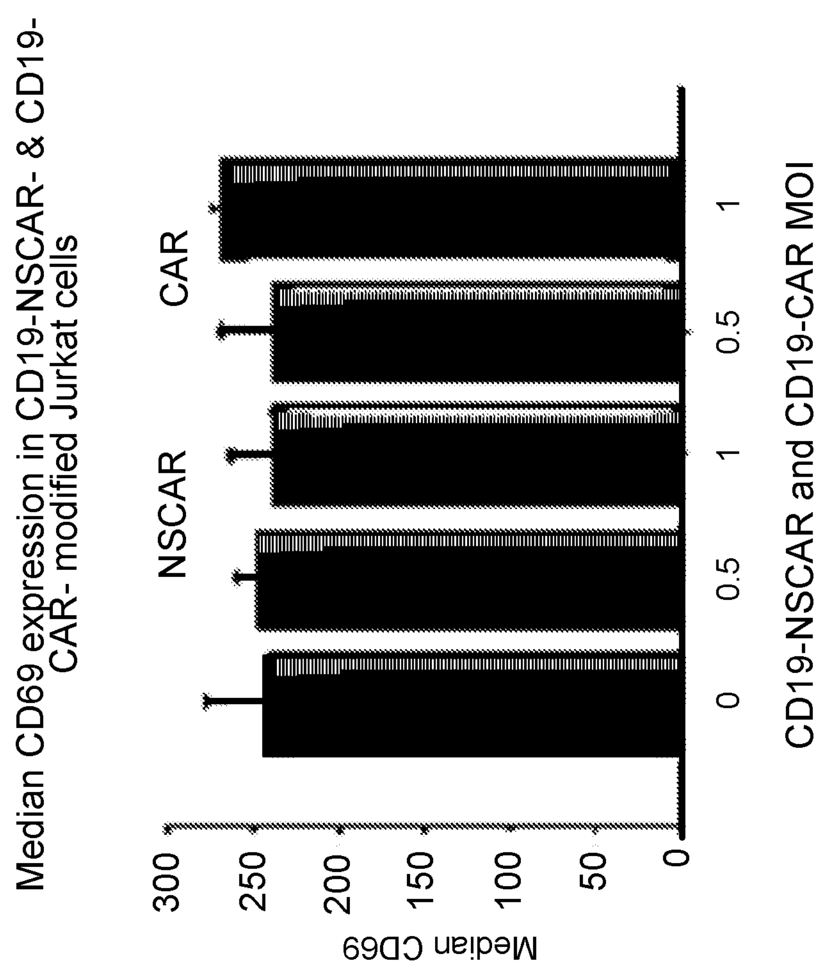
FIG. 33D

FIG. 34A
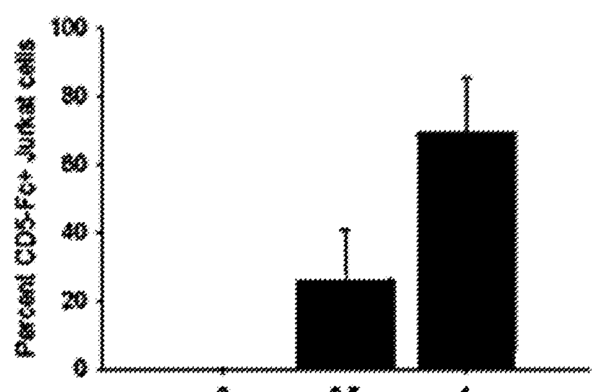
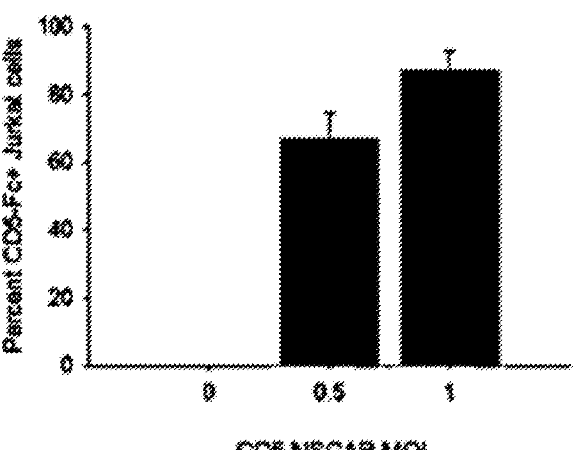
FIG. 34B
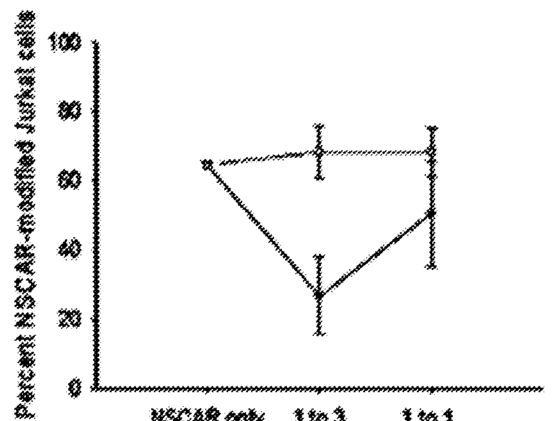
FIG. 34C
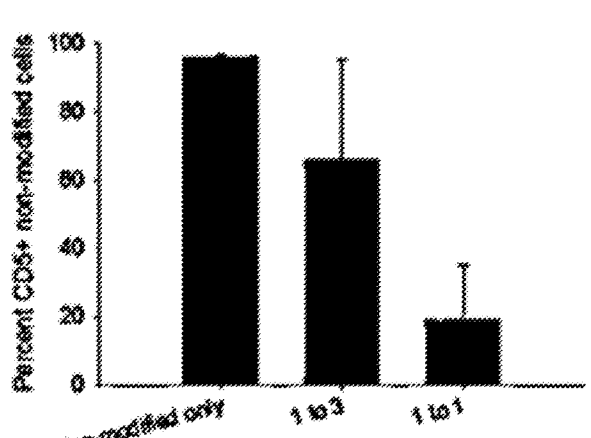
FIGS. 34A-C FIG. 35B
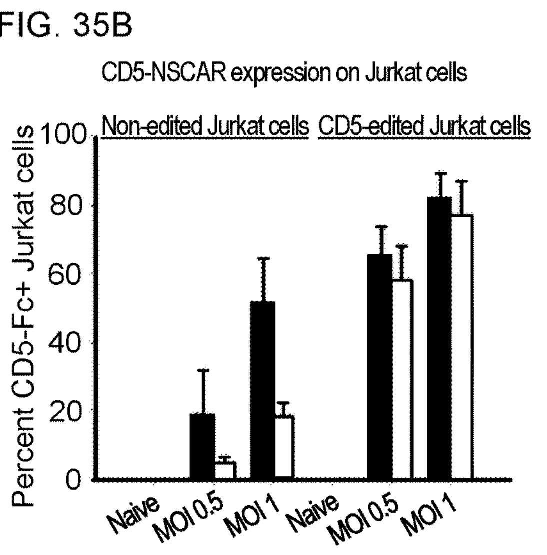
FIG. 35C
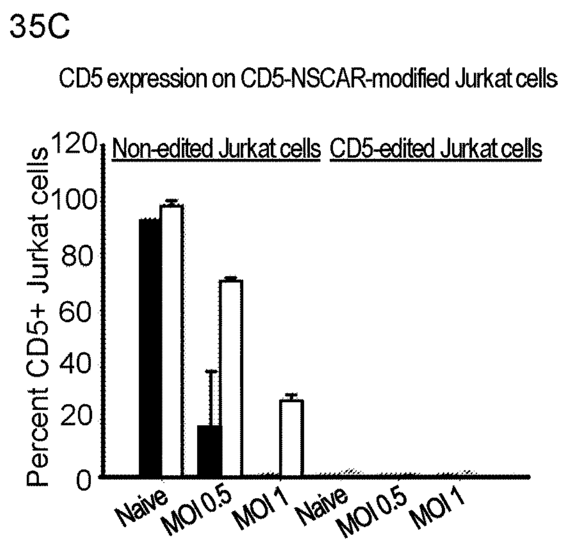
FIG. 35D
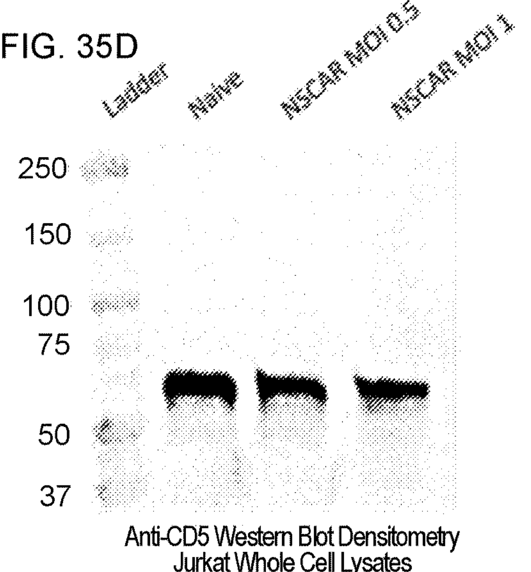
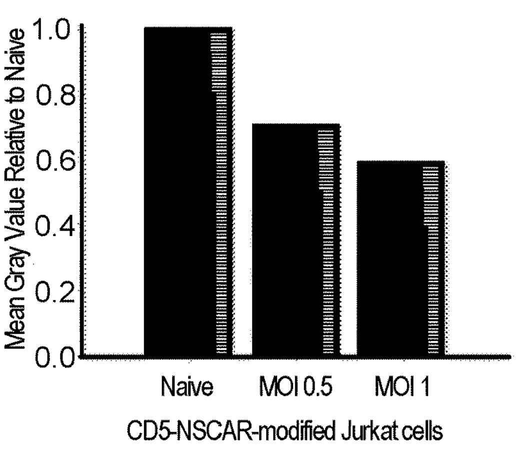
FIGS. 35B-D

FIGS. 42A-B 697 cells cultured in γδ T-cell supernatant for 4 hrs with and without CD19-Fc pre-incubation Percent CD19+ 697 Cells 100
80
60
40
20
0

Naive
Naive + 19-Fc
CD19 NSCAR
CD19 NSCAR + 19-Fc

γδ T-cell Supernatant

FIGS. 42C-D

SEQUENCE LISTING

<160> NUMBER OF SEQ ID NOS: 69

<210> SEQ ID NO 1
<211> LENGTH: 724
<212> TYPE: PRT
<213> ORGANISM: Artificial Sequence
<220> FEATURE:
<223> OTHER INFORMATION: Synthetic construct

<400> SEQUENCE: 1

Pro Ala Pro Pro Ala Cys Asp Leu Arg Val Leu Ser Lys Leu Leu Arg
1               5                   10                  15

Asp Ser His Val Leu His Ser Arg Leu Ser Gln Cys Pro Glu Val His
            20                  25                  30

Pro Leu Pro Thr Pro Val Leu Leu Pro Ala Val Asp Phe Ser Leu Gly
        35                  40                  45

Glu Trp Lys Thr Gln Met Glu Glu Thr Lys Ala Gln Asp Ile Leu Gly
    50                  55                  60

Ala Val Thr Leu Leu Leu Glu Gly Val Met Ala Ala Arg Gly Gln Leu
65                  70                  75                  80

Gly Pro Thr Cys Leu Ser Ser Leu Leu Gly Gln Leu Ser Gly Gln Val
                85                  90                  95

Arg Leu Leu Leu Gly Ala Leu Gln Ser Leu Leu Gly Thr Gln Leu Pro
            100                 105                 110

```
Pro Gln Gly Arg Thr Thr Ala His Lys Asp Pro Asn Ala Ile Phe Leu
        115                 120                 125

Ser Phe Gln His Leu Leu Arg Gly Lys Val Arg Phe Leu Met Leu Val
    130                 135                 140

Gly Gly Ser Thr Leu Cys Val Arg Arg Ala Pro Pro Thr Thr Ala Val
145                 150                 155                 160

Pro Ser Arg Thr Ser Leu Val Leu Thr Leu Asn Glu Leu Pro Asn Arg
                165                 170                 175

Thr Ser Gly Leu Leu Glu Thr Asn Phe Thr Ala Ser Ala Arg Thr Thr
            180                 185                 190

Gly Ser Gly Leu Leu Lys Trp Gln Gln Gly Phe Arg Ala Lys Ile Pro
        195                 200                 205

Gly Leu Leu Asn Gln Thr Ser Arg Ser Leu Asp Gln Ile Pro Gly Tyr
    210                 215                 220

Leu Asn Arg Ile His Glu Leu Leu Asn Gly Thr Arg Gly Leu Phe Pro
225                 230                 235                 240

Gly Pro Ser Arg Arg Thr Leu Gly Ala Pro Asp Ile Ser Ser Gly Thr
                245                 250                 255

Ser Asp Thr Gly Ser Leu Pro Pro Asn Leu Gln Pro Gly Tyr Ser Pro
            260                 265                 270

Ser Pro Thr His Pro Pro Thr Gly Gln Tyr Thr Leu Phe Pro Leu Pro
        275                 280                 285

Pro Thr Leu Pro Thr Pro Val Val Gln Leu His Pro Leu Leu Pro Asp
    290                 295                 300

Pro Ser Ala Pro Thr Pro Thr Pro Thr Ser Pro Leu Leu Asn Thr Ser
305                 310                 315                 320

Tyr Thr His Ser Gln Asn Leu Ser Gln Glu Gly Gly Gly Gly Gly Ser
                325                 330                 335

Gly Gly Gly Gly Ser Gly Gly Gly Gly Ser Asp Val Val Met Thr Gln
            340                 345                 350

Ser Pro Leu Ser Leu Pro Val Ser Leu Gly Asp Gln Ala Ser Ile Ser
        355                 360                 365

Cys Arg Ser Ser Gln Arg Leu Val His Ser Asn Gly Asn Thr Tyr Leu
    370                 375                 380

His Trp Tyr Leu Gln Lys Pro Gly Gln Ser Pro Lys Leu Leu Ile Tyr
385                 390                 395                 400

Arg Val Ser Asn Arg Phe Pro Gly Val Pro Asp Arg Phe Ser Gly Ser
                405                 410                 415

Gly Ser Gly Thr Asp Phe Thr Leu Lys Ile Ser Arg Val Glu Ala Glu
            420                 425                 430

Asp Leu Gly Ile Tyr Phe Cys Ser Gln Ser Thr His Val Pro Tyr Thr
        435                 440                 445

Phe Gly Gly Gly Thr Lys Leu Glu Ile Lys Arg Ser Asp Pro Thr Thr
    450                 455                 460

Thr Pro Ala Pro Arg Pro Pro Thr Pro Ala Pro Thr Ile Ala Ser Gln
465                 470                 475                 480

Pro Leu Ser Leu Arg Pro Glu Ala Cys Arg Pro Ala Ala Gly Gly Ala
                485                 490                 495

Val His Thr Arg Gly Leu Asp Phe Ala Cys Asp Ile Phe Trp Val Leu
            500                 505                 510

Val Val Val Gly Gly Val Leu Ala Cys Tyr Ser Leu Leu Val Thr Val
        515                 520                 525
```

```
Ala Phe Ile Ile Phe Trp Val Arg Ser Lys Arg Ser Arg Leu Leu His
    530                 535                 540

Ser Asp Tyr Met Asn Met Thr Pro Arg Arg Pro Gly Pro Thr Arg Lys
545                 550                 555                 560

His Tyr Gln Pro Tyr Ala Pro Pro Arg Asp Phe Ala Ala Tyr Arg Ser
                565                 570                 575

Arg Asp Gln Arg Leu Pro Pro Asp Ala His Lys Pro Pro Gly Gly Gly
            580                 585                 590

Ser Phe Arg Thr Pro Ile Gln Glu Glu Gln Ala Asp Ala His Ser Thr
        595                 600                 605

Leu Ala Lys Ile Arg Val Lys Phe Ser Arg Ser Ala Asp Ala Pro Ala
    610                 615                 620

Tyr Gln Gln Gly Gln Asn Gln Leu Tyr Asn Glu Leu Asn Leu Gly Arg
625                 630                 635                 640

Arg Glu Glu Tyr Asp Val Leu Asp Lys Arg Arg Gly Arg Asp Pro Glu
                645                 650                 655

Met Gly Gly Lys Pro Arg Arg Lys Asn Pro Gln Glu Gly Leu Tyr Asn
            660                 665                 670

Glu Leu Gln Lys Asp Lys Met Ala Glu Ala Tyr Ser Glu Ile Gly Met
        675                 680                 685

Lys Gly Glu Arg Arg Arg Gly Lys Gly His Asp Gly Leu Tyr Gln Gly
    690                 695                 700

Leu Ser Thr Ala Thr Lys Asp Thr Tyr Asp Ala Leu His Met Gln Ala
705                 710                 715                 720

Leu Pro Pro Arg


<210> SEQ ID NO 2
<211> LENGTH: 837
<212> TYPE: PRT
<213> ORGANISM: Artificial Sequence
<220> FEATURE:
<223> OTHER INFORMATION: Synthetic construct

<400> SEQUENCE: 2

Pro Ala Pro Pro Ala Cys Asp Leu Arg Val Leu Ser Lys Leu Leu Arg
1               5                   10                  15

Asp Ser His Val Leu His Ser Arg Leu Ser Gln Cys Pro Glu Val His
            20                  25                  30

Pro Leu Pro Thr Pro Val Leu Leu Pro Ala Val Asp Phe Ser Leu Gly
        35                  40                  45

Glu Trp Lys Thr Gln Met Glu Glu Thr Lys Ala Gln Asp Ile Leu Gly
    50                  55                  60

Ala Val Thr Leu Leu Leu Glu Gly Val Met Ala Ala Arg Gly Gln Leu
65                  70                  75                  80

Gly Pro Thr Cys Leu Ser Ser Leu Leu Gly Gln Leu Ser Gly Gln Val
                85                  90                  95

Arg Leu Leu Leu Gly Ala Leu Gln Ser Leu Leu Gly Thr Gln Leu Pro
            100                 105                 110

Pro Gln Gly Arg Thr Thr Ala His Lys Asp Pro Asn Ala Ile Phe Leu
        115                 120                 125

Ser Phe Gln His Leu Leu Arg Gly Lys Val Arg Phe Leu Met Leu Val
    130                 135                 140

Gly Gly Ser Thr Leu Cys Val Arg Arg Ala Pro Pro Thr Thr Ala Val
145                 150                 155                 160

Pro Ser Arg Thr Ser Leu Val Leu Thr Leu Asn Glu Leu Pro Asn Arg
```

-continued

```
                165                 170                 175

Thr Ser Gly Leu Leu Glu Thr Asn Phe Thr Ala Ser Ala Arg Thr Thr
            180                 185                 190

Gly Ser Gly Leu Leu Lys Trp Gln Gln Gly Phe Arg Ala Lys Ile Pro
        195                 200                 205

Gly Leu Leu Asn Gln Thr Ser Arg Ser Leu Asp Gln Ile Pro Gly Tyr
    210                 215                 220

Leu Asn Arg Ile His Glu Leu Leu Asn Gly Thr Arg Gly Leu Phe Pro
225                 230                 235                 240

Gly Pro Ser Arg Arg Thr Leu Gly Ala Pro Asp Ile Ser Ser Gly Thr
                245                 250                 255

Ser Asp Thr Gly Ser Leu Pro Pro Asn Leu Gln Pro Gly Tyr Ser Pro
            260                 265                 270

Ser Pro Thr His Pro Pro Thr Gly Gln Tyr Thr Leu Phe Pro Leu Pro
        275                 280                 285

Pro Thr Leu Pro Thr Pro Val Val Gln Leu His Pro Leu Leu Pro Asp
    290                 295                 300

Pro Ser Ala Pro Thr Pro Thr Pro Thr Ser Pro Leu Leu Asn Thr Ser
305                 310                 315                 320

Tyr Thr His Ser Gln Asn Leu Ser Gln Glu Gly Gly Gly Gly Gly Ser
                325                 330                 335

Gly Gly Gly Gly Ser Gly Gly Gly Gly Ser Asp Val Val Met Thr Gln
            340                 345                 350

Ser Pro Leu Ser Leu Pro Val Ser Leu Gly Asp Gln Ala Ser Ile Ser
        355                 360                 365

Cys Arg Ser Ser Gln Arg Leu Val His Ser Asn Gly Asn Thr Tyr Leu
    370                 375                 380

His Trp Tyr Leu Gln Lys Pro Gly Gln Ser Pro Lys Leu Leu Ile Tyr
385                 390                 395                 400

Arg Val Ser Asn Arg Phe Pro Gly Val Pro Asp Arg Phe Ser Gly Ser
                405                 410                 415

Gly Ser Gly Thr Asp Phe Thr Leu Lys Ile Ser Arg Val Glu Ala Glu
            420                 425                 430

Asp Leu Gly Ile Tyr Phe Cys Ser Gln Ser Thr His Val Pro Tyr Thr
        435                 440                 445

Phe Gly Gly Gly Thr Lys Leu Glu Ile Lys Arg Ser Asp Pro Ala Glu
    450                 455                 460

Pro Lys Ser Pro Asp Lys Thr His Thr Cys Pro Pro Cys Pro Ala Pro
465                 470                 475                 480

Pro Val Ala Gly Pro Ser Val Phe Leu Phe Pro Pro Lys Pro Lys Asp
                485                 490                 495

Thr Leu Met Ile Ala Arg Thr Pro Glu Val Thr Cys Val Val Val Asp
            500                 505                 510

Val Ser His Glu Asp Pro Glu Val Lys Phe Asn Trp Tyr Val Asp Gly
        515                 520                 525

Val Glu Val His Asn Ala Lys Thr Lys Pro Arg Glu Glu Gln Tyr Asn
    530                 535                 540

Ser Thr Tyr Arg Val Val Ser Val Leu Thr Val Leu His Gln Asp Trp
545                 550                 555                 560

Leu Asn Gly Lys Glu Tyr Lys Cys Lys Val Ser Asn Lys Ala Leu Pro
                565                 570                 575

Ala Pro Ile Glu Lys Thr Ile Ser Lys Ala Lys Gly Gln Pro Arg Glu
            580                 585                 590
```

```
Pro Gln Val Tyr Thr Leu Pro Pro Ser Arg Asp Glu Leu Thr Lys Asn
        595                 600                 605

Gln Val Ser Leu Thr Cys Leu Val Lys Gly Phe Tyr Pro Ser Asp Ile
    610                 615                 620

Ala Val Glu Trp Glu Ser Asn Gly Gln Pro Glu Asn Asn Tyr Lys Thr
625                 630                 635                 640

Thr Pro Pro Val Leu Asp Ser Asp Gly Ser Phe Phe Leu Tyr Ser Lys
                645                 650                 655

Leu Thr Val Asp Lys Ser Arg Trp Gln Gln Gly Asn Val Phe Ser Cys
            660                 665                 670

Ser Val Met His Glu Ala Leu His Asn His Tyr Thr Gln Lys Ser Leu
        675                 680                 685

Ser Leu Ser Pro Gly Lys Lys Asp Pro Lys Phe Trp Val Leu Val Val
    690                 695                 700

Val Gly Gly Val Leu Ala Cys Tyr Ser Leu Leu Val Thr Val Ala Phe
705                 710                 715                 720

Ile Ile Phe Trp Val Arg Ser Lys Arg Ser Arg Leu Leu His Ser Asp
                725                 730                 735

Tyr Met Asn Met Thr Pro Arg Arg Pro Gly Pro Thr Arg Lys His Tyr
            740                 745                 750

Gln Pro Tyr Ala Pro Pro Arg Asp Phe Ala Ala Tyr Arg Ser Arg Asp
        755                 760                 765

Gln Arg Leu Pro Pro Asp Ala His Lys Pro Pro Gly Gly Gly Ser Phe
    770                 775                 780

Arg Thr Pro Ile Gln Glu Glu Gln Ala Asp Ala His Ser Thr Leu Ala
785                 790                 795                 800

Lys Ile Arg Val Lys Phe Ser Arg Ser Ala Asp Ala Pro Ala Tyr Gln
                805                 810                 815

Gln Gly Gln Asn Gln Leu Tyr Asn Glu Leu Asn Leu Gly Arg Arg Glu
            820                 825                 830

Glu Tyr Asp Val Leu
        835
```

<210> SEQ ID NO 3
<211> LENGTH: 698
<212> TYPE: PRT
<213> ORGANISM: Artificial Sequence
<220> FEATURE:
<223> OTHER INFORMATION: Synthetic construct

<400> SEQUENCE: 3

```
Pro Ala Pro Pro Ala Cys Asp Leu Arg Val Leu Ser Lys Leu Leu Arg
1               5                   10                  15

Asp Ser His Val Leu His Ser Arg Leu Ser Gln Cys Pro Glu Val His
            20                  25                  30

Pro Leu Pro Thr Pro Val Leu Leu Pro Ala Val Asp Phe Ser Leu Gly
        35                  40                  45

Glu Trp Lys Thr Gln Met Glu Glu Thr Lys Ala Gln Asp Ile Leu Gly
    50                  55                  60

Ala Val Thr Leu Leu Leu Glu Gly Val Met Ala Ala Arg Gly Gln Leu
65                  70                  75                  80

Gly Pro Thr Cys Leu Ser Ser Leu Leu Gly Gln Leu Ser Gly Gln Val
                85                  90                  95

Arg Leu Leu Leu Gly Ala Leu Gln Ser Leu Leu Gly Thr Gln Leu Pro
            100                 105                 110
```

-continued

```
Pro Gln Gly Arg Thr Thr Ala His Lys Asp Pro Asn Ala Ile Phe Leu
        115                 120                 125

Ser Phe Gln His Leu Leu Arg Gly Lys Val Arg Phe Leu Met Leu Val
    130                 135                 140

Gly Gly Ser Thr Leu Cys Val Arg Arg Ala Pro Pro Thr Thr Ala Val
145                 150                 155                 160

Pro Ser Arg Thr Ser Leu Val Leu Thr Leu Asn Glu Leu Pro Asn Arg
                165                 170                 175

Thr Ser Gly Leu Leu Glu Thr Asn Phe Thr Ala Ser Ala Arg Thr Thr
            180                 185                 190

Gly Ser Gly Leu Leu Lys Trp Gln Gln Gly Phe Arg Ala Lys Ile Pro
        195                 200                 205

Gly Leu Leu Asn Gln Thr Ser Arg Ser Leu Asp Gln Ile Pro Gly Tyr
    210                 215                 220

Leu Asn Arg Ile His Glu Leu Leu Asn Gly Thr Arg Gly Leu Phe Pro
225                 230                 235                 240

Gly Pro Ser Arg Arg Thr Leu Gly Ala Pro Asp Ile Ser Ser Gly Thr
                245                 250                 255

Ser Asp Thr Gly Ser Leu Pro Pro Asn Leu Gln Pro Gly Tyr Ser Pro
            260                 265                 270

Ser Pro Thr His Pro Pro Thr Gly Gln Tyr Thr Leu Phe Pro Leu Pro
        275                 280                 285

Pro Thr Leu Pro Thr Pro Val Val Gln Leu His Pro Leu Leu Pro Asp
    290                 295                 300

Pro Ser Ala Pro Thr Pro Thr Pro Thr Ser Pro Leu Leu Asn Thr Ser
305                 310                 315                 320

Tyr Thr His Ser Gln Asn Leu Ser Gln Glu Gly Gly Gly Gly Gly Ser
                325                 330                 335

Gly Gly Gly Gly Ser Gly Gly Gly Gly Ser Asp Val Val Met Thr Gln
            340                 345                 350

Ser Pro Leu Ser Leu Pro Val Ser Leu Gly Asp Gln Ala Ser Ile Ser
        355                 360                 365

Cys Arg Ser Ser Gln Arg Leu Val His Ser Asn Gly Asn Thr Tyr Leu
    370                 375                 380

His Trp Tyr Leu Gln Lys Pro Gly Gln Ser Pro Lys Leu Leu Ile Tyr
385                 390                 395                 400

Arg Val Ser Asn Arg Phe Pro Gly Val Pro Asp Arg Phe Ser Gly Ser
                405                 410                 415

Gly Ser Gly Thr Asp Phe Thr Leu Lys Ile Ser Arg Val Glu Ala Glu
            420                 425                 430

Asp Leu Gly Ile Tyr Phe Cys Ser Gln Ser Thr His Val Pro Tyr Thr
        435                 440                 445

Phe Gly Gly Gly Thr Lys Leu Glu Ile Lys Arg Ser Asp Pro Ala Glu
    450                 455                 460

Pro Lys Ser Pro Asp Lys Thr His Thr Cys Pro Pro Cys Pro Lys Asp
465                 470                 475                 480

Pro Lys Phe Trp Val Leu Val Val Val Gly Gly Val Leu Ala Cys Tyr
                485                 490                 495

Ser Leu Leu Val Thr Val Ala Phe Ile Ile Phe Trp Val Arg Ser Lys
            500                 505                 510

Arg Ser Arg Leu Leu His Ser Asp Tyr Met Asn Met Thr Pro Arg Arg
        515                 520                 525
```

```
Pro Gly Pro Thr Arg Lys His Tyr Gln Pro Tyr Ala Pro Pro Arg Asp
    530                 535                 540

Phe Ala Ala Tyr Arg Ser Arg Asp Gln Arg Leu Pro Pro Asp Ala His
545                 550                 555                 560

Lys Pro Pro Gly Gly Gly Ser Phe Arg Thr Pro Ile Gln Glu Glu Gln
                565                 570                 575

Ala Asp Ala His Ser Thr Leu Ala Lys Ile Arg Val Lys Phe Ser Arg
            580                 585                 590

Ser Ala Asp Ala Pro Ala Tyr Gln Gln Gly Gln Asn Gln Leu Tyr Asn
        595                 600                 605

Glu Leu Asn Leu Gly Arg Arg Glu Glu Tyr Asp Val Leu Asp Lys Arg
    610                 615                 620

Arg Gly Arg Asp Pro Glu Met Gly Gly Lys Pro Arg Arg Lys Asn Pro
625                 630                 635                 640

Gln Glu Gly Leu Tyr Asn Glu Leu Gln Lys Asp Lys Met Ala Glu Ala
                645                 650                 655

Tyr Ser Glu Ile Gly Met Lys Gly Glu Arg Arg Arg Gly Lys Gly His
            660                 665                 670

Asp Gly Leu Tyr Gln Gly Leu Ser Thr Ala Thr Lys Asp Thr Tyr Asp
        675                 680                 685

Ala Leu His Met Gln Ala Leu Pro Pro Arg
    690                 695


<210> SEQ ID NO 4
<211> LENGTH: 174
<212> TYPE: PRT
<213> ORGANISM: Artificial Sequence
<220> FEATURE:
<223> OTHER INFORMATION: Synthetic construct

<400> SEQUENCE: 4

Ser Pro Ala Pro Pro Ala Cys Asp Leu Arg Val Leu Ser Lys Leu Leu
1               5                   10                  15

Arg Asp Ser His Val Leu His Ser Arg Leu Ser Gln Cys Pro Glu Val
            20                  25                  30

His Pro Leu Pro Thr Pro Val Leu Leu Pro Ala Val Asp Phe Ser Leu
        35                  40                  45

Gly Glu Trp Lys Thr Gln Met Glu Glu Thr Lys Ala Gln Asp Ile Leu
    50                  55                  60

Gly Ala Val Thr Leu Leu Leu Glu Gly Val Met Ala Ala Arg Gly Gln
65                  70                  75                  80

Leu Gly Pro Thr Cys Leu Ser Ser Leu Leu Gly Gln Leu Ser Gly Gln
                85                  90                  95

Val Arg Leu Leu Leu Gly Ala Leu Gln Ser Leu Leu Gly Thr Gln Leu
            100                 105                 110

Pro Pro Gln Gly Arg Thr Thr Ala His Lys Asp Pro Asn Ala Ile Phe
        115                 120                 125

Leu Ser Phe Gln His Leu Leu Arg Gly Lys Val Arg Phe Leu Met Leu
    130                 135                 140

Val Gly Gly Ser Thr Leu Cys Val Arg Arg Ala Pro Pro Thr Thr Ala
145                 150                 155                 160

Val Pro Ser Arg Thr Ser Leu Val Leu Thr Leu Asn Glu Leu
                165                 170


<210> SEQ ID NO 5
<211> LENGTH: 500
```

<212> TYPE: PRT
<213> ORGANISM: Artificial Sequence
<220> FEATURE:
<223> OTHER INFORMATION: Synthetic construct

<400> SEQUENCE: 5

```
Ser Pro Ala Pro Pro Ala Cys Asp Leu Arg Val Leu Ser Lys Leu Leu
1               5                   10                  15

Arg Asp Ser His Val Leu His Ser Arg Leu Ser Gln Cys Pro Glu Val
            20                  25                  30

His Pro Leu Pro Thr Pro Val Leu Leu Pro Ala Val Asp Phe Ser Leu
        35                  40                  45

Gly Glu Trp Lys Thr Gln Met Glu Glu Thr Lys Ala Gln Asp Ile Leu
    50                  55                  60

Gly Ala Val Thr Leu Leu Leu Glu Gly Val Met Ala Ala Arg Gly Gln
65                  70                  75                  80

Leu Gly Pro Thr Cys Leu Ser Ser Leu Leu Gly Gln Leu Ser Gly Gln
                85                  90                  95

Val Arg Leu Leu Leu Gly Ala Leu Gln Ser Leu Leu Gly Thr Gln Leu
            100                 105                 110

Pro Pro Gln Gly Arg Thr Thr Ala His Lys Asp Pro Asn Ala Ile Phe
        115                 120                 125

Leu Ser Phe Gln His Leu Leu Arg Gly Lys Val Arg Phe Leu Met Leu
    130                 135                 140

Val Gly Gly Ser Thr Leu Cys Val Arg Arg Ala Pro Pro Thr Thr Ala
145                 150                 155                 160

Val Pro Ser Arg Thr Ser Leu Val Leu Thr Leu Asn Glu Leu Ala Ser
                165                 170                 175

Glu Pro Lys Ser Cys Asp Lys Thr His Thr Cys Pro Gly Gln Pro Arg
            180                 185                 190

Glu Pro Gln Val Tyr Thr Leu Pro Pro Ser Arg Glu Glu Met Thr Lys
        195                 200                 205

Asn Gln Val Ser Leu Thr Cys Leu Val Lys Gly Phe Tyr Pro Ser Asp
    210                 215                 220

Ile Ala Val Glu Trp Glu Ser Asn Gly Gln Pro Glu Asn Asn Tyr Lys
225                 230                 235                 240

Thr Thr Pro Pro Val Leu Asp Ser Asp Gly Ser Phe Phe Leu Tyr Ser
                245                 250                 255

Lys Leu Thr Val Asp Lys Ser Arg Trp Gln Gln Gly Asn Val Phe Ser
            260                 265                 270

Cys Ser Val Met His Glu Ala Leu His Asn His Tyr Thr Gln Lys Ser
        275                 280                 285

Leu Ser Leu Ser Pro Gly Lys Asp Asn Glu Lys Ser Asn Gly Thr Ile
    290                 295                 300

Ile His Val Lys Gly Lys His Leu Cys Pro Ser Pro Leu Phe Pro Gly
305                 310                 315                 320

Pro Ser Lys Pro Phe Trp Val Leu Val Val Val Gly Gly Val Leu Ala
                325                 330                 335

Cys Tyr Ser Leu Leu Val Thr Val Ala Phe Ile Ile Phe Trp Val Arg
            340                 345                 350

Ser Lys Arg Ser Arg Leu Leu His Ser Asp Tyr Met Asn Met Thr Pro
        355                 360                 365

Arg Arg Pro Gly Pro Thr Arg Lys His Tyr Gln Pro Tyr Ala Pro Pro
    370                 375                 380
```

```
Arg Asp Phe Ala Ala Tyr Arg Ser Ser Arg Ser Ala Asp Ala Pro Ala
385                 390                 395                 400

Tyr Gln Gln Gly Gln Asn Gln Leu Tyr Asn Glu Leu Asn Leu Gly Arg
                405                 410                 415

Arg Glu Glu Tyr Asp Val Leu Asp Lys Arg Arg Gly Arg Asp Pro Glu
            420                 425                 430

Met Gly Gly Lys Pro Arg Arg Lys Asn Pro Gln Glu Gly Leu Tyr Asn
        435                 440                 445

Glu Leu Gln Lys Asp Lys Met Ala Glu Ala Tyr Ser Glu Ile Gly Met
    450                 455                 460

Lys Gly Glu Arg Arg Arg Gly Lys Gly His Asp Gly Leu Tyr Gln Gly
465                 470                 475                 480

Leu Ser Thr Ala Thr Lys Asp Thr Tyr Asp Ala Leu His Met Gln Ala
                485                 490                 495

Leu Pro Pro Arg
            500


<210> SEQ ID NO 6
<211> LENGTH: 427
<212> TYPE: PRT
<213> ORGANISM: Artificial Sequence
<220> FEATURE:
<223> OTHER INFORMATION: Synthetic construct

<400> SEQUENCE: 6

Ser Pro Ala Pro Pro Ala Cys Asp Leu Arg Val Leu Ser Lys Leu Leu
1               5                   10                  15

Arg Asp Ser His Val Leu His Ser Arg Leu Ser Gln Cys Pro Glu Val
            20                  25                  30

His Pro Leu Pro Thr Pro Val Leu Leu Pro Ala Val Asp Phe Ser Leu
        35                  40                  45

Gly Glu Trp Lys Thr Gln Met Glu Glu Thr Lys Ala Gln Asp Ile Leu
    50                  55                  60

Gly Ala Val Thr Leu Leu Leu Glu Gly Val Met Ala Ala Arg Gly Gln
65                  70                  75                  80

Leu Gly Pro Thr Cys Leu Ser Ser Leu Leu Gly Gln Leu Ser Gly Gln
                85                  90                  95

Val Arg Leu Leu Leu Gly Ala Leu Gln Ser Leu Leu Gly Thr Gln Leu
            100                 105                 110

Pro Pro Gln Gly Arg Thr Thr Ala His Lys Asp Pro Asn Ala Ile Phe
        115                 120                 125

Leu Ser Phe Gln His Leu Leu Arg Gly Lys Val Arg Phe Leu Met Leu
    130                 135                 140

Val Gly Gly Ser Thr Leu Cys Val Arg Arg Ala Pro Pro Thr Thr Ala
145                 150                 155                 160

Val Pro Ser Arg Thr Ser Leu Val Leu Thr Leu Asn Glu Leu Ala Ser
                165                 170                 175

Thr Thr Thr Pro Ala Pro Arg Pro Pro Thr Pro Ala Pro Thr Ile Ala
            180                 185                 190

Ser Gln Pro Leu Ser Leu Arg Pro Glu Ala Cys Arg Pro Ala Ala Gly
        195                 200                 205

Gly Ala Val His Thr Arg Gly Leu Asp Phe Ala Cys Asp Ile Asp Asn
    210                 215                 220

Glu Lys Ser Asn Gly Thr Ile Ile His Val Lys Gly Lys His Leu Cys
225                 230                 235                 240
```

```
Pro Ser Pro Leu Phe Pro Gly Pro Ser Lys Pro Phe Trp Val Leu Val
                245                 250                 255

Val Val Gly Gly Val Leu Ala Cys Tyr Ser Leu Leu Val Thr Val Ala
            260                 265                 270

Phe Ile Ile Phe Trp Val Arg Ser Lys Arg Ser Arg Leu Leu His Ser
        275                 280                 285

Asp Tyr Met Asn Met Thr Pro Arg Arg Pro Gly Pro Thr Arg Lys His
    290                 295                 300

Tyr Gln Pro Tyr Ala Pro Pro Arg Asp Phe Ala Ala Tyr Arg Ser Ser
305                 310                 315                 320

Arg Ser Ala Asp Ala Pro Ala Tyr Gln Gln Gly Gln Asn Gln Leu Tyr
                325                 330                 335

Asn Glu Leu Asn Leu Gly Arg Arg Glu Glu Tyr Asp Val Leu Asp Lys
            340                 345                 350

Arg Arg Gly Arg Asp Pro Glu Met Gly Gly Lys Pro Arg Arg Lys Asn
        355                 360                 365

Pro Gln Glu Gly Leu Tyr Asn Glu Leu Gln Lys Asp Lys Met Ala Glu
    370                 375                 380

Ala Tyr Ser Glu Ile Gly Met Lys Gly Glu Arg Arg Arg Gly Lys Gly
385                 390                 395                 400

His Asp Gly Leu Tyr Gln Gly Leu Ser Thr Ala Thr Lys Asp Thr Tyr
                405                 410                 415

Asp Ala Leu His Met Gln Ala Leu Pro Pro Arg
            420                 425


<210> SEQ ID NO 7
<211> LENGTH: 273
<212> TYPE: PRT
<213> ORGANISM: Artificial Sequence
<220> FEATURE:
<223> OTHER INFORMATION: Synthetic construct

<400> SEQUENCE: 7

Met Lys Lys Thr Gln Thr Trp Ile Leu Thr Cys Ile Tyr Leu Gln Leu
1               5                   10                  15

Leu Leu Phe Asn Pro Leu Val Lys Thr Glu Gly Ile Cys Arg Asn Arg
            20                  25                  30

Val Thr Asn Asn Val Lys Asp Val Thr Lys Leu Val Ala Asn Leu Pro
        35                  40                  45

Lys Asp Tyr Met Ile Thr Leu Lys Tyr Val Pro Gly Met Asp Val Leu
    50                  55                  60

Pro Ser His Cys Trp Ile Ser Glu Met Val Val Gln Leu Ser Asp Ser
65                  70                  75                  80

Leu Thr Asp Leu Leu Asp Lys Phe Ser Asn Ile Ser Glu Gly Leu Ser
                85                  90                  95

Asn Tyr Ser Ile Ile Asp Lys Leu Val Asn Ile Val Asp Asp Leu Val
            100                 105                 110

Glu Cys Val Lys Glu Asn Ser Ser Lys Asp Leu Lys Lys Ser Phe Lys
        115                 120                 125

Ser Pro Glu Pro Arg Leu Phe Thr Pro Glu Glu Phe Phe Arg Ile Phe
    130                 135                 140

Asn Arg Ser Ile Asp Ala Phe Lys Asp Phe Val Val Ala Ser Glu Thr
145                 150                 155                 160

Ser Asp Cys Val Val Ser Ser Thr Leu Ser Pro Glu Lys Asp Ser Arg
                165                 170                 175
```

```
Val Ser Val Thr Lys Pro Phe Met Leu Pro Pro Val Ala Ala Ser Ser
            180                 185                 190

Leu Arg Asn Asp Ser Ser Ser Ser Asn Arg Lys Ala Lys Asn Pro Pro
        195                 200                 205

Gly Asp Ser Ser Leu His Trp Ala Ala Met Ala Leu Pro Ala Leu Phe
    210                 215                 220

Ser Leu Ile Ile Gly Phe Ala Phe Gly Ala Leu Tyr Trp Lys Lys Arg
225                 230                 235                 240

Gln Pro Ser Leu Thr Arg Ala Val Glu Asn Ile Gln Ile Asn Glu Glu
                245                 250                 255

Asp Asn Glu Ile Ser Met Leu Gln Glu Lys Glu Arg Glu Phe Gln Glu
            260                 265                 270

Val


<210> SEQ ID NO 8
<211> LENGTH: 418
<212> TYPE: PRT
<213> ORGANISM: Artificial Sequence
<220> FEATURE:
<223> OTHER INFORMATION: Synthetic construct

<400> SEQUENCE: 8

Lys Glu Ile Cys Gly Asn Pro Val Thr Asp Asn Val Lys Asp Ile Thr
1               5                   10                  15

Lys Leu Val Ala Asn Leu Pro Asn Asp Tyr Met Ile Thr Leu Asn Tyr
            20                  25                  30

Val Ala Gly Met Asp Val Leu Pro Ser His Cys Trp Leu Arg Asp Met
        35                  40                  45

Val Ile Gln Leu Ser Leu Ser Leu Thr Thr Leu Leu Asp Lys Phe Ser
    50                  55                  60

Asn Ile Ser Glu Gly Leu Ser Asn Tyr Ser Ile Ile Asp Lys Leu Gly
65                  70                  75                  80

Lys Ile Val Asp Asp Leu Val Leu Cys Met Glu Glu Asn Ala Pro Lys
                85                  90                  95

Asn Ile Lys Glu Ser Pro Lys Arg Pro Glu Thr Arg Ser Phe Thr Pro
            100                 105                 110

Glu Glu Phe Phe Ser Ile Phe Asn Arg Ser Ile Asp Ala Phe Lys Asp
        115                 120                 125

Phe Met Val Ala Ser Asp Thr Ser Asp Cys Val Leu Ser Ser Thr Leu
    130                 135                 140

Gly Pro Glu Lys Asp Ser Arg Val Ser Val Thr Lys Pro Phe Met Leu
145                 150                 155                 160

Pro Pro Val Ala Ala Ala Ser Thr Thr Thr Pro Ala Pro Arg Pro Pro
                165                 170                 175

Thr Pro Ala Pro Thr Ile Ala Ser Gln Pro Leu Ser Leu Arg Pro Glu
            180                 185                 190

Ala Cys Arg Pro Ala Ala Gly Gly Ala Val His Thr Arg Gly Leu Asp
        195                 200                 205

Phe Ala Cys Asp Ile Asp Asn Glu Lys Ser Asn Gly Thr Ile Ile His
    210                 215                 220

Val Lys Gly Lys His Leu Cys Pro Ser Pro Leu Phe Pro Gly Pro Ser
225                 230                 235                 240

Lys Pro Phe Trp Val Leu Val Val Val Gly Gly Val Leu Ala Cys Tyr
                245                 250                 255

Ser Leu Leu Val Thr Val Ala Phe Ile Ile Phe Trp Val Arg Ser Lys
```

```
            260                 265                 270

Arg Ser Arg Leu Leu His Ser Asp Tyr Met Asn Met Thr Pro Arg Arg
        275                 280                 285

Pro Gly Pro Thr Arg Lys His Tyr Gln Pro Tyr Ala Pro Pro Arg Asp
    290                 295                 300

Phe Ala Ala Tyr Arg Ser Ser Arg Ser Ala Asp Ala Pro Ala Tyr Gln
305                 310                 315                 320

Gln Gly Gln Asn Gln Leu Tyr Asn Glu Leu Asn Leu Gly Arg Arg Glu
                325                 330                 335

Glu Tyr Asp Val Leu Asp Lys Arg Arg Gly Arg Asp Pro Glu Met Gly
            340                 345                 350

Gly Lys Pro Arg Arg Lys Asn Pro Gln Glu Gly Leu Tyr Asn Glu Leu
        355                 360                 365

Gln Lys Asp Lys Met Ala Glu Ala Tyr Ser Glu Ile Gly Met Lys Gly
    370                 375                 380

Glu Arg Arg Arg Gly Lys Gly His Asp Gly Leu Tyr Gln Gly Leu Ser
385                 390                 395                 400

Thr Ala Thr Lys Asp Thr Tyr Asp Ala Leu His Met Gln Ala Leu Pro
                405                 410                 415

Pro Arg


<210> SEQ ID NO 9
<211> LENGTH: 96
<212> TYPE: PRT
<213> ORGANISM: Artificial Sequence
<220> FEATURE:
<223> OTHER INFORMATION: Synthetic construct

<400> SEQUENCE: 9

Asp Asn Glu Lys Ser Asn Gly Thr Ile Ile His Val Lys Gly Lys His
1               5                   10                  15

Leu Cys Pro Ser Pro Leu Phe Pro Gly Pro Ser Lys Pro Phe Trp Val
            20                  25                  30

Leu Val Val Val Gly Gly Val Leu Ala Cys Tyr Ser Leu Leu Val Thr
        35                  40                  45

Val Ala Phe Ile Ile Phe Trp Val Arg Ser Lys Arg Ser Arg Leu Leu
    50                  55                  60

His Ser Asp Tyr Met Asn Met Thr Pro Arg Arg Pro Gly Pro Thr Arg
65                  70                  75                  80

Lys His Tyr Gln Pro Tyr Ala Pro Pro Arg Asp Phe Ala Ala Tyr Arg
                85                  90                  95


<210> SEQ ID NO 10
<211> LENGTH: 108
<212> TYPE: PRT
<213> ORGANISM: Artificial Sequence
<220> FEATURE:
<223> OTHER INFORMATION: Synthetic construct

<400> SEQUENCE: 10

Ser Arg Ser Ala Asp Ala Pro Ala Tyr Gln Gln Gly Gln Asn Gln Leu
1               5                   10                  15

Tyr Asn Glu Leu Asn Leu Gly Arg Arg Glu Glu Tyr Asp Val Leu Asp
            20                  25                  30

Lys Arg Arg Gly Arg Asp Pro Glu Met Gly Gly Lys Pro Arg Arg Lys
        35                  40                  45

Asn Pro Gln Glu Gly Leu Tyr Asn Glu Leu Gln Lys Asp Lys Met Ala
```

```
    50                  55                  60

Glu Ala Tyr Ser Glu Ile Gly Met Lys Gly Glu Arg Arg Arg Gly Lys
65                  70                  75                  80

Gly His Asp Gly Leu Tyr Gln Gly Leu Ser Thr Ala Thr Lys Asp Thr
                85                  90                  95

Tyr Asp Ala Leu His Met Gln Ala Leu Pro Pro Arg
            100                 105


<210> SEQ ID NO 11
<211> LENGTH: 47
<212> TYPE: PRT
<213> ORGANISM: Artificial Sequence
<220> FEATURE:
<223> OTHER INFORMATION: Synthetic construct

<400> SEQUENCE: 11

Ala Ser Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Cys Arg Pro Ala
            20                  25                  30

Ala Gly Gly Ala Val His Thr Arg Gly Leu Asp Phe Ala Cys Asp
        35                  40                  45


<210> SEQ ID NO 12
<211> LENGTH: 20
<212> TYPE: PRT
<213> ORGANISM: Artificial Sequence
<220> FEATURE:
<223> OTHER INFORMATION: Synthetic construct

<400> SEQUENCE: 12

Met Tyr Arg Met Gln Leu Leu Ser Cys Ile Ala Leu Ser Leu Ala Leu
1               5                   10                  15

Val Thr Asn Ser
            20


<210> SEQ ID NO 13
<211> LENGTH: 332
<212> TYPE: PRT
<213> ORGANISM: Artificial Sequence
<220> FEATURE:
<223> OTHER INFORMATION: Synthetic construct

<400> SEQUENCE: 13

Ser Pro Ala Pro Pro Ala Cys Asp Leu Arg Val Leu Ser Lys Leu Leu
1               5                   10                  15

Arg Asp Ser His Val Leu His Ser Arg Leu Ser Gln Cys Pro Glu Val
            20                  25                  30

His Pro Leu Pro Thr Pro Val Leu Leu Pro Ala Val Asp Phe Ser Leu
        35                  40                  45

Gly Glu Trp Lys Thr Gln Met Glu Glu Thr Lys Ala Gln Asp Ile Leu
    50                  55                  60

Gly Ala Val Thr Leu Leu Leu Glu Gly Val Met Ala Ala Arg Gly Gln
65                  70                  75                  80

Leu Gly Pro Thr Cys Leu Ser Ser Leu Leu Gly Gln Leu Ser Gly Gln
                85                  90                  95

Val Arg Leu Leu Leu Gly Ala Leu Gln Ser Leu Leu Gly Thr Gln Leu
            100                 105                 110

Pro Pro Gln Gly Arg Thr Thr Ala His Lys Asp Pro Asn Ala Ile Phe
        115                 120                 125
```

```
Leu Ser Phe Gln His Leu Leu Arg Gly Lys Val Arg Phe Leu Met Leu
    130                 135                 140

Val Gly Gly Ser Thr Leu Cys Val Arg Arg Ala Pro Pro Thr Thr Ala
145                 150                 155                 160

Val Pro Ser Arg Thr Ser Leu Val Leu Thr Leu Asn Glu Leu Pro Asn
                165                 170                 175

Arg Thr Ser Gly Leu Leu Glu Thr Asn Phe Thr Ala Ser Ala Arg Thr
            180                 185                 190

Thr Gly Ser Gly Leu Leu Lys Trp Gln Gln Gly Phe Arg Ala Lys Ile
        195                 200                 205

Pro Gly Leu Leu Asn Gln Thr Ser Arg Ser Leu Asp Gln Ile Pro Gly
    210                 215                 220

Tyr Leu Asn Arg Ile His Glu Leu Leu Asn Gly Thr Arg Gly Leu Phe
225                 230                 235                 240

Pro Gly Pro Ser Arg Arg Thr Leu Gly Ala Pro Asp Ile Ser Ser Gly
                245                 250                 255

Thr Ser Asp Thr Gly Ser Leu Pro Pro Asn Leu Gln Pro Gly Tyr Ser
            260                 265                 270

Pro Ser Pro Thr His Pro Pro Thr Gly Gln Tyr Thr Leu Phe Pro Leu
        275                 280                 285

Pro Pro Thr Leu Pro Thr Pro Val Val Gln Leu His Pro Leu Leu Pro
    290                 295                 300

Asp Pro Ser Ala Pro Thr Pro Thr Pro Thr Ser Pro Leu Leu Asn Thr
305                 310                 315                 320

Ser Tyr Thr His Ser Gln Asn Leu Ser Gln Glu Gly
                325                 330
```

<210> SEQ ID NO 14
<211> LENGTH: 522
<212> TYPE: DNA
<213> ORGANISM: Artificial Sequence
<220> FEATURE:
<223> OTHER INFORMATION: Synthetic construct

<400> SEQUENCE: 14

```
agcccggctc ctcctgcttg tgacctccga gtcctcagta aactgcttcg tgactcccat     60

gtccttcaca gcagactgag ccagtgccca gaggttcacc ctttgcctac acctgtcctg    120

ctgcctgctg tggactttag cttgggagag tggaaaaccc agatggagga gaccaaggca    180

caggacattc tgggagcagt gacccttctg ctggagggag tgatggcagc acggggacaa    240

ctgggaccca cttgcctctc atccctcctg gggcagcttt ctggacaggt ccgtctcctc    300

cttggggccc tgcagagcct ccttggaacc cagcttcctc cacagggcag gaccacagct    360

cacaaggatc ccaatgccat cttcctgagc ttccaacacc tgctccgagg aaaggtgcgt    420

ttcctgatgc ttgtaggagg gtccaccctc tgcgtcaggc gggccccacc caccacagct    480

gtccccagca gaacctctct agtcctcaca ctgaacgagc tc                        522
```

<210> SEQ ID NO 15
<211> LENGTH: 522
<212> TYPE: DNA
<213> ORGANISM: Artificial Sequence
<220> FEATURE:
<223> OTHER INFORMATION: Synthetic construct

<400> SEQUENCE: 15

```
tctcccgccc ctcccgcttg tgatctgaga gtgctgagca agctgctgcg cgactcccac     60
```

```
gtgctgcaca gcagactgtc ccagtgccct gaggtgcacc cactgccaac ccccgtgctg    120

ctgcctgctg tggacttcag cctgggggag tggaagaccc agatggagga aaccaaggct    180

caggacatcc tgggagctgt gaccctgctg ctggagggcg tgatggctgc taggggacag    240

ctgggaccaa cctgcctgtc cagcctgctg ggccagctga gcggacaagt gaggctgctg    300

ctgggggctc tgcagtccct gctggggacc cagctgcctc cgcagggaag gaccaccgct    360

cacaaggacc ccaacgccat cttcctgagc ttccagcacc tgctgcgggg caaagtgagg    420

ttcctgatgc tggtgggcgg gtccaccctg tgcgtgcgcc gcgcccctcc gaccaccgcc    480

gtgcccagcc ggacctccct ggtgctgacc ctgaacgagc tg                       522
```

<210> SEQ ID NO 16
<211> LENGTH: 1326
<212> TYPE: DNA
<213> ORGANISM: Artificial Sequence
<220> FEATURE:
<223> OTHER INFORMATION: Synthetic construct

<400> SEQUENCE: 16

```
atgtacagga tgcaactcct gtcttgcatt gcactaagtc ttgcacttgt cacgaattcg     60

ggcgcgccta aggagatctg cgggaatcct gtgactgata atgtaaaaga cattacaaaa    120

ctggtggcaa atcttccaaa tgactatatg ataaccctca actatgtcgc cgggatggat    180

gttttgccta gtcattgttg gctacgagat atggtaatac aattatcact cagcttgact    240

actcttctgg acaagttctc aaatatttct gaaggcttga gtaattactc catcatagac    300

aaacttggga aaatagtgga tgacctcgtg ttatgcatgg aagaaaacgc accgaagaat    360

ataaaagaat ctccgaagag gccagaaact agatccttta ctcctgaaga attctttagt    420

attttcaata gatccattga tgcctttaag gactttatgg tggcatctga cactagtgac    480

tgtgtgctct cttcaacatt aggtcccgag aaagattcca gagtcagtgt cacaaaacca    540

tttatgttac cccctgttgc agccgctagc accactaccc cggcccctag gccccctact    600

ccagcgccaa ctatagcatc acagcctttg agcttgaggc ccgaagcttg cagaccggcg    660

gcaggggggg ctgtgcatac aaggggcctc gactttgcct gcgacatcga taatgagaag    720

agcaatggaa ccattatcca tgtgaaaggg aaacaccttt gtccaagtcc cctatttccc    780

ggaccttcta agccctttttg ggtgctggtg gtggttggtg gagtcctggc ttgctatagc    840

ttgctagtaa cagtggcctt tattattttc tgggtgagga gtaagaggag caggctcctg    900

cacagtgact acatgaacat gactcccagg aggcctgggc caacccgcaa gcattaccag    960

ccctatgccc caccacgcga cttcgcagcc tatcgctcca gcaggagcgc agacgctccc   1020

gcgtaccagc agggccagaa ccagctctat aacgagctca atctaggacg aagagaggag   1080

tacgatgttt tggacaagag acgtggccgg gaccctgaga tgggaggcaa gccgagaagg   1140

aagaaccctc aggaaggcct gtacaatgaa ctgcagaaag ataagatggc ggaggcctac   1200

agtgagattg ggatgaaagg cgagcgccgg aggggcaagg ggcacgatgg cctttaccag   1260

ggtctcagta cagccaccaa ggacacctac gacgcccttc acatgcaggc cctgcctcct   1320

cgctga                                                               1326
```

<210> SEQ ID NO 17
<211> LENGTH: 1396
<212> TYPE: DNA
<213> ORGANISM: Artificial Sequence
<220> FEATURE:

<223> OTHER INFORMATION: Synthetic construct

<400> SEQUENCE: 17

```
atcgatcgtt cggtcagtcg caattcctct ctagaatgta caggatgcag ctgctgagct     60
gcatcgccct gtccctggct ctggtgacca acagcggcgc gcctaaggag atctgcggca    120
accccgtgac cgacaatgtg aaggatatca ccaagctggt ggccaacctg ccaaatgact    180
acatgatcac cctgaactac gtggctggca tggacgtgct gcccagccac tgctggctga    240
gggatatggt gatccagctg agcctgtccc tgaccaccct gctggacaag ttcagcaaca    300
tctccgaagg cctgagcaat tactccatca tcgataagct gggcaagatc gtggacgatc    360
tggtgctgtg catggaggaa aacgccccca agaatatcaa ggagagcccc aagaggccag    420
aaaccagatc cttcacccca gaggaattct tcagcatctt caataggtcc atcgacgcct    480
tcaaggattt catggtggcc agcgacacct ccgattgcgt gctgagctcc accctgggac    540
cagagaagga tagcagagtg tccgtgacca agccattcat gctgcccccca gtggccgctg    600
ctagcaccac caccccagct ccaagacccc caaccccagc tccaaccatc gccagccagc    660
cactgtccct gaggcccgag gcttgcaggc ccgctgctgg aggcgccgtg cacaccaggg    720
gcctggactt cgcctgcgac atcgataacg aaaagagcaa tggcaccatc atccacgtga    780
agggcaagca cctgtgccca agcccactgt tcccaggacc atccaagcca ttctgggtgc    840
tggtggtggt gggaggagtg ctggcttgct acagcctgct ggtgaccgtg gccttcatca    900
tcttctgggt caggagcaag agatccaggc tgctgcactc cgactacatg aacatgaccc    960
caaggaggcc cggcccaacc agaaagcact accagccata cgctccacca agggacttcg   1020
ctgcttacag aagctccagg tccgctgatg ctccagctta ccagcaggga cagaatcagc   1080
tgtacaacga gctgaatctg ggcaggagag aggaatacga cgtgctggat aagaggagag   1140
gcagagatcc cgaaatgggc ggcaagccaa ggagaaagaa cccccaggag ggcctgtaca   1200
atgaactgca gaaggacaag atggctgagg cctacagcga aatcggcatg aagggcgaga   1260
ggagaagggg caagggccac gatggcctgt accagggcct gtccaccgct accaaggaca   1320
cctacgatgc tctgcacatg caggccctgc cccaaggtg agtcgacgaa tggccgggaa   1380
aggtacatag ctagct                                                   1396
```

<210> SEQ ID NO 18
<211> LENGTH: 6070
<212> TYPE: DNA
<213> ORGANISM: Artificial Sequence
<220> FEATURE:
<223> OTHER INFORMATION: Synthetic construct

<400> SEQUENCE: 18

```
gggtctctct ggttagacca gatctgagcc tggctctctg gctaactagg gaacccactg     60
cttaagcctc aataaagctt gccttgagtg cttcaagtag tgtgtgcccg tctgttgtgt    120
gactctggta actagagatc cctcagaccc ttttagtcag tgtggaaaat ctctagcagt    180
ggcgcccgaa cagggacctg aaagcgaaag ggaaaccaga gctctctcga cgcaggactc    240
ggcttgctga agcgcgcacg gcaagaggcg aggggcggcg actggtgagt acgccaaaaa    300
ttttgactag cggaggctag aaggagagag atgggtgcga gagcgtcagt attaagcggg    360
ggagaattag atcgcgatgg gaaaaaattc ggttaaggcc agggggaaag aaaaaatata    420
aattaaaaca tatagtatgg gcaagcaggg agctagaacg attcgcagtt aatcctggcc    480
tgttagaaac atcagaaggc tgtagacaaa tactgggaca gctacaacca tcccttcaga    540
```

```
caggatcaga agaacttaga tcattatata atacagtagc aaccctctat tgtgtgcatc    600
aaaggataga gataaaagac accaaggaag ctttagacaa gatagaggaa gagcaaaaca    660
aaagtaagac caccgcacag caagcggccg ctgatcttca gacctggagg aggagatatg    720
agggacaatt ggagaagtga attatataaa tataaagtag taaaaattga accattagga    780
gtagcaccca ccaaggcaaa gagaagagtg gtgcagagag aaaaaagagc agtgggaata    840
ggagctttgt tccttgggtt cttgggagca gcaggaagca ctatgggcgc agcgtcaatg    900
acgctgacgg tacaggccag acaattattg tctggtatag tgcagcagca gaacaatttg    960
ctgagggcta ttgaggcgca acagcatctg ttgcaactca cagtctgggg catcaagcag   1020
ctccaggcaa gaatcctggc tgtggaaaga tacctaaagg atcaacagct cctggggatt   1080
tggggttgct ctggaaaact catttgcacc actgctgtgc cttggaatgc tagttggagt   1140
aataaatctc tggaacagat ttggaatcac acgacctgga tggagtggga cagagaaatt   1200
aacaattaca caagcttaat acactcctta attgaagaat cgcaaaacca gcaagaaaag   1260
aatgaacaag aattattgga attagataaa tgggcaagtt tgtggaattg gtttaacata   1320
acaaattggc tgtggtatat aaaattattc ataatgatag taggaggctt ggtaggttta   1380
agaatagttt ttgctgtact ttctatagtg aatagagtta ggcagggata ttcaccatta   1440
tcgtttcaga cccacctccc aaccccgagg ggacccgaca ggcccgaagg aatagaagaa   1500
gaaggtggag agagagacag agacagatcc attcgattag tgaacggatc ggcactgcgt   1560
gcgccaattc tgcagacaaa tggcagtatt catccacaat tttaaaagaa aaggggggat   1620
tggggggtac agtgcagggg aaagaatagt agacataata gcaacagaca tacaaactaa   1680
agaattacaa aaacaaatta caaaaattca aaattttcgg gtttattaca gggacagcag   1740
agatccagtt tggttaatta acccgtgtcg gctccagatc tggcctccgc gccgggtttt   1800
ggcgcctccc gcgggcgccc ccctcctcac ggcgagcgct gccacgtcag acgaagggcg   1860
cagcgagcgt cctgatcctt ccgcccggac gctcaggaca gcggcccgct gctcataaga   1920
ctcggcctta gaaccccagt atcagcagaa ggacatttta ggacgggact tgggtgactc   1980
tagggcactg gttttctttc cagagagcgg aacaggcgag gaaaagtagt cccttctcgg   2040
cgattctgcg gagggatctc cgtggggcgg tgaacgccga tgattatata aggacgcgcc   2100
gggtgtggca cagctagttc cgtcgcagcc gggatttggg tcgcggttct tgtttgtgga   2160
tcgctgtgat cgtcacttgg tgagtagcgg gctgctgggc tggccggggc tttcgtggcc   2220
gccgggccgc tcggtgggac ggaagcgtgt ggagagaccg ccaagggctg tagtctgggt   2280
ccgcgagcaa ggttgccctg aactgggggt tggggggagc gcagcaaaat ggcggctgtt   2340
cccgagtctt gaatggaaga cgcttgtgag gcgggctgtg aggtcgttga aacaaggtgg   2400
ggggcatggt gggcggcaag aacccaaggt cttgaggcct tcgctaatgc gggaaagctc   2460
ttattcgggt gagatgggct ggggcaccat ctggggaccc tgacgtgaag tttgtcactg   2520
actggagaac tcggtttgtc gtctgttgcg ggggcggcag ttatggcggt gccgttgggc   2580
agtgcacccg tacctttggg agcgcgcgcc ctcgtcgtgt cgtgacgtca cccgttctgt   2640
tggcttataa tgcagggtgg ggccacctgc cggtaggtgt gcggtaggct tttctccgtc   2700
gcaggacgca gggttcgggc ctagggtagg ctctcctgaa tcgacaggcg ccggacctct   2760
ggtgagggga gggataagtg aggcgtcagt ttctttggtc ggttttatgt acctatcttc   2820
ttaagtagct gaagctccgg ttttgaacta tgcgctcggg gttggcgagt gtgttttgtg   2880
```

-continued

```
aagtttttta ggcacctttt gaaatgtaat catttgggtc aatatgtaat tttcagtgtt   2940
agactagtaa attgtccgct aaattctggc cgtttttggc tttttgtta gacgaagctt    3000
gggctgcagg tccgatccac cggtcgccac catggtgagc aagggcgagg agctgttcac   3060
cggggtggtg cccatcctgg tcgagctgga cggcgacgta aacggccaca agttcagcgt   3120
gtccggcgag ggcgagggcg atgccaccta cggcaagctg accctgaagt tcatctgcac   3180
caccggcaag ctgcccgtgc cctggcccac cctcgtgacc accctgacct acggcgtgca   3240
gtgcttcagc cgctaccccg accacatgaa gcagcacgac ttcttcaagt ccgccatgcc   3300
cgaaggctac gtccaggagc gcaccatctt cttcaaggac gacggcaact acaagacccg   3360
cgccgaggtg aagttcgagg gcgacaccct ggtgaaccgc atcgagctga agggcatcga   3420
cttcaaggag gacggcaaca tcctggggca caagctggag tacaactaca acagccacaa   3480
cgtctatatc atggccgaca agcagaagaa cggcatcaag gtgaacttca agatccgcca   3540
caacatcgag gacggcagcg tgcagctcgc cgaccactac cagcagaaca cccccatcgg   3600
cgacggcccc gtgctgctgc ccgacaacca ctacctgagc acccagtccg ccctgagcaa   3660
agaccccaac gagaagcgcg atcacatggt cctgctggag ttcgtgaccg ccgccgggat   3720
cactctcggc atggacgagc tgtacaaggg atctggagca acaaacttct cactactcaa   3780
acaagcaggt gacgtggagg agaatcccgg gccttctaga atgtacagga tgcagctgct   3840
gagctgcatc gccctgtccc tggctctggt gaccaacagc ggcgcgccta aggagatctg   3900
cggcaacccc gtgaccgaca atgtgaagga tatcaccaag ctggtggcca acctgccaaa   3960
tgactacatg atcaccctga actacgtggc tggcatggac gtgctgccca gccactgctg   4020
gctgagggat atggtgatcc agctgagcct gtccctgacc accctgctgg acaagttcag   4080
caacatctcc gaaggcctga gcaattactc catcatcgat aagctgggca agatcgtgga   4140
cgatctggtg ctgtgcatgg aggaaaacgc ccccaagaat atcaaggaga gccccaagag   4200
gccagaaacc agatccttca ccccagagga attcttcagc atcttcaata ggtccatcga   4260
cgccttcaag gatttcatgg tggccagcga cacctccgat tgcgtgctga gctccaccct   4320
gggaccagag aaggatagca gagtgtccgt gaccaagcca ttcatgctgc cccagtggc    4380
cgctgctagc accaccaccc cagctccaag acccccaacc ccagctccaa ccatcgccag   4440
ccagccactg tccctgaggc ccgaggcttg caggcccgct gctggaggcg ccgtgcacac   4500
caggggcctg gacttcgcct gcgacatcga taacgaaaag agcaatggca ccatcatcca   4560
cgtgaagggc aagcacctgt gcccaagccc actgttccca ggaccatcca agccattctg   4620
ggtgctggtg gtggtgggag gagtgctggc ttgctacagc ctgctggtga ccgtggcctt   4680
catcatcttc tgggtcagga gcaagagatc caggctgctg cactccgact acatgaacat   4740
gaccccaagg aggcccggcc caaccagaaa gcactaccag ccatacgctc caccaaggga   4800
cttcgctgct tacagaagct ccaggtccgc tgatgctcca gcttaccagc agggacagaa   4860
tcagctgtac aacgagctga atctgggcag gagagaggaa tacgacgtgc tggataagag   4920
gagaggcaga gatcccgaaa tgggcggcaa gccaaggaga aagaaccccc aggagggcct   4980
gtacaatgaa ctgcagaagg acaagatggc tgaggcctac agcgaaatcg gcatgaaggg   5040
cgagaggaga aggggcaagg gccacgatgg cctgtaccag ggcctgtcca ccgctaccaa   5100
ggacacctac gatgctctgc acatgcaggc cctgcccccca aggtgagtcg actcgacaat  5160
caacctctgg attacaaaat ttgtgaaaga ttgactggta ttcttaacta tgttgctcct   5220
tttacgctat gtggatacgc tgctttaatg cctttgtatc atgctattgc ttcccgtatg   5280
```

```
gctttcattt tctcctcctt gtataaatcc tggttgctgt ctctttatga ggagttgtgg   5340

cccgttgtca ggcaacgtgg cgtggtgtgc actgtgtttg ctgacgcaac ccccactggt   5400

tggggcattg ccaccacctg tcagctcctt tccgggactt tcgctttccc cctccctatt   5460

gccacggcgg aactcatcgc cgcctgcctt gcccgctgct ggacaggggc tcggctgttg   5520

ggcactgaca attccgtggt gttgtcgggg aagctgacgt cctttccatg gctgctcgcc   5580

tgtgttgcca cctggattct gcgcgggacg tccttctgct acgtcccttc ggccctcaat   5640

ccagcggacc ttccttcccg cggcctgctg ccggctctgc ggcctcttcc gcatcttcgc   5700

cttcgccctc agacgagtcg gatctccctt tgggccgcct ccccgcctgg aattaattcg   5760

agctcggtac ctttaagacc aatgacttac aaggcagctg tagatcttag ccacttttta   5820

aaagaaaagg ggggactgga agggctacgt aactcccaac gaagacaaga tctgcttttt   5880

gcttgtactg ggtctctctg gttagaccag atctgagcct gggagctctc tggctaacta   5940

gggaacccac tgcttaagcc tcaataaagc ttgccttgag tgcttcaagt agtgtgtgcc   6000

cgtctgttgt gtgactctgg taactagaga tccctcagac ccttttagtc agtgtggaaa   6060

atctctagca                                                          6070
```

```
<210> SEQ ID NO 19
<211> LENGTH: 2115
<212> TYPE: DNA
<213> ORGANISM: Artificial Sequence
<220> FEATURE:
<223> OTHER INFORMATION: Synthetic construct

<400> SEQUENCE: 19
```

```
atggtgagca agggcgagga gctgttcacc ggggtggtgc ccatcctggt cgagctggac     60

ggcgacgtaa acggccacaa gttcagcgtg tccggcgagg gcgagggcga tgccacctac    120

ggcaagctga ccctgaagtt catctgcacc accggcaagc tgcccgtgcc ctggcccacc    180

ctcgtgacca ccctgaccta cggcgtgcag tgcttcagcc gctaccccga ccacatgaag    240

cagcacgact tcttcaagtc cgccatgccc gaaggctacg tccaggagcg caccatcttc    300

ttcaaggacg acggcaacta caagacccgc gccgaggtga agttcgaggg cgacaccctg    360

gtgaaccgca tcgagctgaa gggcatcgac ttcaaggagg acggcaacat cctggggcac    420

aagctggagt acaactacaa cagccacaac gtctatatca tggccgacaa gcagaagaac    480

ggcatcaagg tgaacttcaa gatccgccac aacatcgagg acggcagcgt gcagctcgcc    540

gaccactacc agcagaacac ccccatcggc gacggccccg tgctgctgcc cgacaaccac    600

tacctgagca cccagtccgc cctgagcaaa gaccccaacg agaagcgcga tcacatggtc    660

ctgctggagt tcgtgaccgc cgccgggatc actctcggca tggacgagct gtacaaggga    720

tctggagcaa caaacttctc actactcaaa caagcaggtg acgtggagga gaatcccggg    780

ccttctagaa tgtacaggat gcagctgctg agctgcatcg ccctgtccct ggctctggtg    840

accaacagcg gcgcgcctaa ggagatctgc ggcaaccccg tgaccgacaa tgtgaaggat    900

atcaccaagc tggtggccaa cctgccaaat gactacatga tcaccctgaa ctacgtggct    960

ggcatggacg tgctgcccag ccactgctgg ctgagggata tggtgatcca gctgagcctg   1020

tccctgacca ccctgctgga caagttcagc aacatctccg aaggcctgag caattactcc   1080

atcatcgata agctgggcaa gatcgtggac gatctggtgc tgtgcatgga ggaaaacgcc   1140

cccaagaata tcaaggagag ccccaagagg ccagaaacca gatccttcac cccagaggaa   1200
```

-continued

```
ttcttcagca tcttcaatag gtccatcgac gccttcaagg atttcatggt ggccagcgac   1260

acctccgatt gcgtgctgag ctccaccctg ggaccagaga aggatagcag agtgtccgtg   1320

accaagccat tcatgctgcc cccagtggcc gctgctagca ccaccacccc agctccaaga   1380

cccccaaccc cagctccaac catcgccagc cagccactgt ccctgaggcc cgaggcttgc   1440

aggcccgctg ctggaggcgc cgtgcacacc aggggcctgg acttcgcctg cgacatcgat   1500

aacgaaaaga gcaatggcac catcatccac gtgaagggca agcacctgtg cccaagccca   1560

ctgttcccag gaccatccaa gccattctgg gtgctggtgg tggtgggagg agtgctggct   1620

tgctacagcc tgctggtgac cgtggccttc atcatcttct gggtcaggag caagagatcc   1680

aggctgctgc actccgacta catgaacatg accccaagga ggcccggccc aaccagaaag   1740

cactaccagc catacgctcc accaagggac ttcgctgctt acagaagctc caggtccgct   1800

gatgctccag cttaccagca gggacagaat cagctgtaca acgagctgaa tctgggcagg   1860

agagaggaat acgacgtgct ggataagagg agaggcagag atcccgaaat gggcggcaag   1920

ccaaggagaa agaaccccca ggagggcctg tacaatgaac tgcagaagga caagatggct   1980

gaggcctaca gcgaaatcgg catgaagggc gagaggagaa ggggcaaggg ccacgatggc   2040

ctgtaccagg gcctgtccac cgctaccaag gacacctacg atgctctgca catgcaggcc   2100

ctgcccccaa ggtga                                                    2115


<210> SEQ ID NO 20
<211> LENGTH: 704
<212> TYPE: PRT
<213> ORGANISM: Artificial Sequence
<220> FEATURE:
<223> OTHER INFORMATION: Synthetic construct

<400> SEQUENCE: 20

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
```

```
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys Gly
225                 230                 235                 240

Ser Gly Ala Thr Asn Phe Ser Leu Leu Lys Gln Ala Gly Asp Val Glu
                245                 250                 255

Glu Asn Pro Gly Pro Ser Arg Met Tyr Arg Met Gln Leu Leu Ser Cys
            260                 265                 270

Ile Ala Leu Ser Leu Ala Leu Val Thr Asn Ser Gly Ala Pro Lys Glu
        275                 280                 285

Ile Cys Gly Asn Pro Val Thr Asp Asn Val Lys Asp Ile Thr Lys Leu
    290                 295                 300

Val Ala Asn Leu Pro Asn Asp Tyr Met Ile Thr Leu Asn Tyr Val Ala
305                 310                 315                 320

Gly Met Asp Val Leu Pro Ser His Cys Trp Leu Arg Asp Met Val Ile
                325                 330                 335

Gln Leu Ser Leu Ser Leu Thr Thr Leu Leu Asp Lys Phe Ser Asn Ile
            340                 345                 350

Ser Glu Gly Leu Ser Asn Tyr Ser Ile Ile Asp Lys Leu Gly Lys Ile
        355                 360                 365

Val Asp Asp Leu Val Leu Cys Met Glu Glu Asn Ala Pro Lys Asn Ile
    370                 375                 380

Lys Glu Ser Pro Lys Arg Pro Glu Thr Arg Ser Phe Thr Pro Glu Glu
385                 390                 395                 400

Phe Phe Ser Ile Phe Asn Arg Ser Ile Asp Ala Phe Lys Asp Phe Met
                405                 410                 415

Val Ala Ser Asp Thr Ser Asp Cys Val Leu Ser Ser Thr Leu Gly Pro
            420                 425                 430

Glu Lys Asp Ser Arg Val Ser Val Thr Lys Pro Phe Met Leu Pro Pro
        435                 440                 445

Val Ala Ala Ala Ser Thr Thr Thr Pro Ala Pro Arg Pro Pro Thr Pro
    450                 455                 460

Ala Pro Thr Ile Ala Ser Gln Pro Leu Ser Leu Arg Pro Glu Ala Cys
465                 470                 475                 480

Arg Pro Ala Ala Gly Gly Ala Val His Thr Arg Gly Leu Asp Phe Ala
                485                 490                 495

Cys Asp Ile Asp Asn Glu Lys Ser Asn Gly Thr Ile Ile His Val Lys
            500                 505                 510

Gly Lys His Leu Cys Pro Ser Pro Leu Phe Pro Gly Pro Ser Lys Pro
        515                 520                 525

Phe Trp Val Leu Val Val Val Gly Gly Val Leu Ala Cys Tyr Ser Leu
    530                 535                 540

Leu Val Thr Val Ala Phe Ile Ile Phe Trp Val Arg Ser Lys Arg Ser
545                 550                 555                 560

Arg Leu Leu His Ser Asp Tyr Met Asn Met Thr Pro Arg Arg Pro Gly
                565                 570                 575

Pro Thr Arg Lys His Tyr Gln Pro Tyr Ala Pro Pro Arg Asp Phe Ala
            580                 585                 590

Ala Tyr Arg Ser Ser Arg Ser Ala Asp Ala Pro Ala Tyr Gln Gln Gly
        595                 600                 605

Gln Asn Gln Leu Tyr Asn Glu Leu Asn Leu Gly Arg Arg Glu Glu Tyr
    610                 615                 620
```

```
Asp Val Leu Asp Lys Arg Arg Gly Arg Asp Pro Glu Met Gly Gly Lys
625                 630                 635                 640

Pro Arg Arg Lys Asn Pro Gln Glu Gly Leu Tyr Asn Glu Leu Gln Lys
                645                 650                 655

Asp Lys Met Ala Glu Ala Tyr Ser Glu Ile Gly Met Lys Gly Glu Arg
            660                 665                 670

Arg Arg Gly Lys Gly His Asp Gly Leu Tyr Gln Gly Leu Ser Thr Ala
        675                 680                 685

Thr Lys Asp Thr Tyr Asp Ala Leu His Met Gln Ala Leu Pro Pro Arg
    690                 695                 700


<210> SEQ ID NO 21
<211> LENGTH: 98
<212> TYPE: PRT
<213> ORGANISM: Artificial Sequence
<220> FEATURE:
<223> OTHER INFORMATION: Synthetic construct

<400> SEQUENCE: 21

Leu Asp Asn Glu Lys Ser Asn Gly Thr Ile Ile His Val Lys Gly Lys
1               5                   10                  15

His Leu Cys Pro Ser Pro Leu Phe Pro Gly Pro Ser Lys Pro Phe Trp
            20                  25                  30

Val Leu Val Val Val Gly Gly Val Leu Ala Cys Tyr Ser Leu Leu Val
        35                  40                  45

Thr Val Ala Phe Ile Ile Phe Trp Val Arg Ser Lys Arg Ser Arg Leu
    50                  55                  60

Leu His Ser Asp Tyr Met Asn Met Thr Pro Arg Arg Pro Gly Pro Thr
65                  70                  75                  80

Arg Lys His Tyr Gln Pro Tyr Ala Pro Pro Arg Asp Phe Ala Ala Tyr
                85                  90                  95

Arg Ser


<210> SEQ ID NO 22
<211> LENGTH: 42
<212> TYPE: PRT
<213> ORGANISM: Artificial Sequence
<220> FEATURE:
<223> OTHER INFORMATION: Synthetic construct

<400> SEQUENCE: 22

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40


<210> SEQ ID NO 23
<211> LENGTH: 42
<212> TYPE: PRT
<213> ORGANISM: Artificial Sequence
<220> FEATURE:
<223> OTHER INFORMATION: Synthetic construct

<400> SEQUENCE: 23

Ala Leu Tyr Leu Leu Arg Arg Asp Gln Arg Leu Pro Pro Asp Ala His
1               5                   10                  15

Lys Pro Pro Gly Gly Gly Ser Phe Arg Thr Pro Ile Gln Glu Glu Gln
```

```
            20                  25                  30

Ala Asp Ala His Ser Thr Leu Ala Lys Ile
        35                  40


<210> SEQ ID NO 24
<211> LENGTH: 62
<212> TYPE: PRT
<213> ORGANISM: Artificial Sequence
<220> FEATURE:
<223> OTHER INFORMATION: Synthetic construct

<400> SEQUENCE: 24

Lys Lys Val Ala Lys Lys Pro Thr Asn Lys Ala Pro His Pro Lys Gln
1               5                   10                  15

Glu Pro Gln Glu Ile Asn Phe Pro Asp Asp Leu Pro Gly Ser Asn Thr
            20                  25                  30

Ala Ala Pro Val Gln Glu Thr Leu His Gly Cys Gln Pro Val Thr Gln
        35                  40                  45

Glu Asp Gly Lys Glu Ser Arg Ile Ser Val Gln Glu Arg Gln
    50                  55                  60


<210> SEQ ID NO 25
<211> LENGTH: 36
<212> TYPE: PRT
<213> ORGANISM: Artificial Sequence
<220> FEATURE:
<223> OTHER INFORMATION: Synthetic construct

<400> SEQUENCE: 25

Trp Leu Thr Lys Lys Lys Tyr Ser Ser Ser Val His Asp Pro Asn Gly
1               5                   10                  15

Glu Tyr Met Phe Met Arg Ala Val Asn Thr Ala Lys Lys Ser Arg Leu
            20                  25                  30

Thr Asp Val Thr
        35


<210> SEQ ID NO 26
<211> LENGTH: 48
<212> TYPE: PRT
<213> ORGANISM: Artificial Sequence
<220> FEATURE:
<223> OTHER INFORMATION: Synthetic construct

<400> SEQUENCE: 26

Gln Arg Arg Lys Tyr Arg Ser Asn Lys Gly Glu Ser Pro Val Glu Pro
1               5                   10                  15

Ala Glu Pro Cys His Tyr Ser Cys Pro Arg Glu Glu Glu Gly Ser Thr
            20                  25                  30

Ile Pro Ile Gln Glu Asp Tyr Arg Lys Pro Glu Pro Ala Cys Ser Pro
        35                  40                  45


<210> SEQ ID NO 27
<211> LENGTH: 46
<212> TYPE: PRT
<213> ORGANISM: Artificial Sequence
<220> FEATURE:
<223> OTHER INFORMATION: Synthetic construct

<400> SEQUENCE: 27

Met Ile Glu Thr Tyr Asn Gln Thr Ser Pro Arg Ser Ala Ala Thr Gly
1               5                   10                  15

Leu Pro Ile Ser Met Lys Ile Phe Met Tyr Leu Leu Thr Val Phe Leu
```

```
            20                  25                  30

Ile Thr Gln Met Ile Gly Ser Ala Leu Phe Ala Val Tyr Leu
        35                  40                  45


<210> SEQ ID NO 28
<211> LENGTH: 53
<212> TYPE: PRT
<213> ORGANISM: Artificial Sequence
<220> FEATURE:
<223> OTHER INFORMATION: Synthetic construct

<400> SEQUENCE: 28

Trp Trp Lys Asn Leu Lys Trp Trp Thr Asn Trp Val Ile Pro Ala Ile
1               5                   10                  15

Ser Ala Val Ala Val Ala Leu Met Tyr Arg Leu Tyr Met Ala Glu Asp
            20                  25                  30

Ser Arg Met Asn Gly Thr Glu Gly Pro Asn Phe Tyr Val Pro Phe Ser
        35                  40                  45

Asn Lys Thr Val Cys
    50


<210> SEQ ID NO 29
<211> LENGTH: 35
<212> TYPE: PRT
<213> ORGANISM: Artificial Sequence
<220> FEATURE:
<223> OTHER INFORMATION: Synthetic construct

<400> SEQUENCE: 29

Pro Gly Glu Ser Gly Thr Ser Gly Trp Arg Gly Gly Asp Thr Pro Ser
1               5                   10                  15

Pro Leu Cys Leu Leu Leu Leu Leu Leu Leu Leu Ile Leu Arg Leu Leu
            20                  25                  30

Arg Ile Leu
        35


<210> SEQ ID NO 30
<211> LENGTH: 338
<212> TYPE: PRT
<213> ORGANISM: Artificial Sequence
<220> FEATURE:
<223> OTHER INFORMATION: Synthetic construct

<400> SEQUENCE: 30

Met Ala Ser Ser Gly Tyr Val Leu Gln Ala Glu Leu Ser Pro Ser Thr
1               5                   10                  15

Glu Asn Ser Ser Gln Leu Asp Phe Glu Asp Val Trp Asn Ser Ser Tyr
            20                  25                  30

Gly Val Asn Asp Ser Phe Pro Asp Gly Asp Tyr Gly Ala Asn Leu Glu
        35                  40                  45

Ala Ala Ala Pro Cys His Ser Cys Asn Leu Leu Asp Asp Ser Ala Leu
    50                  55                  60

Pro Phe Phe Ile Leu Thr Ser Val Leu Gly Ile Leu Ala Ser Ser Thr
65                  70                  75                  80

Val Leu Phe Met Leu Phe Arg Pro Leu Phe Arg Trp Gln Leu Cys Pro
                85                  90                  95

Gly Trp Pro Val Leu Ala Gln Leu Ala Val Gly Ser Ala Leu Phe Ser
            100                 105                 110

Ile Val Val Pro Val Leu Ala Pro Gly Leu Gly Ser Thr Arg Ser Ser
        115                 120                 125
```

```
Ala Leu Cys Ser Leu Gly Tyr Cys Val Trp Tyr Gly Ser Ala Phe Ala
    130                 135                 140

Gln Ala Leu Leu Leu Gly Cys His Ala Ser Leu Gly His Arg Leu Gly
145                 150                 155                 160

Ala Gly Gln Val Pro Gly Leu Thr Leu Gly Leu Thr Val Gly Ile Trp
                165                 170                 175

Gly Val Ala Ala Leu Leu Thr Leu Pro Val Thr Leu Ala Ser Gly Ala
            180                 185                 190

Ser Gly Gly Leu Cys Thr Leu Ile Tyr Ser Thr Glu Leu Lys Ala Leu
        195                 200                 205

Gln Ala Thr His Thr Val Ala Cys Leu Ala Ile Phe Val Leu Leu Pro
    210                 215                 220

Leu Gly Leu Phe Gly Ala Lys Gly Leu Lys Lys Ala Leu Gly Met Gly
225                 230                 235                 240

Pro Gly Pro Trp Met Asn Ile Leu Trp Ala Trp Phe Ile Phe Trp Trp
                245                 250                 255

Pro His Gly Val Val Leu Gly Leu Asp Phe Leu Val Arg Ser Lys Leu
            260                 265                 270

Leu Leu Leu Ser Thr Cys Leu Ala Gln Gln Ala Leu Asp Leu Leu Leu
        275                 280                 285

Asn Leu Ala Glu Ala Leu Ala Ile Leu His Cys Val Ala Thr Pro Leu
    290                 295                 300

Leu Leu Ala Leu Phe Cys His Gln Ala Thr Arg Thr Leu Leu Pro Ser
305                 310                 315                 320

Leu Pro Leu Pro Glu Gly Trp Ser Ser His Leu Asp Thr Leu Gly Ser
                325                 330                 335

Lys Ser


<210> SEQ ID NO 31
<211> LENGTH: 35
<212> TYPE: PRT
<213> ORGANISM: Artificial Sequence
<220> FEATURE:
<223> OTHER INFORMATION: Synthetic construct

<400> SEQUENCE: 31

Pro Gly Glu Ser Gly Thr Ser Gly Trp Arg Gly Gly Asp Thr Pro Ser
1               5                   10                  15

Pro Leu Cys Leu Leu Leu Leu Leu Leu Leu Leu Ile Leu Arg Leu Leu
            20                  25                  30

Arg Ile Leu
        35


<210> SEQ ID NO 32
<211> LENGTH: 35
<212> TYPE: PRT
<213> ORGANISM: Artificial Sequence
<220> FEATURE:
<223> OTHER INFORMATION: Synthetic construct

<400> SEQUENCE: 32

Glu Ser Ala Glu Pro Ser Arg Gly Glu Asn Ala Ala Gln Thr Pro Arg
1               5                   10                  15

Ile Pro Ser Arg Leu Leu Ala Ile Leu Leu Phe Leu Leu Ala Met Leu
            20                  25                  30

Leu Thr Leu
        35
```

<210> SEQ ID NO 33
<211> LENGTH: 29
<212> TYPE: PRT
<213> ORGANISM: Artificial Sequence
<220> FEATURE:
<223> OTHER INFORMATION: Synthetic construct

<400> SEQUENCE: 33

Tyr Ala Ala Ala Met Ser Gly Ala Gly Pro Trp Ala Ala Trp Pro Phe
1 5 10 15

Leu Leu Ser Leu Ala Leu Met Leu Leu Trp Leu Leu Ser
20 25

<210> SEQ ID NO 34
<211> LENGTH: 35
<212> TYPE: PRT
<213> ORGANISM: Artificial Sequence
<220> FEATURE:
<223> OTHER INFORMATION: Synthetic construct

<400> SEQUENCE: 34

Pro Glu Val Arg Val Leu His Ser Ile Gly His Ser Ala Ala Pro Arg
1 5 10 15

Leu Phe Pro Leu Ala Trp Thr Val Leu Leu Leu Pro Leu Leu Leu Leu
20 25 30

Gln Thr Pro
35

<210> SEQ ID NO 35
<211> LENGTH: 38
<212> TYPE: PRT
<213> ORGANISM: Artificial Sequence
<220> FEATURE:
<223> OTHER INFORMATION: Synthetic construct

<400> SEQUENCE: 35

Ser Val Arg Gly Ile Asn Gly Ser Ile Ser Leu Ala Val Pro Leu Trp
1 5 10 15

Leu Leu Ala Ala Ser Leu Leu Gly Leu Leu Leu Pro Ala Phe Gly Ile
20 25 30

Leu Val Tyr Leu Glu Phe
35

<210> SEQ ID NO 36
<211> LENGTH: 35
<212> TYPE: PRT
<213> ORGANISM: Artificial Sequence
<220> FEATURE:
<223> OTHER INFORMATION: Synthetic construct

<400> SEQUENCE: 36

Asp Ser Glu Gly Ser Gly Ala Leu Pro Ser Leu Thr Cys Ser Leu Thr
1 5 10 15

Cys Ser Leu Thr Pro Leu Gly Leu Ala Leu Val Leu Trp Thr Val Leu
20 25 30

Gly Pro Cys
35

<210> SEQ ID NO 37
<211> LENGTH: 32
<212> TYPE: PRT
<213> ORGANISM: Artificial Sequence
<220> FEATURE:
<223> OTHER INFORMATION: Synthetic construct

<400> SEQUENCE: 37

```
Val Ser Gln Val Lys Ile Ser Gly Ala Pro Thr Leu Ser Pro Ser Leu
1               5                   10                  15

Leu Gly Leu Leu Leu Pro Ala Phe Gly Ile Leu Val Tyr Leu Glu Phe
            20                  25                  30
```

<210> SEQ ID NO 38
<211> LENGTH: 34
<212> TYPE: PRT
<213> ORGANISM: Artificial Sequence
<220> FEATURE:
<223> OTHER INFORMATION: Synthetic construct

<400> SEQUENCE: 38

```
Gln Val Pro Lys Leu Glu Lys Ser Ile Ser Gly Thr Ser Pro Lys Arg
1               5                   10                  15

Glu His Leu Pro Leu Ala Val Gly Ile Ala Phe Phe Leu Met Thr Phe
            20                  25                  30

Leu Ala
```

<210> SEQ ID NO 39
<211> LENGTH: 32
<212> TYPE: PRT
<213> ORGANISM: Artificial Sequence
<220> FEATURE:
<223> OTHER INFORMATION: Synthetic construct

<400> SEQUENCE: 39

```
Thr Thr Asp Ala Ala His Pro Gly Arg Ser Val Val Pro Ala Leu Leu
1               5                   10                  15

Pro Leu Leu Ala Gly Thr Leu Leu Leu Leu Glu Thr Ala Thr Ala Pro
            20                  25                  30
```

<210> SEQ ID NO 40
<211> LENGTH: 35
<212> TYPE: PRT
<213> ORGANISM: Artificial Sequence
<220> FEATURE:
<223> OTHER INFORMATION: Synthetic construct

<400> SEQUENCE: 40

```
Glu Ala Pro Glu Pro Ile Phe Thr Ser Asn Asn Ser Cys Ser Ser Pro
1               5                   10                  15

Gly Gly Cys Arg Leu Phe Leu Ser Thr Ile Pro Val Leu Trp Thr Leu
            20                  25                  30

Leu Gly Ser
        35
```

<210> SEQ ID NO 41
<211> LENGTH: 30
<212> TYPE: PRT
<213> ORGANISM: Artificial Sequence
<220> FEATURE:
<223> OTHER INFORMATION: Synthetic construct

<400> SEQUENCE: 41

```
Thr Asn Ala Thr Thr Lys Ala Ala Gly Gly Ala Leu Gln Ser Thr Ala
1               5                   10                  15

Ser Leu Phe Val Val Ser Leu Ser Leu Leu His Leu Tyr Ser
            20                  25                  30
```

```
<210> SEQ ID NO 42
<211> LENGTH: 273
<212> TYPE: PRT
<213> ORGANISM: Artificial Sequence
<220> FEATURE:
<223> OTHER INFORMATION: Synthetic construct

<400> SEQUENCE: 42

Met Lys Lys Thr Gln Thr Trp Ile Ile Thr Cys Ile Tyr Leu Gln Leu
1               5                   10                  15

Leu Leu Phe Asn Pro Leu Val Lys Thr Lys Glu Ile Cys Gly Asn Pro
            20                  25                  30

Val Thr Asp Asn Val Lys Asp Ile Thr Lys Leu Val Ala Asn Leu Pro
        35                  40                  45

Asn Asp Tyr Met Ile Thr Leu Asn Tyr Val Ala Gly Met Asp Val Leu
    50                  55                  60

Pro Ser His Cys Trp Leu Arg Asp Met Val Ile Gln Leu Ser Leu Ser
65                  70                  75                  80

Leu Thr Thr Leu Leu Asp Lys Phe Ser Asn Ile Ser Glu Gly Leu Ser
                85                  90                  95

Asn Tyr Ser Ile Ile Asp Lys Leu Gly Lys Ile Val Asp Asp Leu Val
            100                 105                 110

Leu Cys Met Glu Glu Asn Ala Pro Lys Asn Ile Lys Glu Ser Pro Lys
        115                 120                 125

Arg Pro Glu Thr Arg Ser Phe Thr Pro Glu Glu Phe Phe Ser Ile Phe
    130                 135                 140

Asn Arg Ser Ile Asp Ala Phe Lys Asp Phe Met Val Ala Ser Asp Thr
145                 150                 155                 160

Ser Asp Cys Val Leu Ser Ser Thr Leu Gly Pro Glu Lys Asp Ser Arg
                165                 170                 175

Val Ser Val Thr Lys Pro Phe Met Leu Pro Pro Val Ala Ala Ser Ser
            180                 185                 190

Leu Arg Asn Asp Ser Ser Ser Ser Asn Arg Lys Ala Ala Lys Ala Pro
        195                 200                 205

Glu Asp Ser Gly Leu Gln Trp Thr Ala Met Ala Leu Pro Ala Leu Ile
    210                 215                 220

Ser Leu Val Ile Gly Phe Ala Phe Gly Ala Leu Tyr Trp Lys Lys Lys
225                 230                 235                 240

Gln Ser Ser Leu Thr Arg Ala Val Glu Asn Ile Gln Ile Asn Glu Glu
                245                 250                 255

Asp Asn Glu Ile Ser Met Leu Gln Gln Lys Glu Arg Glu Phe Gln Glu
            260                 265                 270

Val


<210> SEQ ID NO 43
<211> LENGTH: 441
<212> TYPE: PRT
<213> ORGANISM: Artificial Sequence
<220> FEATURE:
<223> OTHER INFORMATION: Synthetic construct

<400> SEQUENCE: 43

Met Tyr Arg Met Gln Leu Leu Ser Cys Ile Ala Leu Ser Leu Ala Leu
1               5                   10                  15

Val Thr Asn Ser Gly Ala Pro Lys Glu Ile Cys Gly Asn Pro Val Thr
            20                  25                  30
```

```
Asp Asn Val Lys Asp Ile Thr Lys Leu Val Ala Asn Leu Pro Asn Asp
        35                  40                  45

Tyr Met Ile Thr Leu Asn Tyr Val Ala Gly Met Asp Val Leu Pro Ser
    50                  55                  60

His Cys Trp Leu Arg Asp Met Val Ile Gln Leu Ser Leu Ser Leu Thr
65                  70                  75                  80

Thr Leu Leu Asp Lys Phe Ser Asn Ile Ser Glu Gly Leu Ser Asn Tyr
                85                  90                  95

Ser Ile Ile Asp Lys Leu Gly Lys Ile Val Asp Asp Leu Val Leu Cys
            100                 105                 110

Met Glu Glu Asn Ala Pro Lys Asn Ile Lys Glu Ser Pro Lys Arg Pro
        115                 120                 125

Glu Thr Arg Ser Phe Thr Pro Glu Glu Phe Phe Ser Ile Phe Asn Arg
    130                 135                 140

Ser Ile Asp Ala Phe Lys Asp Phe Met Val Ala Ser Asp Thr Ser Asp
145                 150                 155                 160

Cys Val Leu Ser Ser Thr Leu Gly Pro Glu Lys Asp Ser Arg Val Ser
                165                 170                 175

Val Thr Lys Pro Phe Met Leu Pro Pro Val Ala Ala Ala Ser Thr Thr
            180                 185                 190

Thr Pro Ala Pro Arg Pro Pro Thr Pro Ala Pro Thr Ile Ala Ser Gln
        195                 200                 205

Pro Leu Ser Leu Arg Pro Glu Ala Cys Arg Pro Ala Ala Gly Gly Ala
    210                 215                 220

Val His Thr Arg Gly Leu Asp Phe Ala Cys Asp Ile Asp Asn Glu Lys
225                 230                 235                 240

Ser Asn Gly Thr Ile Ile His Val Lys Gly Lys His Leu Cys Pro Ser
                245                 250                 255

Pro Leu Phe Pro Gly Pro Ser Lys Pro Phe Trp Val Leu Val Val Val
            260                 265                 270

Gly Gly Val Leu Ala Cys Tyr Ser Leu Leu Val Thr Val Ala Phe Ile
        275                 280                 285

Ile Phe Trp Val Arg Ser Lys Arg Ser Arg Leu Leu His Ser Asp Tyr
    290                 295                 300

Met Asn Met Thr Pro Arg Arg Pro Gly Pro Thr Arg Lys His Tyr Gln
305                 310                 315                 320

Pro Tyr Ala Pro Pro Arg Asp Phe Ala Ala Tyr Arg Ser Ser Arg Ser
                325                 330                 335

Ala Asp Ala Pro Ala Tyr Gln Gln Gly Gln Asn Gln Leu Tyr Asn Glu
            340                 345                 350

Leu Asn Leu Gly Arg Arg Glu Glu Tyr Asp Val Leu Asp Lys Arg Arg
        355                 360                 365

Gly Arg Asp Pro Glu Met Gly Gly Lys Pro Arg Arg Lys Asn Pro Gln
    370                 375                 380

Glu Gly Leu Tyr Asn Glu Leu Gln Lys Asp Lys Met Ala Glu Ala Tyr
385                 390                 395                 400

Ser Glu Ile Gly Met Lys Gly Glu Arg Arg Arg Gly Lys Gly His Asp
                405                 410                 415

Gly Leu Tyr Gln Gly Leu Ser Thr Ala Thr Lys Asp Thr Tyr Asp Ala
            420                 425                 430

Leu His Met Gln Ala Leu Pro Pro Arg
        435                 440
```

<210> SEQ ID NO 44
<211> LENGTH: 165
<212> TYPE: PRT
<213> ORGANISM: Artificial Sequence
<220> FEATURE:
<223> OTHER INFORMATION: Synthetic construct

<400> SEQUENCE: 44

```
Lys Glu Ile Cys Gly Asn Pro Val Thr Asp Asn Val Lys Asp Ile Thr
1               5                   10                  15

Lys Leu Val Ala Asn Leu Pro Asn Asp Tyr Met Ile Thr Leu Asn Tyr
            20                  25                  30

Val Ala Gly Met Asp Val Leu Pro Ser His Cys Trp Leu Arg Asp Met
        35                  40                  45

Val Ile Gln Leu Ser Leu Ser Leu Thr Thr Leu Leu Asp Lys Phe Ser
    50                  55                  60

Asn Ile Ser Glu Gly Leu Ser Asn Tyr Ser Ile Ile Asp Lys Leu Gly
65                  70                  75                  80

Lys Ile Val Asp Asp Leu Val Leu Cys Met Glu Glu Asn Ala Pro Lys
                85                  90                  95

Asn Ile Lys Glu Ser Pro Lys Arg Pro Glu Thr Arg Ser Phe Thr Pro
            100                 105                 110

Glu Glu Phe Phe Ser Ile Phe Asn Arg Ser Ile Asp Ala Phe Lys Asp
        115                 120                 125

Phe Met Val Ala Ser Asp Thr Ser Asp Cys Val Leu Ser Ser Thr Leu
    130                 135                 140

Gly Pro Glu Lys Asp Ser Arg Val Ser Val Thr Lys Pro Phe Met Leu
145                 150                 155                 160

Pro Pro Val Ala Ala
                165
```

<210> SEQ ID NO 45
<211> LENGTH: 165
<212> TYPE: PRT
<213> ORGANISM: Artificial Sequence
<220> FEATURE:
<223> OTHER INFORMATION: Synthetic construct

<400> SEQUENCE: 45

```
Glu Gly Ile Cys Arg Asn Arg Val Thr Asn Asn Val Lys Asp Val Thr
1               5                   10                  15

Lys Leu Val Ala Asn Leu Pro Lys Asp Tyr Met Ile Thr Leu Lys Tyr
            20                  25                  30

Val Pro Gly Met Asp Val Leu Pro Ser His Cys Trp Ile Ser Glu Met
        35                  40                  45

Val Val Gln Leu Ser Asp Ser Leu Thr Asp Leu Leu Asp Lys Phe Ser
    50                  55                  60

Asn Ile Ser Glu Gly Leu Ser Asn Tyr Ser Ile Ile Asp Lys Leu Val
65                  70                  75                  80

Asn Ile Val Asp Asp Leu Val Glu Cys Val Lys Glu Asn Ser Ser Lys
                85                  90                  95

Asp Leu Lys Lys Ser Phe Lys Ser Pro Glu Pro Arg Leu Phe Thr Pro
            100                 105                 110

Glu Glu Phe Phe Arg Ile Phe Asn Arg Ser Ile Asp Ala Phe Lys Asp
        115                 120                 125

Phe Val Val Ala Ser Glu Thr Ser Asp Cys Val Val Ser Ser Thr Leu
    130                 135                 140
```

Ser Pro Glu Lys Asp Ser Arg Val Ser Val Thr Lys Pro Phe Met Leu
145 150 155 160

Pro Pro Val Ala Ala
165

<210> SEQ ID NO 46
<211> LENGTH: 1443
<212> TYPE: DNA
<213> ORGANISM: Artificial Sequence
<220> FEATURE:
<223> OTHER INFORMATION: Synthetic construct

<400> SEQUENCE: 46
atgtacagga tgcaactcct gtcttgcatt gcactaagtc ttgcacttgt cacgaattcg 60
ggcgcgcctg aaattcagtt ggtgcaaagc ggaggtggcc ttgtgaagcc aggaggcagt 120
gtgcgaatta gttgtgcagc ctccggttac acgttcacca actatggcat gaactgggtg 180
agacaggccc ccggcaaggg gttggaatgg atgggctgga ttaacacaca tacgggcgaa 240
ccgacatacg ccgacagctt taaaggtcga tttactttta gcttggacga ttccaaaaat 300
acggcatacc tgcaaataaa ctcactgcgg gcagaggata cggccgtata tttttgtacg 360
cggagagggt acgattggta ctttgatgtc tggggacagg ggacgacagt aaccgtgtct 420
agtggcgggg gaggatcagg tggtggcggt agcggtggag gtggaagtga tatccagatg 480
acacaatcac cgagttccct gtccgcgtca gtaggggatc gggtgacaat tacatgtaga 540
gcatctcaag acatcaatag ctacctgagc tggtttcagc aaaagcccgg aaaagctccg 600
aaaactctga tttatcgggc caatcgcctt gagtctgggg tgccaagtag attttcaggc 660
tccgggagcg ggacggacta tacgttgacc atatcaagtc ttcagtacga ggacttcggg 720
atatactatt gccaacagta cgatgagagc ccgtggacct tcgggggtgg gacaaagttg 780
gagatcaaag ctagcgagca gaagctgatc agcgaggagg acctggacaa tgagaagagc 840
aatggaacca ttatccatgt gaaagggaaa cacctttgtc caagtcccct atttcccgga 900
ccttctaagc ccttttgggt gctggtggtg gttggtggag tcctggcttg ctatagcttg 960
ctagtaacag tggcctttat tattttctgg gtgaggagta agaggagcag gctcctgcac 1020
agtgactaca tgaacatgac tcccaggagg cctgggccaa cccgcaagca ttaccagccc 1080
tatgccccac cacgcgactt cgcagcctat cgctccagca ggagcgcaga cgctcccgcg 1140
taccagcagg gccagaacca gctctataac gagctcaatc taggacgaag agaggagtac 1200
gatgttttgg acaagagacg tggccgggac cctgagatgg gaggcaagcc gagaaggaag 1260
aaccctcagg aaggcctgta caatgaactg cagaaagata agatggcgga ggcctacagt 1320
gagattggga tgaaaggcga gcgccggagg ggcaaggggc acgatggcct ttaccagggt 1380
ctcagtacag ccaccaagga cacctacgac gcccttcaca tgcaggccct gcctcctcgc 1440
tga 1443

<210> SEQ ID NO 47
<211> LENGTH: 480
<212> TYPE: PRT
<213> ORGANISM: Artificial Sequence
<220> FEATURE:
<223> OTHER INFORMATION: Synthetic construct

<400> SEQUENCE: 47

Met Tyr Arg Met Gln Leu Leu Ser Cys Ile Ala Leu Ser Leu Ala Leu
1 5 10 15

```
Val Thr Asn Ser Gly Ala Pro Glu Ile Gln Leu Val Gln Ser Gly Gly
            20                  25                  30

Gly Leu Val Lys Pro Gly Gly Ser Val Arg Ile Ser Cys Ala Ala Ser
        35                  40                  45

Gly Tyr Thr Phe Thr Asn Tyr Gly Met Asn Trp Val Arg Gln Ala Pro
    50                  55                  60

Gly Lys Gly Leu Glu Trp Met Gly Trp Ile Asn Thr His Thr Gly Glu
65                  70                  75                  80

Pro Thr Tyr Ala Asp Ser Phe Lys Gly Arg Phe Thr Phe Ser Leu Asp
                85                  90                  95

Asp Ser Lys Asn Thr Ala Tyr Leu Gln Ile Asn Ser Leu Arg Ala Glu
            100                 105                 110

Asp Thr Ala Val Tyr Phe Cys Thr Arg Arg Gly Tyr Asp Trp Tyr Phe
        115                 120                 125

Asp Val Trp Gly Gln Gly Thr Thr Val Thr Val Ser Ser Gly Gly Gly
    130                 135                 140

Gly Ser Gly Gly Gly Gly Ser Gly Gly Gly Gly Ser Asp Ile Gln Met
145                 150                 155                 160

Thr Gln Ser Pro Ser Ser Leu Ser Ala Ser Val Gly Asp Arg Val Thr
                165                 170                 175

Ile Thr Cys Arg Ala Ser Gln Asp Ile Asn Ser Tyr Leu Ser Trp Phe
            180                 185                 190

Gln Gln Lys Pro Gly Lys Ala Pro Lys Thr Leu Ile Tyr Arg Ala Asn
        195                 200                 205

Arg Leu Glu Ser Gly Val Pro Ser Arg Phe Ser Gly Ser Gly Ser Gly
    210                 215                 220

Thr Asp Tyr Thr Leu Thr Ile Ser Ser Leu Gln Tyr Glu Asp Phe Gly
225                 230                 235                 240

Ile Tyr Tyr Cys Gln Gln Tyr Asp Glu Ser Pro Trp Thr Phe Gly Gly
                245                 250                 255

Gly Thr Lys Leu Glu Ile Lys Ala Ser Glu Gln Lys Leu Ile Ser Glu
            260                 265                 270

Glu Asp Leu Asp Asn Glu Lys Ser Asn Gly Thr Ile Ile His Val Lys
        275                 280                 285

Gly Lys His Leu Cys Pro Ser Pro Leu Phe Pro Gly Pro Ser Lys Pro
    290                 295                 300

Phe Trp Val Leu Val Val Val Gly Gly Val Leu Ala Cys Tyr Ser Leu
305                 310                 315                 320

Leu Val Thr Val Ala Phe Ile Ile Phe Trp Val Arg Ser Lys Arg Ser
                325                 330                 335

Arg Leu Leu His Ser Asp Tyr Met Asn Met Thr Pro Arg Arg Pro Gly
            340                 345                 350

Pro Thr Arg Lys His Tyr Gln Pro Tyr Ala Pro Pro Arg Asp Phe Ala
        355                 360                 365

Ala Tyr Arg Ser Ser Arg Ser Ala Asp Ala Pro Ala Tyr Gln Gln Gly
    370                 375                 380

Gln Asn Gln Leu Tyr Asn Glu Leu Asn Leu Gly Arg Arg Glu Glu Tyr
385                 390                 395                 400

Asp Val Leu Asp Lys Arg Arg Gly Arg Asp Pro Glu Met Gly Gly Lys
                405                 410                 415

Pro Arg Arg Lys Asn Pro Gln Glu Gly Leu Tyr Asn Glu Leu Gln Lys
            420                 425                 430
```

```
Asp Lys Met Ala Glu Ala Tyr Ser Glu Ile Gly Met Lys Gly Glu Arg
        435                 440                 445

Arg Arg Gly Lys Gly His Asp Gly Leu Tyr Gln Gly Leu Ser Thr Ala
    450                 455                 460

Thr Lys Asp Thr Tyr Asp Ala Leu His Met Gln Ala Leu Pro Pro Arg
465                 470                 475                 480


<210> SEQ ID NO 48
<211> LENGTH: 2232
<212> TYPE: DNA
<213> ORGANISM: Artificial Sequence
<220> FEATURE:
<223> OTHER INFORMATION: Synthetic construct

<400> SEQUENCE: 48

atggtgagca agggcgagga gctgttcacc ggggtggtgc ccatcctggt cgagctggac     60

ggcgacgtaa acggccacaa gttcagcgtg tccggcgagg gcgagggcga tgccacctac    120

ggcaagctga ccctgaagtt catctgcacc accggcaagc tgcccgtgcc ctggcccacc    180

ctcgtgacca ccctgaccta cggcgtgcag tgcttcagcc gctaccccga ccacatgaag    240

cagcacgact tcttcaagtc cgccatgccc gaaggctacg tccaggagcg caccatcttc    300

ttcaaggacg acggcaacta caagacccgc gccgaggtga agttcgaggg cgacaccctg    360

gtgaaccgca tcgagctgaa gggcatcgac ttcaaggagg acggcaacat cctggggcac    420

aagctggagt acaactacaa cagccacaac gtctatatca tggccgacaa gcagaagaac    480

ggcatcaagg tgaacttcaa gatccgccac aacatcgagg acggcagcgt gcagctcgcc    540

gaccactacc agcagaacac ccccatcggc gacggccccg tgctgctgcc cgacaaccac    600

tacctgagca cccagtccgc cctgagcaaa gaccccaacg agaagcgcga tcacatggtc    660

ctgctggagt tcgtgaccgc cgccgggatc actctcggca tggacgagct gtacaaggga    720

tctggagcaa caaacttctc actactcaaa caagcaggtg acgtggagga gaatcccggg    780

ccttctagaa tgtacaggat gcaactcctg tcttgcattg cactaagtct tgcacttgtc    840

acgaattcgg gcgcgcctga aattcagttg gtgcaaagcg gaggtggcct tgtgaagcca    900

ggaggcagtg tgcgaattag ttgtgcagcc tccggttaca cgttcaccaa ctatggcatg    960

aactgggtga gacaggcccc cggcaagggg ttggaatgga tgggctggat taacacacat   1020

acgggcgaac cgacatacgc cgacagcttt aaaggtcgat ttacttttag cttggacgat   1080

tccaaaaata cggcatacct gcaaataaac tcactgcggg cagaggatac ggccgtatat   1140

ttttgtacgc ggagagggta cgattggtac tttgatgtct ggggacaggg gacgacagta   1200

accgtgtcta gtggcggggg aggatcaggt ggtggcggta gcggtggagg tggaagtgat   1260

atccagatga cacaatcacc gagttccctg tccgcgtcag taggggatcg ggtgacaatt   1320

acatgtagag catctcaaga catcaatagc tacctgagct ggtttcagca aaagcccgga   1380

aaagctccga aaactctgat ttatcgggcc aatcgccttg agtctggggt gccaagtaga   1440

ttttcaggct ccgggagcgg gacggactat acgttgacca tatcaagtct tcagtacgag   1500

gacttcggga tatactattg ccaacagtac gatgagagcc cgtggacctt cgggggtggg   1560

acaaagttgg agatcaaagc tagcgagcag aagctgatca gcgaggagga cctggacaat   1620

gagaagagca atggaaccat tatccatgtg aaagggaaac acctttgtcc aagtccccta   1680

tttcccggac cttctaagcc cttttgggtg ctggtggtgg ttggtggagt cctggcttgc   1740

tatagcttgc tagtaacagt ggcctttatt attttctggg tgaggagtaa gaggagcagg   1800
```

```
ctcctgcaca gtgactacat gaacatgact cccaggaggc ctgggccaac ccgcaagcat   1860

taccagccct atgccccacc acgcgacttc gcagcctatc gctccagcag gagcgcagac   1920

gctcccgcgt accagcaggg ccagaaccag ctctataacg agctcaatct aggacgaaga   1980

gaggagtacg atgttttgga caagagacgt ggccgggacc ctgagatggg aggcaagccg   2040

agaaggaaga accctcagga aggcctgtac aatgaactgc agaaagataa gatggcggag   2100

gcctacagtg agattgggat gaaaggcgag cgccggaggg gcaaggggca cgatggcctt   2160

taccagggtc tcagtacagc caccaaggac acctacgacg cccttcacat gcaggccctg   2220

cctcctcgct ga                                                       2232
```

<210> SEQ ID NO 49
<211> LENGTH: 743
<212> TYPE: PRT
<213> ORGANISM: Artificial Sequence
<220> FEATURE:
<223> OTHER INFORMATION: Synthetic construct

<400> SEQUENCE: 49

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys Gly
225                 230                 235                 240

Ser Gly Ala Thr Asn Phe Ser Leu Leu Lys Gln Ala Gly Asp Val Glu
                245                 250                 255

Glu Asn Pro Gly Pro Ser Arg Met Tyr Arg Met Gln Leu Leu Ser Cys
            260                 265                 270

Ile Ala Leu Ser Leu Ala Leu Val Thr Asn Ser Gly Ala Pro Glu Ile
        275                 280                 285
```

```
Gln Leu Val Gln Ser Gly Gly Gly Leu Val Lys Pro Gly Gly Ser Val
    290                 295                 300

Arg Ile Ser Cys Ala Ala Ser Gly Tyr Thr Phe Thr Asn Tyr Gly Met
305                 310                 315                 320

Asn Trp Val Arg Gln Ala Pro Gly Lys Gly Leu Glu Trp Met Gly Trp
                325                 330                 335

Ile Asn Thr His Thr Gly Glu Pro Thr Tyr Ala Asp Ser Phe Lys Gly
            340                 345                 350

Arg Phe Thr Phe Ser Leu Asp Asp Ser Lys Asn Thr Ala Tyr Leu Gln
        355                 360                 365

Ile Asn Ser Leu Arg Ala Glu Asp Thr Ala Val Tyr Phe Cys Thr Arg
    370                 375                 380

Arg Gly Tyr Asp Trp Tyr Phe Asp Val Trp Gly Gln Gly Thr Thr Val
385                 390                 395                 400

Thr Val Ser Ser Gly Gly Gly Gly Ser Gly Gly Gly Gly Ser Gly Gly
                405                 410                 415

Gly Gly Ser Asp Ile Gln Met Thr Gln Ser Pro Ser Ser Leu Ser Ala
            420                 425                 430

Ser Val Gly Asp Arg Val Thr Ile Thr Cys Arg Ala Ser Gln Asp Ile
        435                 440                 445

Asn Ser Tyr Leu Ser Trp Phe Gln Gln Lys Pro Gly Lys Ala Pro Lys
    450                 455                 460

Thr Leu Ile Tyr Arg Ala Asn Arg Leu Glu Ser Gly Val Pro Ser Arg
465                 470                 475                 480

Phe Ser Gly Ser Gly Ser Gly Thr Asp Tyr Thr Leu Thr Ile Ser Ser
                485                 490                 495

Leu Gln Tyr Glu Asp Phe Gly Ile Tyr Tyr Cys Gln Gln Tyr Asp Glu
            500                 505                 510

Ser Pro Trp Thr Phe Gly Gly Gly Thr Lys Leu Glu Ile Lys Ala Ser
        515                 520                 525

Glu Gln Lys Leu Ile Ser Glu Glu Asp Leu Asp Asn Glu Lys Ser Asn
    530                 535                 540

Gly Thr Ile Ile His Val Lys Gly Lys His Leu Cys Pro Ser Pro Leu
545                 550                 555                 560

Phe Pro Gly Pro Ser Lys Pro Phe Trp Val Leu Val Val Val Gly Gly
                565                 570                 575

Val Leu Ala Cys Tyr Ser Leu Leu Val Thr Val Ala Phe Ile Ile Phe
            580                 585                 590

Trp Val Arg Ser Lys Arg Ser Arg Leu Leu His Ser Asp Tyr Met Asn
        595                 600                 605

Met Thr Pro Arg Arg Pro Gly Pro Thr Arg Lys His Tyr Gln Pro Tyr
    610                 615                 620

Ala Pro Pro Arg Asp Phe Ala Ala Tyr Arg Ser Ser Arg Ser Ala Asp
625                 630                 635                 640

Ala Pro Ala Tyr Gln Gln Gly Gln Asn Gln Leu Tyr Asn Glu Leu Asn
                645                 650                 655

Leu Gly Arg Arg Glu Glu Tyr Asp Val Leu Asp Lys Arg Arg Gly Arg
            660                 665                 670

Asp Pro Glu Met Gly Gly Lys Pro Arg Arg Lys Asn Pro Gln Glu Gly
        675                 680                 685

Leu Tyr Asn Glu Leu Gln Lys Asp Lys Met Ala Glu Ala Tyr Ser Glu
    690                 695                 700
```

```
Ile Gly Met Lys Gly Glu Arg Arg Arg Gly Lys Gly His Asp Gly Leu
705                 710                 715                 720

Tyr Gln Gly Leu Ser Thr Ala Thr Lys Asp Thr Tyr Asp Ala Leu His
                725                 730                 735

Met Gln Ala Leu Pro Pro Arg
            740


<210> SEQ ID NO 50
<211> LENGTH: 1023
<212> TYPE: DNA
<213> ORGANISM: Artificial Sequence
<220> FEATURE:
<223> OTHER INFORMATION: Synthetic construct

<400> SEQUENCE: 50

atgtacagga tgcaactcct gtcttgcatt gcactaagtc ttgcacttgt cacgaattcg      60

ggcgcgcctg aaattcagtt ggtgcaaagc ggaggtggcc ttgtgaagcc aggaggcagt     120

gtgcgaatta gttgtgcagc ctccggttac acgttcacca actatggcat gaactgggtg     180

agacaggccc ccggcaaggg gttggaatgg atgggctgga ttaacacaca tacgggcgaa     240

ccgacatacg ccgacagctt taaaggtcga tttactttta gcttggacga ttccaaaaat     300

acggcatacc tgcaaataaa ctcactgcgg gcagaggata cggccgtata tttttgtacg     360

cggagagggt acgattggta ctttgatgtc tggggacagg ggacgacagt aaccgtgtct     420

agtggcgggg gaggatcagg tggtggcggt agcggtggag gtggaagtga tatccagatg     480

acacaatcac cgagttccct gtccgcgtca gtaggggatc gggtgacaat tacatgtaga     540

gcatctcaag acatcaatag ctacctgagc tggtttcagc aaaagcccgg aaaagctccg     600

aaaactctga tttatcgggc caatcgcctt gagtctgggg tgccaagtag attttcaggc     660

tccgggagcg ggacggacta tacgttgacc atatcaagtc ttcagtacga ggacttcggg     720

atatactatt gccaacagta cgatgagagc ccgtggacct tcgggggtgg gacaaagttg     780

gagatcaaag ctagcgagca gaagctgatc agcgaggagg acctggacaa tgagaagagc     840

aatggaacca ttatccatgt gaaagggaaa cacctttgtc caagtcccct atttcccgga     900

ccttctaagc ccttttgggt gctggtggtg gttggtggag tcctggcttg ctatagcttg     960

ctagtaacag tggcctttat tattttctgg gtgaggagtg aatggccggg aaaggtacgc    1020

tga                                                                  1023


<210> SEQ ID NO 51
<211> LENGTH: 340
<212> TYPE: PRT
<213> ORGANISM: Artificial Sequence
<220> FEATURE:
<223> OTHER INFORMATION: Synthetic construct

<400> SEQUENCE: 51

Met Tyr Arg Met Gln Leu Leu Ser Cys Ile Ala Leu Ser Leu Ala Leu
1               5                   10                  15

Val Thr Asn Ser Gly Ala Pro Glu Ile Gln Leu Val Gln Ser Gly Gly
            20                  25                  30

Gly Leu Val Lys Pro Gly Gly Ser Val Arg Ile Ser Cys Ala Ala Ser
        35                  40                  45

Gly Tyr Thr Phe Thr Asn Tyr Gly Met Asn Trp Val Arg Gln Ala Pro
    50                  55                  60

Gly Lys Gly Leu Glu Trp Met Gly Trp Ile Asn Thr His Thr Gly Glu
65                  70                  75                  80
```

```
Pro Thr Tyr Ala Asp Ser Phe Lys Gly Arg Phe Thr Phe Ser Leu Asp
                85                  90                  95

Asp Ser Lys Asn Thr Ala Tyr Leu Gln Ile Asn Ser Leu Arg Ala Glu
            100                 105                 110

Asp Thr Ala Val Tyr Phe Cys Thr Arg Arg Gly Tyr Asp Trp Tyr Phe
        115                 120                 125

Asp Val Trp Gly Gln Gly Thr Thr Val Thr Val Ser Ser Gly Gly Gly
    130                 135                 140

Gly Ser Gly Gly Gly Gly Ser Gly Gly Gly Gly Ser Asp Ile Gln Met
145                 150                 155                 160

Thr Gln Ser Pro Ser Ser Leu Ser Ala Ser Val Gly Asp Arg Val Thr
                165                 170                 175

Ile Thr Cys Arg Ala Ser Gln Asp Ile Asn Ser Tyr Leu Ser Trp Phe
            180                 185                 190

Gln Gln Lys Pro Gly Lys Ala Pro Lys Thr Leu Ile Tyr Arg Ala Asn
        195                 200                 205

Arg Leu Glu Ser Gly Val Pro Ser Arg Phe Ser Gly Ser Gly Ser Gly
    210                 215                 220

Thr Asp Tyr Thr Leu Thr Ile Ser Ser Leu Gln Tyr Glu Asp Phe Gly
225                 230                 235                 240

Ile Tyr Tyr Cys Gln Gln Tyr Asp Glu Ser Pro Trp Thr Phe Gly Gly
                245                 250                 255

Gly Thr Lys Leu Glu Ile Lys Ala Ser Glu Gln Lys Leu Ile Ser Glu
            260                 265                 270

Glu Asp Leu Asp Asn Glu Lys Ser Asn Gly Thr Ile Ile His Val Lys
        275                 280                 285

Gly Lys His Leu Cys Pro Ser Pro Leu Phe Pro Gly Pro Ser Lys Pro
    290                 295                 300

Phe Trp Val Leu Val Val Val Gly Gly Val Leu Ala Cys Tyr Ser Leu
305                 310                 315                 320

Leu Val Thr Val Ala Phe Ile Ile Phe Trp Val Arg Ser Glu Trp Pro
                325                 330                 335

Gly Lys Val Arg
            340


<210> SEQ ID NO 52
<211> LENGTH: 1812
<212> TYPE: DNA
<213> ORGANISM: Artificial Sequence
<220> FEATURE:
<223> OTHER INFORMATION: Synthetic construct

<400> SEQUENCE: 52

atggtgagca agggcgagga gctgttcacc ggggtggtgc ccatcctggt cgagctggac      60

ggcgacgtaa acggccacaa gttcagcgtg tccggcgagg gcgagggcga tgccacctac     120

ggcaagctga ccctgaagtt catctgcacc accggcaagc tgcccgtgcc ctggcccacc     180

ctcgtgacca ccctgaccta cggcgtgcag tgcttcagcc gctaccccga ccacatgaag     240

cagcacgact tcttcaagtc cgccatgccc gaaggctacg tccaggagcg caccatcttc     300

ttcaaggacg acggcaacta caagacccgc gccgaggtga agttcgaggg cgacaccctg     360

gtgaaccgca tcgagctgaa gggcatcgac ttcaaggagg acggcaacat cctggggcac     420

aagctggagt acaactacaa cagccacaac gtctatatca tggccgacaa gcagaagaac     480

ggcatcaagg tgaacttcaa gatccgccac aacatcgagg acggcagcgt gcagctcgcc     540
```

```
gaccactacc agcagaacac ccccatcggc gacggccccg tgctgctgcc cgacaaccac    600
tacctgagca cccagtccgc cctgagcaaa gaccccaacg agaagcgcga tcacatggtc    660
ctgctggagt tcgtgaccgc cgccgggatc actctcggca tggacgagct gtacaaggga    720
tctggagcaa caaacttctc actactcaaa caagcaggtg acgtggagga gaatcccggg    780
ccttctagaa tgtacaggat gcaactcctg tcttgcattg cactaagtct tgcacttgtc    840
acgaattcgg gcgcgcctga aattcagttg gtgcaaagcg gaggtggcct tgtgaagcca    900
ggaggcagtg tgcgaattag ttgtgcagcc tccggttaca cgttcaccaa ctatggcatg    960
aactgggtga gacaggcccc cggcaagggg ttggaatgga tgggctggat taacacacat   1020
acgggcgaac cgacatacgc cgacagcttt aaaggtcgat ttacttttag cttggacgat   1080
tccaaaaata cggcatacct gcaaataaac tcactgcggg cagaggatac ggccgtatat   1140
ttttgtacgc ggagagggta cgattggtac tttgatgtct ggggacaggg gacgacagta   1200
accgtgtcta gtggcggggg aggatcaggt ggtggcggta gcggtggagg tggaagtgat   1260
atccagatga cacaatcacc gagttccctg tccgcgtcag taggggatcg ggtgacaatt   1320
acatgtagag catctcaaga catcaatagc tacctgagct ggtttcagca aaagcccgga   1380
aaagctccga aaactctgat ttatcgggcc aatcgccttg agtctggggt gccaagtaga   1440
ttttcaggct ccgggagcgg gacggactat acgttgacca tatcaagtct tcagtacgag   1500
gacttcggga tatactattg ccaacagtac gatgagagcc cgtggacctt cgggggtggg   1560
acaaagttgg agatcaaagc tagcgagcag aagctgatca gcgaggagga cctggacaat   1620
gagaagagca atggaaccat tatccatgtg aaagggaaac acctttgtcc aagtccccta   1680
tttcccggac cttctaagcc cttttgggtg ctggtggtgg ttggtggagt cctggcttgc   1740
tatagcttgc tagtaacagt ggcctttatt attttctggg tgaggagtga atggccggga   1800
aaggtacgct ga                                                       1812
```

<210> SEQ ID NO 53
<211> LENGTH: 603
<212> TYPE: PRT
<213> ORGANISM: Artificial Sequence
<220> FEATURE:
<223> OTHER INFORMATION: Synthetic construct

<400> SEQUENCE: 53

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125
```

-continued

```
Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys Gly
225                 230                 235                 240

Ser Gly Ala Thr Asn Phe Ser Leu Leu Lys Gln Ala Gly Asp Val Glu
                245                 250                 255

Glu Asn Pro Gly Pro Ser Arg Met Tyr Arg Met Gln Leu Leu Ser Cys
            260                 265                 270

Ile Ala Leu Ser Leu Ala Leu Val Thr Asn Ser Gly Ala Pro Glu Ile
        275                 280                 285

Gln Leu Val Gln Ser Gly Gly Gly Leu Val Lys Pro Gly Gly Ser Val
    290                 295                 300

Arg Ile Ser Cys Ala Ala Ser Gly Tyr Thr Phe Thr Asn Tyr Gly Met
305                 310                 315                 320

Asn Trp Val Arg Gln Ala Pro Gly Lys Gly Leu Glu Trp Met Gly Trp
                325                 330                 335

Ile Asn Thr His Thr Gly Glu Pro Thr Tyr Ala Asp Ser Phe Lys Gly
            340                 345                 350

Arg Phe Thr Phe Ser Leu Asp Asp Ser Lys Asn Thr Ala Tyr Leu Gln
        355                 360                 365

Ile Asn Ser Leu Arg Ala Glu Asp Thr Ala Val Tyr Phe Cys Thr Arg
    370                 375                 380

Arg Gly Tyr Asp Trp Tyr Phe Asp Val Trp Gly Gln Gly Thr Thr Val
385                 390                 395                 400

Thr Val Ser Ser Gly Gly Gly Gly Ser Gly Gly Gly Gly Ser Gly Gly
                405                 410                 415

Gly Gly Ser Asp Ile Gln Met Thr Gln Ser Pro Ser Ser Leu Ser Ala
            420                 425                 430

Ser Val Gly Asp Arg Val Thr Ile Thr Cys Arg Ala Ser Gln Asp Ile
        435                 440                 445

Asn Ser Tyr Leu Ser Trp Phe Gln Gln Lys Pro Gly Lys Ala Pro Lys
    450                 455                 460

Thr Leu Ile Tyr Arg Ala Asn Arg Leu Glu Ser Gly Val Pro Ser Arg
465                 470                 475                 480

Phe Ser Gly Ser Gly Ser Gly Thr Asp Tyr Thr Leu Thr Ile Ser Ser
                485                 490                 495

Leu Gln Tyr Glu Asp Phe Gly Ile Tyr Tyr Cys Gln Gln Tyr Asp Glu
            500                 505                 510

Ser Pro Trp Thr Phe Gly Gly Gly Thr Lys Leu Glu Ile Lys Ala Ser
        515                 520                 525

Glu Gln Lys Leu Ile Ser Glu Glu Asp Leu Asp Asn Glu Lys Ser Asn
    530                 535                 540

Gly Thr Ile Ile His Val Lys Gly Lys His Leu Cys Pro Ser Pro Leu
```

```
545                 550                 555                 560

Phe Pro Gly Pro Ser Lys Pro Phe Trp Val Leu Val Val Val Gly Gly
                565                 570                 575

Val Leu Ala Cys Tyr Ser Leu Leu Val Thr Val Ala Phe Ile Ile Phe
            580                 585                 590

Trp Val Arg Ser Glu Trp Pro Gly Lys Val Arg
        595                 600


<210> SEQ ID NO 54
<211> LENGTH: 1605
<212> TYPE: DNA
<213> ORGANISM: Artificial Sequence
<220> FEATURE:
<223> OTHER INFORMATION: Synthetic construct

<400> SEQUENCE: 54

atgtacagga tgcaactcct gtcttgcatt gcactaagtc ttgcacttgt cacgaattcg      60

ggcgcgcctg aggtcaagct ccaagaatct gggcctggtt tggtcgcgcc ctctcagtct     120

ttgtccgtca cttgtactgt ttccggcgtt tctctgcccg attacggagt ctcttggata     180

cggcagcccc cacgaaaggg gttggagtgg ttgggcgtta tatggggatc agaaacaacg     240

tattacaact ccgcgctcaa gagcagactt actattataa aggataacag taaatcacag     300

gtgttcctga aaatgaactc tttgcaaacc gatgatacgg cgatctacta ttgtgcgaag     360

cactattact acggtggtag ctacgcgatg gactattggg gccaagggac gtctgtcaca     420

gtatcatctg gtggaggtgg gagtggagga ggcggcagtg gaggcggggg gagtgacatc     480

cagatgacgc agacgacttc ttcactctct gcatctttgg gagatcgggt gactatcagt     540

tgcagggcgt cccaggacat atcaaagtac cttaactggt accagcagaa acccgatggg     600

acagtaaaac ttcttatata tcatacttct cggctgcatt ccggtgtgcc atctaggttt     660

tcaggttctg gctctggaac cgactactcc ttgacgattt ctaacctcga acaagaggac     720

atagctacct atttttgtca gcagggaaac actctcccgt acacgtttgg agggggaact     780

aaactggaga tcacgcgggc tgacgcggct ccaactgtga gtatcttccc accgtcctca     840

aatgctagca ccactacccc ggcccctagg ccccctactc cagcgccaac tatagcatca     900

cagcctttga gcttgaggcc cgaagcttgc agaccggcgg caggggggc tgtgcataca      960

aggggcctcg actttgcctg cgacatcgat aatgagaaga gcaatggaac cattatccat    1020

gtgaaaggga aacacctttg tccaagtccc ctatttcccg gaccttctaa gcccttttgg    1080

gtgctggtgg tggttggtgg agtcctggct tgctatagct tgctagtaac agtggccttt    1140

attattttct gggtgaggag taagaggagc aggctcctgc acagtgacta catgaacatg    1200

actcccagga ggcctgggcc aacccgcaag cattaccagc cctatgcccc accacgcgac    1260

ttcgcagcct atcgctccag caggagcgca gacgctcccg cgtaccagca gggccagaac    1320

cagctctata acgagctcaa tctaggacga agagaggagt acgatgtttt ggacaagaga    1380

cgtggccggg accctgagat gggaggcaag ccgagaagga agaaccctca ggaaggcctg    1440

tacaatgaac tgcagaaaga taagatggcg gaggcctaca gtgagattgg gatgaaaggc    1500

gagcgccgga ggggcaaggg gcacgatggc ctttaccagg gtctcagtac agccaccaag    1560

gacacctacg acgcccttca catgcaggcc ctgcctcctc gctga                    1605


<210> SEQ ID NO 55
<211> LENGTH: 534
<212> TYPE: PRT
```

```
<213> ORGANISM: Artificial Sequence
<220> FEATURE:
<223> OTHER INFORMATION: Synthetic construct

<400> SEQUENCE: 55

Met Tyr Arg Met Gln Leu Leu Ser Cys Ile Ala Leu Ser Leu Ala Leu
1               5                   10                  15

Val Thr Asn Ser Gly Ala Pro Glu Val Lys Leu Gln Glu Ser Gly Pro
            20                  25                  30

Gly Leu Val Ala Pro Ser Gln Ser Leu Ser Val Thr Cys Thr Val Ser
        35                  40                  45

Gly Val Ser Leu Pro Asp Tyr Gly Val Ser Trp Ile Arg Gln Pro Pro
    50                  55                  60

Arg Lys Gly Leu Glu Trp Leu Gly Val Ile Trp Gly Ser Glu Thr Thr
65                  70                  75                  80

Tyr Tyr Asn Ser Ala Leu Lys Ser Arg Leu Thr Ile Ile Lys Asp Asn
                85                  90                  95

Ser Lys Ser Gln Val Phe Leu Lys Met Asn Ser Leu Gln Thr Asp Asp
            100                 105                 110

Thr Ala Ile Tyr Tyr Cys Ala Lys His Tyr Tyr Tyr Gly Gly Ser Tyr
        115                 120                 125

Ala Met Asp Tyr Trp Gly Gln Gly Thr Ser Val Thr Val Ser Ser Gly
    130                 135                 140

Gly Gly Gly Ser Gly Gly Gly Gly Ser Gly Gly Gly Gly Ser Asp Ile
145                 150                 155                 160

Gln Met Thr Gln Thr Thr Ser Ser Leu Ser Ala Ser Leu Gly Asp Arg
                165                 170                 175

Val Thr Ile Ser Cys Arg Ala Ser Gln Asp Ile Ser Lys Tyr Leu Asn
            180                 185                 190

Trp Tyr Gln Gln Lys Pro Asp Gly Thr Val Lys Leu Leu Ile Tyr His
        195                 200                 205

Thr Ser Arg Leu His Ser Gly Val Pro Ser Arg Phe Ser Gly Ser Gly
    210                 215                 220

Ser Gly Thr Asp Tyr Ser Leu Thr Ile Ser Asn Leu Glu Gln Glu Asp
225                 230                 235                 240

Ile Ala Thr Tyr Phe Cys Gln Gln Gly Asn Thr Leu Pro Tyr Thr Phe
                245                 250                 255

Gly Gly Gly Thr Lys Leu Glu Ile Thr Arg Ala Asp Ala Ala Pro Thr
            260                 265                 270

Val Ser Ile Phe Pro Pro Ser Ser Asn Ala Ser Thr Thr Thr Pro Ala
        275                 280                 285

Pro Arg Pro Pro Thr Pro Ala Pro Thr Ile Ala Ser Gln Pro Leu Ser
    290                 295                 300

Leu Arg Pro Glu Ala Cys Arg Pro Ala Ala Gly Gly Ala Val His Thr
305                 310                 315                 320

Arg Gly Leu Asp Phe Ala Cys Asp Ile Asp Asn Glu Lys Ser Asn Gly
                325                 330                 335

Thr Ile Ile His Val Lys Gly Lys His Leu Cys Pro Ser Pro Leu Phe
            340                 345                 350

Pro Gly Pro Ser Lys Pro Phe Trp Val Leu Val Val Val Gly Gly Val
        355                 360                 365

Leu Ala Cys Tyr Ser Leu Leu Val Thr Val Ala Phe Ile Ile Phe Trp
    370                 375                 380

Val Arg Ser Lys Arg Ser Arg Leu Leu His Ser Asp Tyr Met Asn Met
```

385 390 395 400

Thr Pro Arg Arg Pro Gly Pro Thr Arg Lys His Tyr Gln Pro Tyr Ala
405 410 415

Pro Pro Arg Asp Phe Ala Ala Tyr Arg Ser Ser Arg Ser Ala Asp Ala
420 425 430

Pro Ala Tyr Gln Gln Gly Gln Asn Gln Leu Tyr Asn Glu Leu Asn Leu
435 440 445

Gly Arg Arg Glu Glu Tyr Asp Val Leu Asp Lys Arg Arg Gly Arg Asp
450 455 460

Pro Glu Met Gly Gly Lys Pro Arg Arg Lys Asn Pro Gln Glu Gly Leu
465 470 475 480

Tyr Asn Glu Leu Gln Lys Asp Lys Met Ala Glu Ala Tyr Ser Glu Ile
485 490 495

Gly Met Lys Gly Glu Arg Arg Arg Gly Lys Gly His Asp Gly Leu Tyr
500 505 510

Gln Gly Leu Ser Thr Ala Thr Lys Asp Thr Tyr Asp Ala Leu His Met
515 520 525

Gln Ala Leu Pro Pro Arg
530

<210> SEQ ID NO 56
<211> LENGTH: 2394
<212> TYPE: DNA
<213> ORGANISM: Artificial Sequence
<220> FEATURE:
<223> OTHER INFORMATION: Synthetic construct

<400> SEQUENCE: 56
atggtgagca agggcgagga gctgttcacc ggggtggtgc ccatcctggt cgagctggac 60
ggcgacgtaa acggccacaa gttcagcgtg tccggcgagg gcgagggcga tgccacctac 120
ggcaagctga ccctgaagtt catctgcacc accggcaagc tgcccgtgcc ctggcccacc 180
ctcgtgacca ccctgaccta cggcgtgcag tgcttcagcc gctaccccga ccacatgaag 240
cagcacgact tcttcaagtc cgccatgccc gaaggctacg tccaggagcg caccatcttc 300
ttcaaggacg acggcaacta caagacccgc gccgaggtga agttcgaggg cgacaccctg 360
gtgaaccgca tcgagctgaa gggcatcgac ttcaaggagg acggcaacat cctggggcac 420
aagctggagt acaactacaa cagccacaac gtctatatca tggccgacaa gcagaagaac 480
ggcatcaagg tgaacttcaa gatccgccac aacatcgagg acggcagcgt gcagctcgcc 540
gaccactacc agcagaacac ccccatcggc gacggccccg tgctgctgcc cgacaaccac 600
tacctgagca cccagtccgc cctgagcaaa gaccccaacg agaagcgcga tcacatggtc 660
ctgctggagt tcgtgaccgc cgccgggatc actctcggca tggacgagct gtacaaggga 720
tctggagcaa caaacttctc actactcaaa caagcaggtg acgtggagga gaatcccggg 780
ccttctagaa tgtacaggat gcaactcctg tcttgcattg cactaagtct tgcacttgtc 840
acgaattcgg gcgcgcctga ggtcaagctc caagaatctg ggcctggttt ggtcgcgccc 900
tctcagtctt tgtccgtcac ttgtactgtt tccggcgttt ctctgcccga ttacggagtc 960
tcttggatac ggcagccccc acgaaagggg ttggagtggt tgggcgttat atggggatca 1020
gaaacaacgt attacaactc cgcgctcaag agcagactta ctattataaa ggataacagt 1080
aaatcacagg tgttcctgaa aatgaactct ttgcaaaccg atgatacggc gatctactat 1140
tgtgcgaagc actattacta cggtggtagc tacgcgatgg actattgggg ccaagggacg 1200

```
tctgtcacag tatcatctgg tggaggtggg agtggaggag gcggcagtgg aggcgggggg   1260

agtgacatcc agatgacgca gacgacttct tcactctctg catctttggg agatcgggtg   1320

actatcagtt gcagggcgtc ccaggacata tcaaagtacc ttaactggta ccagcagaaa   1380

cccgatggga cagtaaaact tcttatatat catacttctc ggctgcattc cggtgtgcca   1440

tctaggtttt caggttctgg ctctggaacc gactactcct tgacgatttc taacctcgaa   1500

caagaggaca tagctaccta tttttgtcag cagggaaaca ctctcccgta cacgtttgga   1560

gggggaacta aactggagat cacgcgggct gacgcggctc caactgtgag tatcttccca   1620

ccgtcctcaa atgctagcac cactaccccg gcccctaggc cccctactcc agcgccaact   1680

atagcatcac agcctttgag cttgaggccc gaagcttgca gaccggcggc aggggggggct   1740

gtgcatacaa ggggcctcga ctttgcctgc gacatcgata atgagaagag caatggaacc   1800

attatccatg tgaaagggaa acacctttgt ccaagtcccc tatttcccgg accttctaag   1860

cccttttggg tgctggtggt ggttggtgga gtcctggctt gctatagctt gctagtaaca   1920

gtggccttta ttattttctg ggtgaggagt aagaggagca ggctcctgca cagtgactac   1980

atgaacatga ctcccaggag gcctgggcca acccgcaagc attaccagcc ctatgcccca   2040

ccacgcgact tcgcagccta tcgctccagc aggagcgcag acgctcccgc gtaccagcag   2100

ggccagaacc agctctataa cgagctcaat ctaggacgaa gagaggagta cgatgttttg   2160

gacaagagac gtggccggga ccctgagatg gggaggcaagc cgagaaggaa gaaccctcag   2220

gaaggcctgt acaatgaact gcagaaagat aagatggcgg aggcctacag tgagattggg   2280

atgaaaggcg agcgccggag gggcaagggg cacgatggcc tttaccaggg tctcagtaca   2340

gccaccaagg acacctacga cgcccttcac atgcaggccc tgcctcctcg ctga         2394
```

<210> SEQ ID NO 57
<211> LENGTH: 797
<212> TYPE: PRT
<213> ORGANISM: Artificial Sequence
<220> FEATURE:
<223> OTHER INFORMATION: Synthetic construct

<400> SEQUENCE: 57

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160
```

```
Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys Gly
225                 230                 235                 240

Ser Gly Ala Thr Asn Phe Ser Leu Leu Lys Gln Ala Gly Asp Val Glu
                245                 250                 255

Glu Asn Pro Gly Pro Ser Arg Met Tyr Arg Met Gln Leu Leu Ser Cys
            260                 265                 270

Ile Ala Leu Ser Leu Ala Leu Val Thr Asn Ser Gly Ala Pro Glu Val
        275                 280                 285

Lys Leu Gln Glu Ser Gly Pro Gly Leu Val Ala Pro Ser Gln Ser Leu
    290                 295                 300

Ser Val Thr Cys Thr Val Ser Gly Val Ser Leu Pro Asp Tyr Gly Val
305                 310                 315                 320

Ser Trp Ile Arg Gln Pro Pro Arg Lys Gly Leu Glu Trp Leu Gly Val
                325                 330                 335

Ile Trp Gly Ser Glu Thr Thr Tyr Tyr Asn Ser Ala Leu Lys Ser Arg
            340                 345                 350

Leu Thr Ile Ile Lys Asp Asn Ser Lys Ser Gln Val Phe Leu Lys Met
        355                 360                 365

Asn Ser Leu Gln Thr Asp Asp Thr Ala Ile Tyr Tyr Cys Ala Lys His
    370                 375                 380

Tyr Tyr Tyr Gly Gly Ser Tyr Ala Met Asp Tyr Trp Gly Gln Gly Thr
385                 390                 395                 400

Ser Val Thr Val Ser Ser Gly Gly Gly Gly Ser Gly Gly Gly Gly Ser
                405                 410                 415

Gly Gly Gly Gly Ser Asp Ile Gln Met Thr Gln Thr Thr Ser Ser Leu
            420                 425                 430

Ser Ala Ser Leu Gly Asp Arg Val Thr Ile Ser Cys Arg Ala Ser Gln
        435                 440                 445

Asp Ile Ser Lys Tyr Leu Asn Trp Tyr Gln Gln Lys Pro Asp Gly Thr
    450                 455                 460

Val Lys Leu Leu Ile Tyr His Thr Ser Arg Leu His Ser Gly Val Pro
465                 470                 475                 480

Ser Arg Phe Ser Gly Ser Gly Ser Gly Thr Asp Tyr Ser Leu Thr Ile
                485                 490                 495

Ser Asn Leu Glu Gln Glu Asp Ile Ala Thr Tyr Phe Cys Gln Gln Gly
            500                 505                 510

Asn Thr Leu Pro Tyr Thr Phe Gly Gly Gly Thr Lys Leu Glu Ile Thr
        515                 520                 525

Arg Ala Asp Ala Ala Pro Thr Val Ser Ile Phe Pro Pro Ser Ser Asn
    530                 535                 540

Ala Ser Thr Thr Thr Pro Ala Pro Arg Pro Pro Thr Pro Ala Pro Thr
545                 550                 555                 560

Ile Ala Ser Gln Pro Leu Ser Leu Arg Pro Glu Ala Cys Arg Pro Ala
                565                 570                 575
```

```
Ala Gly Gly Ala Val His Thr Arg Gly Leu Asp Phe Ala Cys Asp Ile
            580                 585                 590

Asp Asn Glu Lys Ser Asn Gly Thr Ile Ile His Val Lys Gly Lys His
        595                 600                 605

Leu Cys Pro Ser Pro Leu Phe Pro Gly Pro Ser Lys Pro Phe Trp Val
    610                 615                 620

Leu Val Val Val Gly Gly Val Leu Ala Cys Tyr Ser Leu Leu Val Thr
625                 630                 635                 640

Val Ala Phe Ile Ile Phe Trp Val Arg Ser Lys Arg Ser Arg Leu Leu
                645                 650                 655

His Ser Asp Tyr Met Asn Met Thr Pro Arg Arg Pro Gly Pro Thr Arg
            660                 665                 670

Lys His Tyr Gln Pro Tyr Ala Pro Pro Arg Asp Phe Ala Ala Tyr Arg
        675                 680                 685

Ser Ser Arg Ser Ala Asp Ala Pro Ala Tyr Gln Gln Gly Gln Asn Gln
    690                 695                 700

Leu Tyr Asn Glu Leu Asn Leu Gly Arg Arg Glu Glu Tyr Asp Val Leu
705                 710                 715                 720

Asp Lys Arg Arg Gly Arg Asp Pro Glu Met Gly Gly Lys Pro Arg Arg
                725                 730                 735

Lys Asn Pro Gln Glu Gly Leu Tyr Asn Glu Leu Gln Lys Asp Lys Met
            740                 745                 750

Ala Glu Ala Tyr Ser Glu Ile Gly Met Lys Gly Glu Arg Arg Arg Gly
        755                 760                 765

Lys Gly His Asp Gly Leu Tyr Gln Gly Leu Ser Thr Ala Thr Lys Asp
    770                 775                 780

Thr Tyr Asp Ala Leu His Met Gln Ala Leu Pro Pro Arg
785                 790                 795
```

<210> SEQ ID NO 58
<211> LENGTH: 1077
<212> TYPE: DNA
<213> ORGANISM: Artificial Sequence
<220> FEATURE:
<223> OTHER INFORMATION: Synthetic construct

<400> SEQUENCE: 58

```
atgtacagga tgcaactcct gtcttgcatt gcactaagtc ttgcacttgt cacgaattcg     60

ggcgcgcctg aggtcaagct ccaagaatct gggcctggtt tggtcgcgcc ctctcagtct    120

ttgtccgtca cttgtactgt ttccggcgtt tctctgcccg attacggagt ctcttggata    180

cggcagcccc cacgaaaggg gttggagtgg ttgggcgtta tatggggatc agaaacaacg    240

tattacaact ccgcgctcaa gagcagactt actattataa aggataacag taaatcacag    300

gtgttcctga aaatgaactc tttgcaaacc gatgatacgg cgatctacta ttgtgcgaag    360

cactattact acggtggtag ctacgcgatg gactattggg gccaagggac gtctgtcaca    420

gtatcatctg gtggaggtgg gagtggagga ggcggcagtg gaggcggggg gagtgacatc    480

cagatgacgc agacgacttc ttcactctct gcatctttgg gagatcgggt gactatcagt    540

tgcagggcgt cccaggacat atcaaagtac cttaactggt accagcagaa acccgatggg    600

acagtaaaac ttcttatata tcatacttct cggctgcatt ccggtgtgcc atctaggttt    660

tcaggttctg gctctggaac cgactactcc ttgacgattt ctaacctcga acaagaggac    720

atagctacct atttttgtca gcagggaaac actctcccgt acacgtttgg agggggaact    780

aaactggaga tcacgcgggc tgacgcggct ccaactgtga gtatcttccc accgtcctca    840
```

```
aatgctagcg agcagaagct gatcagcgag gaggacctgg acaatgagaa gagcaatgga    900

accattatcc atgtgaaagg gaaacacctt tgtccaagtc ccctatttcc cggaccttct    960

aagccctttt gggtgctggt ggtggttggt ggagtcctgg cttgctatag cttgctagta   1020

acagtggcct ttattatttt ctgggtgagg agtgaatggc cgggaaaggt acgctga      1077


<210> SEQ ID NO 59
<211> LENGTH: 357
<212> TYPE: PRT
<213> ORGANISM: Artificial Sequence
<220> FEATURE:
<223> OTHER INFORMATION: Synthetic construct

<400> SEQUENCE: 59

Met Tyr Arg Met Gln Leu Leu Ser Cys Ile Ala Leu Ser Leu Ala Leu
1               5                   10                  15

Val Thr Asn Ser Gly Ala Pro Glu Val Lys Leu Gln Glu Ser Gly Pro
            20                  25                  30

Gly Leu Val Ala Pro Ser Gln Ser Leu Ser Val Thr Cys Thr Val Ser
        35                  40                  45

Gly Val Ser Leu Pro Asp Tyr Gly Val Ser Trp Ile Arg Gln Pro Pro
    50                  55                  60

Arg Lys Gly Leu Glu Trp Leu Gly Val Ile Trp Gly Ser Glu Thr Thr
65                  70                  75                  80

Tyr Tyr Asn Ser Ala Leu Lys Ser Arg Leu Thr Ile Ile Lys Asp Asn
                85                  90                  95

Ser Lys Ser Gln Val Phe Leu Lys Met Asn Ser Leu Gln Thr Asp Asp
            100                 105                 110

Thr Ala Ile Tyr Tyr Cys Ala Lys His Tyr Tyr Tyr Gly Gly Ser Tyr
        115                 120                 125

Ala Met Asp Tyr Trp Gly Gln Gly Thr Ser Val Thr Val Ser Ser Gly
    130                 135                 140

Gly Gly Gly Ser Gly Gly Gly Gly Ser Gly Gly Gly Gly Ser Asp Ile
145                 150                 155                 160

Gln Met Thr Gln Thr Thr Ser Ser Leu Ser Ala Ser Leu Gly Asp Arg
                165                 170                 175

Val Thr Ile Ser Cys Arg Ala Ser Gln Asp Ile Ser Lys Tyr Leu Asn
            180                 185                 190

Trp Tyr Gln Gln Lys Pro Asp Gly Thr Val Lys Leu Leu Ile Tyr His
        195                 200                 205

Thr Ser Arg Leu His Ser Gly Val Pro Ser Arg Phe Ser Gly Ser Gly
    210                 215                 220

Ser Gly Thr Asp Tyr Ser Leu Thr Ile Ser Asn Leu Glu Gln Glu Asp
225                 230                 235                 240

Ile Ala Thr Tyr Phe Cys Gln Gln Gly Asn Thr Leu Pro Tyr Thr Phe
                245                 250                 255

Gly Gly Gly Thr Lys Leu Glu Ile Thr Arg Ala Asp Ala Ala Pro Thr
            260                 265                 270

Val Ser Ile Phe Pro Pro Ser Ser Asn Ala Ser Glu Gln Lys Leu Ile
        275                 280                 285

Ser Glu Glu Asp Leu Asp Asn Glu Lys Ser Asn Gly Thr Ile Ile His
    290                 295                 300

Val Lys Gly Lys His Leu Cys Pro Ser Pro Leu Phe Pro Gly Pro Ser
305                 310                 315                 320
```

```
Lys Pro Phe Trp Val Leu Val Val Val Gly Gly Val Leu Ala Cys Tyr
            325                 330                 335

Ser Leu Leu Val Thr Val Ala Phe Ile Ile Phe Trp Val Arg Ser Glu
        340                 345                 350

Trp Pro Gly Lys Val
    355
```

```
<210> SEQ ID NO 60
<211> LENGTH: 1866
<212> TYPE: DNA
<213> ORGANISM: Artificial Sequence
<220> FEATURE:
<223> OTHER INFORMATION: Synthetic construct

<400> SEQUENCE: 60

atggtgagca agggcgagga gctgttcacc ggggtggtgc ccatcctggt cgagctggac     60

ggcgacgtaa acggccacaa gttcagcgtg tccggcgagg gcgagggcga tgccacctac    120

ggcaagctga ccctgaagtt catctgcacc accggcaagc tgcccgtgcc ctggcccacc    180

ctcgtgacca ccctgaccta cggcgtgcag tgcttcagcc gctaccccga ccacatgaag    240

cagcacgact tcttcaagtc cgccatgccc gaaggctacg tccaggagcg caccatcttc    300

ttcaaggacg acggcaacta caagacccgc gccgaggtga agttcgaggg cgacaccctg    360

gtgaaccgca tcgagctgaa gggcatcgac ttcaaggagg acggcaacat cctggggcac    420

aagctggagt acaactacaa cagccacaac gtctatatca tggccgacaa gcagaagaac    480

ggcatcaagg tgaacttcaa gatccgccac aacatcgagg acggcagcgt gcagctcgcc    540

gaccactacc agcagaacac ccccatcggc gacggccccg tgctgctgcc cgacaaccac    600

tacctgagca cccagtccgc cctgagcaaa gaccccaacg agaagcgcga tcacatggtc    660

ctgctggagt tcgtgaccgc cgccgggatc actctcggca tggacgagct gtacaaggga    720

tctggagcaa caaacttctc actactcaaa caagcaggtg acgtggagga gaatcccggg    780

ccttctagaa tgtacaggat gcaactcctg tcttgcattg cactaagtct tgcacttgtc    840

acgaattcgg gcgcgcctga ggtcaagctc caagaatctg gccctggttt ggtcgcgccc    900

tctcagtctt tgtccgtcac ttgtactgtt tccggcgttt ctctgcccga ttacggagtc    960

tcttggatac ggcagccccc acgaaagggg ttggagtggt tgggcgttat atggggatca   1020

gaaacaacgt attacaactc cgcgctcaag agcagactta ctattataaa ggataacagt   1080

aaatcacagg tgttcctgaa aatgaactct ttgcaaaccg atgatacggc gatctactat   1140

tgtgcgaagc actattacta cggtggtagc tacgcgatgg actattgggg ccaagggacg   1200

tctgtcacag tatcatctgg tggaggtggg agtggaggag gcggcagtgg aggcgggggg   1260

agtgacatcc agatgacgca gacgacttct tcactctctg catctttggg agatcgggtg   1320

actatcagtt gcagggcgtc ccaggacata tcaaagtacc ttaactggta ccagcagaaa   1380

cccgatggga cagtaaaact tcttatatat catacttctc ggctgcattc cggtgtgcca   1440

tctaggtttt caggttctgg ctctggaacc gactactcct tgacgatttc taacctcgaa   1500

caagaggaca tagctaccta tttttgtcag cagggaaaca ctctcccgta cacgtttgga   1560

gggggaacta aactggagat cacgcgggct gacgcggctc caactgtgag tatcttccca   1620

ccgtcctcaa atgctagcga gcagaagctg atcagcgagg aggacctgga caatgagaag   1680

agcaatggaa ccattatcca tgtgaaaggg aaacaccttt gtccaagtcc cctatttccc   1740

ggaccttcta agccctttttg ggtgctggtg gtggttggtg gagtcctggc ttgctatagc   1800
```

```
ttgctagtaa cagtggcctt tattattttc tgggtgagga gtgaatggcc gggaaaggta   1860

cgctga                                                              1866


<210> SEQ ID NO 61
<211> LENGTH: 621
<212> TYPE: PRT
<213> ORGANISM: Artificial Sequence
<220> FEATURE:
<223> OTHER INFORMATION: Synthetic construct

<400> SEQUENCE: 61

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys Gly
225                 230                 235                 240

Ser Gly Ala Thr Asn Phe Ser Leu Leu Lys Gln Ala Gly Asp Val Glu
                245                 250                 255

Glu Asn Pro Gly Pro Ser Arg Met Tyr Arg Met Gln Leu Leu Ser Cys
            260                 265                 270

Ile Ala Leu Ser Leu Ala Leu Val Thr Asn Ser Gly Ala Pro Glu Val
        275                 280                 285

Lys Leu Gln Glu Ser Gly Pro Gly Leu Val Ala Pro Ser Gln Ser Leu
    290                 295                 300

Ser Val Thr Cys Thr Val Ser Gly Val Ser Leu Pro Asp Tyr Gly Val
305                 310                 315                 320

Ser Trp Ile Arg Gln Pro Pro Arg Lys Gly Leu Glu Trp Leu Gly Val
                325                 330                 335

Ile Trp Gly Ser Glu Thr Thr Tyr Tyr Asn Ser Ala Leu Lys Ser Arg
            340                 345                 350
```

```
Leu Thr Ile Ile Lys Asp Asn Ser Lys Ser Gln Val Phe Leu Lys Met
        355                 360                 365

Asn Ser Leu Gln Thr Asp Asp Thr Ala Ile Tyr Tyr Cys Ala Lys His
    370                 375                 380

Tyr Tyr Tyr Gly Gly Ser Tyr Ala Met Asp Tyr Trp Gly Gln Gly Thr
385                 390                 395                 400

Ser Val Thr Val Ser Ser Gly Gly Gly Gly Ser Gly Gly Gly Gly Ser
                405                 410                 415

Gly Gly Gly Gly Ser Asp Ile Gln Met Thr Gln Thr Thr Ser Ser Leu
            420                 425                 430

Ser Ala Ser Leu Gly Asp Arg Val Thr Ile Ser Cys Arg Ala Ser Gln
        435                 440                 445

Asp Ile Ser Lys Tyr Leu Asn Trp Tyr Gln Gln Lys Pro Asp Gly Thr
    450                 455                 460

Val Lys Leu Leu Ile Tyr His Thr Ser Arg Leu His Ser Gly Val Pro
465                 470                 475                 480

Ser Arg Phe Ser Gly Ser Gly Ser Gly Thr Asp Tyr Ser Leu Thr Ile
                485                 490                 495

Ser Asn Leu Glu Gln Glu Asp Ile Ala Thr Tyr Phe Cys Gln Gln Gly
            500                 505                 510

Asn Thr Leu Pro Tyr Thr Phe Gly Gly Gly Thr Lys Leu Glu Ile Thr
        515                 520                 525

Arg Ala Asp Ala Ala Pro Thr Val Ser Ile Phe Pro Pro Ser Ser Asn
    530                 535                 540

Ala Ser Glu Gln Lys Leu Ile Ser Glu Glu Asp Leu Asp Asn Glu Lys
545                 550                 555                 560

Ser Asn Gly Thr Ile Ile His Val Lys Gly Lys His Leu Cys Pro Ser
                565                 570                 575

Pro Leu Phe Pro Gly Pro Ser Lys Pro Phe Trp Val Leu Val Val Val
            580                 585                 590

Gly Gly Val Leu Ala Cys Tyr Ser Leu Leu Val Thr Val Ala Phe Ile
        595                 600                 605

Ile Phe Trp Val Arg Ser Glu Trp Pro Gly Lys Val Arg
    610                 615                 620
```

<210> SEQ ID NO 62
<211> LENGTH: 1443
<212> TYPE: DNA
<213> ORGANISM: Artificial Sequence
<220> FEATURE:
<223> OTHER INFORMATION: Synthetic construct

<400> SEQUENCE: 62

```
atgtaccgca tgcaactcct gtcttgcatc gcactaagtc ttgcacttgt cacgaattcg     60

ggcgcgcctg aaatccagtt ggtgcaaagc ggaggcggcc ttgtgaagcc aggaggctct    120

gtgcgaatct cctgtgctgc ctccggttac acgttcacca actatggcat gaactgggtt    180

agacaggccc ccggcaaggg gttggaatgg atgggctgga ttaacacaca tactggcgaa    240

cccacatacg ccgacagctt caaaggccga ttcactttct ccttggacga ttccaaaaac    300

acggcttacc tgcaaataaa ctcactgcgg gcagaggata ctgccgtata tttttgtacc    360

cggagagggt acgactggta tttcgatgtc tggggacagg ggaccaccgt caccgtgtct    420

agtggcgggg gaggatcagg tggtggcggc agcggtggag gtggaagtga tatccagatg    480

acacagtcac cctcgtccct gtccgcgtcc gtcggggatc gggtgactat tacctgcaga    540
```

```
gcatctcaag acatcaatag ctacctgagc tggtttcagc aaaagcccgg caaagctccg    600
aaaactctga tttatcgggc caatcgcctc gaatctgggg tgccaagtag attttcaggc    660
tccgggtccg ggaccgacta taccctgacc atctcatccc tgcagtacga ggacttcggg    720
atatactatt gccaacagta cgatgaaagc ccgtggacct tcgggggtgg gacaaagttg    780
gagatcaagg ctagcgagca gaagctgatc agcgaggagg acctggacaa tgagaagagc    840
aatggaacca tcatccatgt gaaagggaaa cacctgtgtc catctcccct cttccccgga    900
ccttctaagc ccttttgggt gctggtggtg gttggaggag tcctggcttg ctattcatta    960
ctcgtaacag tcgcctttat tatcttctgg gtgaggagta agaggagcag gctcctgcac   1020
tccgactaca tgaacatgac tcccaggagg cctgggccaa cccgcaagca ttaccagccc   1080
tatgccccac cacgcgactt cgctgcctat cgctcctccc gtagcgcaga cgctcccgct   1140
taccagcagg gccagaacca gctctataac gagctaaatc tcggacgaag agaggagtac   1200
gatgttctcg acaagcggcg tggccgggac cctgagatgg gaggcaagcc gagacgcaag   1260
aaccctcagg aaggcctgta caatgaactg cagaaagata agatggcgga ggcctactct   1320
gagattggga tgaaaggcga gcgccggagg ggcaaggggc acgatggcct ttaccagggt   1380
ctctcgacag ccaccaagga cacctacgac gccctgcaca tgcaggccct gcctcctcgc   1440
tga                                                                  1443
```

```
<210> SEQ ID NO 63
<211> LENGTH: 1443
<212> TYPE: DNA
<213> ORGANISM: Artificial Sequence
<220> FEATURE:
<223> OTHER INFORMATION: Synthetic construct

<400> SEQUENCE: 63

atgtaccgta tgcagctcct gtcttgcata gcactgagtc ttgctctcgt cacaaattcg     60
ggcgcgcctg aaatccagct ggtgcaaagc ggaggtggcc tggtgaagcc aggaggctct    120
gtgcgaatct cttgtgcagc ctccggttac acgttcacca actatggcat gaactgggtc    180
agacaggccc ccggcaaggg gttggaatgg atgggctgga tcaacacaca tacgggcgaa    240
ccgacatacg ccgacagctt caaaggtcga tttactttta gcttggacga ttccaaaaat    300
accgcatacc tgcaaatcaa ctcactgcgg gctgaggata cggccgtata tttttgcacc    360
cggcgcgggt acgattggta cttcgatgtc tggggacagg ggactacagt taccgtgtct    420
tccggcgggg gaggatccgg aggtggcggc agcggaggcg gtggatccga tatccagatg    480
actcaatcac cgagttccct gtccgcgtcc gtaggggacc gggtgaccat cacctgtaga    540
gcttctcaag acatcaattc ctatctgagc tggtttcagc aaaagcccgg aaaagctccc    600
aaaactctga tttatcgggc caaccgcctt gagtctgggg tgccatcgag attctcaggc    660
tccgggagcg ggactgacta taccttgacc atctcaagtc tccagtacga agacttcggg    720
atatactatt gccaacagta cgatgagagc ccctggacct tcgggggtgg gacaaagtta    780
gagatcaaag ctagcgagca gaagctgatc agcgaggagg acctggacaa tgaaaagagc    840
aatggaacca ttatccatgt gaaggggaaa cacctgtgtc catcgcccct cttccccgga    900
ccttctaagc ccttttgggt gctggtggtg gttggtggcg tcctggcttg ctattcattg    960
ctagtcaccg tggccttcat tattttctgg gtccgcagta agaggtccag gctcctgcac   1020
agtgactaca tgaacatgac tcccaggcgg cctgggccaa cccgcaagca ttaccagccc   1080
```

```
tatgccccac cacgcgactt cgcagcctat cgctcctcca ggagcgcaga cgctcccgct   1140

taccagcagg gccagaacca gctctataac gagctaaatc tcggacgaag agaggagtac   1200

gatgttctcg acaagagacg tggccgggac cctgagatgg gaggcaagcc gagaaggaag   1260

aaccctcagg aaggcctgta caatgaactg cagaaagata agatggcgga ggcctactca   1320

gagattggga tgaaaggcga gcgccggagg ggcaaggggc acgatggcct ttaccagggc   1380

ctctctacag ccaccaagga cacctacgac gcccttcaca tgcaggccct gcctcctcgc   1440

tga                                                                 1443
```

<210> SEQ ID NO 64
<211> LENGTH: 1023
<212> TYPE: DNA
<213> ORGANISM: Artificial Sequence
<220> FEATURE:
<223> OTHER INFORMATION: Synthetic construct

<400> SEQUENCE: 64

```
atgtacagga tgcaactcct gtcttgcatt gctctctccc tcgcccttgt caccaattcg     60

ggcgcgcctg aaattcagtt ggtgcagtct ggcggtggcc ttgtgaagcc aggaggcagt    120

gtgcgaatca gttgtgcagc ctccggctac acgttcacca actatggcat gaactgggtg    180

agacaggccc ccggcaaggg cttggaatgg atgggctgga ttaacactca taccggcgaa    240

cctacatacg ccgacagctt taaaggtcga tttactttca gcttggacga ttccaaaaac    300

acggcatacc tgcagatcaa ctcactgagg gctgaggata cggccgttta tttttgtact    360

cggagagggt acgactggta ctttgatgtc tggggacagg ggactacagt taccgtctct    420

agtggcgggg gaggatcagg cggtggcggt agcggtggag gtggatcaga tatccagatg    480

acacaatcac cgtcctccct gtccgcatcc gttggggatc gtgtcaccat tacatgccgt    540

gcatctcaag acatcaatag ctacctgagc tggttccagc agaagcccgg caaagctcct    600

aagactctga tttatcgggc caatcgcctt gagtctgggg tgccatcgag attctcaggc    660

tccgggagcg ggacagacta taccttgacc atatcaagtt tacagtacga ggacttcggg    720

atatactatt gccagcagta cgatgaaagc ccatggacct tcggcggcgg gaccaagcta    780

gagatcaagg ctagcgagca gaagctgatc agcgaggagg acctggacaa tgagaagtct    840

aacggcacca tcatccacgt gaaagggaaa cacctgtgtc caagtcccct atttcccgga    900

ccttctaagc ccttctgggt gctggtggtg gttggaggtg tcctggcttg ctatagcctc    960

ctcgtaacag tggcctttat tatcttctgg gtgaggtccg aatggcccgg aaaggtacgc   1020

tga                                                                 1023
```

<210> SEQ ID NO 65
<211> LENGTH: 1023
<212> TYPE: DNA
<213> ORGANISM: Artificial Sequence
<220> FEATURE:
<223> OTHER INFORMATION: Synthetic construct

<400> SEQUENCE: 65

```
atgtacagga tgcaactcct gtcttgcatc gcactatccc ttgcattagt cacgaattcg     60

ggcgcccctg aaattcagct ggtgcaaagc ggcggtggcc tcgtgaagcc aggaggcagt    120

gttcgcatta gttgtgctgc ctccggctac accttcacca actatggcat gaactgggtg    180

agacaggccc ccggcaaggg gttggaatgg atgggctgga tcaacacaca taccggcgaa    240

ccgacatacg ccgacagctt taaaggtcga ttcactttta gccttgacga ctccaagaat    300
```

```
accgcttacc tgcagattaa ctcactgcgt gcggaagata ctgccgtata tttctgtacc    360
cggagggggt acgattggta cttcgatgtc tggggccagg ggactaccgt aaccgtgtct    420
tccggcgggg gaggatcagg tggcggcggc tccggtggag gcggatccga tatccagatg    480
acacaatcgc ctagttccct gtccgcgtca gttggggatc gggtgactat tacctgcaga    540
gcatctcagg acatcaactc ctacctgagc tggttccagc agaagcccgg aaaagctcct    600
aaaactctga tctatcgggc caatcgcctg gagtctgggg tgccaagtag attctcaggc    660
tccgggagcg ggacggacta tacgttgacc atatcatctc ttcagtacga ggacttcggg    720
atatactatt gccaacagta cgacgagtcc ccctggacct tcgggggggg gacaaagttg    780
gagatcaagg ctagcgagca gaagctgatc agcgaggagg acctggacaa tgagaagagc    840
aacggaacca tcatccacgt gaaagggaaa cacctctgtc caagtcccct ctttcccgga    900
ccttctaagc ccttttgggt gctggtcgtc gttggaggtg tcctggcttg ctatagcctc    960
ctcgtcacag tggcctttat tatcttctgg gtgaggagcg aatggccagg aaaggtgcgc   1020
tga                                                                 1023
```

```
<210> SEQ ID NO 66
<211> LENGTH: 1605
<212> TYPE: DNA
<213> ORGANISM: Artificial Sequence
<220> FEATURE:
<223> OTHER INFORMATION: Synthetic construct

<400> SEQUENCE: 66
```

```
atgtaccgaa tgcaattact gtcttgcatt gcactaagtc ttgcattagt cacaaattcg     60
ggcgctcctg aagtcaagct ccaagaatct ggtcctggtt tggtcgctcc atcacagtct    120
ctatccgtca cttgtactgt ttccggcgtt tctctgcccg attacggagt ttcttggata    180
cgtcagcccc cacgaaaggg gttggagtgg ttaggtgtta tttggggatc agaaacaacc    240
tattataact ccgccctcaa aagcagactt accattatta aggataacag taaatcacaa    300
gtgttcctga aaatgaactc tttgcaaacc gatgatacag cgatctacta ttgtgcaaaa    360
cactattatt atggtggtag ctacgcgatg gattattggg gccaaggtac atctgtcaca    420
gtatcatccg gtggaggtgg gagtggagga ggcggtagtg gaggcggggg gagtgacatc    480
cagatgacgc aaacgacatc ctcactgagt gcatctttgg gagatcgtgt gacaatcagt    540
tgcagggctt cccaggatat ctcaaagtac cttaattggt accagcagaa acccgatggg    600
acagtaaaac ttcttatcta tcatacttct cggctgcatt ccggtgtgcc atcgaggttc    660
tcaggtagcg gctctggaac cgattattcc ctcacgatta gcaacctgga acaagaagac    720
atagctacct atttttgtca gcagggaaac actttaccat acacttttgg agggggaaca    780
aagctggaga tcactcgggc tgacgctgct ccaactgtga gtatcttccc accgtcctca    840
aatgctagca ccaccacccc tgcccctagg ccacctactc cagctccaac tatagcatca    900
cagcctttga gccttagacc cgaagcttgt agaccggcag caggcggggc tgtgcataca    960
aggggcctcg attttgcctg cgacatcgat aatgagaaga gcaatggaac cattatccat   1020
gtaaaaggaa aacacttatg tccaagtccc ctgttccccg gaccttctaa gcccttttgg   1080
gtgctggtgg tggttggagg tgtcctggct tgctatagct tgctagtaac agtggccttt   1140
attattttct gggtgagaag taagcgtagc cgactcctgc acagcgacta catgaacatg   1200
actcccagga gacctgggcc aacccgcaaa cattaccagc cctatgcccc accacgcgac   1260
```

```
ttcgcagcct atcgctccag caggagcgca gacgctcccg cataccagca gggccagaat   1320

cagctctata acgagctaaa tctcggacga agagaggaat acgatgtttt ggacaagaga   1380

cgtggccggg accctgagat gggaggcaag ccgagacgga agaaccctca ggaaggactg   1440

tacaatgaac tgcaaaaaga taagatggcg gaagcctaca gtgagattgg gatgaaaggc   1500

gagcgccgga gaggcaaggg gcacgatggc ctttaccagg gtctctcaac agccaccaag   1560

gacacctacg acgcccttca catgcaggcc ctgcctccta gatga                   1605
```

<210> SEQ ID NO 67
<211> LENGTH: 1605
<212> TYPE: DNA
<213> ORGANISM: Artificial Sequence
<220> FEATURE:
<223> OTHER INFORMATION: Synthetic construct

<400> SEQUENCE: 67

```
atgtaccgca tgcaactgct gtcttgcatt gccctaagtc ttgcactggt cacgaattcg     60

ggcgcccctg aggtcaagct ccaagaatcc gggcctggtt tagtcgctcc ctctcagtct    120

ctgtccgtga cctgtaccgt ttccggcgtt tcgctgcccg attacggcgt ctcttggata    180

cggcagcccc cacgaaaggg gctggagtgg ttgggcgtca tctggggctc agaaacaacc    240

tactataact ccgcgctcaa gagcagactt actatcatca aggataacag caaatcccag    300

gtgttcctga aaatgaactc tttgcaaacc gatgatacag ccatctacta ttgtgcgaag    360

cactattact acggtggtag ctacgcaatg gactattggg gccaagggac ctccgtcaca    420

gtatcatctg gtggcggggg gagcggagga ggcggcagcg gaggcggggg gagtgacatc    480

cagatgacac agacgacttc ctccctctca gcatctttgg gcgatcgggt gactatcagc    540

tgcagggcat cccaggacat ttcaaagtac ctgaactggt accagcagaa acccgatggg    600

acagtgaaac tgctgatcta tcatactagt cggctgcatt ccggagtgcc atccaggttt    660

tcaggttctg gctctggaac cgactattcc ttgacgatct ccaacctcga acaagaggac    720

atcgctacct atttctgtca acagggaaac accctccctt acacgttcgg agggggaacc    780

aaacttgaga tcacgcgggc tgacgctgct ccaactgtga gtatcttccc accgtcctca    840

aatgctagca ccactacccc ggcccctagg ccccctaccc cagccccaac tatagcctcc    900

cagcctctga gcttacgtcc cgaagcttgc agaccggccg caggggggc tgtgcataca    960

aggggcctcg actttgcctg cgacatcgat aatgagaaga gcaatggaac cattatccat   1020

gtgaaaggga aacacctgtg tcccagtccc ctatttcccg gaccttcgaa gcccttttgg   1080

gtgctggtgg tggtgggtgg agtcctggct tgctatagcc tgcttgtaac agtggccttc   1140

attattttct gggtgaggag taagcgaagc aggctcctgc acagcgacta catgaacatg   1200

accccccggc gccctgggcc aacccgcaag cactaccagc cctatgcccc accacgcgac   1260

ttcgcagcct atcgctccag caggagcgca gacgctcccg cgtaccagca gggccagaac   1320

cagctctata acgagctaaa tctcggacga agagaggagt acgatgtttt ggacaagaga   1380

cgtggccggg accctgagat gggaggcaag ccgagacgca agaatcctca ggaaggcctg   1440

tacaatgaac tgcagaaaga taagatggcc gaggcctaca gtgagattgg gatgaaaggc   1500

gagcgccgga gaggcaaggg gcacgatggc ctttaccagg gtctctcaac agccaccaag   1560

gacacctacg acgccctgca catgcaggcc ctgcctcccc gctga                   1605
```

<210> SEQ ID NO 68
<211> LENGTH: 1077

```
<212> TYPE: DNA
<213> ORGANISM: Artificial Sequence
<220> FEATURE:
<223> OTHER INFORMATION: Synthetic construct

<400> SEQUENCE: 68

atgtacagaa tgcaactcct gtcctgcatt gcactgagct tagcactggt cacaaattcg      60

ggcgcgcctg aggttaagct ccaagaatct gggcctggtt tggtcgcccc ctctcagagc     120

ctctccgtca cctgtactgt ttccggcgtt tcactgcctg attacggagt gtcgtggatc     180

agacagcccc cacgaaaggg gcttgaatgg ttgggcgtta tctggggatc agaaacaacc     240

tactataact ccgccctgaa gagcagactt accattataa aggataacag taaatcacag     300

gtgttcctga aaatgaacag cttgcaaacc gatgataccg ccatctacta ttgtgccaag     360

cactattact acggtggtag ctacgctatg gactattggg gccaggggac gtccgtcaca     420

gtatcatccg gtggaggtgg cagtggaggc ggcggcagtg gaggcggggg gagtgatatc     480

cagatgaccc agacaacttc ttcactgtct gcatctttgg gagatcgggt gactatcagt     540

tgcagggcct cccaggacat atcaaagtac cttaactggt atcagcagaa acccgatggg     600

acagtaaaac tcctgatcta tcatacatct cggctgcatt ccggtgtgcc atctcgtttt     660

tcaggttcgg gctctggcac cgactactcc ttgacgattt ctaacctcga acaagaggac     720

attgctacct atttttgtca gcagggcaac actctccctt acacgtttgg cgggggaact     780

aagctggaga tcacccgcgc tgacgccgct ccaactgtga gcatcttccc accttcctca     840

aatgctagcg agcagaagct gatcagcgaa gaggacctgg acaatgagaa gagcaatgga     900

accattatcc acgtgaaagg gaaacacctt tgcccaagtc cctatttcc cggcccttct      960

aagcccttct gggtgctggt ggtggttgga ggtgtcctgg cttgctatag cttactagta    1020

acagtggcct tcattatttt ctgggtgagg agcgaatggc cgggaaaggt ccgctga       1077


<210> SEQ ID NO 69
<211> LENGTH: 1077
<212> TYPE: DNA
<213> ORGANISM: Artificial Sequence
<220> FEATURE:
<223> OTHER INFORMATION: Synthetic construct

<400> SEQUENCE: 69

atgtacagga tgcaactcct gtcttgcatt gcactgtcct tggcactcgt cacaaattcg      60

ggcgcccctg aggtgaagct ccaggaatct gggcctggct tggtcgcccc ctcccagtcg     120

ctgtccgtca cttgtactgt gtccggcgtt agcctgcccg attacggcgt ctcttggatt     180

cggcagcccc ctcgaaaggg gttggagtgg ttgggcgtta tctggggctc agaaacaacg     240

tactataact ccgcgctcaa gagcagacta accatcataa aggataacag taaatcacag     300

gtgttcctga aaatgaactc tctgcaaacc gatgatacgg ccatctacta ttgtgcgaag     360

cactattact acggtggtag ctacgctatg gactattggg gccaagggac ttcggtcaca     420

gtatcaagtg gggggagggg gagtggagga ggcggcagcg gaggcggggg gagcgacatc     480

cagatgaccc agacgacctc ttccctctcc gcaagcctcg gcgacagagt gaccatcagc     540

tgccgtgcct cccaggacat ctcaaagtac cttaactggt accagcagaa gcccgatggg     600

acagtgaaac tgcttatcta tcacacttct cgcctgcatt ccggtgtgcc atctcgcttt     660

tcaggttccg gctccggaac cgactactcc ctgaccatta gcaacctcga acaagaggac     720

atagctacct atttctgtca gcagggcaac actctcccct acacatttgg cgggggcacc     780
```

-continued

```
aaactggaga tcacccgggc cgacgccgct ccaaccgtga gtatcttccc accgtcctca     840

aatgctagcg agcagaagct gatcagcgag gaggacctgg acaatgagaa gagcaatgga     900

accatcatcc atgtgaaagg gaaacacctt tgcccaagtc ccctgtttcc cggaccttct     960

aagcctttct gggtgctggt ggtggttgga ggtgtcctgg cttgctatag cttactagta    1020

acagtggcct tcattatttt ctgggtgagg agtgaatggc cgggaaaggt ccgctga       1077
```

COMPOSITIONS AND METHODS FOR PROMOTING HEMATOPOIETIC CELL CYTOTOXICITY

PRIOR RELATED APPLICATIONS

This application is the National Stage of International Application No. PCT/US2020/027865 filed Apr. 12, 2020, which claims the benefit of U.S. Provisional Application No. 62/833,011, filed on Apr. 12, 2019, U.S. Provisional Application No. 62/838,468, filed Apr. 25, 2019, all of which are hereby incorporated by reference in their entireties.

INCORPORATION-BY-REFERENCE OF MATERIAL SUBMITTED AS A TEXT FILE VIA THE OFFICE ELECTRONIC FILING SYSTEM (EFS-WEB)

The Sequence Listing associated with this application is provided in text format in lieu of a paper copy, and is hereby incorporated by reference into the specification. The name of the text file containing the Sequence Listing is EMY-067US1_SEQ LIST.txt. The text file is 155 KB, was created on Oct. 8, 2021, and is being submitted electronically via EFS-Web. The information the text file is identical to the sequence listing contained in the application.

BACKGROUND

The use of T-cell based therapies for the treatment of cancer has advanced to engineering T cells to generate tumor specific immune responses leading to cancer remission in patients. Chimeric antigen receptors (CARs) are recombinant receptors designed to bind tumor antigens, consequently activating CAR T cells while bypassing major histocompatibility complex (MHC) recognition and priming. However, the success of CARs is often restricted.

SUMMARY

Provided herein is a nucleic acid construct comprising a nucleic acid sequence encoding a recombinant protein, wherein the recombinant protein comprises a receptor ligand and a transmembrane domain. Optionally, the receptor ligand is a non-antibody ligand that binds to a receptor expressed on the surface of a hematopoietic stem or progenitor cell, a cancer stem cell or a differentiated cancer cell (e.g., a cancer stem cell or a differentiated cancer cell of hematopoietic origin). In certain constructs the recombinant protein does not comprise an intracellular signaling domain.

Also provided is a nucleic acid construct comprising a nucleic acid sequence encoding a recombinant protein, wherein the recombinant protein comprises a receptor ligand, a transmembrane domain, a costimulatory domain and CD3-zeta. Optionally the receptor ligand is a non-antibody ligand that binds to a receptor expressed on the surface of a hematopoietic stem or progenitor cell, a cancer stem cell or a differentiated cancer cell (e.g., can cancer stem cell of a differentiated cancer cell of hematopoietic origin). Optionally, the recombinant protein does not comprise a co-stimulatory domain.

Further provided is a nucleic acid construct comprising a nucleic acid sequence encoding a recombinant protein comprising an antibody fragment and a transmembrane domain. The antibody binds to a receptor expressed on the surface of a hematopoietic stem or progenitor cell, a cancer stem cell or a differentiated cancer cell (e.g., a cancer stem cell or a differentiated cancer cell of hematopoietic origin). Optionally, the recombinant protein lacks an intracellular signaling domain. In some embodiments, the antibody is a single chain variable fragment (scFv). In some embodiments, the receptor is an antigen present on cancers of hematopoietic origin (e.g., CD5 or CD19).

In some embodiments, the receptor ligand of the disclosed constructs comprises a natural ligand of the receptor or a portion thereof. For example, the receptor ligand can be selected from the group consisting of thrombopoietin (TPO), stem cell factor (SCF), granulocyte-colony stimulating factor (G-CSF), granulocyte-macrophage colony stimulating factor (GM-CSF), Fms-like tyrosine kinase 3 ligand (FLT3), interleukin-3 (IL-3), CRK-like protein (CRKL), L-selectin, CD9, Four-and-a-half LIM domains protein 2 (FHL-2), Galectin-8 (LGALS8), Tetraspanin-4 (TSPAN4), Activated protein C (APC), and Leukocyte-integrin Mac 1 (CD11b/CD18) or a binding fragment thereof.

In some embodiments, the transmembrane domain is selected from the group consisting of a CD28 transmembrane domain, a Glycosylphosphatidylinositol (GPI), a Cytochrome b5 tail anchor, a CD137 anchor, and a Duffy antigen/receptor for chemokines (DARC).

In some embodiments, the nucleic acid sequence that encodes a chimeric antigen receptor comprises (a) a receptor ligand selected from the group consisting of TPO, SCF, G-CSF, GM-CSF, FLT3, IL-3, CRKL, L-selectin, CD9, FHL-2, LGALS8, TSPAN4, APC, and CD11b/CD18 or a binding fragment thereof; (b) a CD28 polypeptide comprising a transmembrane domain and a costimulatory domain; and (c) a CD3-zeta signaling domain.

In some embodiments, a hinge region separates any two components of the construct. Optionally, the hinge region is a CD8α hinge region. Optionally, the construct further comprises a signal sequence. Optionally, the signal sequence is an IL-2 signal sequence. Optionally, the signal sequence is the natural signal sequence of the receptor ligand.

The nucleic acid sequence can be a cell or tissue-directed codon-optimized sequence.

In some embodiments, the receptor ligand is a TPO binding fragment comprising an amino acid sequence that is at least 90% identical to SEQ ID NO: 4. In some embodiments, the nucleic acid sequence encodes a sequence that is at least 90% identical to SEQ ID NO: 5 or SEQ ID NO: 6.

In some embodiments, the receptor ligand is a stem cell factor binding fragment comprising an amino acid sequence that is at least 90% identical to SEQ ID NO: 7. In some embodiments, the nucleic acid sequence encodes a sequence that is at least 90% identical to SEQ ID NO: 8.

Also provided is a vector comprising any of the nucleic acid constructs or sequences provided herein. In some embodiments, the vector is a recombinant lentiviral vector (LV) or a recombinant adeno-associated viral (AAV) vector.

Further provided is a cell comprising any of the vectors described herein. In some embodiments, the cell expresses the recombinant protein on the cell's surface. the cell is selected from the group consisting of alpha beta T cells, cytotoxic T lymphocytes (CTL), T helper cells, lymphokine-activated cells, tumor-infiltrating lymphocytes (TILS), NK cells, naive T cells, memory T cells, gamma delta T cells, NKT cells, and macrophages.

Also provided is a method for making a modified cell comprising transducing a cell with any of the nucleic acid constructs or vectors provided herein. In some embodiments, the cell is selected from the group consisting of alpha beta T cells, cytotoxic T lymphocytes (CTL), T helper cells, lymphokine-activated cells, tumor-infiltrating lymphocytes (TILS), NK cells, naive T cells, memory Ycells, gamma delta T cells, NKT cells, and macrophages. In some embodiments, the cell is obtained from a subject prior to transduction.

Further provided is a cell produced by any of the methods provided herein.

Also provided is a method of depleting hematopoietic stem or progenitor cells, cancer stem cells, or differentiated cancer cells in a subject comprising administering an effective amount of any of the cells described herein to a subject in need thereof. In some embodiments, the hematopoietic stem or progenitor cells or cancer stem cells are MPL+, c-KIT+, FLT3+, IL-3 receptor+, CD34+, integrin alpha 3/beta1+, endothelial protein C receptor+ or Thy-1/CD90+. In some embodiments the subject has cancer or is at risk of developing cancer. In other embodiments, the subject requires a hematopoietic stem cell transplantation for a non-malignant disease.

Also provided is a method for treating cancer in a subject or for conditioning for hematopoietic stem cells for transplantation to a subject comprising (a) introducing into cells obtained from a first subject a nucleic acid construct or vector described herein; and (b) administering the cells to a second subject. In some embodiments, the first subject and the second subject are different subjects. In some embodiments, the first subject and the second subject are the same subject. In some embodiments, the subject has a cancer with cells that are CD5+, CD19+, MPL+, c-KIT+, FLT3+, IL-3 receptor+, CD34+, integrin alpha 3/beta1+, endothelial protein C receptor+ or Thy-1/CD90+. In some embodiments, the cancer is acute myelogenous leukemia. In some embodiments, the cancer is T-cell acute lymphoblastic leukemia, B-cell acute lymphoblastic leukemia or diffuse large B-cell lymphoma. In some embodiments, the method further comprises administering hematopoietic stem and/or progenitor cells to the subject. In some embodiments, the method further comprises administering chemotherapy or immunotherapy to the subject.

DESCRIPTION OF THE FIGURES

The present application includes the following figures. The figures are intended to illustrate certain embodiments and/or features of the compositions and methods, and to supplement any description(s) of the compositions and methods. The figures do not limit the scope of the compositions and methods, unless the written description expressly indicates that such is the case.

FIG. 1A is a schematic of a plasmid encoding human-TPO chimeric antigen receptor (hTPO-CAR) and green fluorescent protein (GFP).

FIG. 1B is a representative image of GFP positive, hTPO-CAR transduced T cells and their amounts as measured by flow cytometry.

FIG. 1C shows the specific upregulation of T cell activation markers on co-culture of hTPO-CAR(GFP+) T cells with Mo7e cells, as compared to untransduced T cells (GFP−).

FIG. 2 shows that hTPO-CAR T cells have specific cytotoxic activity against mouse hematopoietic stem progenitor cells (LSK cells). A representative fluorescence activated cell sorting (FACS) plot showing apoptosis and cell death of mouse LSK (Lin-Sca-$1^+$ c-$kit^+$) cells when co-cultured with hTPO-CAR T cells (left panel) and its corresponding CFU count (right panel) are shown.

FIG. 6C shows the St. Jude PeCan data portal expression and TCGA gene expression AML data sets for MPL expression. Pediatric N=306, Adult N=173.

FIG. 6D shows gene expression analysis from the St. Jude PeCan data portal for c-kit, a commonly targeted receptor in stem cell research that shows high expression across multiple tissues and cancer types making it a problematic target.

FIG. 6H shows mean fluorescence intensity of pSTAT5 stimulation with TPO. All cell lines were reactive and showed a significant increase in pSTAT5 when stimulated by TPO, when analyzed by 2-way ANOVA (P<0.0001), compared to control cell lines K562 and 697, which showed no difference with TPO.

FIG. 6I shows flow cytometry analysis for MPL surface expression using whole mouse bone marrow (N=13) separated into progenitor and stem-like compartments. Representative flow cytometry (y-axis: count, x-axis: MPL) showed long term hematopoietic stem cells (LT-HSC) having the highest MPL surface expression compared to short term hematopoietic stem cells (ST-HSC), multipotent progenitor (MPP), and progenitors.

FIG. 6J shows mean fluorescence intensity of the MPL expression evaluated in each bone marrow compartment. There was a significant difference in MFI by one-way ANOVA in the progenitor (165.2±26.1, P<0.0001), MPP (570.6±122.5, P<0.0001), ST-HSC (1373±234.3, P<0.0001), and LT-HSC (2682±253.2).

FIG. 8A is a schematic of the non codon-optimized (NCO) TPO-CAR bicistronic transgene construct used for expressing enhanced green fluorescent protein (eGFP) and the TPO-CAR using a P2A sequence. It includes a 5' long terminal repeat (LTR), human ubiquitin C promoter (hUBC), eGFP sequence, P2A sequence, an interleukin-2 signal sequence (IL-2 ss), the TPO-CAR, a myc epitope tag, the CD28 region, the CD3ζ intracellular domain and a 3' LTR.

FIG. 8B is a schematic of the CO TPO-CAR codon optimized transgene construct. In contrast to the NCO-TPO-CAR, this construct contains no myc tag epitope, is entirely codon optimized from the IL2 signal sequence (signal sequence) to the end of the CD3ζ sequence, and contains a CH3 hinge domain.

FIGS. 10A-C show that TPO-CAR T cells are cytotoxic as compared to naïve T cells. Target cells HEL (A), CMK (B), and Mo7e (C) were co-cultured with doses of 0, 0.1, 1, 10, 100, and 400 of recombinant TPO with naïve T cells, NCO TPO-CAR T cells, or CO TPO-CAR T cells at a ratio of 1:1 for 12 hours. The addition of TPO caused a significant reduction in cytotoxicity at doses of 400 ng/mL in all three cancer cell lines when co-incubated with the NCO TPO-CAR or the CO TPO-CAR (P<0.05). In all cases, including at physiological doses of TPO (~120 ρg/mL), the TPO-CAR is significantly cytotoxic compared to naïve T cells.

FIGS. 13A-M show complete blood counts performed on peripheral blood. Blood contents and counts included white blood cells (WBC (A)), lymphocytes (LYM (B)), monocytes (MONO (C)), granulocytes (GRAN (D)), mean corpuscular hemoglobin (MCH (E)), mean corpuscular volume (MCV (F)), hematocrit (HCT (G)), hemoglobin (HGB (H)), mean corpuscular hemoglobin concentration (MCHC (I)), platelet (PLT (J)), red blood cell distribution width (RDWa (K)), mean platelet volume (MPV (L)), and red blood cell (RBC (M)). Non-transduced (non-txd) T cells demonstrated significant difference compared to the CO TPO-CAR in granulocytes (p=0.04). Cancer only animals (negative control animal that received cancer cells but no treatment with TPO-CAR T cells) differed from the CO TPO-CAR treated animals in mean corpuscular volume (0.04) and mean corpuscular hemoglobin concentration (p=0.0197). Naïve NSG mice were significantly different from cancer mice in hemoglobin (p=0.0034), mean corpuscular hemoglobin concentration (p=0.0432), and red blood cells (p=0.0058). Naïve mice had higher platelet counts than all treatment groups and cancer only mice (p<0.05) and in mean platelet volume (p<0.05) with the exception of the non-transduced T cell treated animals.

FIGS. 14A-E show in vivo specificity of TPO-CAR in leukemia xenografts against MPL. A-C. Splenocytes from cancer mice and CO TPO-CAR mice were evaluated for remaining MPL expression because these were the only two groups that demonstrated a significant tumor burden in the spleen (A). In the TPO-CAR conditions, there was an appreciable decrease in surface MPL expression (F, 30.3%±10.7 vs 77.1%±4.3, p=0.002) (B) and reduction in MPL MFI (G, 6421±151 vs 3601±535, p=0.0009) (C) on remaining cancer compared to control mice. The bone marrow was analyzed for LK (D) and LSK (E) bone marrow compartments. The data demonstrated significant differences in the LK compartment in naïve vs cancer only mice, non-transduced T cells, and CO TPO-CAR T cells (P<0.0001). In addition, non-transduced T cell treated mice had significantly more cells in the LK compartment compared to mice treated with the CO TPO-CAR (p=0.02). Significant differences in the LSK compartment were noted in the CO TPO-CAR treated mice compared to the naïve NSG mice (P<0.01) and the non-transduced T cell treated mice (P<0.05).

FIGS. 33A-D show CD5 expression and activation of NSCAR-modified Jurkat T cells. Flow cytometry was performed to measure CD5 and CD69 expression on Jurkat T cells five to six days post-transduction. In all figures, a representative flow cytometry overlay is illustrated on the right (black curve: naïve; gray curve: MOI 0.5; light gray curve: MOI 1). CD5 expression in naïve and CD5-NSCAR-modified Jurkat T cells is shown (A) (Naïve and MOI 1: n=4; MOI 0.5: n=3). CD69 expression in naïve and CD5-NSCAR-modified Jurkat T cells is shown (Naïve and MOI 1: n=5; MOI 0.5: n=3). CD5 expression in naïve, CD19- CAR- and CD19-NSCAR-modified Jurkat T cells is shown (C) (n=3). CD69 expression in naïve, CD19-CAR- and CD19-NSCAR-modified Jurkat T cells is shown (D) (n=3). Statistics were performed using a one-way ANOVA with Dunnett's method to compare to the naïve control group.

FIGS. 34A-C shows the effects of CD5-NSCAR expression in Jurkat T cells. CD5-NSCAR expression in non-edited (A, left) or CD5-edited (A, right) Jurkat T cells five days post-transduction. MOI 0.5: n=3; naïve and MOI 1: n=6 (non-edited Jurkat T cells), n=5 (CD5-edited Jurkat T cells). CD5-NSCAR-modified Jurkat T cells were cultured with naïve (B, solid circles) or CD5-edited (B, open circles) Jurkat T cells at 1:1 or 1:3 modified to non-modified ratios, and CD5-NSCAR expression is shown at each ratio. CD5 expression is shown in non-modified Jurkat T cells following co-culture with CD5-NSCAR-modified Jurkat T cells at each ratio. Flow cytometry was performed to measure CD5-Fc and CD5 antigen expression on Jurkat T cells (C). Statistics were performed using a 2-tailed Student's t test and one-way ANOVA with Dunnett's method to compare to the naïve group.

FIGS. 35A-D show variable expression of CD5-NSCAR and CD5 antigen in Jurkat T cells. Flow cytometry was performed on day 5 (black bars) and day 15 (white bars) to measure anti-CD5 and CD5-Fc binding. Representative flow cytometry plots of CD5-NSCAR-modified Jurkat T cells (A, left) and CD5-edited Jurkat T cells (A, right). The percentage of Jurkat T cells expressing the CD5-NSCAR on the cell surface on days 5 and 15 post-transduction. Experiments were performed in duplicate, and means and standard deviations are represented (B). CD5 expression on Jurkat T cells on days 5 and 15 post-CD5-NSCAR transduction are shown for experiments performed in duplicate with means and standard deviations represented (C). Western blot analysis of naïve and CD5-NSCAR-modified Jurkat T-cell whole cell lysates on day 15 post-transduction are shown (D). Membrane was blotted with anti-CD5 antibody. CD5 is detected at 54 kDa. Densitometry was performed using ImageJ.

DESCRIPTION

Figure 3:
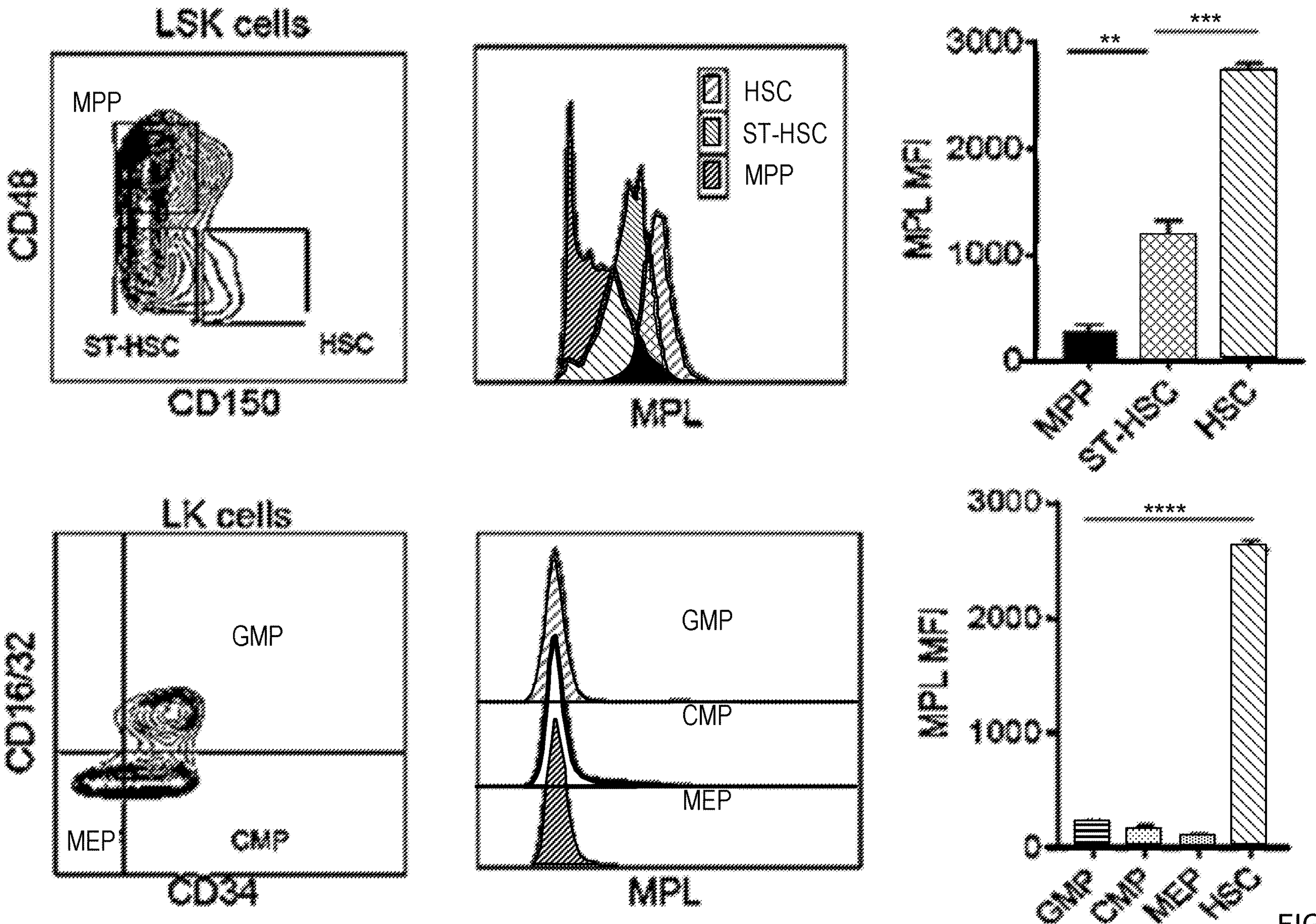
FIG. 3 shows MPL proto-oncogene (MPL) expression in different hematopoietic compartments in mice. Representative flow cytometry plots of MPL expression in hematopoietic step progenitor cells (HSPC) and hematopoietic cell (HPC) compartments are shown. Analysis of MPL expression in murine bone marrow precursors revealed MPL expression is enriched in hematopoietic stem cells (HSC) when compared to hematopoietic progenitor cells (HPC). Murine hematopoietic stem and progenitor cell populations (multipotent progenitor [MPP], short term [ST] repopulating HSCs, long term [LT] repopulating HSCs, granulocyte-macrophage progenitors [GMP], common myeloid progenitors [CMP], common lymphoid progenitor [CLP]) were distinguished using surface markers such as lineage negative, sca-1 positive, c-kit positive (LSK), CD48 and CD150.

There are few validated tumor cell targets and few well-characterized antibodies to these targets in existence. Therefore, alternative mechanisms to engage tumor cell surface receptors were explored. As shown herein, the repertoire of targets was expanded by utilizing a ligand-based CAR approach. Understanding of ligand-receptor interactions (e.g., as compared to antibody-antigen interactions) provides better prediction for the on-target, off-tumor side effects, which can help to anticipate and exploit side effects for clinical benefit.

In addition to exploiting the relationship between tumor cell surface receptors and their natural ligands, non-signaling CARs (NS-CARs) that enhance cell toxicity, for example, gamma delta T-cell cytotoxicity, against tumor cells were developed. These NS-CARs can include a non-antibody receptor ligand or an antibody that binds to a cell surface receptor on a tumor cell.

Nucleic Acid Sequences

Provided herein is a nucleic acid construct comprising a nucleic acid sequence encoding a recombinant protein, wherein the recombinant protein comprises a receptor ligand and a transmembrane domain, wherein the receptor ligand is a non-antibody ligand, wherein the receptor ligand binds to a receptor expressed on the surface of a hematopoietic stem or progenitor cell, a cancer stem cell or a differentiated cancer cell (e.g., a cancer stem cell or a differentiated cancer cell of hematopoietic origin), and wherein the recombinant protein does not comprise an intracellular signaling domain.

As used throughout, the receptor ligand can be a full-length protein that binds to a cell surface receptor expressed on the surface of a hematopoietic stem or progenitor cell, a cancer stem cell or a differentiated cancer cell (e.g., a cancer stem cell or a differentiated cancer cell of hematopoietic origin) or a binding fragment thereof. The nucleic acid constructs described herein that do not encode an intracellular signaling domain are also referred to as non-signaling CARs (NSCARs). Optionally, the construct comprises a non-functional intracellular signaling domain, for example, a CD3ζ polypeptide that has been altered or mutated, for example, by mutating one or more ITAM domains. Optionally, any of the NSCARs described herein exhibit at least 90%, 95% or 99% less signaling as compared to a CAR comprising an intracellular signaling domain. Such constructs can be transduced into cells, for example, gamma delta T cells, that do not require signaling or activation to target tumor cells.

As used throughout, cancer stem cells (CSCs) are a small subpopulation of cells found within tumors or hematological cancers. CSCs possess characteristics associated with normal stem cells, specifically, the ability to give rise to all cell types found in a particular cancer sample. CSC are tumorogenic and can generate tumors through the stem cell processes of self-renewal and differentiation into multiple cell types. A number of cell surface markers such as CD44, CD24, and CD133 can be used to identify and enrich CSCs.

As used throughout, the phrase of hematopoietic origin with regard to cell types means cells derived from a hematopoietic cell with limited potential to differentiate into further cell types. Such hematopoietic cells include, but are not limited to, hematopoietic stem cells, hematopoietic stem progenitor cells, multipotent progenitor cells, lineage-restricted progenitor cells, common myeloid progenitor cells, granulocyte-macrophage progenitor cells, megakaryocyte-erythroid progenitor cells, or cells derived from these cells. Hematopoietic cells include cells of the lymphoid and myeloid lineages, such as lymphocytes, erythrocytes, granulocytes, monocytes, and thrombocytes. In some embodiments, the selected hematopoietic cell is an immune cell, such as a T cell, B cell, macrophage, a natural killer (NK) cell or dendritic cell. In some embodiments the cell is an innate immune cell.

Also provided is a nucleic acid construct comprising a nucleic acid sequence encoding a recombinant protein, wherein the recombinant protein comprises a receptor ligand and CD3-zeta, wherein the receptor ligand is a non-antibody ligand, and wherein the receptor ligand binds to a receptor expressed on the surface of a cancer stem cell, wherein the recombinant protein does not comprise a co-stimulatory domain. As used herein, a co-stimulatory domain is an intracellular signaling domain derived from a co-stimulatory protein, for example, a co-stimulatory protein expressed in T cells, that enhances cytokine production. Co-stimulatory proteins include, but are not limited to, CD28, 4-1BB (CD137), OX40 (CD134), CD40, ICOS (CD278), CD27 and CD40L. Exemplary sequences comprising a costimulatory domain of CD28 (SEQ ID NO: 21), 4-1BB (CD137) (SEQ ID NO: 22), OX40 (CD134) (SEQ ID NO: 23), CD40 (SEQ ID NO: 24), ICOS (CD278) (SEQ ID NO: 25), CD27 (SEQ ID NLO: 27) and CD40L (SEQ ID NO: 28). Optionally, the construct comprises a non-functional co-stimulatory protein or a fragment, i.e., a costimulatory protein or fragment thereof that that has been altered or mutated to decrease or eliminate co-stimulatory activity.

Also provided is a nucleic acid construct comprising a nucleic acid sequence encoding a recombinant protein, wherein the recombinant protein comprises a receptor ligand, a co-stimulatory domain and CD3-zeta, wherein the receptor ligand is a non-antibody ligand, and wherein the receptor ligand binds to a receptor expressed on the surface of a cancer stem cell.

In some embodiments, the receptor ligand is selected from the group consisting of TPO, SCF, G-CSF, GM-CSF, FLT3 ligand, IL-3, CRKL, L-selectin, CD9, FHL-2, LGALS8, TSPAN4, APC, and CDT11b/CDT8 or a binding fragment thereof. The Gene ID No. and Uniprot Accession No. for each ligand is set forth below in Table 1. All of the information, including sequences, provided under the Gene ID No. (Maglott et al. "Entrez Gene: gene centered information at NCBI," Nucleic Acids Res. 39 (Database issue): D52-D57 (2011)), and the UniProt Accession No. is incorporated herein by this reference.

TABLE 1

| Ligand | Gene ID No. | UniProt KB No. |
|---|---|---|
| TPO | 7066 | P40225 |
| SCF | 4254 | P21583 |
| G-CSF | 1441 | Q99062 |
| GM-CSF | 1437 | P04141 |
| FLT3 ligand | 2323 | P49771 |
| IL-3 | 3562 | P08700 |
| CRKL | 1399 | P46109 |
| L-selectin | 6402 | P14151 |
| CD9 | 928 | P21926 |
| FHL-2 | 2274 | Q14192 |
| LGALS8 | 3964 | O00214 |
| TSPAN4 | 7106 | O014817 |
| APC | 5624 | P04070 |
| CD11b/CD18 | 3684 | P11215 |

TPO binds to MPL proto-oncogene (MPL); SCF binds to tyrosine protein kinase KIT (c-kit); FLT3 ligand binds to Fins-like tyrosine kinase 3 (FLT3); IL-3 binds to interleukin-3 receptor; CRKL binds to CD34; L-selectin binds to CD34; CD9 binds to integrin-alpha 3; FHL-2 binds to integrin alpha 3; LGALS8 binds to integrin alpha 3; TSPAN4 binds to integrin-alpha 3, APC binds to endothelial protein C receptor (EPCR/CD201); CDT11b/CDT8 binds to thymocyte antigen-1 (Thy-1/CD90). Optionally, the receptor ligand or binding fragment thereof is a human receptor ligand or binding fragment thereof. Optionally, the receptor ligand is any natural ligand or a fragment thereof that specifically binds to a cancer cell surface receptor.

In any of the constructs described herein, the transmembrane domain can selected from the group consisting of a CD28 transmembrane domain, a GPI, a Cytochrome b5 mail anchor (SEQ ID NO: 28), a CD137 anchor (SEQ ID NO: 29), and a DARC (SEQ ID NO: 30). It is understood that, in the NSCARs described herein, the transmembrane domain used in the constructs can comprise a portion, for example, one, two three or more amino acids of the intracellular domain of the protein from which the transmembrane domain is derived, as long as the NSCAR does not have signaling activity. Methods for identifying transmembrane regionds or domains are known to those of skill in the art. See, for example, Peris et al. "Ig™: An algorithm to predict transmembrane domains and topology in proteins," *BMC Bioinformatics* 9: Article number 367 (2008); and Yu and Zhang, "A Simple Method for Predicting Transmembrane Proteins Based on Wavelet Transform," Int. J. Biol. Sci. 9(1): 22-33 (2013)).

As used herein, a GPI is a phosphoglyceride that is attached to the C-terminus of certain proteins as a post-translational modification. The GPI anchor is attached to the protein in the endoplasmic reticulum by transamidation, a reaction in which a C-terminal GPI-attachment signal is cleaved off concomitantly with addition of the GPI moiety. GPI-attachment signals are poorly conserved on the sequence level but are all composed of a polar segment that includes the GPI-attachment site (larger, bold residue, below) followed by a hydrophobic/transmembrane segment located at the very C terminus of the protein (underlined amino acid sequence below).

Exemplary C-terminal GPI sequences:

(SEQ ID NO: 31)
PGESGTSGWRGGDTPSPLCLLLLLLLILRLLRIL (SEQ ID NO: 32)
ESAEPSRGENAAQTPRIPSRLLAILLFLLAMLLTL (SEQ ID NO: 33)
YAAAMSGAGPWAAWPFLLSLALMLLWLLS (SEQ ID NO: 34)
PEVRVLHSIGHSAAPRLFPLAWTVLLLPLLLLQTP (SEQ ID NO: 35)
SVRGINGSISLAVPLWLLAASLLGLLLPAFGILVYLEF (SEQ ID NO: 36)
DSEGSGALPSLTCSLTCSLTPLGLALVLWTVLGPC (SEQ ID NO: 37)
VSQVKISGAPTLSPSLLGLLLPAFGILVYLEF (SEQ ID NO: 38)
QVPKLEKSISGTSPKREHLPLAVGIAFFLMTFLA (SEQ ID NO: 39)
TTDAAHPGRSVVPALLPLLAGTLLLLETATAP (SEQ ID NO: 40)
EAPEPIFTSNNSCSSPGGCRLFLSTIPVLWTLLGS (SEQ ID NO: 41)
TNATTKAAGGALQSTASLFVVSLSLLHLYS

In some embodiments, the nucleic acid sequence that encodes a chimeric antigen receptor comprises (a) a receptor ligand selected from the group consisting of TPO, SCF, G-CSF, GM-CSF, FLT3, IL-3, CRKL, L-selectin, CD9, FHL-2, LGALS8, TSPAN4, APC, and CD11b/CD18 or a binding fragment thereof; (b) a CD28 polypeptide comprising a transmembrane domain and a costimulatory domain; and (c) a CD3-zeta signaling domain. Optionally, the CD28 polypeptide comprises SEQ ID NO: 9. Optionally, the CD3-zeta signaling domain comprises SEQ ID NO: 10.

In the signaling CARs described herein, the portion of the CAR involved in signal-transmission, i.e., the endomain, either comprises or associates with an intracellular T-cell signaling domain. After target binding recognition, receptors cluster and a signal is transmitted to the cell. The most commonly used T-cell signaling component is that of CD3-zeta, which contains 3 ITAMs. This transmits an activation signal to the T-cell after the receptor ligand, for example, TPO, is bound. CD3-zeta may not provide a fully competent activation signal and additional co-stimulatory signaling may be needed.

In some embodiments, the construct can further comprise an additional co-stimulatory domain, for example, a co-stimulatory domain from 4-1BB (CD137), OX40 (CD134), CD40, ICOS (CD278), CD27 and CD40L. In some embodiments, the CD28 polypeptide comprising a transmembrane domain and co-stimulatory domain is replaced with a 4-1BB (CD137), OX40 (CD134), CD40, ICOS (CD278), CD27 or a CD40L polypeptide comprising a transmembrane domain and co-stimulatory domain. In some embodiments, a polypeptide comprising CD28, OX40 and CD3-Zeta, or portions thereof can be used to transmit a proliferative/survival signal.

In any of the constructs described herein, a linker, spacer and/or hinge region separates any two components of the construct. Optionally, the linker comprises at least 1, 2, 3, 4, 5, 6, 7, 8, 9, 10, 11, 12, 13, 14, 15, 20, 25, 30, 35, 40, 45, or 50 amino acids. Optionally, the hinge region is a CD8α hinge region. Optionally, the CD8α hinge region comprises SEQ ID NO: 11 or a fragment thereof. In some embodiments, the linker comprises an IgG1 Fc region, an IgG1 hinge (for example, an IgG1 CH2-CH3 hinge), a CD8 stalk (or hinge region) (Classon et al. "The hinge region of the CD8 alpha chain: structure, antigenicity, and utility in expression of immunoglobulin superfamily domains," International Immunology 4(2): 215-225 (1992)), or a combination thereof. The linker can alternatively comprise a linker sequence that has similar length and/or domain spacing properties as an IgG1 Fc region, an IgG1 hinge or a CD8 stalk. Optionally, a human IgG1 spacer may be altered to remove Fc binding motifs. SEQ ID NO: 1 is an exemplary amino acid sequence for a TPO-CAR comprising a CD8 stalk spacer. SEQ ID NO: 2 is an exemplary amino acid sequence for a TPO-CAR with an H—CH2-CH3pvaa spacer. SEQ ID NO: 3 is an exemplary amino acid sequence for a TPO-CAR with an IgG1 hinge spacer. In some examples, the spacer can comprise a hinge domain and a CH3 domain derived from human IgG4 (See GenBank Accession No. AAC82527.1, amino acids 98-329). Optionally, the linker can comprise a myc tag.

Optionally, the construct further comprises a signal sequence, such that when the construct, i.e., the CAR, is expressed inside a cell, such as a T-cell, the nascent protein is directed to the endoplasmic reticulum and subsequently to the cell surface, where it is expressed. Optionally, the signal sequence is an IL-2 signal sequence. Optionally, the IL-2 signal sequence comprises SEQ ID NO: 12. Optionally, the signal sequence is the natural signal sequence of the receptor ligand e.g., the signal sequence of TPO, SCF, FLT3, IL-3, CRKL, L-selectin, CD9, FHL-2, LGALS8, TSPAN4, APC, and CD11b/CD18.

Optionally, the nucleic acid sequence is a codon-optimized sequence.

In some embodiments, the receptor ligand is a TPO binding fragment comprising an amino acid sequence that is at least 90% identical to SEQ ID NO: 4. Exemplary nucleic acid sequences encoding SEQ ID NO: 4 are provided herein as SEQ ID NO: 14 and SEQ ID NO: 15. The full-length TPO sequence is provided herein as SEQ ID NO: 13. In some embodiments, the nucleic acid sequence encodes an amino acid sequence that is at least 90% identical to SEQ ID NO: 5 or SEQ ID NO: 6.

In some embodiments, the receptor ligand is a stem cell factor or a binding fragment thereof comprising an amino acid sequence that is at least 90% identical to SEQ ID NO: 7, SEQ ID NO: 42; SEQ ID NO: 43: SEQ ID NO: 44 or SEQ ID NO: 45. In some embodiments, the nucleic acid sequence encodes an amino acid sequence that is at least 90% identical to SEQ ID NO: 8.

Further provided is a nucleic acid construct comprising a nucleic acid sequence encoding a recombinant protein comprising an antibody and a transmembrane domain, wherein the antibody binds to a receptor expressed on the surface of a cancer stem cell or a cancer cell (e.g., a cancer stem cell or a differentiated cancer cell of hematopoietic origin), and wherein the recombinant protein does not comprise an intracellular signaling domain. This construct is an example of a NSCAR. In some embodiments, the antibody is a monoclonal antibody or a single chain variable fragment (scFv) derived from the portion of an antibody that specifically recognizes receptor expressed on the surface of a cancer cell. See, for example, Guedan et al. "Engineering and Design of Chimeric Antigen Receptors," Mol. Therapy: Methods & Clinical Development 12:145-156 (2019)). In some embodiments, the receptor is a tumor antigen. In some embodiments, the tumor antigen is CD5 or CD19. In some embodiments B cell and T cell leukemia and lymphomas are targeted, for example, using CD3, CD5, CD7, or CD19.

As used herein, the term antibody encompasses, but is not limited to, whole immunoglobulin (i.e., an intact antibody) of any class. Native antibodies are usually heterotetrameric glycoproteins, composed of two identical light (L) chains and two identical heavy (H) chains. Typically, each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has at one end a variable domain (V(H)) followed by a number of constant domains. Each light chain has a variable domain at one end (V(L)) and a constant domain at its other end; the constant domain of the light chain is aligned with the first constant domain of the heavy chain, and the light chain variable domain is aligned with the variable domain of the heavy chain. Particular amino acid residues are believed to form an interface between the light and heavy chain variable domains. The light chains of antibodies from any vertebrate species can be assigned to one of two clearly distinct types, called kappa (κ) and lambda (λ), based on the amino acid sequences of their constant domains. Depending on the amino acid sequence of the constant domain of their heavy chains, immunoglobulins can be assigned to different classes. There are five major classes of immunoglobulins: IgA, IgD, IgE, IgG and IgM. Several of these may be further divided into subclasses (isotypes), e.g., IgG-1, IgG-2, IgG-3, and IgG-4; IgA-1 and IgA-2. The heavy chain constant domains that correspond to the different classes of immunoglobulins are called alpha, delta, epsilon, gamma, and mu, respectively.

The term variable is used herein to describe certain portions of the antibody domains that differ in sequence among antibodies and are used in the binding and specificity of each particular antibody for its particular antigen. However, the variability is not usually evenly distributed through the variable domains of antibodies. It is typically concentrated in three segments called complementarity determining regions (CDRs) or hypervariable regions both in the light chain and the heavy chain variable domains. The more highly conserved portions of the variable domains are called the framework (FR). The variable domains of native heavy and light chains each comprise four FR regions, largely adopting a β-sheet configuration, connected by three CDRs, which form loops connecting, and in some cases forming part of, the β-sheet structure. The CDRs in each chain are held together in close proximity by the FR regions and, with the CDRs from the other chain, contribute to the formation of the antigen binding site of antibodies. The constant domains are not involved directly in binding an antibody to an antigen but exhibit various effector functions, such as participation of the antibody in antibody-dependent cellular toxicity. Also included within the meaning of antibody or fragments thereof are conjugates of antibody fragments and antigen binding proteins (single chain antibodies derived from monoclonal antibodies, for example, an scFv) as described, for example, in U.S. Pat. No. 4,704,692, the contents of which are hereby incorporated by reference in their entirety.

Optionally, the antibody is a monoclonal antibody that specifically binds to a tumor antigen. The term monoclonal antibody as used herein refers to an antibody from a substantially homogeneous population of antibodies, i.e., the individual antibodies comprising the population are identical except for possible naturally occurring mutations that may be present in minor amounts. Monoclonal antibodies may be prepared using hybridoma methods, such as those described by Kohler and Milstein, Nature, 256:495 (1975), or Harlow and Lane, Antibodies: A Laboratory Manual, Cold Spring Harbor Publications, New York (1988).

As used throughout, the term nucleic acid or nucleotide refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar properties as the reference nucleic acid and are metabolized in a manner similar to naturally occurring nucleotides. A nucleic acid sequence can comprise combinations of deoxyribonucleic acids and ribonucleic acids. Such deoxyribonucleic acids and ribonucleic acids include both naturally occurring molecules and synthetic analogues. The polynucleotides of the invention also encompass all forms of sequences including, but not limited to, single-stranded forms, double-stranded forms, hairpins, stem-and-loop structures, and the like.

Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260: 2605-2608 (1985); and Rossolini et al., Mol. Cell. Probes 8:91-98 (1994)).

Nucleic acid sequences comprising, consisting of, or consisting essentially of any of the nucleic acid sequences provided herein are also provided. Provided herein are nucleic acid sequences and amino acid sequences that have at least 60% identity (e.g., 85%, 90%, 95%) to any of SEQ ID NO: 1-SEQ ID NO: 69. The term, identity or substantial identity, as used in the context of a polynucleotide or polypeptide sequence described herein, refers to a sequence that has at least 60% sequence identity to a reference sequence. Alternatively, percent identity can be any integer from 60% to 100%. Exemplary embodiments include at least: 60%, 65%, 70%, 75%, 80%, 85%, 90%, 91%, 92%, 93%, 94%, 95%, 96%, 97%, 98%, or 99%, as compared to a reference sequence using the programs described herein; preferably BLAST using standard parameters, as described below. One of skill will recognize that these values can be appropriately adjusted to determine corresponding identity of proteins encoded by two nucleotide sequences by taking into account codon degeneracy, amino acid similarity, reading frame positioning and the like.

For sequence comparison, typically one sequence acts as a reference sequence to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

A comparison window, as used herein, includes reference to a segment of any one of the number of contiguous positions selected from the group consisting of from 20 to 600, usually about 50 to about 200, more usually about 100 to about 150 in which a sequence may be compared to a reference sequence of the same number of contiguous positions after the two sequences are optimally aligned. Methods of alignment of sequences for comparison are well-known in the art. Optimal alignment of sequences for comparison may be conducted by the local homology algorithm of Smith and Waterman *Add. APL. Math.* 2:482 (1981), by the homology alignment algorithm of Needleman and Wunsch *J Mol. Biol.* 48:443 (1970), by the search for similarity method of Pearson and Lipman *Proc. Natl. Acad. Sci.* (U.S.A.) 85: 2444 (1988), by computerized implementations of these algorithms (e.g., BLAST), or by manual alignment and visual inspection.

Algorithms that are suitable for determining percent sequence identity and sequence similarity are the BLAST and BLAST 2.0 algorithms, which are described in Altschul et al. (1990) *J Mol. Biol.* 215: 403-410 and Altschul et al. (1977) *Nucleic Acids Res.* 25: 3389-3402, respectively. Software for performing BLAST analyses is publicly available through the National Center for Biotechnology Information (NCBI) web site. The algorithm involves first identifying high scoring sequence pairs (HSPs) by identifying short words of length Win the query sequence, which either match or satisfy some positive-valued threshold score T when aligned with a word of the same length in a database sequence. T is referred to as the neighborhood word score threshold (Altschul et al, supra). These initial neighborhood word hits acts as seeds for initiating searches to find longer HSPs containing them. The word hits are then extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a word size (W) of 28, an expectation (E) of 10, M=1, N=−2, and a comparison of both strands. For amino acid sequences, the BLASTP program uses as defaults a word size (W) of 3, an expectation (E) of 10, and the BLOSUM62 scoring matrix (see Henikoff & Henikoff, *Proc. Natl. Acad. Sci*. USA 89:10915 (1989)).

The BLAST algorithm also performs a statistical analysis of the similarity between two sequences (see, e.g., Karlin & Altschul, *Proc. Nat'l. Acad. Sci*. USA 90:5873-5787 (1993)). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.01, more preferably less than about $10^{-5}$, and most preferably less than about $10^{-20}$.

Polypeptides

Polypeptides encoded by any of the recombinant nucleic acids described herein are also provided. Polypeptide, peptide, and protein are used interchangeably herein to refer to a polymer of amino acid residues. As used herein, the terms encompass amino acid chains of any length, including full-length proteins, wherein the amino acid residues are linked by covalent peptide bonds.

Modifications, including the specific amino acid substitutions or mutations disclosed herein, are made by known methods. By way of example, modifications are made by site specific mutagenesis of nucleotides in a nucleic acid encoding the polypeptide, thereby producing a DNA encoding the modification, and thereafter expressing the DNA in recombinant cell culture to produce the encoded polypeptide. Techniques for making substitution mutations at predetermined sites in DNA having a known sequence are well known. For example, M13 primer mutagenesis and PCR-based mutagenesis methods can be used to make one or more substitution mutations. Any of the nucleic acid sequences provided herein can be codon-optimized to alter, for example, maximize expression, in a host cell.

The amino acids in the polypeptides described herein can be any of the 20 naturally occurring amino acids, D-stereoisomers of the naturally occurring amino acids, unnatural amino acids and chemically modified amino acids. Unnatural amino acids (that is, those that are not naturally found in proteins) are also known in the art, as set forth in, for example, Zhang et al. "Protein engineering with unnatural amino acids," *Curr. Opin. Struct. Biol.* 23(4): 581-587 (2013); Xie et al. "Adding amino acids to the genetic repertoire," 9(6): 548-54 (2005)); and all references cited therein. β and γ amino acids are known in the art and are also contemplated herein as unnatural amino acids.

As used herein, a chemically modified amino acid refers to an amino acid whose side chain has been chemically modified. For example, a side chain can be modified to comprise a signaling moiety, such as a fluorophore or a radiolabel. A side chain can also be modified to comprise a new functional group, such as a thiol, carboxylic acid, or amino group. Post-translationally modified amino acids are also included in the definition of chemically modified amino acids.

Also contemplated are conservative amino acid substitutions. By way of example, conservative amino acid substitutions can be made in one or more of the amino acid residues, for example, in one or more lysine residues of any of the polypeptides provided herein. One of skill in the art would know that a conservative substitution is the replacement of one amino acid residue with another that is biologically and/or chemically similar. The following eight groups each contain amino acids that are conservative substitutions for one another:

1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M).

By way of example, when an arginine to serine is mentioned, also contemplated is a conservative substitution for the serine (e.g., threonine). Nonconservative substitutions, for example, substituting a lysine with an asparagine, are also contemplated.

Also provided herein are conjugates of any of the receptor ligands provided herein. For example, the receptor ligand can be conjugated to a detectable entity, toxin, or a chemotherapeutic entity. The detectable entity can be a fluorescent moiety, for example a fluorescent peptide. A fluorescent peptide refers to a polypeptide which, following excitation, emits light at a detectable wavelength. Examples of fluorescent proteins include, but are not limited to, fluorescein isothiocyanate (FITC), phycoerythrin (PE), allophycocyanin (APC), green fluorescent protein (GFP), enhanced GFP, red fluorescent protein (RFP), blue fluorescent protein (BFP) and mCherry. A chemotherapeutic entity as used herein refers to an entity which is destructive to a cell, that is the entity reduces the viability of the cell. The chemotherapeutic entity may be a toxin or cytotoxic drug. The toxin may be saporin. A chemotherapeutic agent contemplated includes, without limitation, alkylating agents, nitrosoureas, ethylenimines/methylmelamine, alkyl sulfonates, antimetabolites, pyrimidine analogs, epipodophylotoxins, enzymes such as L-asparaginase; biological response modifiers such as IFNalpha, IL-2, G-CSF and GM-CSF; platinium coordination complexes such as cisplatin and carboplatin, anthracenediones, substituted urea such as hydroxyurea, methyihydrazine derivatives including N-methylhydrazine (MIH) and procarbazine, adrenocortical suppressants such as mitotane (o,p'-DDD) and aminoglutethimide; hormones and antagonists including adrenocorticosteroid antagonists such as prednisone and equivalents, dexamethasone and aminoglutethimide; progestin such as hydroxyprogesterone caproate, medroxyprogesterone acetate and megestrol acetate; estrogen such as diethylstilbestrol and ethinyl estradiol equivalents; antiestrogen such as tamoxifen; androgens including testosterone propionate and fluoxymesterone/equivalents; antiandrogens such as flutamide, gonadotropin-releasing hormone analogs and leuprolide; and non-steroidal antiandrogens such as flutamide.

Also provided is a bispecific T-cell engager comprising a receptor ligand described herein.

A wide variety of molecules have been developed that have two binding domains. Bispecific T-cell engaging molecules are a class of bispecific molecules that have been developed, primarily for use as anti-cancer drugs. They direct a host's immune system, more specifically, T cell cytotoxic activity, against a target cell. In these molecules, one binding domain binds to a T cell for example, via the CD3 receptor, and the other to a target cell, for example, a hematopoietic stem cell.

Since the bispecific molecule binds both the target cell and the T cell, it brings the target cell into proximity with the T cell, so that the T cell can exert its effect, for example, a cytotoxic effect on a hematopoietic stem cells. The formation of the T cell: bispecific agent: hematopoietic stem cells complex induces signaling in the T cell leading to, for example, the release of cytotoxic mediators. Ideally, the agent only induces the desired signaling in the presence of the target cell, leading to selective killing.

In certain embodiments, the agent used in the methods provided herein is a polypeptide comprising (i) a first domain, for example, a receptor ligand and (ii) a second domain, for example, a T cell binding/activating domain. The bi-specific molecule can comprise a signal sequence to aid in its production. The signal peptide may cause the bi-specific molecule to be secreted by a host cell, such that the bi-specific molecule can be harvested from the host cell supernatant. The bi-specific molecule can be represented by the general formula: Signal peptide—first domain—second domain. The bi-specific molecule may comprise a spacer sequence to connect the first domain with the second domain and spatially separate the two domains. The spacer sequence may, for example, comprise an IgG1 hinge or a CD8 stalk. The linker may alternatively comprise an alternative linker sequence which has similar length and/or domain spacing properties as an IgG1 hinge or a CD8 stalk (for example, a CD8α hinge). A nucleic acid sequence encoding any of the bi-specific molecules described herein is also provided.

Vectors

The nucleic acid sequences provided herein or constructs comprising them can be in or form part of a vector. Any of the vectors provided herein can comprise a nucleic acid sequence comprising, consisting of or consisting essentially of the nucleic acid sequences set forth herein, for example, any of the nucleic acid sequences set forth in SEQ ID NOs: 1-69. Any of the vectors provided herein can include one or more nucleic acid sequences encoding an amino acid sequence comprising, consisting of, or consisting essentially of any of the amino acid sequences described herein, for example, any of the amino acid sequences set forth in SEQ ID NOs: 1-69. Thus, provided herein is a vector comprising a nucleic acid sequence or construct described herein. Optionally, the vector comprises a promoter operably linked to a nucleic acid sequence described herein. A nucleic acid is operably linked when it is placed into a functional relationship with another nucleic acid sequence. Numerous promoters can be used in the constructs described herein. A promoter is a region or a sequence located upstream and/or downstream from the start of transcription which is involved in recognition and binding of RNA polymerase and other proteins to initiate transcription. The promoter can be a eukaryotic or a prokaryotic promoter. The nucleic acids can be combined with constitutive, inducible, tissue-preferred, or other promoters for expression in the cells or organism of interest. See, for example, Uchibori et al., "Functional Analysis of an Inducible Promoter Driven by Activation Signals from a Chimeric Antigen Receptor," *Mol. Ther. Oncol.* 12:16-25 (2019). In addition to one or more promoters, the vector can comprise other regulatory regions including, but not limited to enhancer sequences, response elements, protein recognition sites, inducible elements, protein binding sequences, 5' and 3' untranslated regions (UTRs), transcriptional start sites, termination sequences, polyadenylation sequences, and introns.

Suitable vectors include expression vectors for use in prokaryotes such as pUC18, pUC19, Bluescript and its derivatives, mp18, mp19, pBR322, pMB9, ColEI, pCRI. Shuttle vectors, such as pSA3 and pAT28, can also be used. Yeast expression vectors, such as 2-micra plasmid-type vectors, integration plasmids, YEP vectors and centromeric plasmids can also be used. Vectors for expression in insect cells, such as the pAC-series and pVL-series vectors as well as vectors for plant expression (for example, series pIBI, pEarleyGate, pAVA, pCAMBIA, pGSA, pGWB, pMDC, pMY, pORE can also be used. Eukaryotic expression vectors as well as viral vectors (for example, adenovirus, adeno-associated virus, retrovirus and lentivirus) can also be used. Non-viral vectors such as pSilencer 4.1-CMV (Ambion), pcDNA3, pcDNA3.1/hyg pHCMV/Zeo, pCR3.1, pEFI/His, pIND/GS, pRc/HCMV2, pSV40/Zeo2, pTRACER-HCMV, pUB6/V5-His, pVAXI, pZeoSV2, pCI, pSVL and pKSV-10, pBPV-1, pML2d and pTDTI are also contemplated.

Any vector provided herein can be used to transform, transfect or infect cells susceptible or prone to transformation, transfection or infection by said vector. Said cells can be prokaryotic or eukaryotic. In some examples, a nucleic acid construct is introduced into the cell, for example, a T cell, using a plasmid or a vector that, when introduced in a host cell, integrates into the cell's genome and replicates together with the chromosome (or chromosomes) into which it has been integrated. Optionally, expression of the recombinant protein encoded by the construct is transient.

Nucleic acid sequences and vectors provided herein can be delivered or introduced into any of the host cells described herein by any method known in the art for this purpose. As used herein, introducing, in the context of introducing a nucleic acid sequence or vector, refers to the translocation of the nucleic acid sequence from outside a cell to inside the cell. In some cases, introducing refers to translocation of the nucleic acid sequence from outside the cell to inside the nucleus of the cell.

One or more of the nucleic acid sequences or vectors described herein can be introduced via naked delivery, plasmid delivery, nanoparticles, for example, a liposome, comprising the nucleic acid sequence or vector, genome editing methods (for example, CRISPR/Cas genome editing, Zinc finger nucleases (ZFNs), transcription-activator like effector nucleases (TALENs), or meganucleases) (Osborn et al. "Megatal, Crispr/Cas9, and Talen T-Cell Receptor Gene Editing," *Blood* 126(23):2045 (2015); Webber et al. "Highly efficient mutliplex human T cell engineering without double-stranded breaks using Cas9 base editors," *Nat. Commun.* 10: 52222 (2019)), site-specific recombination, reagent-based methods using reagents such as cationic lipids, calcium phosphate, or DEAE-dextran. Transduction, transfection, and instrument-based methods such as electroporation, microinjection, laserfection, contact with nanowires or nanotubes, receptor mediated internalization, translocation via cell penetrating peptides, and the like, can also be used alone or in combination with any of the other methods for introducing a nucleic acid sequence into a host cell.

The CRISPR/Ca9 system, an RNA-guided nuclease system that employs a Cas9 endonuclease, can be used to edit the genome of a host cell or organism. The "CRISPR/Cas" system refers to a widespread class of bacterial systems for defense against foreign nucleic acid. CRISPR/Cas systems are found in a wide range of eubacterial and archaeal organisms. CRISPR/Cas systems include type I, II, and III sub-types. Wild-type type II CRISPR/Cas systems utilize an RNA-mediated nuclease, for example, Cas9, in complex with guide and activating RNA to recognize and cleave foreign nucleic acid. Guide RNAs having the activity of both a guide RNA and an activating RNA are also known in the art. In some cases, such dual activity guide RNAs are referred to as a single guide RNA (sgRNA).

As used herein, the term "Cas9" refers to an RNA-mediated nuclease (e.g., of bacterial or archeal orgin, or derived therefrom). Exemplary RNA-mediated nucleases include the foregoing Cas9 proteins and homologs thereof. Other RNA-mediated nucleases include Cpf1 (See, e.g., Zetsche et al., Cell, Volume 163, Issue 3, p 759-771, 22 Oct. 2015) and homologs thereof.

Cas9 homologs are found in a wide variety of eubacteria, including, but not limited to bacteria of the following taxonomic groups: *Actinobacteria, Aquificae, Bacteroidetes-Chlorobi, Chlamydiae-Verrucomicrobia, Chlroflexi, Cyanobacteria, Firmicutes, Proteobacteria, Spirochaetes*, and *Thermotogae*. An exemplary Cas9 protein is the *Streptococcus pyogenes* Cas9 protein. Additional Cas9 proteins and homologs thereof are described in, e.g., Chylinksi, et al., RNA Biol. 2013 May 1; 10(5): 726-737; Nat. Rev. Microbiol. 2011 June; 9(6): 467-477; Hou, et al., Proc Natl Acad Sci USA. 2013 Sep. 24; 110(39):15644-9; Sampson et al., Nature. 2013 May 9; 497(7448):254-7; and Jinek, et al., Science. 2012 Aug. 17; 337(6096):816-21. Variants of any of the Cas9 nucleases provided herein can be optimized for efficient activity or enhanced stability in the host cell. Thus, engineered Cas9 nucleases are also contemplated. See, for example, "Slaymaker et al., "Rationally engineered Cas9 nucleases with improved specificity," Science 351 (6268): 84-88 (2016)). Nucleic acid sequences can also be delivered using Cas9 ribonucleoprotein complexes (Farboud et al. "Enhanced Genome Editing with Cas9 Ribonucleoprotein in Diverse Cells and Organimss," *J. Vis. Exp*. 135: 57350 (2018).

Optionally, any of the nucleic acid constructs or vectors described herein further comprise a selectable marker. As used herein, selectable marker, refers to a gene which allows selection of a host cell, for example, a T cell, comprising a marker. The selectable markers may include, but are not limited to: fluorescent markers, luminescent markers and drug selectable markers, cell surface receptors, and the like. In some embodiments, the selection can be positive selection; that is, the cells expressing the marker are isolated from a population, e.g. to create an enriched population of cells expressing the selectable marker. Separation can be by any convenient separation technique appropriate for the selectable marker used. For example, if a fluorescent marker is used, cells can be separated by fluorescence activated cell sorting, whereas if a cell surface marker has been inserted, cells can be separated from the heterogeneous population by affinity separation techniques, e.g. magnetic separation, affinity chromatography, "panning" with an affinity reagent attached to a solid matrix, fluorescence activated cell sorting or other convenient technique.

As used herein, a cell can be a eukaryotic cell, a prokaryotic cell, an animal cell, a plant cell, a fungal cell, and the like. Optionally, the cell is a mammalian cell, for example, a human cell. In some cases, the cell is a human T cell or a cell capable of differentiating into a T cell that expresses a T cell receptor molecule. These include hematopoietic stem cells and cells derived from hematopoietic stem cells.

Bacterial cells include, without limitation, the cells of Gram-positive bacteria such as species of the genus *Bacillus, Streptomyces* and *Staphylococcus* and cells of Gram-negative bacteria such as cells of the genus *Escherichia* and *Pseudomonas*. Fungal cells include, preferably, yeast cells such as *Saccharomyces, Pichia pastoris* and *Hansenula polymorpha*. Insect cells include, without limitation, cells of *Drosophila* and Sf9 cells. Plant cells include, among others, cells from crop plants such as cereals, medicinal or ornamental plants or bulbs. Suitable mammal cells for the present disclosure include epithelial cell lines (porcine, etc.), osteosarcoma cell lines (human, etc.), neuroblastoma cell lines (human, etc.), epithelial carcinomas (human, etc.), glial cells (murine, etc.), liver cell lines (monkey, etc.). CHO cells (Chinese Hamster Ovary), COS cells, BHK cells, cells HeLa, 911, AT1080, A549, 293 or PER.C6, human ECCs NTERA-2 cells, D3 cells of the line of mESCs, human embryonic stem cells such as HS293 and BGV01, SHEF1, SHEF2 and HS181 cells, NIH3T3, 293T, REH and MCF-7 and hMSCs cells.

Methods of Making Cells

A method of making a modified cell comprising transducing a cell with any of the nucleic acid constructs or vectors provided herein. Optionally, the cell is obtained from a subject prior to transduction. Any of the nucleic acid sequences, constructs or vectors described herein can be expressed in alpha beta T cells, cytotoxic T lymphocytes (CTL), T helper cells, lymphokine-activated cells, tumor-infiltrating lymphocytes (TILS), NK cells, naive T cells, memory T cells, gamma delta T cells, NKT cells, or macrophages. Cells made by any of the methods provided herein are also provided. Cell populations comprising variable quantities of one or more of the aforesaid cells are also provided. As used throughout, a cell comprising a nucleic acid sequence or construct encoding a chimeric antigen receptor described herein can be referred to as a CAR cell.

Optionally, the cells can be primary cells. As used herein, a primary cell is a cell that has not been transformed or immortalized. Such primary cells can be cultured, sub-cultured, or passaged a limited number of times (e.g., cultured 0, 1, 2, 3, 4, 5, 6, 7, 8, 9, 10, 11, 12, 13, 14, 15, 16, 17, 18, 19, or 20 times). In some cases, the primary cells are adapted to in vitro culture conditions. In some cases, the primary cells are isolated from an organism, system, organ, or tissue, optionally sorted, and utilized directly without culturing or sub-culturing. In some cases, the primary cells are stimulated, activated, or differentiated. For example, primary T cells can be activated by contact with (e.g., culturing in the presence of) CD3, CD28 agonists, IL-2, IFN-γ, or a combination thereof.

Suitable methods for obtaining lymphocytes are known to those in the art and include, without limitation, isolation from peripheral blood, from umbilical cord blood, and from tissues containing lymphocytes. Optionally, the lymphocytes are isolated through drainage from the lymph nodes of patients suffering from a particular disease.

Once the lymphocytes have been isolated, they are placed in they are transduced with a nucleic acid construct provided herein, under suitable conditions for lymphocyte expansion to take place. The general conditions for lymphocyte expansion, for example, CTL expansion, can be established according to well-known methods (See, Carter J. et al., Immunology, 57 (1), 123-129, (1996)) and can be routinely optimized by one of skill in the art. Typically, transduction is carried out by means of culturing the lymphocytes in a suitable medium for said cells. The cells may be cultured under conventional conditions in a suitable medium for growing lymphocytes which include a Minimum Essential Medium or RPMI 1640 Medium. With a view to promoting cell growth, necessary proliferation and viability factors may be added including serum, for example, fetal calf serum or human serum and antibiotics, for example, penicillin, streptomycin. The lymphocytes are kept in the necessary conditions for supporting growth, for example, at a suitable temperature of about 37° C. and atmosphere, for example, air plus 5% $CO_2$.

A T cell can be a T cell or a T lymphocyte, which is a type of lymphocyte that plays a central role in cell-mediated immunity. A T cell can be distinguished from other lymphocytes, such as B cells and natural killer cells (NK cells), by the presence of a T-cell receptor (TCR) on the cell surface. There are various types of T cells, as summarized below.

Helper T helper cells (TH cells or CD4+ cells) assist other white blood cells in immunologic processes, including maturation of B cells into plasma cells and memory B cells, and activation of cytotoxic T cells and macrophages. TH cells express CD4 on their surface. TH cells become activated when they are presented with peptide antigens by MHC class II molecules on the surface of antigen presenting cells (APCs). These cells can differentiate into one of several subtypes, including TH1, TH2, TH3, TH17, Th9, or TFH, which secrete different cytokines to facilitate different types of immune responses.

Cytolytic T cells (TC cells, CTLs, or CD8+ cells) destroy virally infected cells and tumor cells, and are also implicated in transplant rejection. CTLs express the CD8 at their surface. These cells recognize their targets by binding to antigen associated with MHC class I, which is present on the surface of all nucleated cells. Through IL-10, adenosine and other molecules secreted by regulatory T cells, the CD8+ cells can be inactivated to an anergic state, which prevent autoimmune diseases such as experimental autoimmune encephalomyelitis.

Memory T cells are a subset of antigen-specific T cells that persist long-term after an infection has resolved. They quickly expand to large numbers of effector T cells upon re-exposure to their cognate antigen, thus providing the immune system with "memory" against past infections. Memory T cells comprise three subtypes: central memory T cells (TCM cells) and two types of effector memory T cells (TEM cells and TEMRA cells). Memory cells may be either CD4+ or CD8+. Memory T cells typically express the cell surface protein CD45RO.

Regulatory T cells (Treg cells), formerly known as suppressor T cells, are crucial for the maintenance of immunological tolerance. Their major role is to shut down T cell-mediated immunity toward the end of an immune reaction and to suppress auto-reactive T cells that escaped the process of negative selection in the thymus. Two major classes of CD4+ Treg cells have been described—naturally occurring Treg cells and adaptive Treg cells. Naturally occurring Treg cells (also known as CD4+CD25+FoxP3+Treg cells) arise in the thymus and have been linked to interactions between developing T cells with both myeloid (CD11c+) and plasmacytoid (CD123+) dendritic cells that have been activated with TSLP. Naturally occurring Treg cells can be distinguished from other T cells by the presence of an intracellular molecule called FoxP3. Mutations of the FOXP3 gene can prevent regulatory T cell development, causing the fatal autoimmune disease IPEX. Adaptive Treg cells (also known as Tr1 cells or Th3 cells) may originate during a normal immune response.

In certain embodiments, the cell provided herein is a Natural Killer cell (or NK cell). NK cells form part of the innate immune system. NK cells provide rapid responses to innate signals from virally infected cells in an MHC independent manner NK cells (belonging to the group of innate lymphoid cells) are defined as large granular lymphocytes (LGL) and constitute the third kind of cells differentiated from the common lymphoid progenitor generating B and T lymphocytes. NK cells are known to differentiate and mature in the bone marrow, lymph node, spleen, tonsils and thymus where they then enter into the circulation.

Methods of Treatment

Provided herein is a method of depleting cancer stem cells or differentiated cancer cells (e.g., a cancer stem cell or a differentiated cancer cell of hematopoietic origin) in a subject comprising administering an effective amount of any of the cells described herein. In some embodiments, the subject has cancer or is at risk of developing cancer. As used throughout, cancer refers to any cellular disorder in which the cells proliferate more rapidly than normal tissue growth. A proliferative disorder includes, but is not limited to, neoplasms, which are also referred to as tumors. A neoplasm can be a solid neoplasm (e.g., sarcoma or carcinoma) or a cancerous growth affecting the hematopoietic system.

Examples of cancer include, but are not limited to, lymphoma and leukemia. The lymphoma or leukemia can be selected from the group consisting of acute myelogenous leukemia (AML), peripheral T-cell lymphoma, not otherwise specified (PTCL-NOS); angio-immunoblastic T-cell lymphoma (AITL), anaplastic large cell lymphoma (ALCL), enteropathy-associated T-cell lymphoma (EATL), hepatosplenic T-cell lymphoma (HSTL), extranodal NK/T-cell lymphoma nasal type, cutaneous T-cell lymphoma, primary cutaneous ALCL, T cell prolymphocytic leukemia and T-cell acute lymphoblastic leukemia, myelodysplastic syndromes, myelodysplastic/myeloproliferative neoplasms, multiple myeloma, chronic myelogenous leukemia, chronic myeloproliferative neoplasms, Burkitt lymphoma, chronic lymphocytic leukemia, Hodgkin lymphoma, and hairy cell leukemia.

Other examples include solid tumors, for example, pancreatic cancer, breast cancer, brain cancer (e.g., glioblastoma), lung cancer, a central nervous system cancer, prostate cancer, colorectal cancer, head and neck cancer, ovarian cancer, thyroid cancer, renal cancer, rhabdomyosarcoma, bone cancer sarcomas, anal cancer, testicular cancer, kidney cancer, neuroendocrine cancer, cervical cancer, skin cancer (e.g., melanoma), stomach cancer, bladder cancer, adrenal cancer and liver cancer, to name a few.

In some embodiments, the cancer stem cells are MPL+, c-KIT+, FLT3+, IL-3 receptor+, CD34+, integrin alpha 3/beta1+, endothelial protein C receptor+ or Thy-1/CD90+.

Any of the method set forth herein can also be used to treat or prevent solid tumors, for example, In some embodiments, any of the methods provided herein can be used to deplete hematopoietic stem cells for non-malignant hematopoietic stem cell transplantation, with or without gene therapy. Non-malignant diseases include, but are not limited to, thalassemia, sickle cell anemia, aplastic anemia, Fanconi anemia, Fabry disease, Gaucher disease, Cystinosis, Pompe disease, mucopolysaccharidosis, Danon disease, leukocyte adhesion deficiency, pyruvate kinase deficiency, metachromatic leukodystrophy, chronic granulomatous disease, Wiskott-Aldrich syndrome, severe combined immune deficiencies (X-SCID and ADA-SCID), familial hemophagocytic lymphohistiocytosis, and hemophilia A.

Also provided is a method for treating or preventing cancer in a subject comprising (a) introducing into cells obtained from a first subject a nucleic acid construct or vector described herein; and (b) administering the cells to a second subject. In some embodiments, the first subject and the second subject are different subjects. In some embodiments, the first subject and the second subject are the same subject. In some embodiments, the subject has a cancer associated with an increase in MPL+, c-KIT+, FLT3+, IL-3 receptor+, CD34+, integrin alpha 3/beta1+, endothelial protein C receptor+ or Thy-1/CD90+ cells. In some embodiments, the cancer is selected from the group consisting of acute myelogenous leukemia (AML), peripheral T-cell lymphoma, not otherwise specified (PTCL-NOS); angio-immunoblastic T-cell lymphoma (AITL), anaplastic large cell lymphoma (ALCL), enteropathy-associated T-cell lymphoma (EATL), hepatosplenic T-cell lymphoma (HSTL), extranodal NK/T-cell lymphoma nasal type, cutaneous T-cell lymphoma, primary cutaneous ALCL, T cell prolymphocytic leukemia, T-cell acute lymphoblastic leukemia, myelodysplastic syndromes, myelodysplastic/myeloproliferative neoplasms, multiple myeloma, chronic myelogenous leukemia, chronic myeloproliferative neoplasms, Burkitt lymphoma, chronic lymphocytic leukemia, Hodgkin lymphoma, and hairy cell leukemia.

Other cancers include, but are not limited to, pancreatic cancer, breast cancer, brain cancer (e.g., glioblastoma), lung cancer, a central nervous system cancer, prostate cancer, colorectal cancer, head and neck cancer, ovarian cancer, thyroid cancer, renal cancer, rhabdomyosarcoma, bone cancer sarcomas, anal cancer, testicular cancer, kidney cancer, neuroendocrine cancer, cervical cancer, skin cancer (e.g., melanoma), stomach cancer, bladder cancer, adrenal cancer and liver cancer. Optionally, any of the methods provided herein, can further comprise diagnosing the subject with cancer.

In the methods provided herein, the cells can be one or more of the cell types mentioned above. Cells expressing any of the CARs described herein can be produced ex vivo either from a patient's own peripheral blood, in the setting of a hematopoietic stem cell transplant from related donor peripheral blood, or peripheral blood from an unrelated donor.

Alternatively, cells expressing a CAR described herein can be derived from ex vivo differentiation of inducible progenitor cells or embryonic progenitor cells. Alternatively, an immortalized T-cell line that retains its lytic function and could act as a therapeutic agent can be used.

Optionally, the cells, for example, T or NK cells, can be activated and/or expanded prior to or after being transduced with a nucleic acid construct described herein, for example, by treatment with an anti-CD3 monoclonal antibody.

In some embodiments, a cell, for example, a T cell or an NK cell, can be made by (i) isolating a T or NK cell-containing sample from a subject or other sources and (ii) transducing or transfecting the cell with a nucleic acid construct set forth herein.

The transduced or transfected cells can then by purified, for example, selected on the basis of expression of the receptor ligand, for example TPO, that selectively binds a cell surface protein, for example, MPL, prior to administration to the subject.

Any of the methods provided herein can further comprise radiation therapy, immunotherapy, chemotherapy or surgery, to name a few. In certain embodiments, the methods further comprise administering any of the cells described herein in combination with immune checkpoint inhibitors or immunostimulatory cytokines, including for not limited to, GM-CSF, anti-PD-1, anti-PD-L1, anti-CTLA-4, anti-CD40, anti-IL-7, or anti-IL-6 antibodies or combinations thereof.

In certain embodiments, the anti-CTLA-4 antibody is ipilimumab; the anti-PD-1 antibody is selected from nivolumab, pembrolizumab, and pidilizumab; and the anti-PD-L1 is selected from (MDX-1105) BMS-936559, MPDL3280A (atezolizumab), MEDI4736 (durvalumab), and MSB0010718C.

In some embodiments, the method further comprises administering chemotherapy to the subject. For example, the methods can further comprise administering compositions disclosed herein in combination with bevacizumab, erlotinib, ipilimumab, bevacizumab and erlotinib, bevacizumab and erlotinib, lambrolizumab, dasatinib, IL-2, pembrolizumab, cisplatin and pemetrexed, carboplatin and paclitaxel, pegylated IFN-α2b, axitinib, lenalidomide and dexamethasone, trametinib and dabrafenib, and IFN-γ.

In some embodiments, the method further comprises administering hematopoietic stem cells to the subject. By administering one or more of the cells, recombinant proteins or conjugates provided herein, a subject can be conditioned for an HSC transplantation. By way of example, such conjugates include constructs with an antibody fragment or ligand conjugated to a drug or toxin (e.g., ribosomal inactivating protein, saporin).

Hematopoietic stem cell transplantation (HSCT) involves the intravenous (IV) infusion of autologous (the patient's own stem cells are used), allogeneic (the stem cells come from a donor) or syngeneic (from an identical twin) to reestablish hematopoietic function in patients whose bone marrow or immune system is damaged or defective. HSCT is typically performed for patients with certain cancers of the blood or bone marrow, such as multiple myeloma or leukemia. In these cases, the recipient's immune system is conditioned, i.e., destroyed with radiation or chemotherapy before the transplantation. Infection and graft-versus-host disease are major complications of allogeneic HSCT.

As used herein, hematopoietic stem cell, refers to a type of stem cell that can give rise to a blood cell. Hematopoietic stem cells can give rise to cells of the myeloid or lymphoid lineages, or a combination thereof. Hematopoietic stem cells are predominantly found in the bone marrow, although they can be isolated from peripheral blood, or a fraction thereof. Various cell surface markers can be used to identify, sort, or purify hematopoietic stem cells. In some cases, hematopoietic stem cells are identified as c-kit$^+$ and lin$^-$. In some cases, human hematopoietic stem cells are identified as CD34+, CD59*, Thy1/CD90$^+$, CD38$^{lo/-}$, C-kit/CD117$^+$, lin$^-$. In some cases, human hematopoietic stem cells are identified as CD34$^-$, CD59$^+$, Thy1/CD90$^+$, CD38$^{lo/-}$, C-kit/CD117$^+$, lin$^-$. In some cases, human hematopoietic stem cells are identified as CD133$^+$, CD59$^+$, Thy1/CD90$^+$, CD38$^{lo/-}$, C-kit/CD117$^+$, lin$^-$. In some cases, mouse hematopoietic stem cells are identified as CD34$^{lo/-}$, SCA-1$^+$, Thy1$^{+/lo}$, CD38$^+$, C-kit$^+$, lin$^-$. In some cases, the hematopoietic stem cells are CD150$^+$CD48$^-$CD244$^-$.

Autologous HSCT includes the extraction (e.g., apheresis) of hematopoietic stem cells (HSC) from the patient and storage of the harvested cells. The patient is then provided a conditioning treatment, for example, chemotherapy with or without radiotherapy, with the intention of eradicating the malignant cell population of the subject with partial or complete bone marrow ablation (destruction of bone marrow of the subject to grow new blood cells). The stored stem cells of the subject are then transfused where they replace destroyed tissue and resume the normal blood cell production of the subject.

In certain embodiments, the conditioning, HSCT, and or cancer treatments disclosed herein can be used on subjects diagnosed with acute myeloid leukemia (AML), chronic myeloid leukemia (CML), acute lymphoblastic leukemia (ALL), Hodgkin lymphoma (HL) (relapsed, refractory), non-Hodgkin lymphoma (NHL) (relapsed, refractory), neuroblastoma, Ewing sarcoma, multiple myeloma, myelodysplastic syndromes, gliomas, solid tumors, thalassemia, sickle cell anemia, aplastic anemia, Fanconi anemia, malignant infantile osteopetrosis, mucopolysaccharidosis, or hemophilia A.

Provided herein is a method for conditioning a subject for an HSC transplantation by administering an effective amount of a cell described herein, an antibody fragment or ligand drug/toxin conjugate (e.g., anti-c-Kit Mab-saporin or TPO-saporin) to a subject who is in need of an HSC transplantation. For example, provided herein, is a method for conditioning a subject for an HSC transplantation by administering an effective amount of a TPO-CAR comprising cell described herein, a TPO conjugate, or recombinant TPO protein to a subject who is in need of an HSC transplantation.

Any of the methods described herein may further comprise transplanting a first population of HSCs to the subject after conditioning the subject for HSC transplantation and optionally transplanting a second population of HSCs to the subject after the transplantation of the first HSC population.

In any of the methods described herein, the amount of the construct-comprising cell, conjugate, or recombinant protein, can be effective to induce apoptosis of endogenous HSCs and HSPCs, and/or promote engraftment of the HSCs transplanted to the subject.

In some embodiments, the first population of HSCs can be transplanted to the subject after the construct-comprising cell, conjugate, or recombinant protein, is substantially cleared from serum of the subject. In some examples, the first population of HSCs can be transplanted to the subject at least 24 hours after the administration of the construct-comprising cell, conjugate, or recombinant receptor ligand protein. In other examples, the first population of HSCs can be transplanted to the subject at least 3 days (e.g., at least 7 days) after the administration of the CAR-expressing cell, conjugate, or recombinant receptor ligand protein described herein.

Optionally, the subject to be treated by any of the methods described herein may be free of any further conditioning treatment, e.g., irradiation treatment or administration of a DNA damaging agent, before the transplantation of HSCs.

In any methods described herein, the first population of HSCs, the second population of HSCs, or both for transplantation can be derived from bone marrow, peripheral blood cells, and/or umbilical cord blood of a suitable source (e.g., human). The HSCs can be allogeneic HSCs or autologous HSCs. In some examples, the HSCs can be cultured ex vivo prior to transplantation to a subject.

In the methods provided herein an effective dose of construct-comprising cells and/or HSCs can be administered to the subject. The terms effective amount and effective dosage are used interchangeably. The term effective amount is defined as any amount necessary to produce a desired physiologic response. In some methods, about $1\times10^6$ to about $12\times10^6$ CD34+ cells/kg can be administered, but this amount can vary depending on the associated disorder. Effective amounts and schedules for administering the cells may be determined empirically, and making such determinations is within the skill in the art. The dosage ranges for administration are those large enough to produce the desired effect (e.g., treatment of a disease, for example, cancer). The dosage should not be so large as to cause substantial adverse side effects, such as unwanted cross-reactions, anaphylactic reactions, and the like. Generally, the dosage will vary with the age, condition, sex, type of disease, the extent of the disease or disorder, route of administration, or whether other drugs are included in the regimen, and can be determined by one of skill in the art. The dosage can be adjusted by the individual physician in the event of any contraindications. Dosages can vary, and the agent can be administered in one or more dose administrations daily, for one or multiple days as needed. Any of the methods for treating a disorder described herein can further comprise administering one or more immunosuppressants to the subject.

As used throughout, a subject can be a vertebrate, more specifically a mammal (e.g., a human, horse, cat, dog, cow, pig, sheep, goat, mouse, rabbit, rat, and guinea pig). The term does not denote a particular age or sex. Thus, adult and newborn subjects, whether male or female, are intended to be covered. As used herein, patient or subject may be used interchangeably and can refer to a subject with or at risk of developing a disorder. The term patient or subject includes human and veterinary subjects.

As used herein the terms treatment, treat, or treating refers to a method of reducing one or more of the effects of the disorder or one or more symptoms of the disorder, for example, cancer in the subject. Thus in the disclosed methods, treatment can refer to a 10%, 20%, 30%, 40%, 50%, 60%, 70%, 80%, 90%, or 100% reduction in the severity of cancer. For example, a method for treating cancer is considered to be a treatment if there is a 10% reduction in one or more symptoms of the cancer in a subject as compared to a control. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disorder or symptoms of the disorder.

As utilized herein, by prevent, preventing, or prevention is meant a method of precluding, delaying, averting, obviating, forestalling, stopping, or hindering the onset, incidence, severity, or recurrence of a disease or disorder. For example, the disclosed method is considered to be a prevention if there is a reduction or delay in onset, incidence, severity, or recurrence of cancer or one or more symptoms of cancer in a subject susceptible to cancer as compared to control subjects susceptible to cancer that did not receive a cell, conjugate or recombinant protein described herein. The disclosed method is also considered to be a prevention if there is a reduction or delay in onset, incidence, severity, or recurrence of cancer or one or more symptoms of cancer in a subject susceptible to cancer after receiving a cell, conjugate or recombinant protein described herein as compared to the subject's progression prior to receiving treatment. Thus, the reduction or delay in onset, incidence, severity, or recurrence of cancer can be about a 10, 20, 30, 40, 50, 60, 70, 80, 90, 100%, or any amount of reduction in between.

Also provided herein is a pharmaceutical composition comprising a cell with a construct, a conjugate, or recombinant protein described herein, for use in promoting engraftment of donor HSCs in a subject who is in need for a HSC transplantation or conditioning a subject for a HSC transplantation. The composition can further comprise an inhibitor of any cell surface receptor described herein, for example, an inhibitor of MPL, c-KIT, FLT3, IL-3 receptor, CD34, integrin alpha 3/beta1, endothelial protein C receptor, or Thy-1/CD90.

Also within the scope of the present disclosure are the use of any of the construct-comprising cells, conjugates, or recombinant nucleic acids or protein described herein in manufacturing a medicament for use in promoting engraftment of donor HSCs in a subject who is in need for a HSC transplantation or conditioning a subject for a HSC transplantation. Any of these medicaments can be used to treat or prevent any disease set forth herein.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein. For example, if a method is disclosed and discussed and a number of modifications that can be made to one or more molecules including in the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the material for which they are cited are hereby specifically incorporated by reference in their entireties.

Example I

Acute myelogenous leukemia (AML) is a cancer composed of myeloblasts. AML accounts for 20% of pediatric malignancies and is the most common leukemia in adults. Similar to hematopoiesis, leukemia stem cells (LSC) are capable of self-renewal and propagation of the leukemia. LSCs are characterized by $CD34^{+}$ $CD38^{-}$ expression and have been reported to be difficult to target because they are resistant to chemotherapy. Also, HSCs and LSCs depend on the c-MPL/TPO pathway for survival. In addition, leukemias such as megakaryocytic and erythropoietic leukemias have been reported to have high MPL expression. Furthermore, patients with $MPL^{+}$ LSCs have a worse prognosis for patient outcomes and are resistant to conventional chemotherapies. Taken together, there is an unmet need to target this subset of leukemias as well as cancer stem cells. For these reasons, a CAR targeting the MPL receptor was designed.

Figure 4:
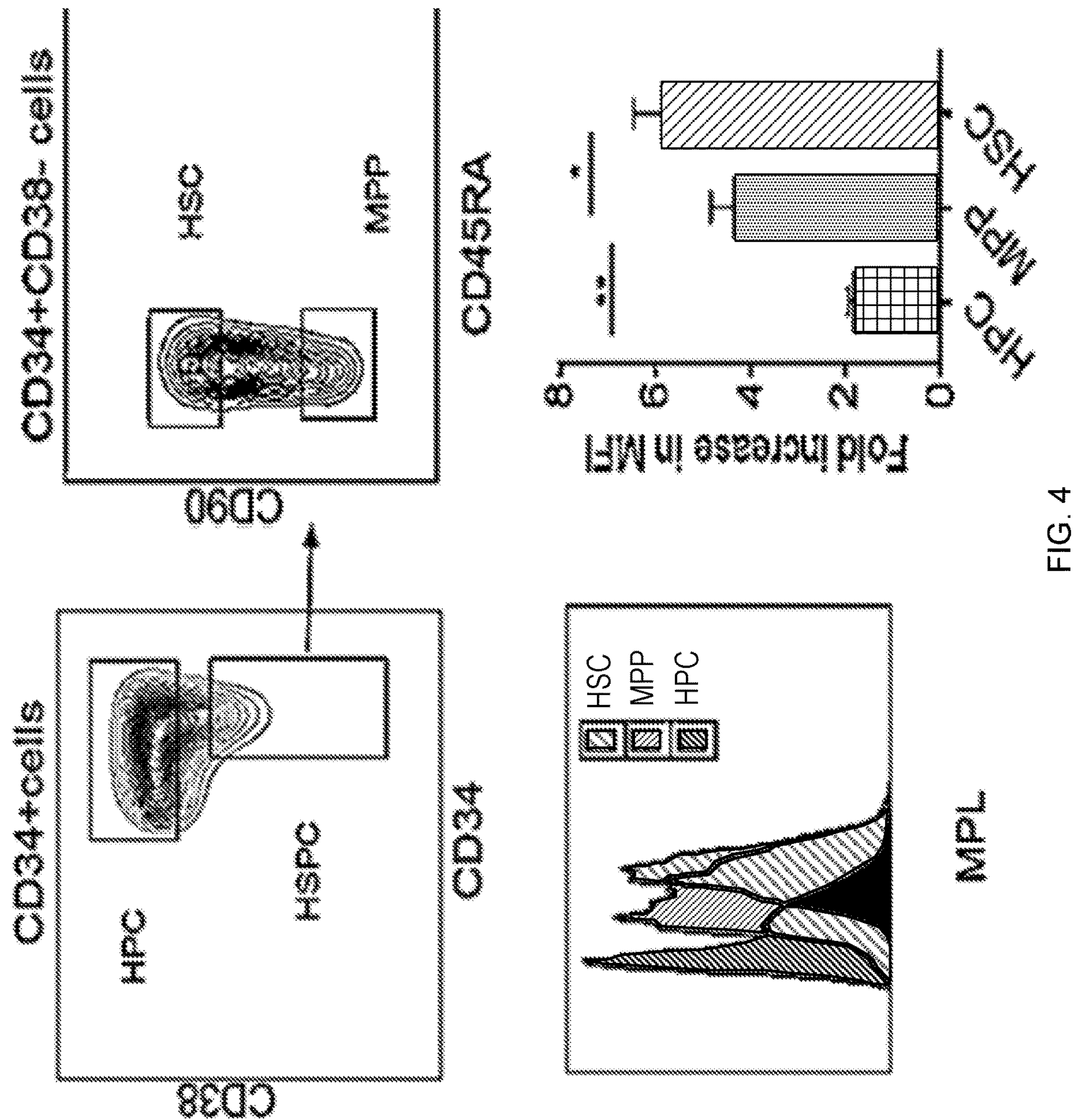
FIG. 4 shows MPL expression in different hematopoietic compartments in humans. Representative flow cytometry plots of MPL expression in HSPC and HPC compartments are shown. Analysis of MPL expression in human bone marrow precursors revealed MPL expression is enriched in HSC when compared to HPC.
Figure 5:
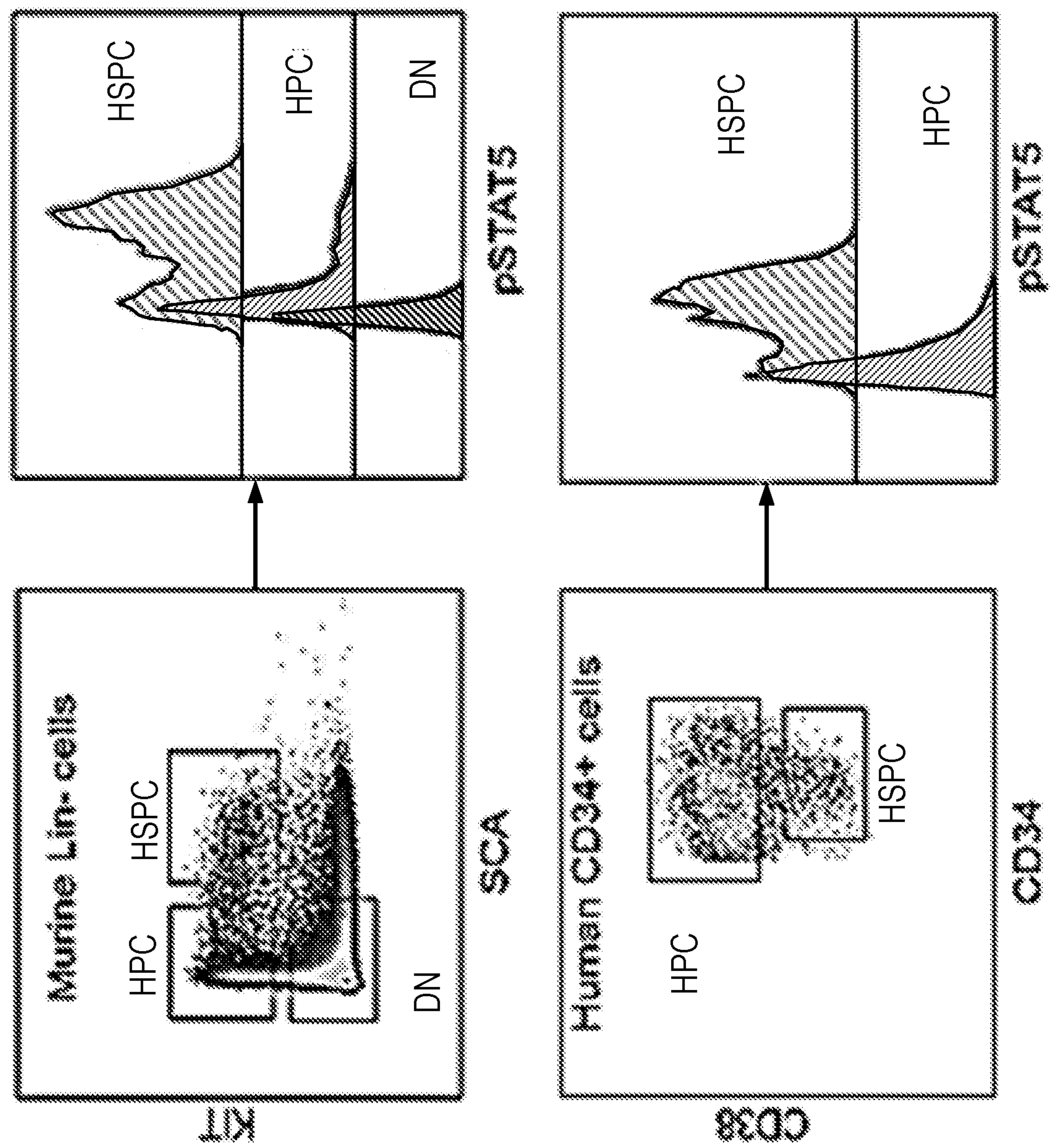
FIG. 5 shows the response to TPO assessed by pSTAT5 staining in murine and human HSPC. Flow cytometry of pSTAT5 following TPO stimulation in HPC and HSPC compartment is shown. Analysis of pSTAT5 following TPO exposure revealed that 2-3% of mouse bone marrow responds to TPO, and the TPO-responsive cells are enriched in the HSPC compartment. Similarly, TPO-responsive cells are enriched in the HSPC compartment of human bone marrow.

A ligand-based chimeric antigen receptor (CAR) was developed with human TPO (hTPO). hTPO is the binding partner of MPL. A CAR that combined hTPO as a receptor ligand linked to the T cell signaling domains, CD28 and CD3z (FIG. TA) was made. the construct also expressed GFP as a method for studying genetically modified cells. Recombinant lentivirus encoding this hTPO-CAR was generated and has shown that it efficiently transduces T cells, and that transduced T cells are specifically activated against MPL-expressing target cells (FIG. 1B, 1C). To further demonstrate specificity of the TPO-CAR, it was shown that mouse hematopoietic stem cells (termed LSK cells), which is a population of cells that express MPL, are selectively killed by hTPO-CAR T cells (FIG. 2). Therefore, this construct can be used to target MPL In addition to targeting MPL expressing cancer cells, MPL and its ligand TPO are essential for several important HSC functions, such as survival, quiescence, and DNA repair. Mice and humans deficient in c-MPL have critically low hematopoietic progenitor cells (HPC) and HSC. In humans, inactivating mutations in MPL lead to a progressive bone marrow failure, reinforcing the critical role of c-MPL in sustaining long-term hematopoiesis. Analysis of MPL expression in murine and human bone marrow precursors revealed MPL expression is enriched in HSC when compared to HPC (FIG. 3 and FIG. 4). To validate the functional significance of this receptor's expression, analysis of pSTAT5 following TPO exposure revealed that 2-3% of mouse bone marrow responds to TPO, and the TPO-responsive cells are enriched in the HSPC compartment (FIG. 5). Also, even within the BM precursor compartment, MPL expression is enriched in the HSC compartment when compared to c-KIT or CD45, which are broadly expressed (FIG. 3 and FIG. 4). Additionally, unlike c-KIT, which has very high expression in the non-hematopoietic compartment, there is only minimal expression of MPL in the non-hematopoietic compartment (Table 2). These characteristics make MPL an ideal target for HSC directed conditioning regimens.

TABLE 2

| | KIT mRNA Expression | | MPL mRNA Expression | |
|---|---|---|---|---|
| | Tissue | RPKM | Tissue | RPKM |
| 1 | Breast | 25.5 | Testis | 0.6 |
| 2 | Ovary | 15.3 | Lung | 0.3 |
| 3 | Thyroid | 12.7 | Ovary | 0.3 |
| 4 | Cerebellum | 12.6 | Cerebral Cortex | 0.2 |
| 5 | Hippocampus | 11.7 | Colon | 0.1 |
| 6 | Salivary Gland | 11.4 | Spleen | 0.1 |
| 7 | Skin | 11 | Heart Muscle | 0.1 |
| 8 | Stomach | 10.7 | Hippocampus | 0.1 |
| 9 | Lung | 9.9 | Urinary Bladder | 0.1 |
| 10 | Urinary Bladder | 9.5 | Prostate | 0.1 |

Example II

Cell Lines and Cell Culture

HEL (DSMZ, Braunschweig, Germany), K562 (ATCC, Manassas, VA), and 697 (ATCC, Old Town Manassass, VA) cells were cultured in RPMI-1640 with L-glutamine (Corning CellGro, Manassass, VA) and 100% FBS and 1% Penicillin/Streptomy cin. CMK cells (Petrich laboratory, Emory University) were also cultured under previous conditions except with 20% FBS. Mo7e (DSMZ, Braunschweig, Germany) cells were cultured in IMDM (1×) with L-glutamine and 25 mM HEPES, supplemented with 20% FBS, 1% Penicillin/Streptomycin, and 10 ng/mL of TPO (BioLegend, San Diego, CA).

Primary Cells

Whole blood leukoreduction filters were procured from the American Red Cross. Healthy donor T cells were isolated by negative selection from donor PBMC isolated from leukoreduction filters, as previously described. See, Wegehaupt et al. "Recovery and assessment of leukocytes from LR Express filters," Biologicals. 49:15-22 (2017). PBMC were isolated after cells were isolated with Ficoll-Paque Premium sterile solution (GE Healthcare, Uppsala, Sweden). Leukocytes were washed with PBS and T cells were isolated using EasySep Human T cell Isolation Kit (Stem Cell Technologies, Cambridge, MA). Immediately after isolation, T cells were activated with CD3/CD28 DynaBeads (ThermoFisher Scientific, Waltham, MA) for 24 hours.

Cloning of CAR Constructs

CAR sequences were cloned into a vector containing the necessary components for lentiviral production. The binding domain of TPO was used as the binding portion for the CAR. See, Feese et al. "Structure of the receptor-binding domain of human TPO determined by complexation with a neutralizing antibody fragment," *Proc Natl Acad Sci* USA. 101(7): 1816-1821 (2004). The CAR is a bicistronic vector co-expressing GFP. The codon-optimized construct was redesigned to contain a CH3 hinge domain and was not bicistronic, but the entire CAR from the IL2 signal sequence to CD3ζ was optimized for human cell expression. All genes were obtained by gene synthesis from Genewiz (South Plainfield, NJ).

Lentiviral Production

Viral accessory plasmids and CAR expression plasmids were transiently transfected in 293T-17 cells using a calcium phosphate transfection (Sigma Aldrich, St. Louis, MO) method to generate LV vectors pseudotyped with the VSVG envelope. Conditioned media was collected for 3 days beginning at 48 hours post-transfection and passed through a 0.45-μm filter. Virus was concentrated by overnight centrifugation at 10,000×g, followed by filtration using a 0.22-μm filter. Viral concentrate titers were determined using quantitative real-time PCR analysis.

Lentiviral Transduction

Transduction of recombinant HIV lentiviral particles was carried out by incubating cells with virus in complete medium supplemented with 8 μg/ml polybrene (EMD Millipore, Billerica, MA). Eighteen hours after transduction, media was replaced. The transduced cells were cultured for at least 5 days before being used in experiments.

Flow Cytometry

Cells were washed with phosphate buffered saline (PBS) and centrifuged at 100×g. Supernatant was decanted and replaced with the appropriate antibody cocktail in PBS. The antibodies used from BD Biosciences (Franklin Lakes, NJ) include: BUV737 Mouse Anti-Human CD3 (Clone SP34-2), BUV496 Mouse Anti-Human CD38 (Clone HIT2), APC-Cy7 Mouse Anti-Human CD69 (Clone FN50), PE Mouse Anti-Human CD45, V450 Mouse Anti-Human CD3 (UCHT1), BV605 Rat Anti-Mouse CD16/32 (Clone 2.4G2), BV421 Rat Anti-Mouse CD150 (Clone Q38-480), PE-Cy7 Hamster Anti-Mouse CD48 (Clone HM48-1). Antibodies used from BioLegend (San Diego, CA) include: APC Annexin V, PE Anti-Human CD110 (516017E), Propidium Iodide Solution, APC Anti-Human CD38 (HIT2), FITC Anti-Mouse CD3/Gr-1/CD11b/CD45R(B220)/Ter-119 ("Lineage"), PE Anti-Mouse Ly-6A/E (Sca-1) (Clone D7), APC Anti-Mouse CD117 (c-kit) (Clone ACK2), PerCP/Cy5.5 Anti-Mouse CD34 (Clone MEC14.7). Cells were analyzed by flow cytometry using an LSRII (BD Biosciences, Franklin Lakes, NJ).

pSTAT5 Activation Assay

Cancer cell lines were stimulated for 45 minutes with recombinant TPO (BioLegend, San Diego, CA) or T cell media. T cells were seeded at $1.5\times10^6$ cells/mL and 72 hours later, cells were centrifuged and media was collected. Cells were resuspended in 250 μL of conditioned media or 400 ng/mL of recombinant human TPO. To block activation of pSTAT5, 10 μg of human TPO antibody (R&D Systems, Minneapolis, MN) was incubated with cells in addition to an external TPO source. After incubation with TPO, cells were fixed and permeabilized for flow cytometry. Cells were stained with anti-hu phospho-STAT5 (Tyr694) clone SRBCZX (Invitrogen, Carlsbad, CA).

Cytotoxicity Assays

T cells were tested for cytotoxic potential by co-culture experiment. Target cells (CMK, Mo7e, HEL) were labeled with the Violet Proliferation Dye 450 (BD Biosciences, Franklin Lakes, NJ) and assessed in flow cytometry-based cytotoxicity assays. In mixing cytotoxicity experiments, target cells, K562 and 697, were stained with CFSE (ThermoFisher Scientific, Waltham, MA) to separate MPL+/− target cells. In competitive cytotoxicity assays, 0.1-400 ng/mL of recombinant human TPO (BioLegend, San Diego, CA) was added at the start of the cytotoxicity assay at the same time as effector cells. Target cells were incubated with T cells at the varied effector to target (E:T) ratios: 0:1, 1:2, 1:1, 2:1, 5:1 for 12 hours at 37° C. Target cell death was analyzed via flow cytometry using dead cell stains Annexin V and PI, and effectors were analyzed for activation markers CD69 and CD38. Remaining targets were additionally analyzed for MPL surface expression. Antibodies were incubated for 60 minutes with shaking at room temperature and data was acquired after 1 volume PBS wash.

Real Time Quantitative PCR

Genomic DNA was extracted using the Qiagen DNeasy Blood & Tissue Kit using manufacturer's recommended protocol (Qiagen, Germantown, MD). Oligonucleotide primers were designed for a 150 bp amplicon of the Rev-response element (RRE). Real-time PCR was performed in an Applied Biosystems® StepOne™ System (ThermoFisher Scientific, Waltham, MA).

In Vivo Mouse Experiments

NOD.Cg-Prkdc$^{scid}$ Il2rg$^{tm1Wjl}$/SzJ (NSG) mice were purchased from Jackson Laboratory (Bar Harbor, ME) and were maintained in a pathogen-free environment. Mice were cared for according to the established principles of the Institutional Animal Care and Use Committee (IACUC), and all animal protocols were approved by the IACUC. Five-week-old mice were injected tail vein with $5\times10^6$ CMK luciferase cells. Tumor growth and mice health were monitored three times per week by weighing, IVIS (In vivo Imaging System, Perkin Elmer, Waltham, MA) imaging, and bi-monthly complete blood counts. Luciferase was made fresh immediately prior to imaging. Luciferin was injected at 10 mL/gram intraperitoneal. Mice were imaged 10 minutes after injection and bioluminescence was quantified.

Statistical Analysis

All statistical analysis and graphing were performed using Sigma Plot version 13 (Systat Software Inc,) and GraphPad Prism. Exact methods are described for each experiment as used.

Results

Detection of MPL on LT-HSC and Leukemia Cells

Figure 6B:
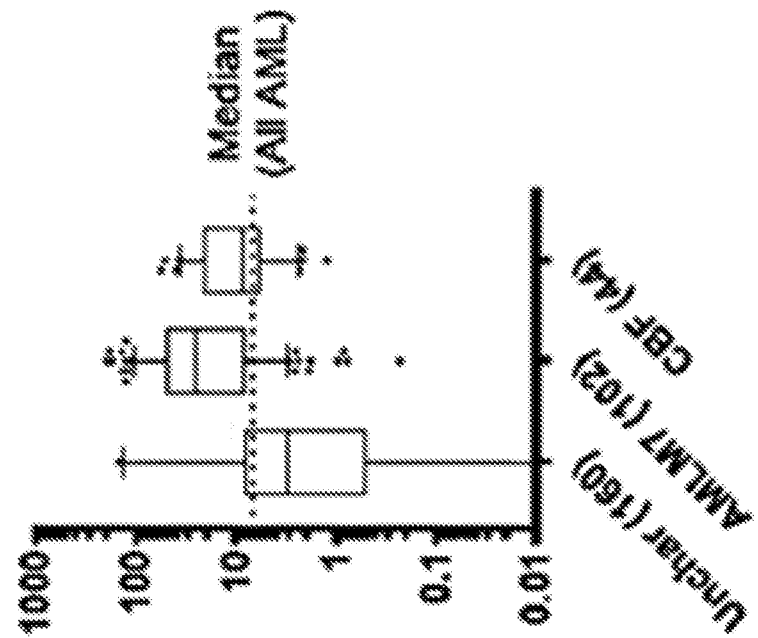
FIG. 6B shows data from pediatric AML patients demonstrating that the acute megakaryoblastic leukemic (AMLM7, N=102) and core binding factor (CBF, N=44) leukemias have a higher gene expression for MPL compared to the uncharacterized AML population (N=160).
Figure 6A:
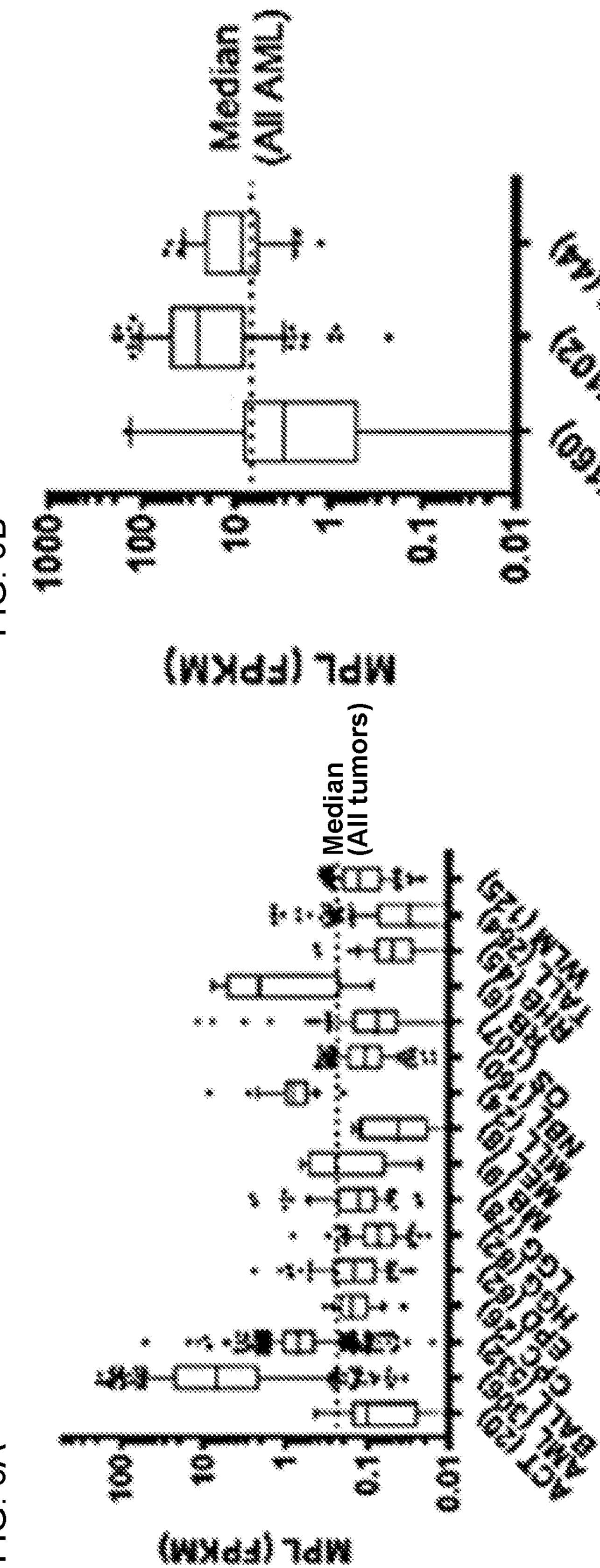
FIG. 6A shows MPL expression based on data acquired from the St. Jude PeCan database. MPL RNA sequencing data was taken and formatted to show the expression across multiple pediatric subpopulations including adenocortical carcinoma (ACT), acute myeloid leukemia (AML), B cell acute lymphoblastic leukemia (BALL), choroid plexus carcinoma (CPC), ependymoma (EPD), high grade glioma (HGG), low grade glioma (LGG), medulloblastoma (MB), melanoma (MEL), mixed lineage leukemia (MLL), neuroblastoma (NBL), osteosarcoma (OS), retinoblastoma (RB), rhabdosarcoma (RHB), T cell acute lymphocytic leukemia (TALL), and Wilm's tumor (WLM). Box and violin plots are shown with median expression demonstrated by the dotted line for all tumors.
Figure 6F:
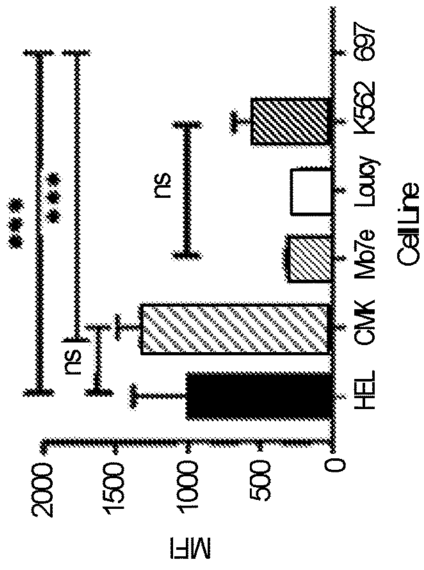
FIG. 6F shows that mean fluorescence intensity of MPL surface expression analysis showed significantly higher expression in the HEL (1008±378.4) and CMK (1330±160.5) cell line compared to the Mo7e (316.7±6.66) and Loucy (233±8.66) lines.
Figure 6E:
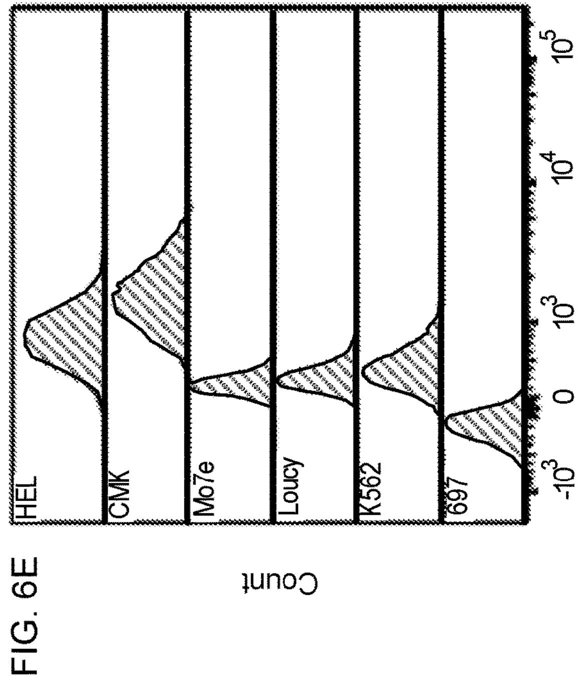
FIG. 6E is a representative flow cytometry analysis of cancer cell lines HEL (N=3), CMK (N=3), Mo7e (N=3), and Loucy (N=3) surface MPL expression and control cell lines K562 and 697.

Data from the St. Jude PeCan Data Portal database suggests many pediatric malignancies have MPL expression (Downing et al. The Pediatric Cancer Genome Project. *Nat Genet.* 44(6):619-622 (2012)); however, acute myeloid leukemias (AML) stand out as highly expressive (FIG. 6A). Acute megakaryoblastic (M7 or AMKL) and core binding factor (CBF) AMLs tend to express higher levels of MPL than other subtypes (FIG. 6B). Interestingly, adult AMLs do not express the same level of MPL according to TCGA data (FIG. 6C). Furthermore, the St. Jude PeCan data portal was analyzed for data on the c-kit receptor, which is expressed on HSCs and targeted as a mechanism of bone marrow/stem cell depletion. RNA expression was high in multiple pediatric cancers surveyed in the St. Jude PeCan data portal (FIG. 6D) as well as more highly expressed compared to MPL in healthy tissues and non-hematopoietic tissues (Table 2), perhaps limiting its utility as a ligand-based CAR. To establish the presence of MPL on various AML cell lines, surface expression of MPL was measured using flow cytometry (FIG. 6E-F). In addition, the RNA expression levels available from the Cancer Cell Line Encyclopedia (CCLE) (Table 3) demonstrate high MPL surface expression on HEL (erythroblastic leukemia) and CMK cells (AMKL), and low/undetectable expression on Mo7e, another AMKL line.

TABLE 3

| Cell Line | MPL | Tissue | Description |
|---|---|---|---|
| HEL | 45.685 | M6 AML | JAK2p.V617F |
| CMK | 22.130 | M7 AML | T21 |
| Mo7e | 1.095 | M7 AML | Infant |
| Loucy | 1.262 | T-ALL | SET-NUP214 |

Figure 6G:
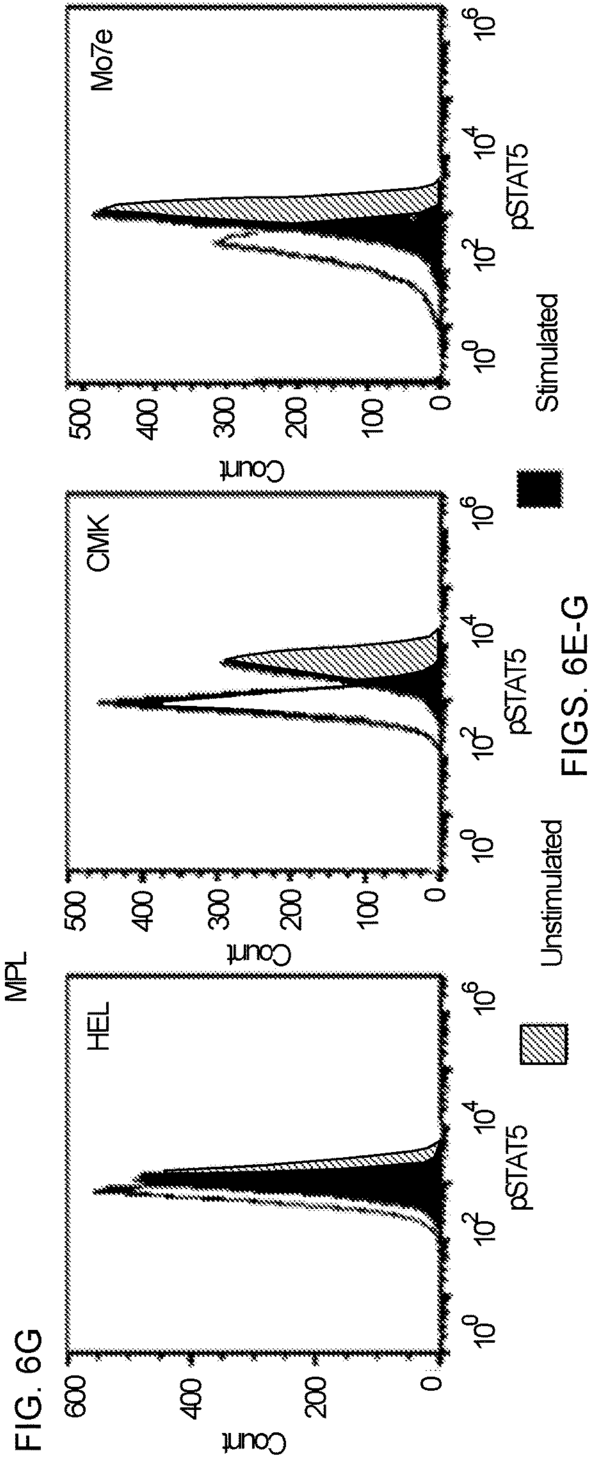
FIG. 6G shows results for cells stimulated for 45 minutes with recombinant human TPO, fixed, permeabilized and evaluated for pSTAT5 expression. Representative flow cytometry of the HEL, CMK, and Mo7e cell lines showed increased pSTAT5 expression after stimulation compared to non-stimulated controls.
Figure 7:
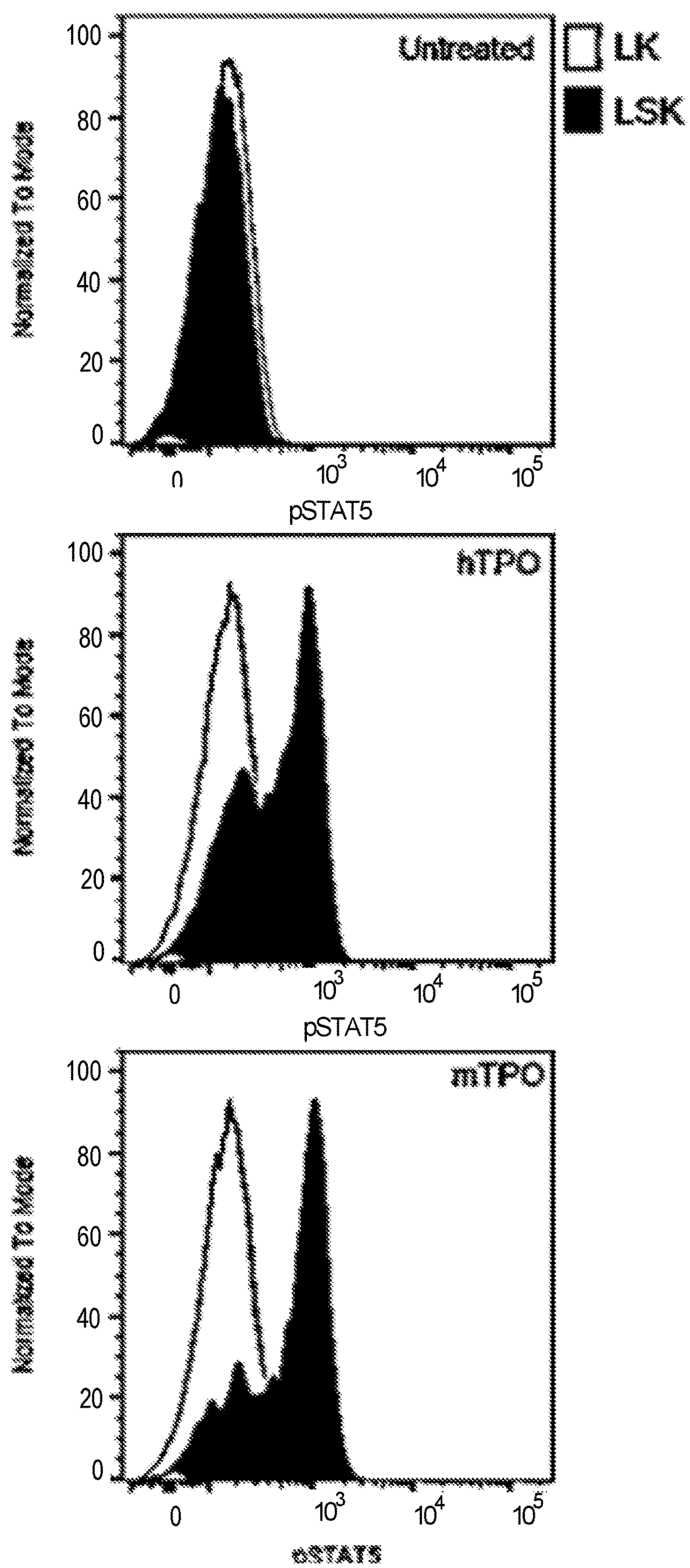
FIG. 7 shows the results of testing for cross reactivity of mouse and human recombinant TPO. Mouse bone marrow was stimulated with TPO for 45 minutes, fixed, permeabilized, and stained for pSTAT5. Bone marrow was further delineated by the lineage-c-kit+(LK) and lineage-c-kit+ sca-1+(LSK) when checking for pSTAT5 expression. Data suggests the less differentiated LSK compartment was reactive to both mouse and human TPO compared to more differentiated LK compartment.

To verify these cell lines were responsive to TPO, downstream upregulation of pSTAT5 was measured. HEL, CMK, Mo7e cells were stimulated as well as control cell lines K562 and 697 for 45 minutes with mouse or human TPO (FIG. 6G-H). Upon stimulation with TPO, a significant increase in pSTAT5 was observed in HEL, CMK, and Mo7e cells and each cell line showed a significant increase in mean fluorescence intensity (MFI) (FIG. 1H, P<0.001, 2-way ANOVA) compared to their unstimulated counterparts. Despite minimal expression of MPL, MO7e cells respond to TPO. Notably, this shift was not observed in control cell lines K562 (chronic myelogenous leukemia) and 697 (B cell leukemia). MPL and pSTAT5 expression was tested in both mouse and human bone marrow samples. The data presented herein show the more stem-like cells/long-term hematopoietic stem cells have greater surface expression of MPL and higher MFIs compared to more-differentiated short-term hematopoietic stem cells (ST-HSCs), multipotent progenitors (MPP), and most differentiated progenitors (FIG. 6I-J). Both human and mouse recombinant TPO induced pSTAT5 expression in mouse bone marrow, specifically in the LSK (lineage negative, c-kit positive, Sca-1 positive) cells (FIG. 7A).

Development of Ligand-Based CAR Targeting MPL

Figures 8C, 8D:
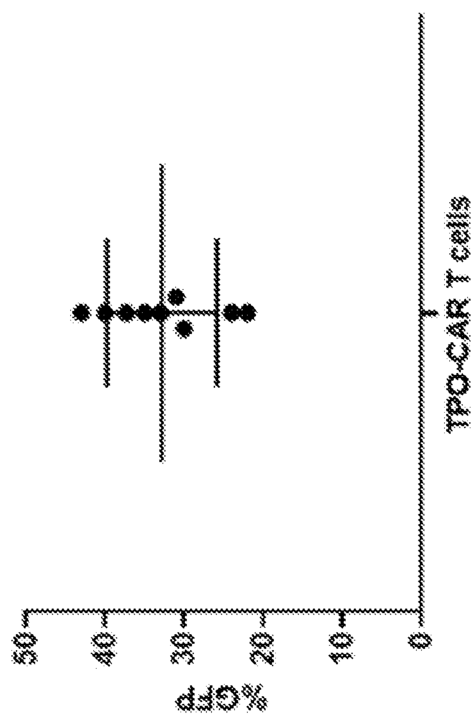
FIG. 8C shows GFP expression by primary T cells from 9 healthy donors transduced 24 hours post isolation with activation at a multiplicity of infection (MOI) of 50. GFP percentage of the NCO TPO-CAR construct as displayed are between 22-40%.
FIG. 8D shows the results of vector copy analysis after genomic DNA was isolated for RT-PCR. Vector copy analysis demonstrated significantly higher vector copy numbers (VCN) in the codon optimized (CO) TPO-CAR construct compared to the NCO TPO-CAR construct but not significantly different from the CD19 CAR control.
Figure 8E:
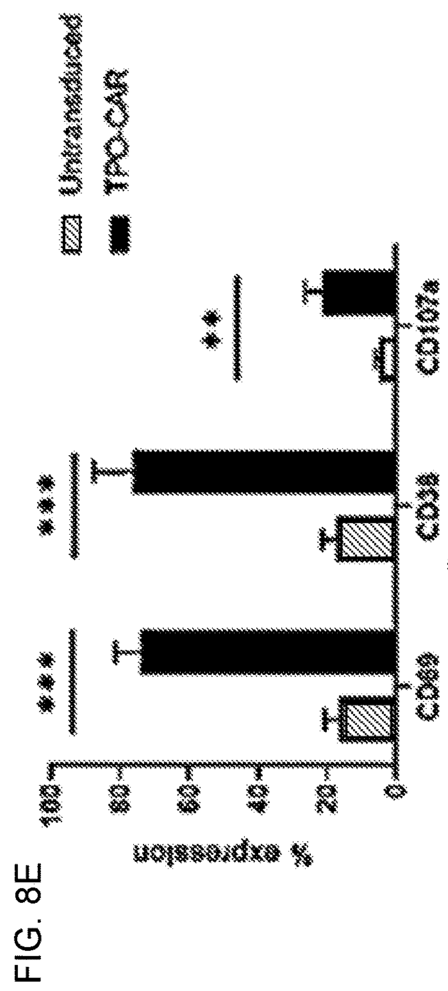
FIG. 8E shows activation of GFP+/−populations. A 4 hour co-culture experiment was set up with the NCO TPO-CAR and Mo7e target cell line to measure activation of the GFP+/−populations. After four hours, cells were washed and stained for flow cytometry analysis. Significant increases, as determined by 2-way ANOVA (P<0.001), were measured in the transduced TPO CAR population in the percentages of CD69 (16.67±4.16 vs 74.0±7.55, early marker of activation, P≤0.0001), CD38 (17.33±4.16 vs 76.33±11.5, long term marker of activation, P≤0.0001), and CD107a (5±1 vs 21.3±5.03, degranulation, P≤0.027).
Figure 8F:
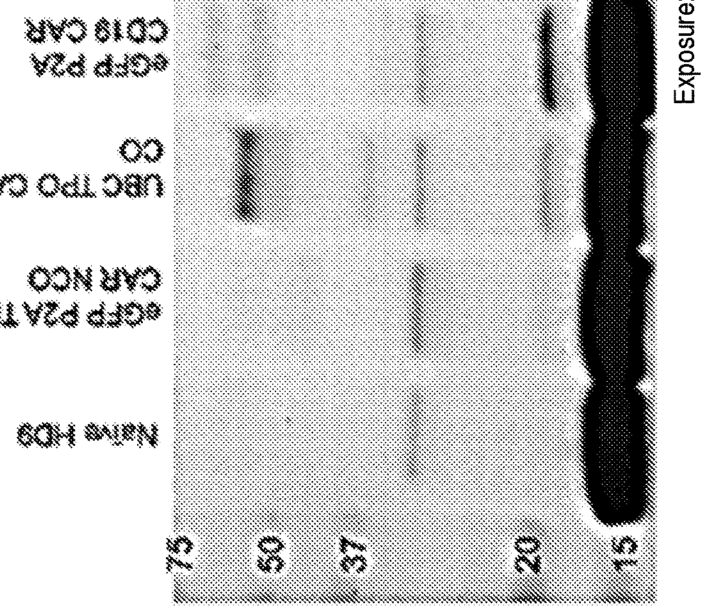
FIG. 8F is a Western blot from protein cell lysates (40 μg) loaded onto an SDS PAGE gel for Western blot analysis using CD3ζ and HRP for detection. After 315s of exposure, CD3ζ bands were detected in naïve T cells (HD9), the NCO TPO-CAR (CAR band: 43.35 kDa), CO TPO-CAR (CAR band: 55.64 kDa), and the control CD19 CAR (CAR band: 55.97 kDa). Vector copy number of the cells are shown to the right to demonstrate similar copy numbers. Data show more CAR in the CO TPO-CAR compared to the CD19 CAR and undetectable NCO TPO-CAR.

The TPO ligand was truncated at the 176 amino acid position and the resulting cDNA was cloned into a second generation lentiviral CAR construct (FIG. 8A). Human T cells were isolated from PBMCs and activated for 24 hours. T cells were then transduced and incubated for 18 hours. Five days post-transduction, cells demonstrated between 22-43% transduction efficiency by GFP (FIG. 8C) with vector copy numbers ranging from 0.20-0.96 copies (FIG. 8D). T cells transduced with the TPO-CAR and coincubated with the Mo7e cell line showed significantly increased percentages of CD69 (early activation marker), CD38 (long term activation marker), and CD107a (degranulation) (FIG. 8E). However, when TPO-CAR lysates were harvested and compared to control CD19 CAR T cells and non-transduced T cells, CAR expression lower compared to the CD19 CAR (FIG. 8F). Further analysis demonstrated proper sequencing of the genomic DNA and no significant difference in mRNA by northern blot between the CD19 CAR and TPO-CAR. To analyze whether there was an issue with the protein sequence and construct design, the linker sequence was substituted with the CH3 domain of IgG1 and that CAR construct was codon optimized using a custom codon usage bias table. The in silico optimization using a commercial algorithm was made from a custom table and termed codon optimized (CO) instead of species-specific or genome-based tables. Optimization parameters included removing the cis-acting motifs, destabilizing RNA structures, and minimizing GC content (FIG. 8B). To evaluate the new construct, T cells were isolated, activated, and transduced at a multiplicity of infection (MOI) of 50 with the lentiviral non codon-optimized (NCO) bicistronic vectors eGFP P2A TPO CAR (NCO TPO-CAR) or eGFP P2A CD19 CAR (CD19 CAR) or the codon-optimized monocistronic vector CO TPO-CAR. Lysates were harvested between days 5-7 post-transduction and CD3ζ expression was detected via western blot (FIG. 8F). In multiple donors, the CO TPO-CAR had greater protein expression compared to the NCO TPO-CAR and CD19 CAR.

Specific Activation and Cytotoxic Targeting of MPL+ Cells

Figure 9D:
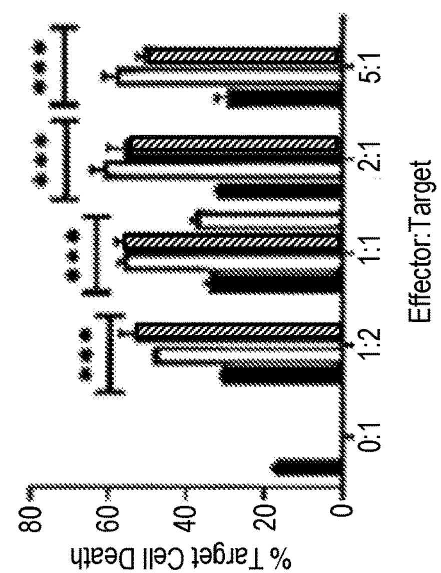
FIGS. 9A-R show activation, cytotoxicity and specificity of TPO-CAR. Target cells were stained with VPD450 proliferation dye or CFSE dye. Co-cultures were established and incubated for 12 hours and subsequently stained for CD3, CD69, CD38, MPL, Annexin V, and PI for flow cytometry. Activation after a 12 hour co-culture experiment was measured when cells were co-incubated with HEL (A), CMK (B), or Mo7e (C) cells. Activation was measured by surface expression of CD69 alone or CD69 and CD38. Data show one T cell donor with experimental triplicates; however, data are representative across donors. Significant increases in activation were seen across all cell lines and in all measures of activation compared to non-transduced T cells. *P<0.001 D-F: The TPO CAR cytotoxic potential was measured against HEL (D), MO7e (E), CMK (F) cells in 12 hour co culture assay. Increasing effector to target ratios (E:T) were tested including 0:1 (stained target cells alone), 1:1, 2:1, and 5:1 (y-axis) with non-transduced T cells, NCO TPO-CAR, and the CO TPO-CAR. The CD19 CAR was only tested at the 1:1 E:T ratio. Significant cell death was seen in the NCO TPO-CAR and CO TPO-CAR co-culture conditions compared to the non-transduced and CD19 CAR transduced T cells in all target cell lines. *p<0.001 G-I. Cytotoxicity assays from multiple donors were pooled and the effector to target ratio 1:1 was compared within each cell line. The NCO TPO-CAR and CO TPO-CAR significantly killed the HEL (G), CMK (H), and Mo7e (I) significantly better than the non-transduced T cells and CD19 CAR T cells in all donors. P<0.01 *P<0.001. J-M. After the co-culture cytotoxicity experiment, the remaining living target cells in the HEL (J-K) and CMK (L-M) cell lines were evaluated for remaining MPL expression and MFI. In the TPO-CAR conditions there was an appreciable decrease in surface MPL expression and MFI on remaining target in cytotoxicity data as effector:target ratios increased. Also, there was less MPL surface expression compared to target cells treated with naïve T cells. MPL— cells were stained with CFSE and MPL+ (HEL (N) and CMK (0)) cells were stained with VPD450. One hundred thousand cells from each cell line were mixed together and incubated with 100,000 TPO-CAR transduced T cells. Cytotoxicity was measured within the MPL—cells, K562 (15.7%±1.6) and 697 (21.4% 0.5), and the MPL+ HEL cells demonstrated cell death at 57.8%±1.3, P<0.0001 and 41.9±0.4, P<0.0001, respectively. When the experiment was repeated with HEL cells, K562's cytotoxicity due to the TPO-CAR was 11.7%±0.6 and 697's cytoxicity was 25.0%±5.74 versus CMK cytotoxicity of 83.6±8.6, P≤0.0001 and 76.1±1.0, P≤0.0001. The HEL cells and CMK cells showed significantly higher death than MPL—cells 697 or K562. Target cells HEL (P), CMK (Q), and Mo7e (R) were co-cultured+/−400 ng/mL of TPO with naïve T cells, NCO TPO-CAR T cells, or CO TPO-CAR T cells at a ratio of 1:1 for 12 hours. The addition of TPO caused a significant reduction in cytotoxicity in all three cancer cell lines when co-incubated with NCO TPO-CAR or CO TPO-CAR. The CMK cells and the Mo7e cells cultured with NCO TPO-CAR or CO TPO-CAR with TPO showed significantly greater cell death when compared to naïve T cell killing. Ordinary one-way ANOVA, **P<0.0001, *P<0.001
Figure 9E:
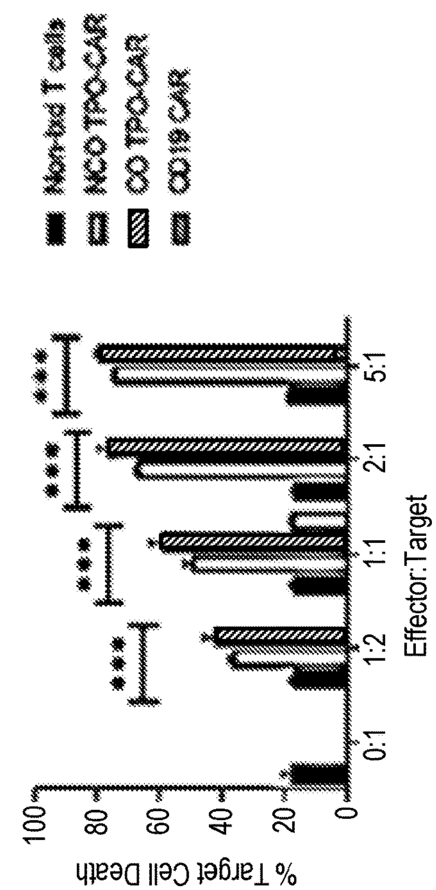
Figure 9F:
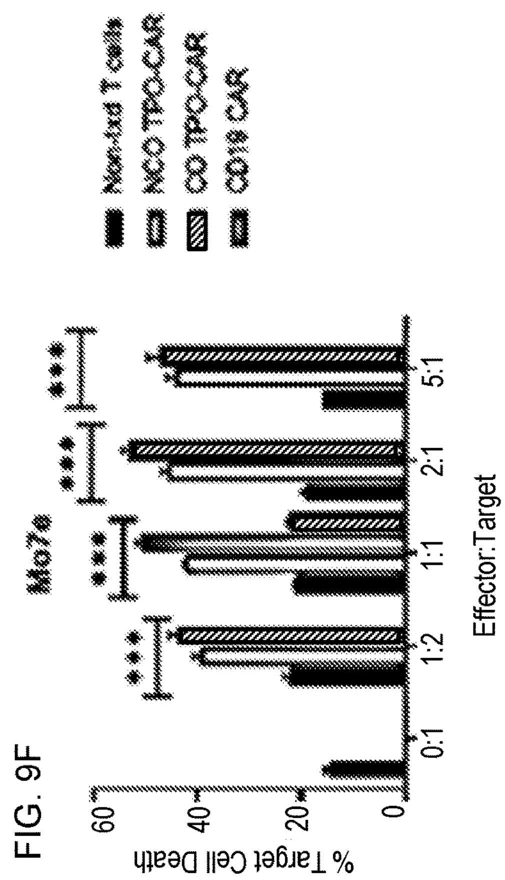

CAR activation induced by HEL, Mo7e, and CMK cells was measured after 12 hours of co-incubation by flow cytometry for CD69 and CD38 surface expression. Cells transduced with CO TPO-CAR showed significantly higher activation compared to the NCO TPO-CAR and non-transduced T cells following incubation with either of the three cell lines (P≤0.001). Additionally, the cells transduced with the NCO TPO-CAR significantly activated compared to non-transduced T cells against all three cell lines (FIG. 9A-C). In vitro cytotoxicity of the NCO and CO TPO CAR was evaluated against 3 MPL expressing leukemia cell lines as well as a T-cell acute lymphoblastic leukemia (ALL) cell line, Loucy, and B-cell leukemia cell line, 697. Both the NCO and CO TPO-CAR T cells significantly killed HEL, CMK, and Mo7e cells at effector to target ratios of 1:2, 1:1, 2:1, and 5:1 compared to non-transduced T cells and CD19 CAR T cells without significant cytotoxicity against non-MPL expressing leukemia cell lines (FIG. 9D-F). Comparison of the 1:1 ratio from multiple donors showed consistent killing of the CAR-modified cells compared to controls (FIG. 9G-I).

Figure 9L:
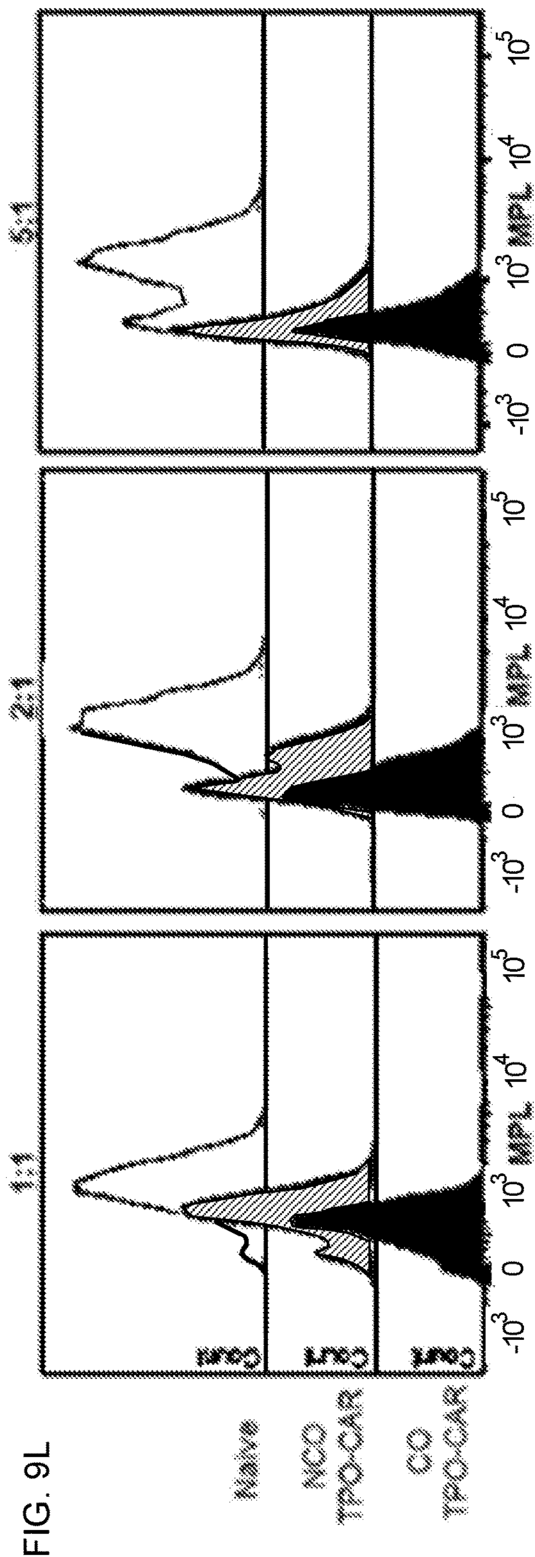
Figure 9M:
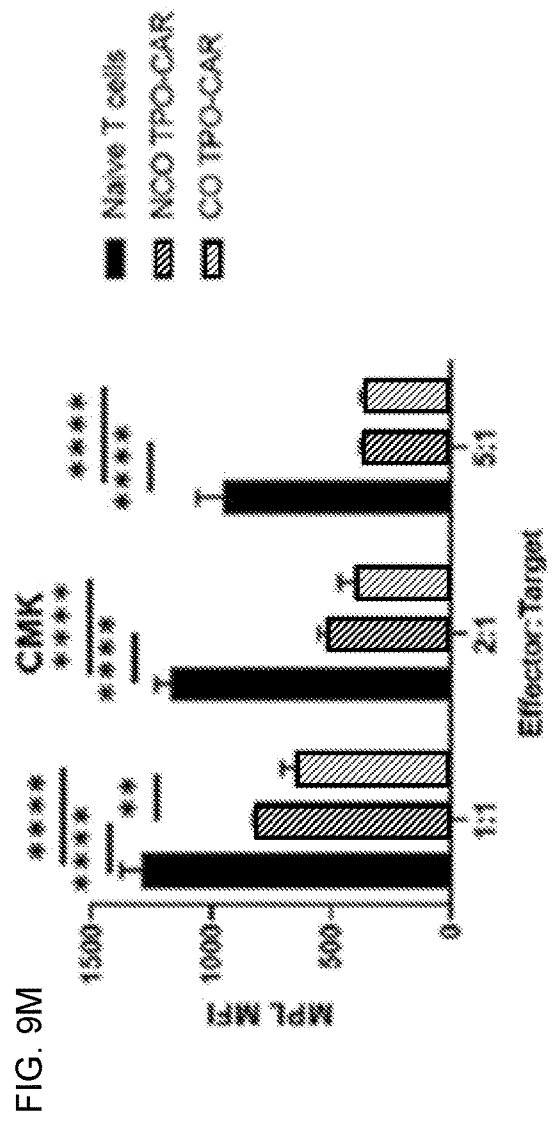

As a test of the specificity, the remaining live HEL (FIGS. 9J-K) and CMK (FIG. 9L-M) target cells after the cytotoxicity assay were screened for cell surface MPL expression. As expected, there was a clear decrease in live MPL positive cell percentages and MFI after coincubation with both the NCO and CO TPO-CAR compared to targets incubated with non-transduced T cells, suggesting TPO-CAR preferentially killed the MPL positive fraction of the leukemia cell lines. Further, TPO-CAR T cells were mixed with HEL target cells and the non-MPL expressing cells, such as K562 or 697 cells, at a 1:1:1 ratio. The NCO TPO-CAR T cells demonstrated minimal toxicity against K562 and 697, while achieving cytotoxicity against the HEL cell line (FIG. 9N). This was repeated with the CMK target cell line and similar results were achieved (FIG. 9O). Again, these data demonstrated significant killing of MPL+ cells compared to either MPL-cell line.

Finally, effector cells and target cell lines, HEL, CMK, and Mo7e were coincubated with/out superphysiological levels of recombinant human TPO. The TPO significantly impacted cytotoxicity with the NCO and CO TPO-CAR T cells, suggesting competition for the engagement of the MPL receptor (FIG. 9P-R). However, cytotoxicity with the CAR T cells against the Mo7e and CMK cell lines in the presence of TPO was still significantly greater than cytotoxicity from naïve T cells (P≤0.001) and further analysis using a dose response starting at physiological levels demonstrate the NCO and CO TPO-CAR significantly kill in the presence of TPO (FIG. 10A-C).

Utilizing the TPO-CAR for Targeting MPL In Vivo

Figure 11A:
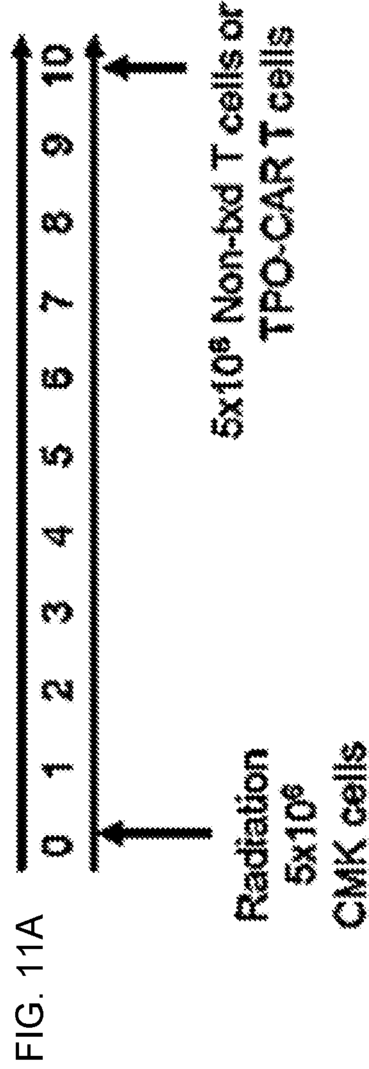
FIGS. 11A-E show the in vivo effectiveness of TPO-CAR in leukemia xenografts. Schematic (A) shows the design of a NSG mouse experiment to test the non-transduced T cells (non-txd) and CO TPO-CAR T cells against the CMK cell line. Mice received low dose radiation to facilitate engraftment of CMK cells and were administered $5\times10^6$ CMK cells modified with luciferase. Ten days after, mice received $5\times10^6$ T cells. Survival curves (B), to day 40 from the start of treatment, show no significant survival advantage among animals that received non-transduced (non-txd) T cells (N=4) or CO TPO-CAR T cells (N=4) in a CMK leukemia model. The CMK cell line was stimulated with recombinant TPO, or media from naïve T cells, NCO TPO-CAR T cells+/−a polyclonal TPO antibody, or CO TPO-CAR T cells+/−a polyclonal TPO antibody for 45 minutes. Representative histograms (C), percentage of pSTAT5 (D) and the MFI (E) demonstrate pSTAT5 staining significantly increased in the presence of conditioned media but it could be blocked with the TPO antibody. **P<0.0001, *P<0.001
Figure 11B:
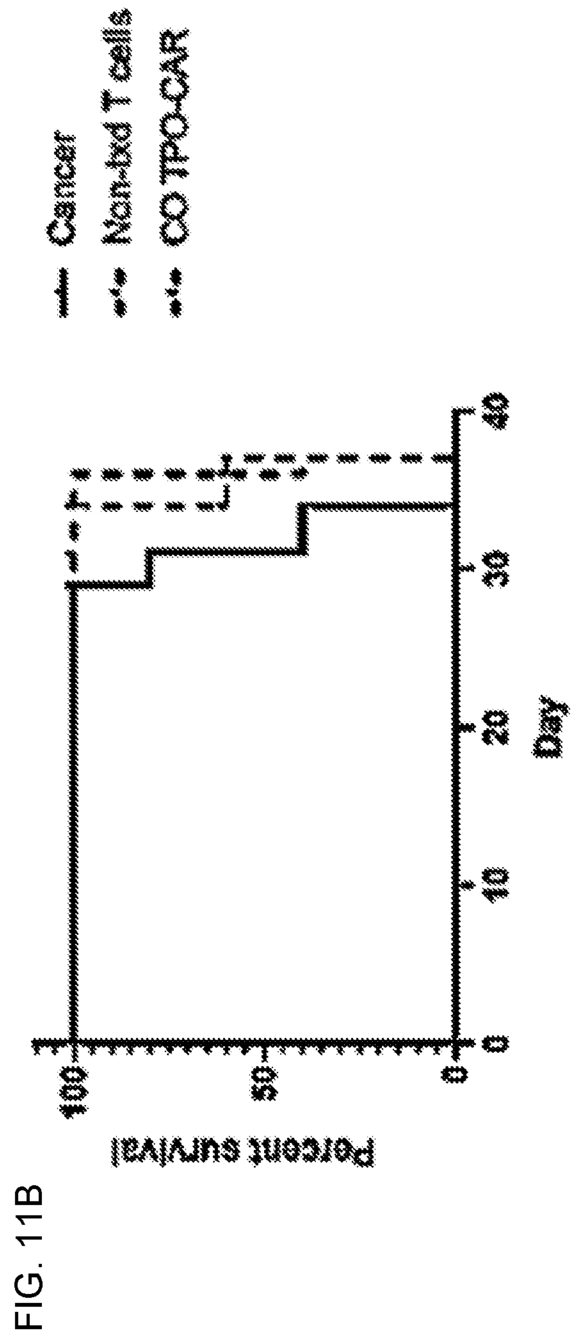
Figure 11C:
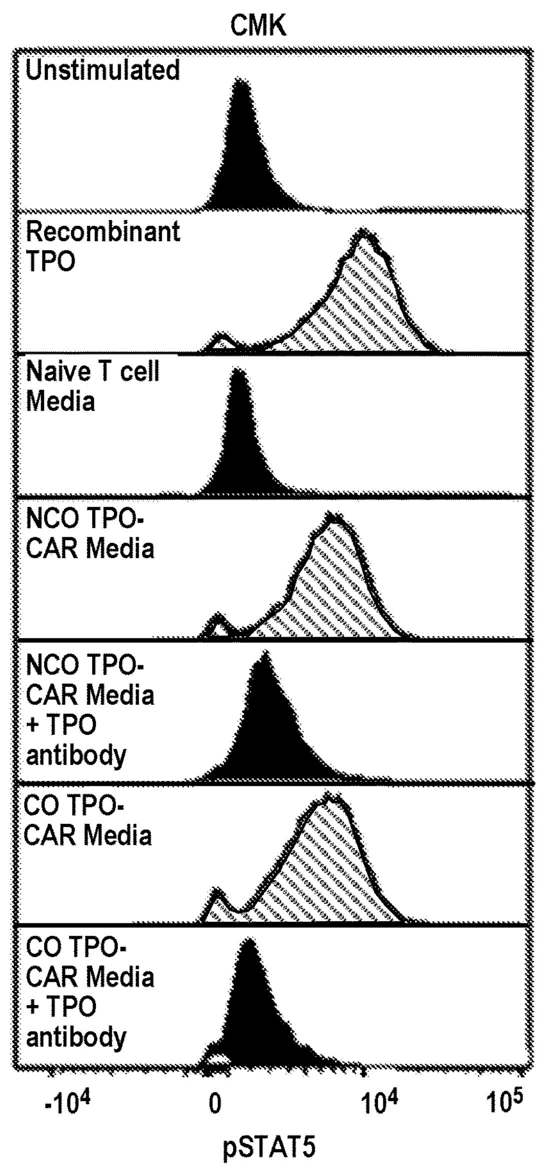
Figure 11D:
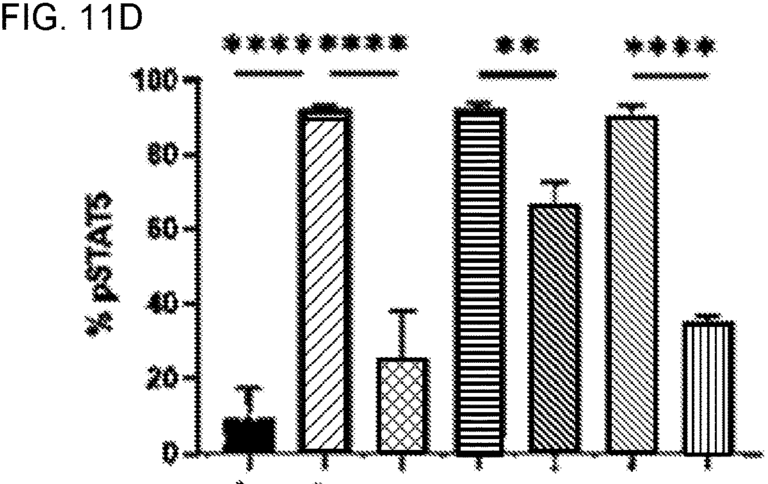
Figure 11E:
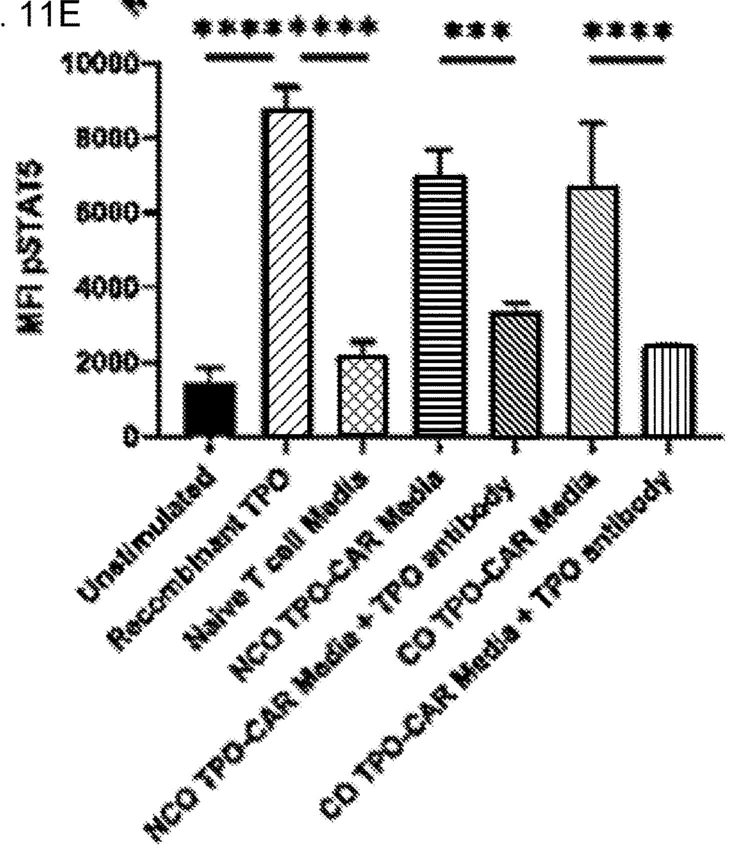
Figure 12B:
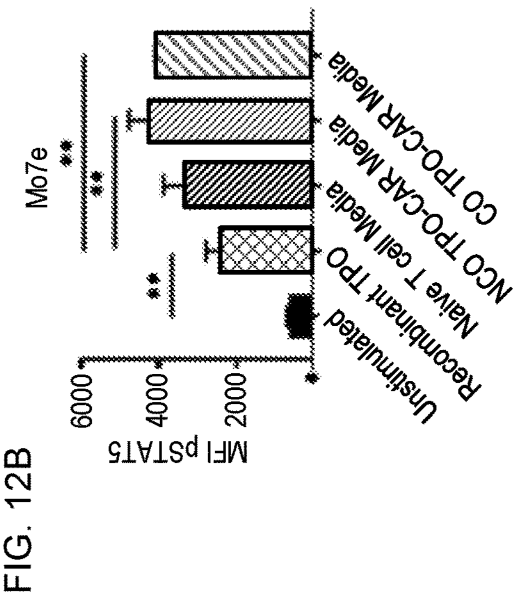
FIGS. 12A-I show measurements of pSTAT5 in cells after stimulation with TPO. Cancer cells including Mo7e (A-C), HEL (D-F), and CMK (G-I) cells were stimulated with recombinant TPO, or media from naïve T cells, NCO TPO-CAR T cells, or CO TPO-CAR T cells. pSTAT5 expression was measured by flow cytometry and representative histograms are represented in A, D, and G, MFI of pSTAT5 in B, E, and H, and percent of pSTAT5 in C, F, and I. Data demonstrate that there were significant increases in MFI and % pSTAT percent from unstimulated cancer cells as compared to cells stimulated with recombinant TPO. Mo7e cells were stimulated by naïve T cell media. Therefore, increases in pSTAT5 were not detected with NCO or CO TPO-CAR T cells. HEL cells demonstrated increases in MFI and pSTAT5 percent with the NCO TPO-CAR T cells compared to naïve T cell media and CO TPO-CAR T cells. The CMK cell line demonstrated significant increases in pSTAT5 MFI and percent with NCO TPO-CAR media and CO TPO CAR T cell media.
Figure 12C:
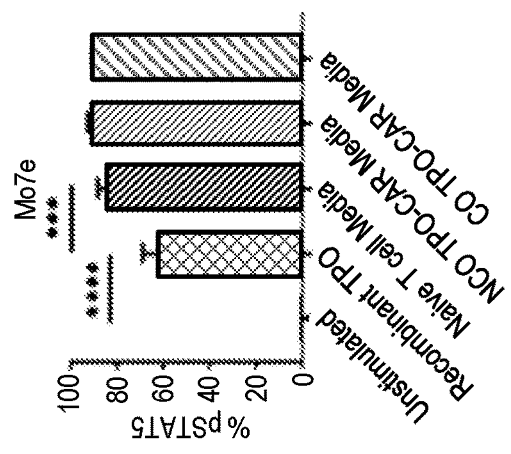
Figure 12A:
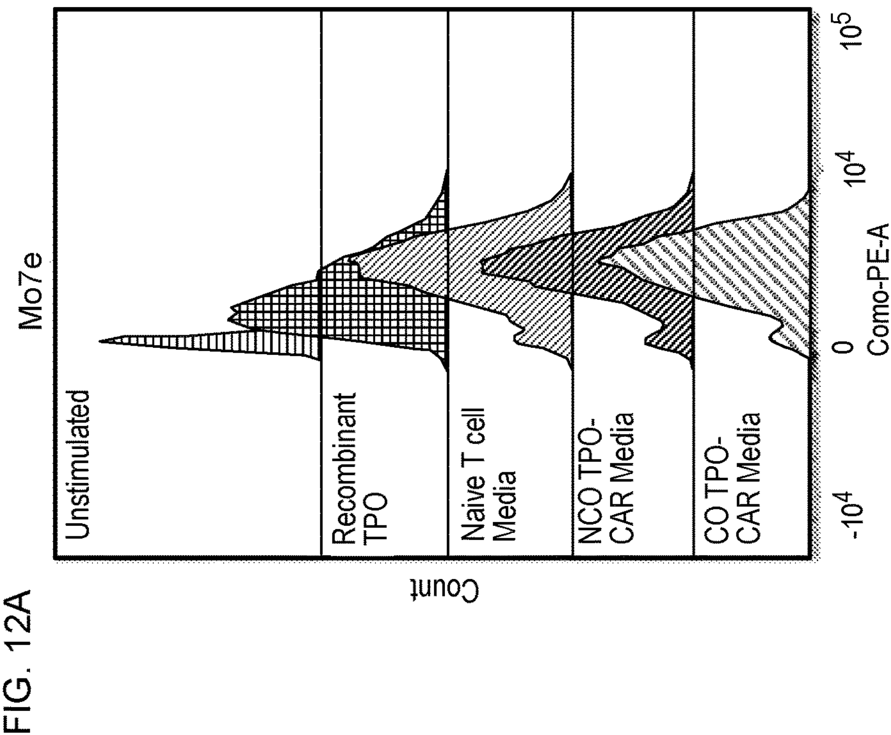
Figure 12E:
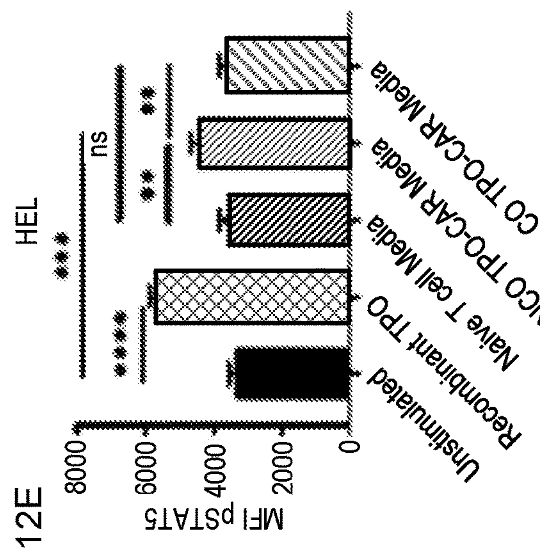
Figure 12F:
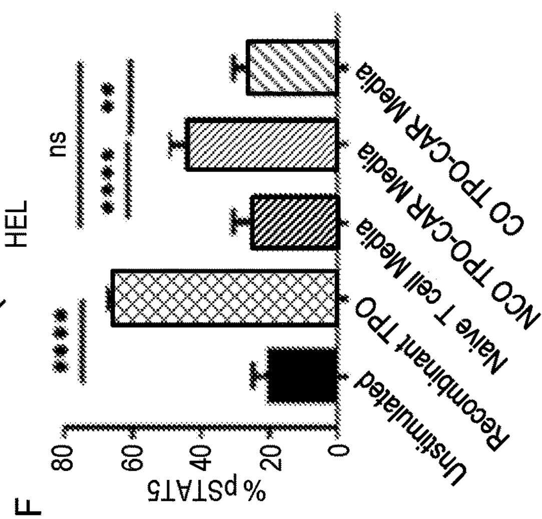
Figure 12D:
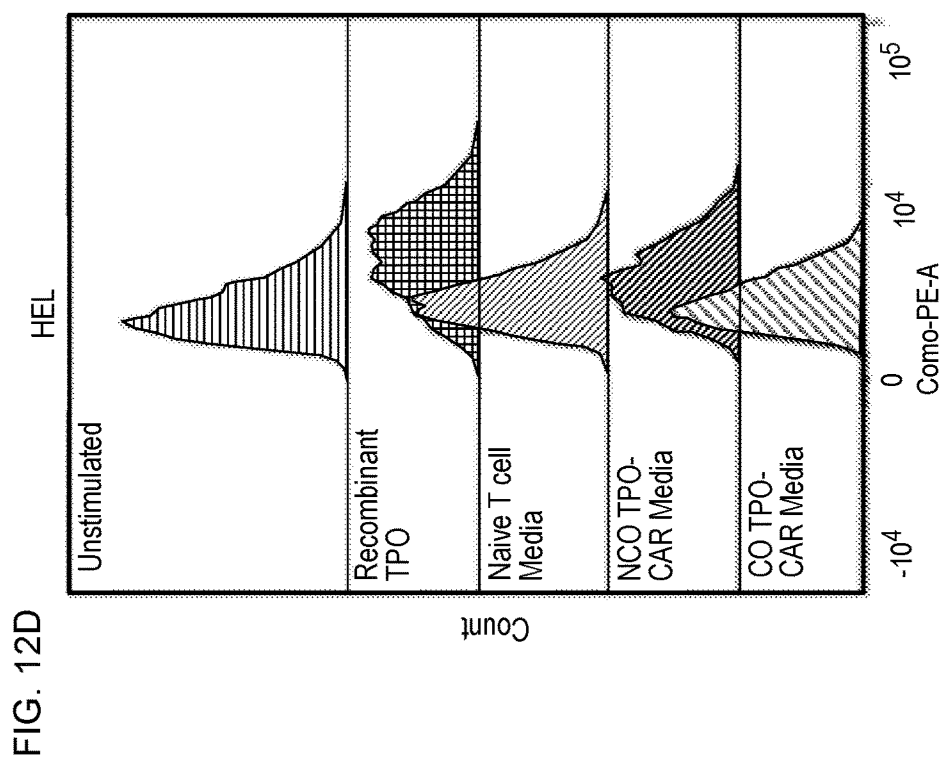
Figure 12H:
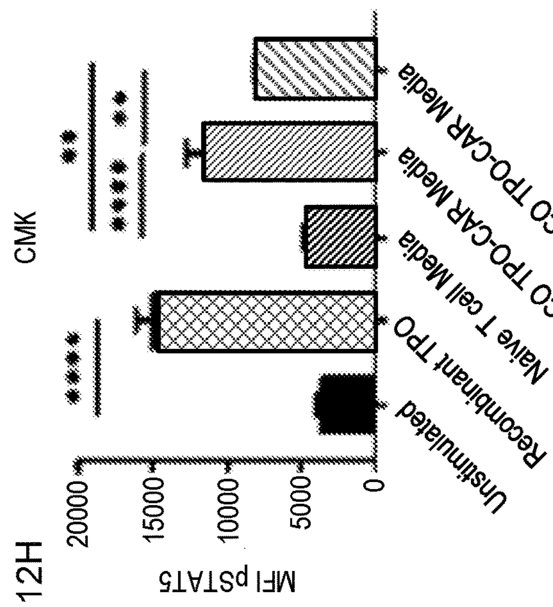
Figure 12I:
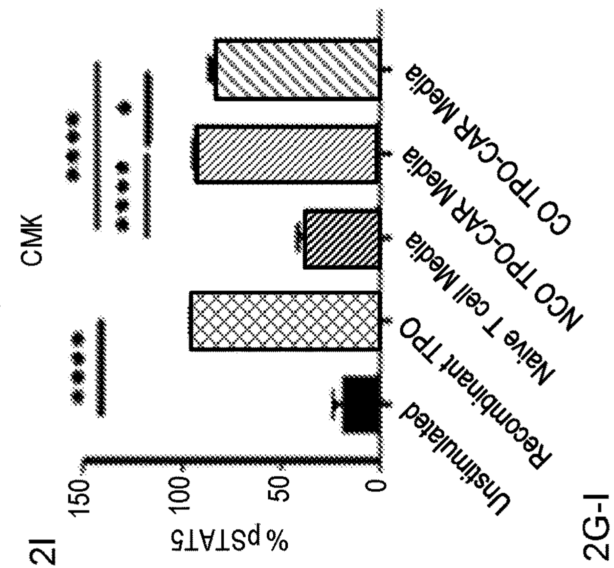
Figure 12G:
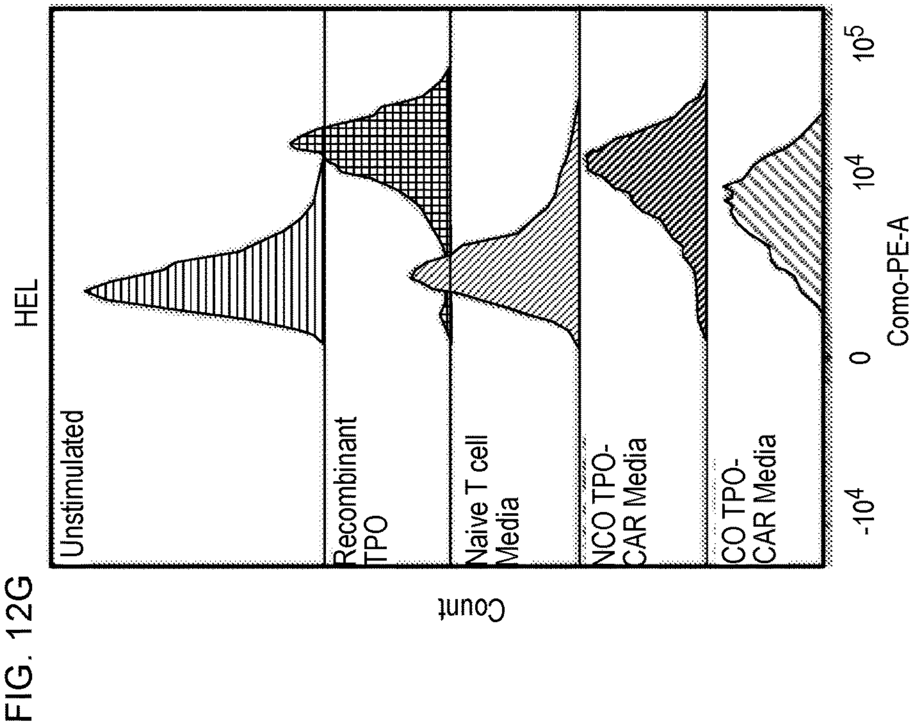

The CO TPO CAR, due to its higher protein expression, in vivo against the CMK cell line (FIG. 11A) was tested. NOD.Cg-Prkdc$^{scid}$Il2rg$^{tm1Wjl}$/SzJ (NSG) mice were irradiated with 100 Rads and injected intravenously with a luciferase positive CMK cell line. Ten days after cancer cells were injected, $5\times10^6$ non-transduced T cells (N=4) or CO TPO-CAR T cells (N=4) were intravenously injected. The mice were imaged and weighed regularly to evaluate cancer progression and overall health. Mice tolerated infusion of the modified T cells and showed no signs of weight loss or change in activity. Interestingly, mice treated with non-transduced T cells and the CO TPO-CAR T cells succumbed to sickness between days 34-37 (FIG. 11B). It was hypothesized that these results could be due to the shedding of TPO from the membrane-bound CAR acting as a survival advantage for the cancer cells or CO TPO-CAR was too toxic to the stem cell compartment, resulting in no survival benefit. To test these hypotheses, media was first harvested from transduced T cells and naïve T cells and a pSTAT5 activation assay was performed to demonstrate if shed TPO would cause activation of cancer cells (FIG. 12A-I). The data show there was a significant activation of pSTAT5 by the T cell media of the NCO TPO-CAR T cells in the HEL and CMK cell line and the CO TPO-CAR T cells in the CMK cell line, suggesting that shedding may be a significant problem when utilizing ligand-based CARs. Interestingly, induction of pSTAT5 was blocked by using an antibody to TPO in the CMK cell line (FIG. 11C-E).

To analyze bone marrow suppression, at the time of euthanasia from the in vivo experiment, the bone marrow cell counts in two femurs in mice that received non-transduced compared to CO TPO-CAR T cells in the LK (lineage-, c-kit+) compartment was $4.46\times10^4\pm2.3\times10^4$ vs $1.99\times10^4\pm1.8\times10^4$ and LSK (LK, Sca-1+) was $3.22\times10^4\pm9.2\times10^3$ vs $1.85\times10^4$ $1.6\times10^4$. Additionally, mice treated with CO TPO-CAR had 12.6±6.9% T cells in the bone marrow and 70.9±4.7% were activated by CD69. These results suggest the CO TPO-CAR demonstrated greater on-target off-tumor toxicity; thus, the experiment outlined in FIG. 11A was repeated with a new donor, and the mice were sacrificed at day 30 to evaluate cancer burden and the bone marrow compartment.

Figure 14E:
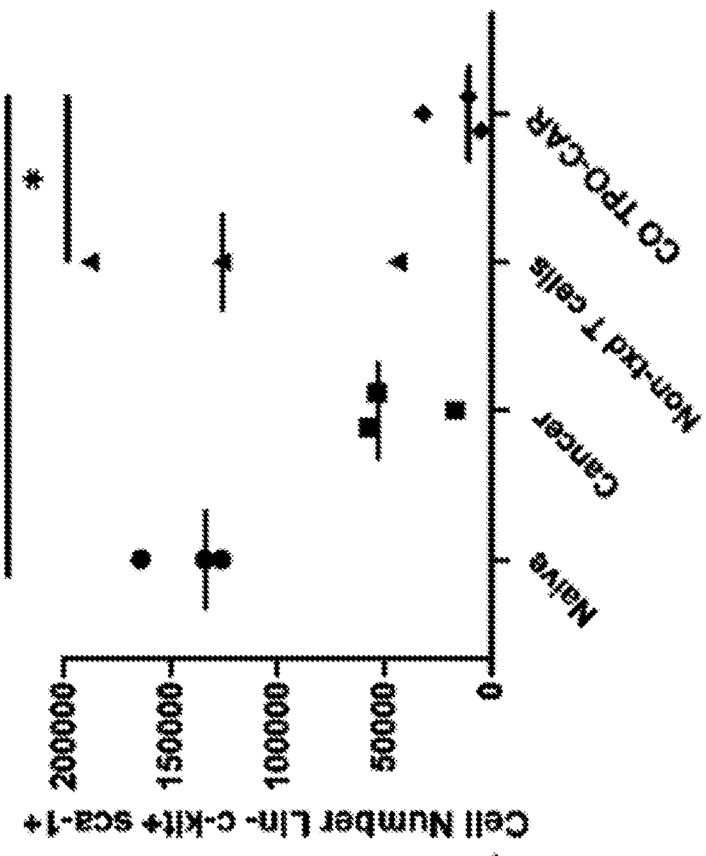
Figure 14D:
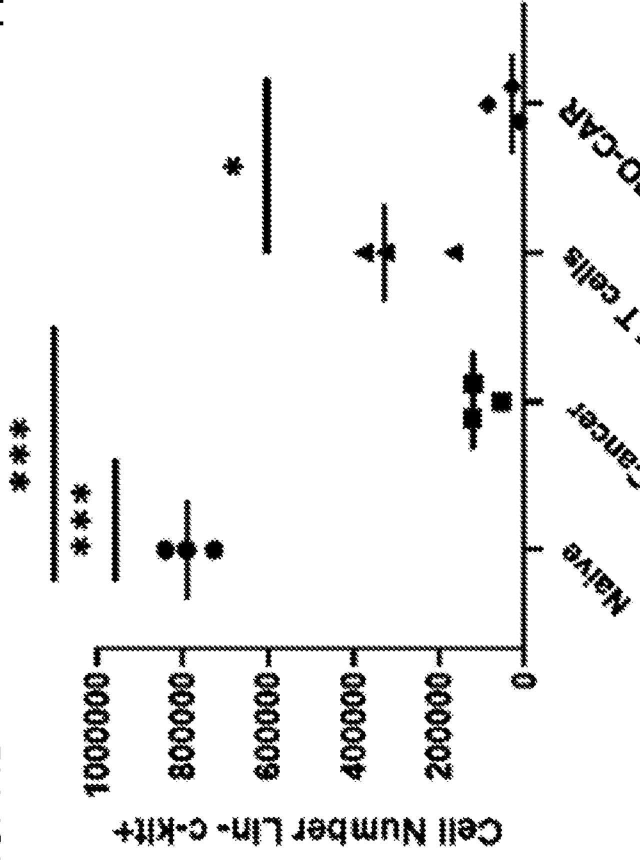

Mice were euthanized on day 30, after blood was drawn to evaluate overall health in complete blood counts (FIG. 13A-M). Spleens were dissociated for flow cytometry analysis. Spleens from the cancer only mice and the mice that received the CO TPO-CAR T cells were analyzed for the amount of MPL expression on the remaining cancer cells. Cancer cells were defined by human CD3− and CD33+. Animals receiving the CO TPO-CAR compared to cancer alone showed a significant reduction in MPL surface expression (FIG. 14A-C). These results confirmed our in vitro data demonstrating the TPO-CAR is specific for MPL+ cells. In addition, bone marrow was tested for depletion by measure the LK and LSK compartments in two femurs. The data suggests all mice receiving cancer cells had some reduction in the amount of bone marrow in the LK compartment (FIG. 14D, P≤0.001). Mice receiving CO TPO-CAR T cells compared to mice injected with non-transduced T cells showed a significant reduction in the LK and the LSK compartment (FIG. 14E, P≤0.05).

A ligand-based CAR targeting the MPL receptor for leukemic cancer stem cell clearance was designed. A cancer stem cell population was pursued due to their chemo resistance and ability to self-renew, making MPL an ideal candidate to treat leukemic stem cells and prevent relapse. MPL has limited expression in healthy tissues, making the on-target, off-tumor side effects more predictable and manageable. Furthermore, AML was successfully targeted using the TPO-CAR targeting MPL described herein. This is the first report of a CAR designed to target MPL using a novel ligand-based approach.

The initial CAR design displayed low-level expression compared to a control CD19 CAR, despite significant functional output. Codon optimization was used to robustly enhance CAR expression. Both the initial CAR and the codon-optimized CAR were used pursue specific cytotoxicity and activation of MPL positive populations of cells. In vitro studies verified the functionality of the CAR including activation by multiple indicators and cytotoxicity experiments with multiple cell lines. The data supported the conclusion that the ligand-based CARs were specifically targeting the MPL+ population.

In vivo testing of the CO TPO-CAR was performed using an immune compromised megakaryocytic leukemia model. It was found that the CO TPO-CAR treated animals were succumbing shortly after the untreated animals that received cancer. It was hypothesized that this was due to on-target, off-tumor side effects or the CO TPO-CAR's specific cytotoxicity against MPL+ cancer cells allowed for outgrowth of MPL-populations. Due to the CO TPO-CAR being more highly expressed by western blot compared to the NCO TPO-CAR, it was anticipated that the higher protein expression of the CO TPO-CAR could more rapidly clear bone marrow, leading to suppressed hematopoiesis. CAR effects in the stem cell compartment were viewed as a potential benefit, as a bridge to allogeneic HSC transplantation, possibly without the need for genotoxic conditioning. Many patients presenting with this level of disease in the MPL+ leukemias typically have a poor prognosis and will eventually need a bone marrow transplant following initial treatment (Yogarajah and Tefferi, "Leukemic Transformation in Myeloproliferative Neoplasms: A Literature Review on Risk, Characteristics, and Outcome," *Mayo Clin Proc.* 92(7):1118-1128 (2017)).

Mice that received cancer cells alone or cancer cells with CO TPO-CAR T cells were evaluated for in vivo targeting of MPL+ leukemia cells. Observations showed that the TPO-CAR was targeting MPL+ cells, thereby verifying in vitro results. Due to previous findings suggesting MPL+ LSCs are resistant to chemotherapy, it is entirely possible that this CAR could be paired with chemotherapy, which would target MPL—populations of cancer cells. In addition to targeting MPL+ leukemias, the data provided herein suggests there is suppression in the bone marrow compartment of mice administered TPO-CAR. This can be partially due to the CAR clearing the bone marrow HSPCs, but could be an effect of the inflammatory bone marrow milieu, from human T cell activation and proliferation in the mouse bone marrow, leading to bone marrow suppression. To manage this, a suicide switch could be introduced into the CAR or an alternative short-lived immune cell source, such as a γδ T cells or NK cells, could be utilized (Zoine et al., "Ex vivo expanded patient-derived gamma delta T-cell immunotherapy enhances neuroblastoma tumor regression in a murine model," *Oncoimmunology.* 8(8):1593804 (2019)); Rosenberg et al., "Adoptive cell transfer: a clinical path to effective cancer immunotherapy," *Nat Rev Cancer.* 8(4):299-

308 (2008)); Patel et al. "Beyond CAR T Cells: Other Cell-Based Immunotherapeutic Strategies Against Cancer," *Front Oncol.* 9:196 (2019)); Martinez and Moon, "CAR T Cells for Solid Tumors: New Strategies for Finding, Infiltrating, and Surviving in the Tumor Microenvironment," *Front Immunol.* 10:128 (2019)).

In summary, these analyses showed successful transduction of naïve T cells using a lentiviral TPO-CAR construct. Further, TPO-CAR T cells were capable of specific activation by binding to MPL positive cell lines, depletes HSCs, and effectively kills MPL+ cancer cells specifically in vitro and in vivo.

While there are avenues for turning the CAR off to prevent toxicity to the healthy bone marrow compartment, an alternative would be to allow the TPO-CAR to function as a non-genotoxic HSCT conditioning regimen and then turn the CAR off prior to infusion of healthy donor HSPC. Being that CAR therapy is advancing to target multiple antigens in one cellular product, one could adopt this strategy to target MPL and another antigen highly expressed on the surface. Optionally, this could be to extend the use of this CAR to all relapsed hematopoietic cancers that have MPL expression on the surface.

Example III

Stem Cell Factor Chimeric Antigen Receptor (SCF-CAR) Design

Chimeric antigen receptors (CARs) are chimeric proteins developed for the purpose of activating T cells to deplete a certain cell type with the associated receptor on its surface in an MHC-independent manner. In some examples, CARs comprise i) an antigen binding domain to bind the antigen of interest and ii) a transmembrane domain. In other example, CARs comprise i) an antigen binding domain to bind the antigen of interest and ii) an intracellular signaling domain to induce T-cell associated activation and cytotoxicity. The intracellular signaling domains consist of one-to-two costimulatory domains, and the one main T cell activation domain CD3ζ. Optionally, there is one additional portion that can be used to connect the antigen binding domain and the intracellular signaling domains, which is known as the hinge region.

Figure 15:
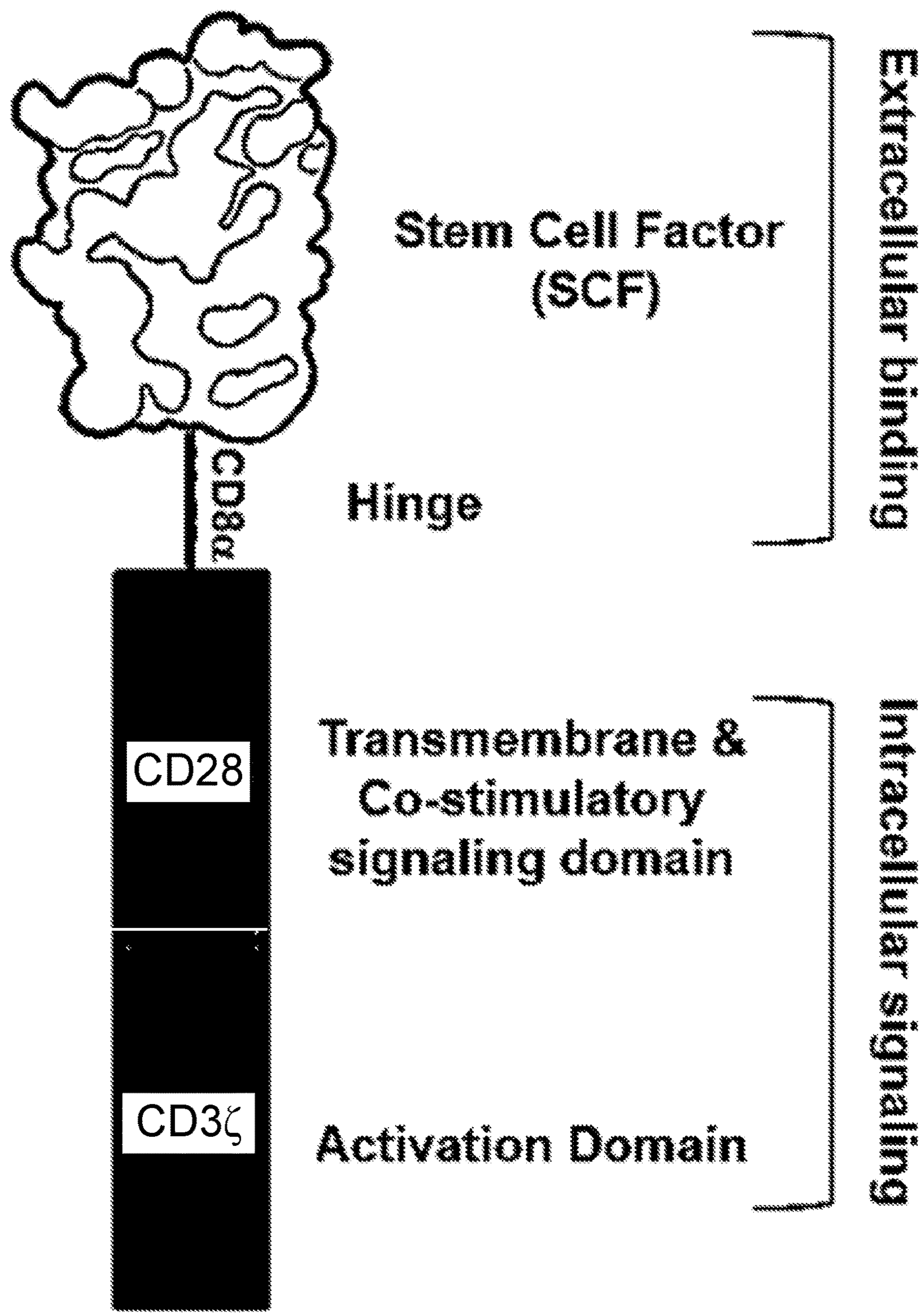
FIG. 15 is a schematic of a stem cell factor (SCF) CAR construct. The SCF CAR construct includes the full murine stem cell factor (SCF) ligand fused to portions of CD8α to serve as a hinge region. This is then fused to the transmembrane and costimulatory signaling domains of the co-stimulatory molecule CD28. Finally, the end of the product is fused to the main signaling domain of the TCR, CD3ζ. The entirety of this product is expressed on the surface of cells, with the SCF and CD8α regions serving as the extracellular binding region, and the CD28 and CD3ζ serving as the intracellular signaling region.

The CAR described herein, SCF CAR, aimed to target a receptor known to be expressed on hematopoietic stem cells, known as c-kit (CD117). In contrast to the traditional CAR design, the SCF CAR is ligand-based, where the natural ligand is utilized as the extracellular binding domain of the CAR rather than an antibody-based scFv. The design of this CAR is as follows: the natural ligand stem cell factor (SCF) or a binding portion thereof is fused to a CD8α hinge region, followed by fusion to the transmembrane and intracellular portions of the co-stimulatory molecule CD28, then the intracellular signaling domain of CD3 ζ(FIG. 15). The murine SCF sequence was used instead of the human sequence, to allow for preliminary optimization in mice. Human SCF does not cross react with murine c-kit, but murine scf does cross react with human c-kit. However, the sequences for the rest of the construct (CD8α, CD28, CD3ζ) were all human.

Figure 16:
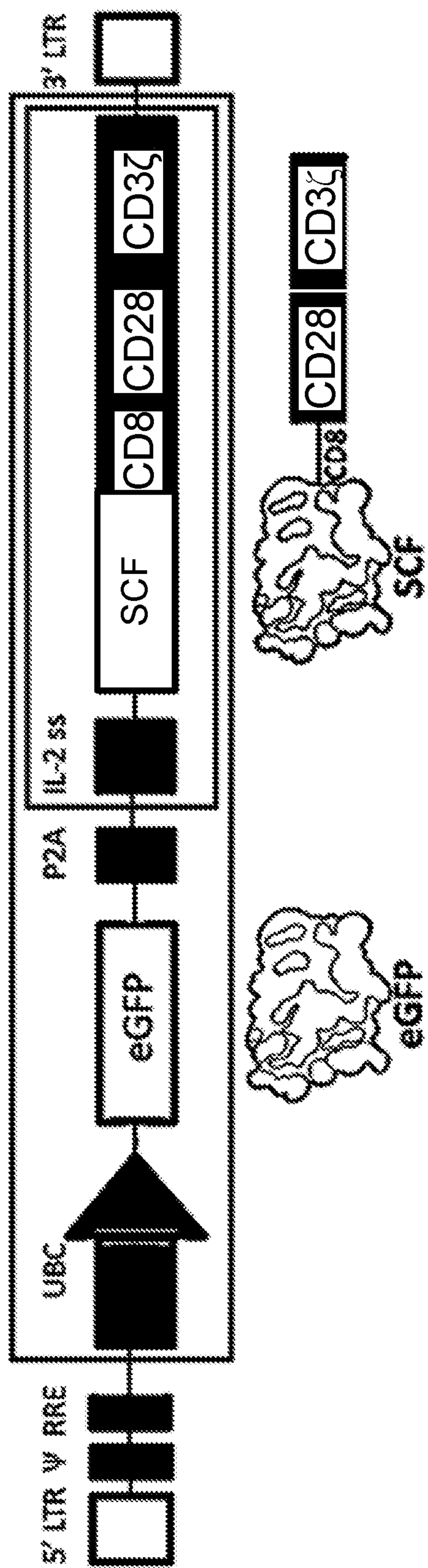
FIG. 16 is a schematic of a transgene construct. The transgene is flanked by both a 5' long terminal repeat (5' LTR) and a 3' long terminal repeat (3' LTR) in addition to the Ψ region and RRE, which collectively aid in lentiviral packaging and transgene insertion. The UBC promoter allows for the expression of both eGFP and the SCF CAR by the P2A ribosomal skipping sequence. The CAR is then brought to the surface of the cell via the IL-2 signal sequence (IL-2 ss), which is cleaved from the top of the construct after appropriate intracellular packaging. A genomic representation of the construct (upper panel) and a protein representation (lower panel) are shown.

The SCF CAR was cloned into a bicistronic vector encoding an enhanced green fluorescent protein (eGFP) and the SCF CAR via the inclusion of a P2A ribosomal skipping sequence. The construct also included an IL-2 signal sequence (IL-2 ss) that served to appropriately package the CAR to allow for surface expression. The signal sequence will be cleaved off of from the rest of the construct during this process. The entire construct was under the control of a UBC promoter and contains the appropriate sequences for lentiviral packaging and transgene insertion (FIG. 16).

Codon Optimization

The SCF CAR was codon optimized using a custom codon optimization table for efficient translation in hematopoietic cells. The optimized sequence is from the beginning of the IL-2 signal sequence (ss) to the end of the CD3ζ, which was optimized using a custom codon optimization table (the optimized sequence is schematically shown in FIG. 16,). The following sequence in bold and underlined is the original sequence that was subsequently optimized:

(SEQ ID NO: 16)

ATGTACAGGATGCAACTCCTGTCTTGCATTGCACT

AAGTCTTGCACTTGTCACGAATTCGGGCGCGCCTA

AGGAGATCTGCGGGAATCCTGTGACTGATAATGTA

AAAGACATTACAAAACTGGTGGCAAATCTTCCAAA

TGACTATATGATAACCCTCAACTATGTCGCCGGGA

TGGATGTTTTGCCTAGTCATTGTTGGCTACGAGAT

ATGGTAATACAATTATCACTCAGCTTGACTACTCT

TCTGGACAAGTTCTCAAATATTTCTGAAGGCTTGA

GTAATTACTCCATCATAGACAAACTTGGGAAAATA

GTGGATGACCTCGTGTTATGCATGGAAGAAAACGC

ACCGAAGAATATAAAAGAATCTCCGAAGAGGCCAG

AAACTAGATCCTTTACTCCTGAAGAATTCTTTAGT

ATTTTCAATAGATCCATTGATGCCTTTAAGGACTT

TATGGTGGCATCTGACACTAGTGACTGTGTGCTCT

CTTCAACATTAGGTCCCGAGAAAGATTCCAGAGTC

AGTGTCACAAAACCATTTATGTTACCCCCTGTTGC

AGCCGCTAGCACCACTACCCCGGCCCCTAGGCCCC

CTACTCCAGCGCCAACTATAGCATCACAGCCTTTG

AGCTTGAGGCCCGAAGCTTGCAGACCGGCGGCAGG

GGGGGCTGTGCATACAAGGGGCCTCGACTTTGCCT

GCGACATCGATAATGAGAAGAGCAATGGAACCATT

ATCCATGTGAAAGGGAAACACCTTTGTCCAAGTCC

CCTATTTCCCGGACCTTCTAAGCCCTTTTGGGTGC

TGGTGGTGGTTGGTGGAGTCCTGGCTTGCTATAGC

TTGCTAGTAACAGTGGCCTTTATTATTTTCTGGGT

GAGGAGTAAGAGGAGCAGGCTCCTGCACAGTGACT

ACATGAACATGACTCCCAGGAGGCCTGGGCCAACC

CGCAAGCATTACCAGCCCTATGCCCCACCACGCGA

CTTCGCAGCCTATCGCTCCAGCAGGAGCGCAGACG

CTCCCGCGTACCAGCAGGGCCAGAACCAGCTCTAT

AACGAGCTCAATCTAGGACGAAGAGAGGAGTACGA

TGTTTTGGACAAGAGACGTGGCCGGGACCCTGAGA

-continued

TGGGAGGCAAGCCGAGAAGGAAGAACCCTCAGGAA

GGCCTGTACAATGAACTGCAGAAAGATAAGATGGC

GGAGGCCTACAGTGAGATTGGGATGAAAGGCGAGC

GCCGGAGGGGCAAGGGGCACGATGGCCTTTACCAG

GGTCTCAGTACAGCCACCAAGGACACCTACGACGC

CCTTCACATGCAGGCCCTGCCTCCTCGCTGA

Sequences neither bolded nor underlined are the portions that were not optimized. These portions include the sequences for the restriction enzymes XbaI, AscI, NheI, and SalI. The exclusion of the restriction enzyme sequences from the codon optimization is to allow for the sequence to be cloned into the lentiviral expression vector and the remainder of the transgene. Two additional restriction enzyme sites were included just before the beginning and after the end of the sequence for stem cell factor. This will ensure that the antigen binding specificity of the construct can be removed and replaced with another, without the need for additional codon optimization of the entire construct again. The final, optimized product is as follows:

(SEQ ID NO: 17)

ATCGATCGTTCGGTCAGTCGCAATTCCTCTCTAGA

ATGTACAGGATGCAGCTGCTGAGCTGCATCGCCCT

GTCCCTGGCTCTGGTGACCAACAGCGGCGCGCCTA

AGGAGATCTGCGGCAACCCCGTGACCGACAATGTG

AAGGATATCACCAAGCTGGTGGCCAACCTGCCAAA

TGACTACATGATCACCCTGAACTACGTGGCTGGCA

TGGACGTGCTGCCCAGCCACTGCTGGCTGAGGGAT

ATGGTGATCCAGCTGAGCCTGTCCCTGACCACCCT

GCTGGACAAGTTCAGCAACATCTCCGAAGGCCTGA

GCAATTACTCCATCATCGATAAGCTGGGCAAGATC

GTGGACGATCTGGTGCTGTGCATGGAGGAAAACGC

CCCCAAGAATATCAAGGAGAGCCCCAAGAGGCCAG

AAACCAGATCCTTCACCCCAGAGGAATTCTTCAGC

ATCTTCAATAGGTCCATCGACGCCTTCAAGGATTT

CATGGTGGCCAGCGACACCTCCGATTGCGTGCTGA

GCTCCACCCTGGGACCAGAGAAGGATAGCAGAGTG

TCCGTGACCAAGCCATTCATGCTGCCCCCAGTGGC

CGCTGCTAGCACCACCACCCCAGCTCCAAGACCCC

CAACCCCAGCTCCAACCATCGCCAGCCAGCCACTG

TCCCTGAGGCCCGAGGCTTGCAGGCCCGCTGCTGG

AGGCGCCGTGCACACCAGGGGCCTGGACTTCGCCT

GCGACATCGATAACGAAAAGAGCAATGGCACCATC

ATCCACGTGAAGGGCAAGCACCTGTGCCCAAGCCC

ACTGTTCCCAGGACCATCCAAGCCATTCTGGGTGC

TGGTGGTGGTGGGAGGAGTGCTGGCTTGCTACAGC

-continued

CTGCTGGTGACCGTGGCCTTCATCATCTTCTGGGT

CAGGAGCAAGAGATCCAGGCTGCTGCACTCCGACT

ACATGAACATGACCCCAAGGAGGCCCGGCCCAACC

AGAAAGCACTACCAGCCATACGCTCCACCAAGGGA

CTTCGCTGCTTACAGAAGCTCCAGGTCCGCTGATG

CTCCAGCTTACCAGCAGGGACAGAATCAGCTGTAC

AACGAGCTGAATCTGGGCAGGAGAGAGGAATACGA

CGTGCTGGATAAGAGGAGAGGCAGAGATCCCGAAA

TGGGCGGCAAGCCAAGGAGAAAGAACCCCCAGGAG

GGCCTGTACAATGAACTGCAGAAGGACAAGATGGC

TGAGGCCTACAGCGAAATCGGCATGAAGGGCGAGA

GGAGAAGGGGCAAGGGCCACGATGGCCTGTACCAG

GGCCTGTCCACCGCTACCAAGGACACCTACGATGC

TCTGCACATGCAGGCCCTGCCCCCAAGGTGAGTCG

ACGAATGGCCGGGAAAGGTACATAGCTAGCT

All codon optimization was performed by GenScript (Piscataway, NJ) using a custom codon optimization table. This construct was then ordered in a pUC57 plasmid for cloning in competent bacterial cells. It was delivered in 4 μg and was resuspended in Molecular Biology Grade Water to make a final concentration of 100 ng/μL and was called SCF ligand_pUC57.

Sequencing was performed using multiple forward and reverse primers to ensure the entire construct has been sequenced. The sequencing for both constructs had the expected sequence, and the constructs have sequenced correctly from before the UBC promoter to just before the 3' LTR (FIG. 16), with the construct SCF CAR-3c1 (SCF CAR) eventually moving forward for additional studies. The nucleotide sequence of the entire codon optimized transgene, from the 5' LTR to the 3' LTR, is as follows:

(SEQ ID NO: 18)

GGGTCTCTCTGGTTAGACCAGATCTGAGCCTGGCTCTCTGGCTAACTAGG

GAACCCACTGCTTAAGCCTCAATAAAGCTTGCCTTGAGTGCTTCAAGTAG

TGTGTGCCCGTCTGTTGTGTGACTCTGGTAACTAGAGATCCCTCAGACCC

TTTTAGTCAGTGTGGAAAATCTCTAGCAGTGGCGCCCGAACAGGGACCTG

AAAGCGAAAGGGAAACCAGAGCTCTCTCGACGCAGGACTCGGCTTGCTGA

AGCGCGCACGGCAAGAGGCGAGGGGCGGCGACTGGTGAGTACGCCAAAAA

TTTTGACTAGCGGAGGCTAGAAGGAGAGAGATGGGTGCGAGAGCGTCAGT

ATTAAGCGGGGGAGAATTAGATCGCGATGGGAAAAAATTCGGTTAAGGCC

AGGGGGAAAGAAAAAATATAAATTAAAACATATAGTATGGGCAAGCAGGG

AGCTAGAACGATTCGCAGTTAATCCTGGCCTGTTAGAAACATCAGAAGGC

TGTAGACAAATACTGGGACAGCTACAACCATCCCTTCAGACAGGATCAGA

AGAACTTAGATCATTATATAATACAGTAGCAACCCTCTATTGTGTGCATC

AAAGGATAGAGATAAAAGACACCAAGGAAGCTTTAGACAAGATAGAGGAA

-continued

GAGCAAAACAAAAGTAAGACCACCGCACAGCAAGCGGCCGCTGATCTTCA
GACCTGGAGGAGGAGATATGAGGGACAATTGGAGAAGTGAATTATATAAA
TATAAAGTAGTAAAAATTGAACCATTAGGAGTAGCACCCACCAAGGCAAA
GAGAAGAGTGGTGCAGAGAGAAAAAAGAGCAGTGGGAATAGGAGCTTTGT
TCCTTGGGTTCTTGGGAGCAGCAGGAAGCACTATGGGCGCAGCGTCAATG
ACGCTGACGGTACAGGCCAGACAATTATTGTCTGGTATAGTGCAGCAGCA
GAACAATTTGCTGAGGGCTATTGAGGCGCAACAGCATCTGTTGCAACTCA
CAGTCTGGGGCATCAAGCAGCTCCAGGCAAGAATCCTGGCTGTGGAAAGA
TACCTAAAGGATCAACAGCTCCTGGGGATTTGGGGTTGCTCTGGAAAACT
CATTTGCACCACTGCTGTGCCTTGGAATGCTAGTTGGAGTAATAAATCTC
TGGAACAGATTTGGAATCACACGACCTGGATGGAGTGGGACAGAGAAATT
AACAATTACACAAGCTTAATACACTCCTTAATTGAAGAATCGCAAAACCA
GCAAGAAAAGAATGAACAAGAATTATTGGAATTAGATAAATGGGCAAGTT
TGTGGAATTGGTTTAACATAACAAATTGGCTGTGGTATATAAAATTATTC
ATAATGATAGTAGGAGGCTTGGTAGGTTTAAGAATAGTTTTTGCTGTACT
TTCTATAGTGAATAGAGTTAGGCAGGGATATTCACCATTATCGTTTCAGA
CCCACCTCCCAACCCCGAGGGGACCCGACAGGCCCGAAGGAATAGAAGAA
GAAGGTGGAGAGAGAGACAGAGACAGATCCATTCGATTAGTGAACGGATC
GGCACTGCGTGCGCCAATTCTGCAGACAAATGGCAGTATTCATCCACAAT
TTTAAAAGAAAAGGGGGGATTGGGGGGTACAGTGCAGGGGAAAGAATAGT
AGACATAATAGCAACAGACATACAAACTAAAGAATTACAAAAACAAATTA
CAAAAATTCAAAATTTTCGGGTTTATTACAGGGACAGCAGAGATCCAGTT
TGGTTAATTAACCCGTGTCGGCTCCAGATCTGGCCTCCGCGCCGGGTTTT
GGCGCCTCCCGCGGGCGCCCCCCTCCTCACGGCGAGCGCTGCCACGTCAG
ACGAAGGGCGCAGCGAGCGTCCTGATCCTTCCGCCCGGACGCTCAGGACA
GCGGCCCGCTGCTCATAAGACTCGGCCTTAGAACCCCAGTATCAGCAGAA
GGACATTTTAGGACGGGACTTGGGTGACTCTAGGGCACTGGTTTTCTTTC
CAGAGAGCGGAACAGGCGAGGAAAAGTAGTCCCTTCTCGGCGATTCTGCG
GAGGGATCTCCGTGGGGCGGTGAACGCCGATGATTATATAAGGACGCGCC
GGGTGTGGCACAGCTAGTTCCGTCGCAGCCGGGATTTGGGTCGCGGTTCT
TGTTTGTGGATCGCTGTGATCGTCACTTGGTGAGTAGCGGGCTGCTGGGC
TGGCCGGGGCTTTCGTGGCCGCCGGGCCGCTCGGTGGGACGGAAGCGTGT
GGAGAGACCGCCAAGGGCTGTAGTCTGGGTCCGCGAGCAAGGTTGCCCTG
AACTGGGGGTTGGGGGGAGCGCAGCAAAATGGCGGCTGTTCCCGAGTCTT
GAATGGAAGACGCTTGTGAGGCGGGCTGTGAGGTCGTTGAAACAAGGTGG
GGGGCATGGTGGGCGGCAAGAACCCAAGGTCTTGAGGCCTTCGCTAATGC
GGGAAAGCTCTTATTCGGGTGAGATGGGCTGGGGCACCATCTGGGGACCC
TGACGTGAAGTTTGTCACTGACTGGAGAACTCGGTTTGTCGTCTGTTGCG
GGGGCGGCAGTTATGGCGGTGCCGTTGGGCAGTGCACCCGTACCTTTGGG
AGCGCGCGCCCTCGTCGTGTCGTGACGTCACCCGTTCTGTTGGCTTATAA
TGCAGGGTGGGGCCACCTGCCGGTAGGTGTGCGGTAGGCTTTTCTCCGTC

-continued

GCAGGACGCAGGGTTCGGGCCTAGGGTAGGCTCTCCTGAATCGACAGGCG
CCGGACCTCTGGTGAGGGGAGGGATAAGTGAGGCGTCAGTTTCTTTGGTC
GGTTTTATGTACCTATCTTCTTAAGTAGCTGAAGCTCCGGTTTTGAACTA
TGCGCTCGGGGTTGGCGAGTGTGTTTTGTGAAGTTTTTTAGGCACCTTTT
GAAATGTAATCATTTGGGTCAATATGTAATTTTCAGTGTTAGACTAGTAA
ATTGTCCGCTAAATTCTGGCCGTTTTTGGCTTTTTTGTTAGACGAAGCTT
GGGCTGCAGGTCCGATCCACCGGTCGCCACCATGGTGAGCAAGGGCGAGG
AGCTGTTCACCGGGGTGGTGCCCATCCTGGTCGAGCTGGACGGCGACGTA
AACGGCCACAAGTTCAGCGTGTCCGGCGAGGGCGAGGGCGATGCCACCTA
CGGCAAGCTGACCCTGAAGTTCATCTGCACCACCGGCAAGCTGCCCGTGC
CCTGGCCCACCCTCGTGACCACCCTGACCTACGGCGTGCAGTGCTTCAGC
CGCTACCCCGACCACATGAAGCAGCACGACTTCTTCAAGTCCGCCATGCC
CGAAGGCTACGTCCAGGAGCGCACCATCTTCTTCAAGGACGACGGCAACT
ACAAGACCCGCGCCGAGGTGAAGTTCGAGGGCGACACCCTGGTGAACCGC
ATCGAGCTGAAGGGCATCGACTTCAAGGAGGACGGCAACATCCTGGGGCA
CAAGCTGGAGTACAACTACAACAGCCACAACGTCTATATCATGGCCGACA
AGCAGAAGAACGGCATCAAGGTGAACTTCAAGATCCGCCACAACATCGAG
GACGGCAGCGTGCAGCTCGCCGACCACTACCAGCAGAACACCCCCATCGG
CGACGGCCCCGTGCTGCTGCCCGACAACCACTACCTGAGCACCCAGTCCG
CCCTGAGCAAAGACCCCAACGAGAAGCGCGATCACATGGTCCTGCTGGAG
TTCGTGACCGCCGCCGGGATCACTCTCGGCATGGACGAGCTGTACAAGGG
ATCTGGAGCAACAAACTTCTCACTACTCAAACAAGCAGGTGACGTGGAGG
AGAATCCCGGGCCTTCTAGAATGTACAGGATGCAGCTGCTGAGCTGCATC
GCCCTGTCCCTGGCTCTGGTGACCAACAGCGGCGCGCCTAAGGAGATCTG
CGGCAACCCCGTGACCGACAATGTGAAGGATATCACCAAGCTGGTGGCCA
ACCTGCCAAATGACTACATGATCACCCTGAACTACGTGGCTGGCATGGAC
GTGCTGCCCAGCCACTGCTGGCTGAGGGATATGGTGATCCAGCTGAGCCT
GTCCCTGACCACCCTGCTGGACAAGTTCAGCAACATCTCCGAAGGCCTGA
GCAATTACTCCATCATCGATAAGCTGGGCAAGATCGTGGACGATCTGGTG
CTGTGCATGGAGGAAAACGCCCCCAAGAATATCAAGGAGAGCCCCAAGAG
GCCAGAAACCAGATCCTTCACCCCAGAGGAATTCTTCAGCATCTTCAATA
GGTCCATCGACGCCTTCAAGGATTTCATGGTGGCCAGCGACACCTCCGAT
TGCGTGCTGAGCTCCACCCTGGGACCAGAGAAGGATAGCAGAGTGTCCGT
GACCAAGCCATTCATGCTGCCCCCAGTGGCCGCTGCTAGCACCACCACCC
CAGCTCCAAGACCCCCAACCCCAGCTCCAACCATCGCCAGCCAGCCACTG
TCCCTGAGGCCCGAGGCTTGCAGGCCCGCTGCTGGAGGCGCCGTGCACAC
CAGGGGCCTGGACTTCGCCTGCGACATCGATAACGAAAAGAGCAATGGCA
CCATCATCCACGTGAAGGGCAAGCACCTGTGCCCAAGCCCACTGTTCCCA
GGACCATCCAAGCCATTCTGGGTGCTGGTGGTGGTGGGAGGAGTGCTGGC
TTGCTACAGCCTGCTGGTGACCGTGGCCTTCATCATCTTCTGGGTCAGGA

-continued

GCAAGAGATCCAGGCTGCTGCACTCCGACTACATGAACATGACCCCAAGG

AGGCCCGGCCCAACCAGAAAGCACTACCAGCCATACGCTCCACCAAGGGA

CTTCGCTGCTTACAGAAGCTCCAGGTCCGCTGATGCTCCAGCTTACCAGC

AGGGACAGAATCAGCTGTACAACGAGCTGAATCTGGGCAGGAGAGAGGAA

TACGACGTGCTGGATAAGAGGAGAGGCAGAGATCCCGAAATGGGCGGCAA

GCCAAGGAGAAAGAACCCCCAGGAGGGCCTGTACAATGAACTGCAGAAGG

ACAAGATGGCTGAGGCCTACAGCGAAATCGGCATGAAGGGCGAGAGGAGA

AGGGGCAAGGGCCACGATGGCCTGTACCAGGGCCTGTCCACCGCTACCAA

GGACACCTACGATGCTCTGCACATGCAGGCCCTGCCCCCAAGGTGAGTCG

ACTCGACAATCAACCTCTGGATTACAAAATTTGTGAAAGATTGACTGGTA

TTCTTAACTATGTTGCTCCTTTTACGCTATGTGGATACGCTGCTTTAATG

CCTTTGTATCATGCTATTGCTTCCCGTATGGCTTTCATTTTCTCCTCCTT

GTATAAATCCTGGTTGCTGTCTCTTTATGAGGAGTTGTGGCCCGTTGTCA

GGCAACGTGGCGTGGTGTGCACTGTGTTTGCTGACGCAACCCCCACTGGT

TGGGGCATTGCCACCACCTGTCAGCTCCTTTCCGGGACTTTCGCTTTCCC

CCTCCCTATTGCCACGGCGGAACTCATCGCCGCCTGCCTTGCCCGCTGCT

GGACAGGGGCTCGGCTGTTGGGCACTGACAATTCCGTGGTGTTGTCGGGG

AAGCTGACGTCCTTTCCATGGCTGCTCGCCTGTGTTGCCACCTGGATTCT

GCGCGGGACGTCCTTCTGCTACGTCCCTTCGGCCCTCAATCCAGCGGACC

TTCCTTCCCGCGGCCTGCTGCCGGCTCTGCGGCCTCTTCCGCATCTTCGC

CTTCGCCCTCAGACGAGTCGGATCTCCCTTTGGGCCGCCTCCCCGCCTGG

AATTAATTCGAGCTCGGTACCTTTAAGACCAATGACTTACAAGGCAGCTG

TAGATCTTAGCCACTTTTTAAAAGAAAAGGGGGGACTGGAAGGGCTACGT

AACTCCCAACGAAGACAAGATCTGCTTTTTGCTTGTACTGGGTCTCTCTG

GTTAGACCAGATCTGAGCCTGGGAGCTCTCTGGCTAACTAGGGAACCCAC

TGCTTAAGCCTCAATAAAGCTTGCCTTGAGTGCTTCAAGTAGTGTGTGCC

CGTCTGTTGTGTGACTCTGGTAACTAGAGATCCCTCAGACCCTTTTAGTC

AGTGTGGAAAATCTCTAGCA

The nucleotide sequence of the entire codon optimized transgene, beginning at the start of eGFP to the end of CD3ζ, is as follows:

(SEQ ID NO: 19)

ATGGTGAGCAAGGGCGAGGAGCTGTTCACCGGGGTGGTGCCCATCCTGGT

CGAGCTGGACGGCGACGTAAACGGCCACAAGTTCAGCGTGTCCGGCGAGG

GCGAGGGCGATGCCACCTACGGCAAGCTGACCCTGAAGTTCATCTGCACC

ACCGGCAAGCTGCCCGTGCCCTGGCCCACCCTCGTGACCACCCTGACCTA

CGGCGTGCAGTGCTTCAGCCGCTACCCCGACCACATGAAGCAGCACGACT

TCTTCAAGTCCGCCATGCCCGAAGGCTACGTCCAGGAGCGCACCATCTTC

TTCAAGGACGACGGCAACTACAAGACCCGCGCCGAGGTGAAGTTCGAGGG

CGACACCCTGGTGAACCGCATCGAGCTGAAGGGCATCGACTTCAAGGAGG

ACGGCAACATCCTGGGGCACAAGCTGGAGTACAACTACAACAGCCACAAC

-continued

GTCTATATCATGGCCGACAAGCAGAAGAACGGCATCAAGGTGAACTTCAA

GATCCGCCACAACATCGAGGACGGCAGCGTGCAGCTCGCCGACCACTACC

AGCAGAACACCCCCATCGGCGACGGCCCCGTGCTGCTGCCCGACAACCAC

TACCTGAGCACCCAGTCCGCCCTGAGCAAAGACCCCAACGAGAAGCGCGA

TCACATGGTCCTGCTGGAGTTCGTGACCGCCGCCGGGATCACTCTCGGCA

TGGACGAGCTGTACAAGGGATCTGGAGCAACAAACTTCTCACTACTCAAA

CAAGCAGGTGACGTGGAGGAGAATCCCGGGCCTTCTAGAATGTACAGGAT

GCAGCTGCTGAGCTGCATCGCCCTGTCCCTGGCTCTGGTGACCAACAGCG

GCGCGCCTAAGGAGATCTGCGGCAACCCCGTGACCGACAATGTGAAGGAT

ATCACCAAGCTGGTGGCCAACCTGCCAAATGACTACATGATCACCCTGAA

CTACGTGGCTGGCATGGACGTGCTGCCCAGCCACTGCTGGCTGAGGGATA

TGGTGATCCAGCTGAGCCTGTCCCTGACCACCCTGCTGGACAAGTTCAGC

AACATCTCCGAAGGCCTGAGCAATTACTCCATCATCGATAAGCTGGGCAA

GATCGTGGACGATCTGGTGCTGTGCATGGAGGAAAACGCCCCCAAGAATA

TCAAGGAGAGCCCCAAGAGGCCAGAAACCAGATCCTTCACCCCAGAGGAA

TTCTTCAGCATCTTCAATAGGTCCATCGACGCCTTCAAGGATTTCATGGT

GGCCAGCGACACCTCCGATTGCGTGCTGAGCTCCACCCTGGGACCAGAGA

AGGATAGCAGAGTGTCCGTGACCAAGCCATTCATGCTGCCCCCAGTGGCC

GCTGCTAGCACCACCACCCCAGCTCCAAGACCCCCAACCCCAGCTCCAAC

CATCGCCAGCCAGCCACTGTCCCTGAGGCCCGAGGCTTGCAGGCCCGCTG

CTGGAGGCGCCGTGCACACCAGGGGCCTGGACTTCGCCTGCGACATCGAT

AACGAAAAGAGCAATGGCACCATCATCCACGTGAAGGGCAAGCACCTGTG

CCCAAGCCCACTGTTCCCAGGACCATCCAAGCCATTCTGGGTGCTGGTGG

TGGTGGGAGGAGTGCTGGCTTGCTACAGCCTGCTGGTGACCGTGGCCTTC

ATCATCTTCTGGGTCAGGAGCAAGAGATCCAGGCTGCTGCACTCCGACTA

CATGAACATGACCCCAAGGAGGCCCGGCCCAACCAGAAAGCACTACCAGC

CATACGCTCCACCAAGGGACTTCGCTGCTTACAGAAGCTCCAGGTCCGCT

GATGCTCCAGCTTACCAGCAGGGACAGAATCAGCTGTACAACGAGCTGAA

TCTGGGCAGGAGAGAGGAATACGACGTGCTGGATAAGAGGAGAGGCAGAG

ATCCCGAAATGGGCGGCAAGCCAAGGAGAAAGAACCCCCAGGAGGGCCTG

TACAATGAACTGCAGAAGGACAAGATGGCTGAGGCCTACAGCGAAATCGG

CATGAAGGGCGAGAGGAGAAGGGGCAAGGGCCACGATGGCCTGTACCAGG

GCCTGTCCACCGCTACCAAGGACACCTACGATGCTCTGCACATGCAGGCC

CTGCCCCCAAGGTGA

The amino acid sequence of the entire codon optimized transgene, beginning at the start codon for eGFP and ending at the stop codon (*) in the CD3ζ, is as follows:

(SEQ ID NO: 20)

MVSKGEELFTGVVPILVELDGDVNGHKFSVSGEGEGDATYGKLTLKFICT

TGKLPVPWPTLVTTLTYGVQCFSRYPDHMKQHDFFKSAMPEGYVQERTIF

FKDDGNYKTRAEVKFEGDTLVNRIELKGIDFKEDGNILGHKLEYNYNSHN

-continued

```
VYIMADKQKNGIKVNFKIRHNIEDGSVQLADHYQQNTPIGDGPVLLPDNH

YLSTQSALSKDPNEKRDHMVLLEFVTAAGITLGMDELYKGSGATNFSLLK

QAGDVEENPGPSRMYRMQLLSCIALSLALVTNSGAPKEICGNPVTDNVKD

ITKLVANLPNDYMITLNYVAGMDVLPSHCWLRDMVIQLSLSLTTLLDKFS

NISEGLSNYSIIDKLGKIVDDLVLCMEENAPKNIKESPKRPETRSFTPEE

FFSIFNRSIDAFKDFMVASDTSDCVLSSTLGPEKDSRVSVTKPFMLPPVA

AASTTTPAPRPPTPAPTIASQPLSLRPEACRPAAGGAVHTRGLDFACDID

NEKSNGTIIHVKGKHLCPSPLFPGPSKPFWVLVVVGGVLACYSLLVTVAF

IIFWVRSKRSRLLHSDYMNMTPRRPGPTRKHYQPYAPPRDFAAYRSSRSA

DAPAYQQGQNQLYNELNLGRREEYDVLDKRRGRDPEMGGKPRRKNPQEGL

YNELQKDKMAEAYSEIGMKGERRRGKGHDGLYQGLSTATKDTYDALHMQA

LPPR*
```

293T Studies

Figure 17:
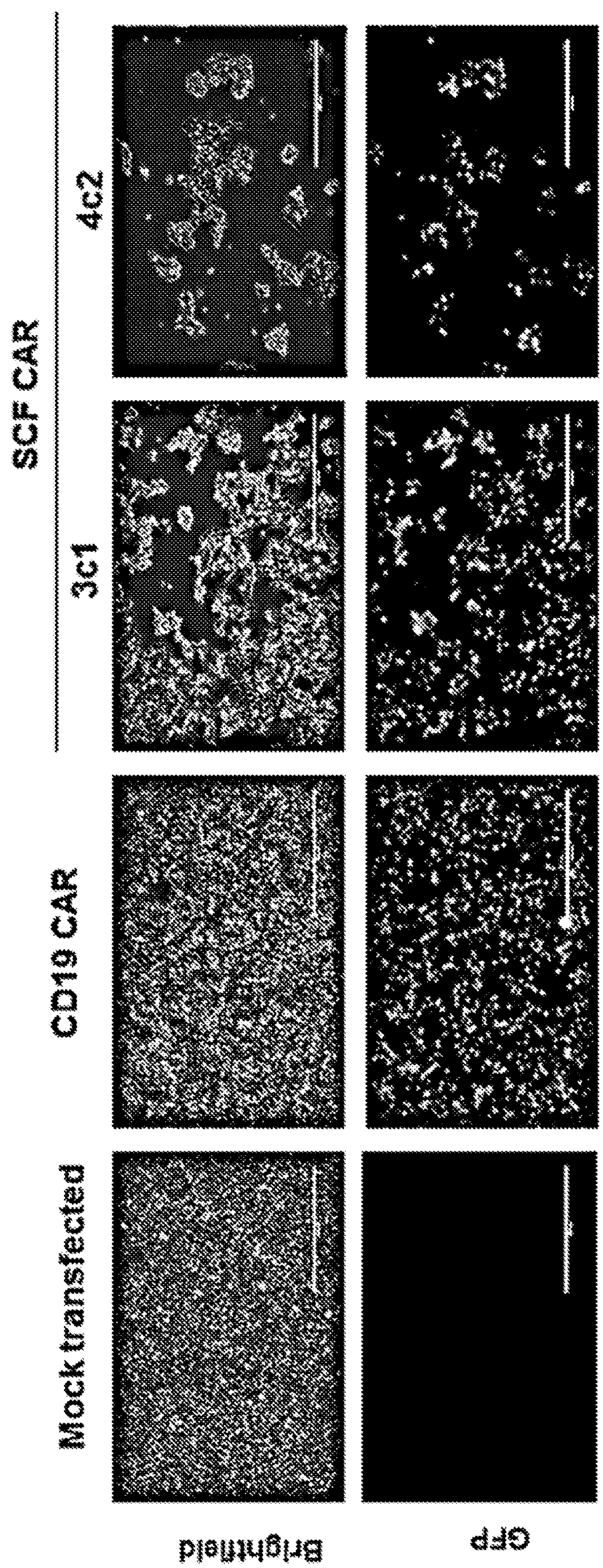
FIG. 17 shows GFP images of transfected HEK293T cells confirming transgene expression of both SCF CAR clones. HEK293T cells were transfected using lipofectamine and 14 mg of each plasmid for 18 hours, with a media change the following day. GFP images were taken on day 3 and transgene expression was confirmed.
Figure 18:
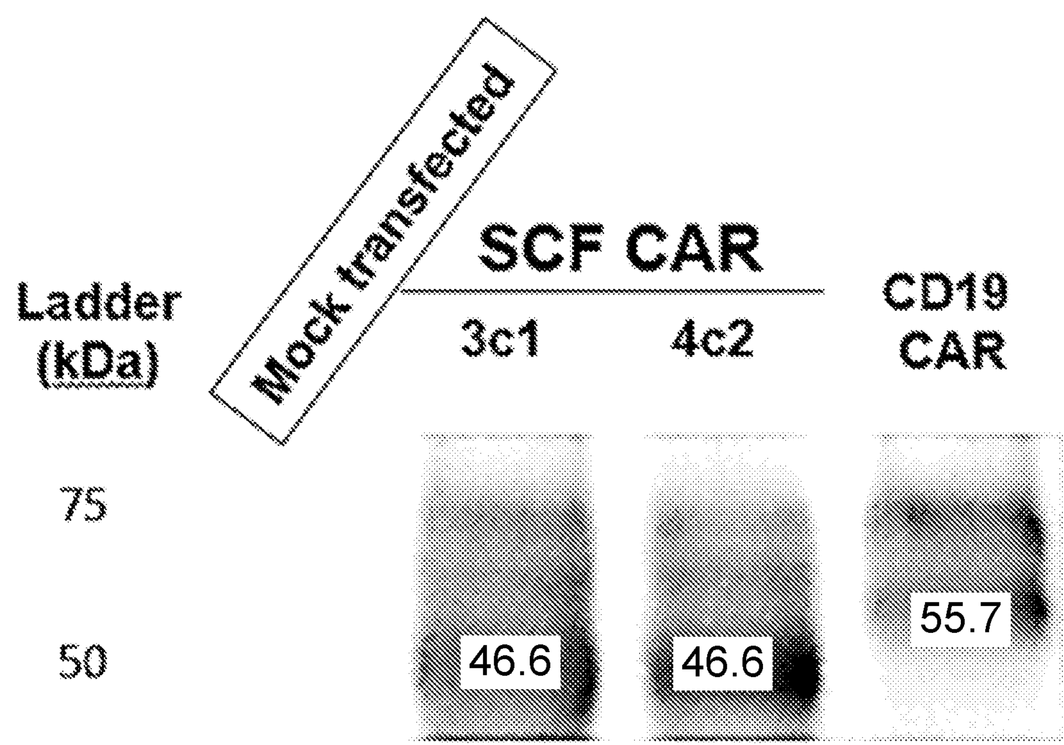
FIG. 18 is a Western blot of SCF CAR clones 3c1 and 4c2 further confirming transgene CAR expression. HEK293T cells were transfected using lipofectamine and 14 mg of each plasmid for 18 hours, with a media change the following day. Cells were lysed with CST lysis buffer supplemented with protease inhibitors and then visualized via a Western blot. 40 mg of protein were loaded into each lane, with the mock transduced and CD19 CAR as controls. The blot was stained with mahCD3ζ antibody and exposed for 21 seconds. Other bands represent glycosylated products and have a higher molecular weight than un-glycosylated products. SCF CAR: 46.6 kDa, CD19 CAR: 55.7 kDa.

HEK293T cells ($1.5\times10^6$) were transfected with 14 μg of SCF CAR clones 3c1 and 4c2 plasmid using Lipofectamine 2000 for 18 hours overnight with a media change the following day. GFP images (FIG. 17) confirmed the presence of GFP in these cells on day 3, and the cells were pelleted and lysed using CST lysis buffer with protease inhibitors. A Western blot of 40 μg of protein further confirmed transgene expression, and it was decided that the construct 3c1 would be moved forward for lentiviral production, and referred to as SCF CAR (FIG. 18).

Jurkat Studies

Figure 19A:
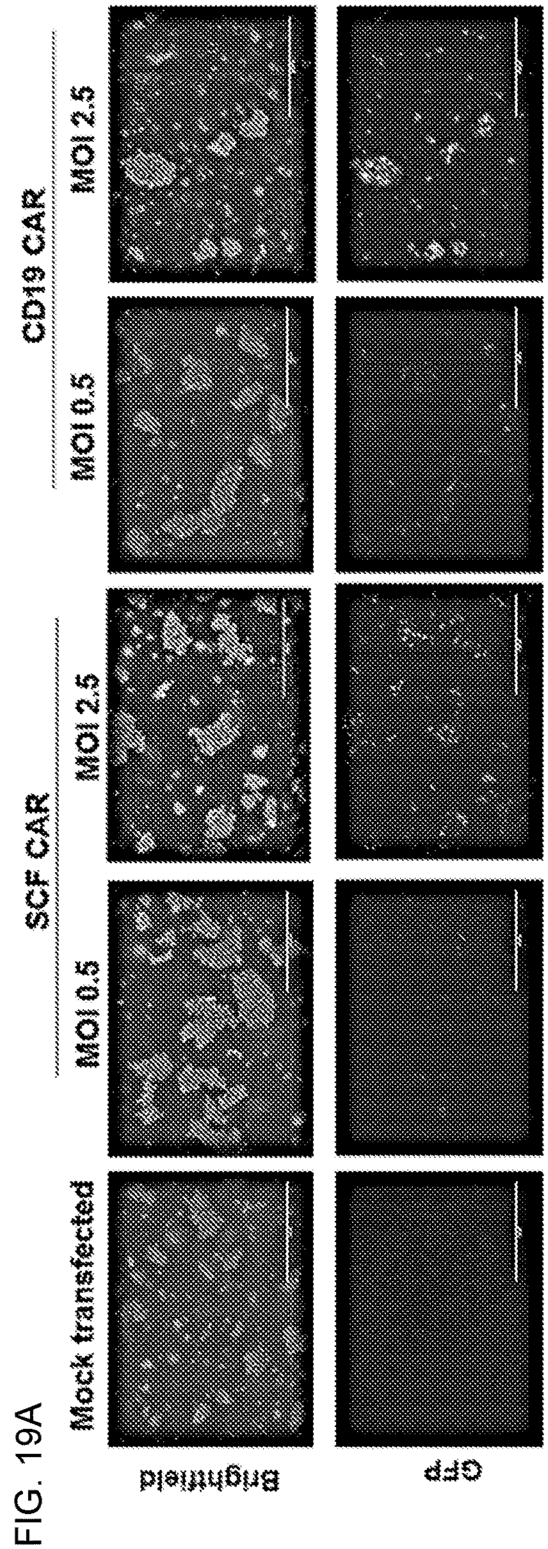
FIGS. 19A-B show transgene expression of CAR constructs in Jurkat cells on day 3 after transduction with lentiviral vector. Jurkats were transduced at MOI 0.5 and 2.5 with either the SCF CAR or CD19 CAR. GFP images (A) and lysates were taken on day 3, and a Western blot (B) for hCD3ζ confirmed expression. SCF CAR: 46.6 kDa, CD19 CAR: 55.7 kDa. Endogenous monomeric CD3ζ in Jurkat cells can be seen by the lowest band at 16 kDa, and dimerized CD3z can be seen at 32 kDa.
Figure 19B:
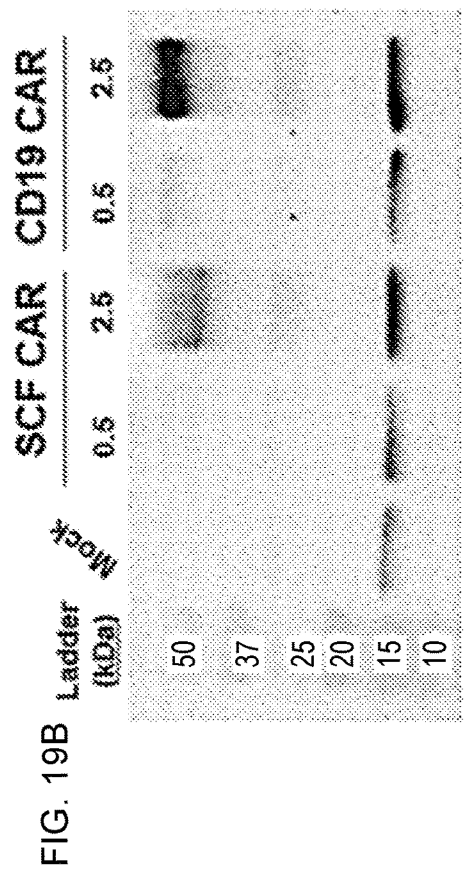
Figure 20A:
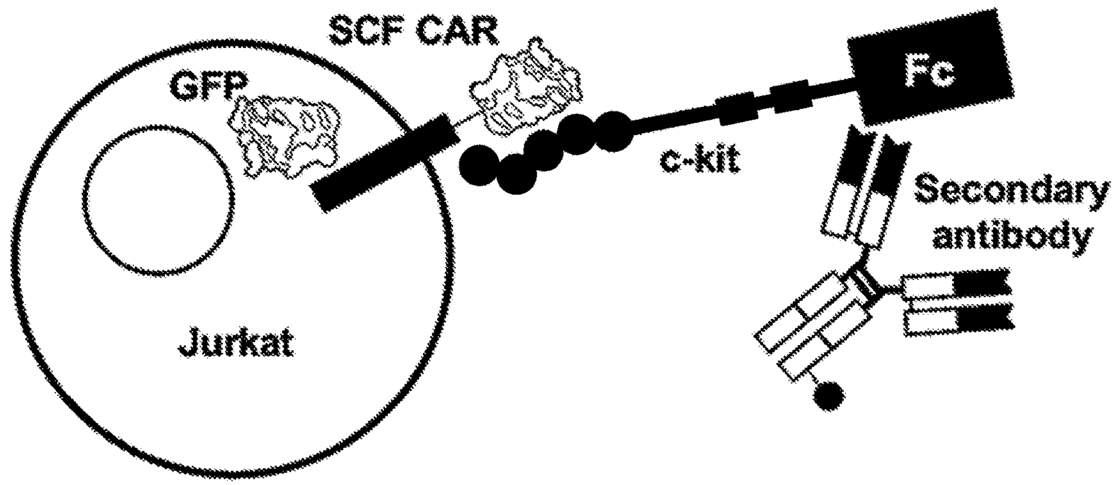
FIGS. 20A-C show that c-kit Fc chimera specifically activates SCF CAR-Jurkats as compared to CD19 CAR-Jurkats. Schematic (A) shows how the c-kit Fc chimera binds to the SCF CAR-Jurkat and is then detected via a secondary antibody via flow cytometry. SCF CAR and CD19 CAR transduced Jurkats were incubated with 20 ng of the receptor c-kit Fc chimera for 30 minutes at 4° C., then washed with 3 volumes of FACS Buffer. Cells were then stained with secondary abIgG for 15 minutes at 4° C., then washed again with 3 volumes of FACS buffer. Cells were then stained with a CD69 antibody, incubated at 4° C. for 30 minutes, then washed with 3 volumes of FACS buffer. Cells were analyzed on the Cytek Aurora (B). Secondary alone controls were incubated in 100 mL FACS buffer while all other cells stained with the c-kit FC chimera. Representative flow plots are shown for cells transduced at MOI 2.5 only. n=1. Cumulative data from B are shown (C) (n=1, error bars are replicates within the one experiment).
Figure 20B:
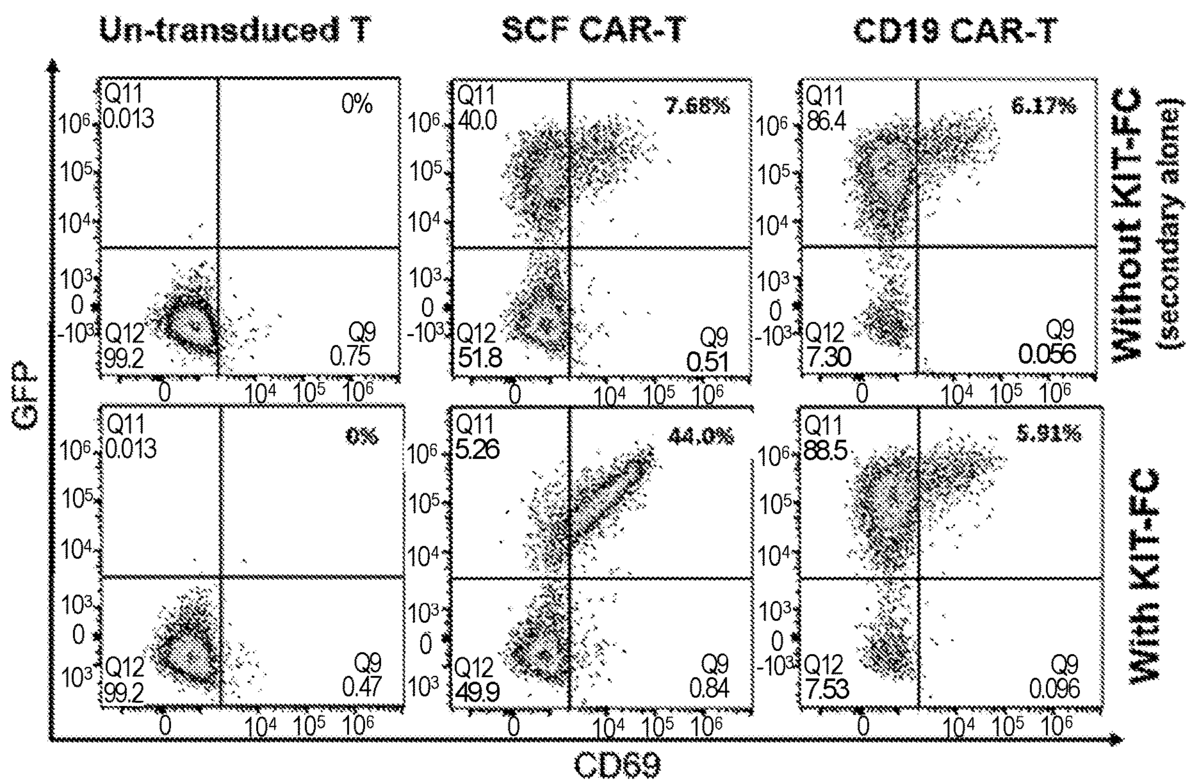
Figure 20C:
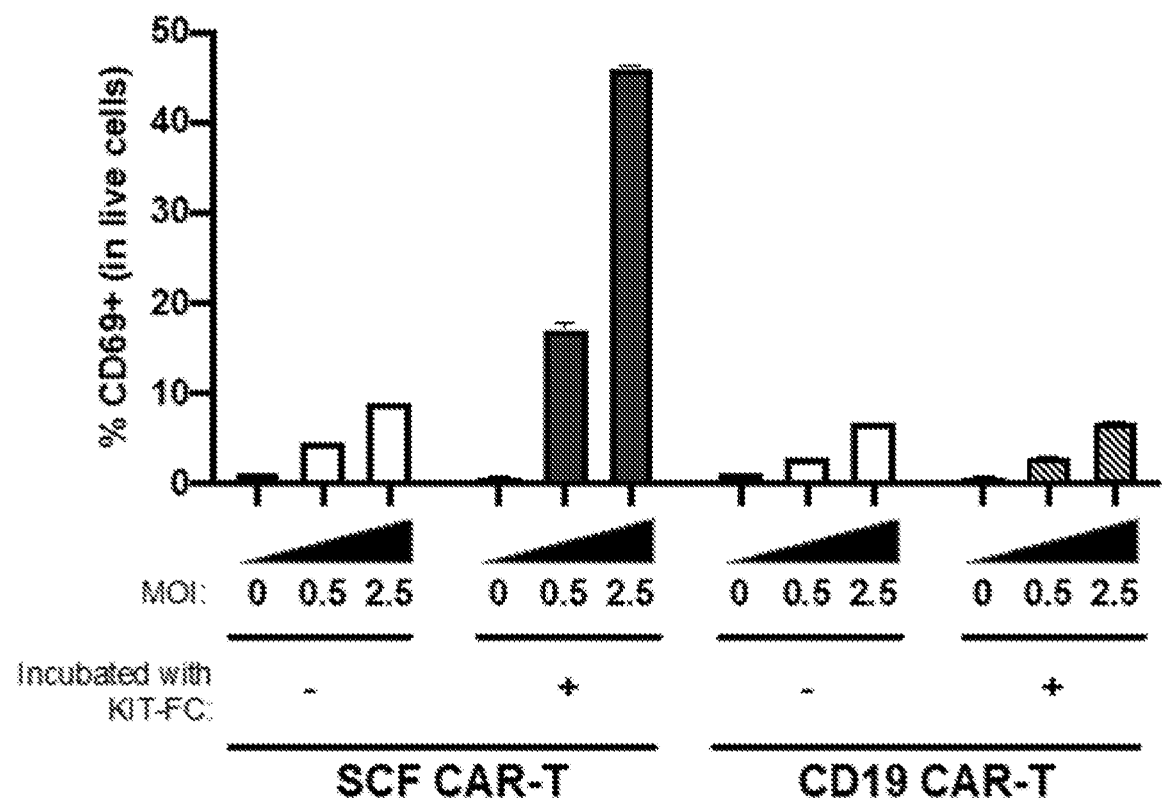

Jurkat cells ($1\times10^6$) were transduced at MOI 0.5 and 2.5 with the SCF CAR and CD19 CAR as a control for 18 hours, with a media change the following day. GFP images (FIG. 19A) and western (FIG. 19B) on day 3 confirmed transgene expression. Since CD69 is a known activation marker of T cells, the baseline activation levels of Jurkats were explored. It was also important to know the binding of the target receptor to the construct itself. So, transduced Jurkats were stained with an antibody detecting CD69, as well as a receptor chimera protein. The receptor chimera protein consists of the murine c-kit receptor fused to a murine Fc, which can then be detected with a secondary anti-Fc antibody conjugated to a fluorochrome (FIG. 20A). SCF CAR-Jurkats and CD19 CAR-Jurkats were stained with the receptor chimera protein and αCD69 antibody and were then visualized via flow cytometry. Both the SCF CAR and CD19 CAR transduced Jurkats (GFP+ quadrant) show higher activation via an increase in CD69 levels as compared to their non-transduced counterparts (GFP− quadrant), indicating that transducing these cells with the transgene results in an increase in CD69 (FIG. 20B top panel, FIG. 20C). This is expected, since by transducing a Jurkat, more CD3ζ was added than there once was in the cell, which could cause auto-activation. As expected, when incubated with the c-kit receptor Fc, CD69 levels increase drastically in the SCF CAR-Jurkats but remain the same in the CD19 CAR-Jurkats (FIG. 20B, bottom panel, FIG. 20C). This shows that the c-kit chimera Fc introduces specific activation of the SCF CAR-Jurkats, but not the CD19 CAR Jurkats, thus showing that the SCF CAR is specific toward the c-kit receptor.

Figure 21A:
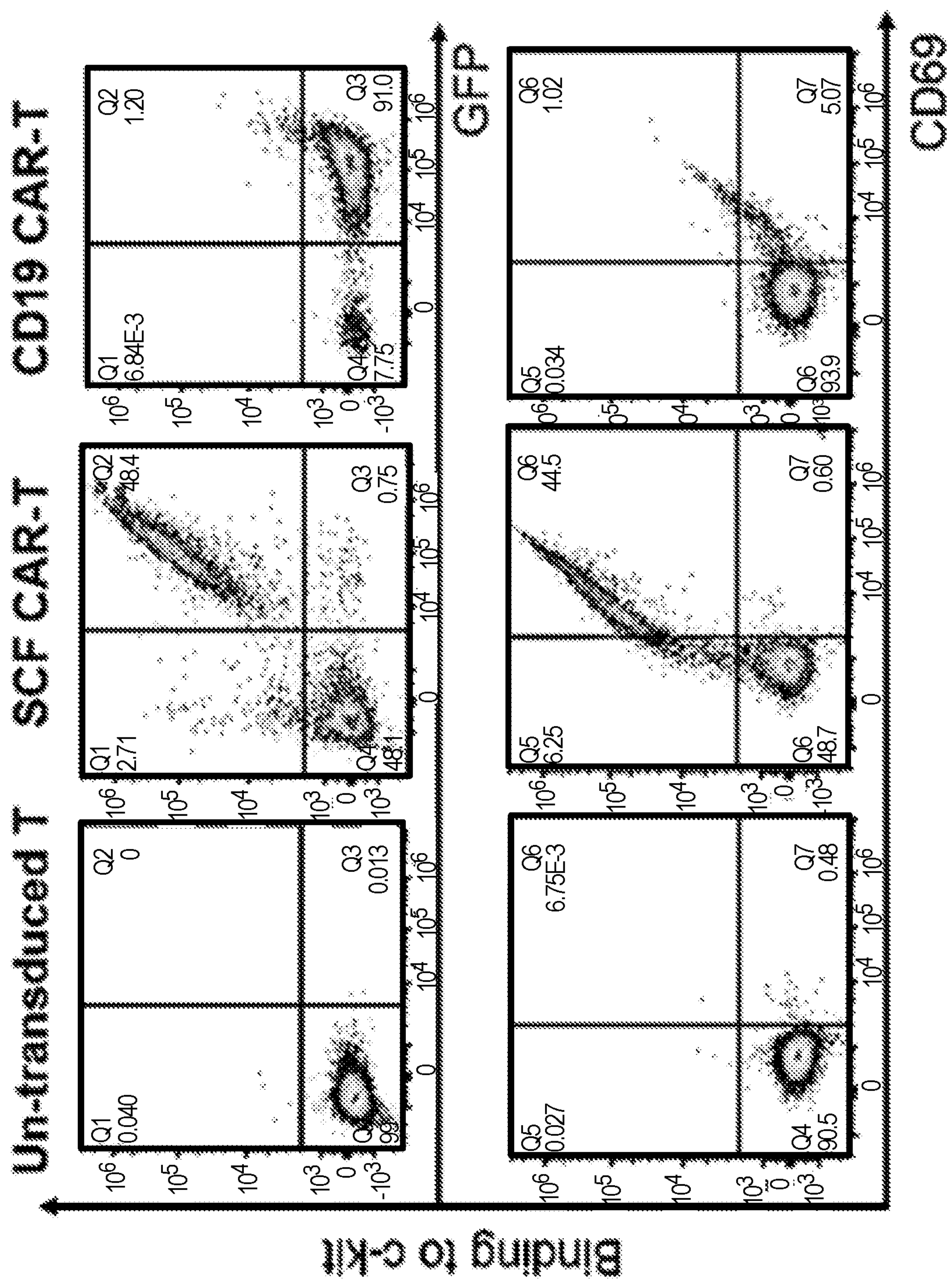
FIGS. 21A-C show that SCF CAR is specific to the c-kit receptor. SCF CAR and CD19 CAR transduced Jurkats were incubated with 20 ng of the receptor c-kit Fc chimera for 30 minutes at 4° C., then washed with 3 volumes of FACS Buffer. Cells were then stained with secondary amIgG for 15 minutes at 4° C., then washed again with 3 volumes of FACS buffer. Cells were then stained with a CD69 antibody, incubated at 4° C. for 30 minutes, then washed with 3 volumes of FACS buffer. Cells were analyzed on the Cytek Aurora. Representative flow plots are shown for cells transduced at MOI 2.5 only (A) (n=1). Cumulative data from A for GFP+ cells are shown (B) (n=1, error bars are replicates within the one experiment). Cumulative data from A for CD69+ cells are shown (C) (n=1, error bars are replicates within the one experiment). Together, these data show that the SCF CAR is specific to the c-kit receptor, as shown by increased receptor Fc binding and increased CD69 expression in only the SCF CAR-T cells and not the CD19 CAR-T control.
Figure 21C:
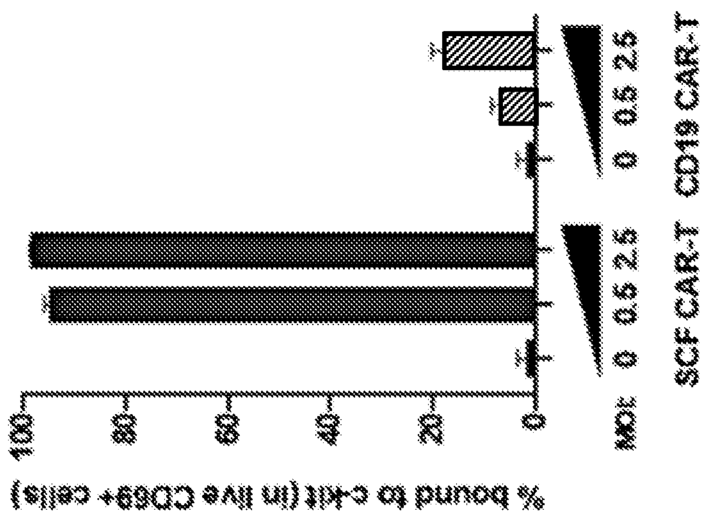
Figure 21B:
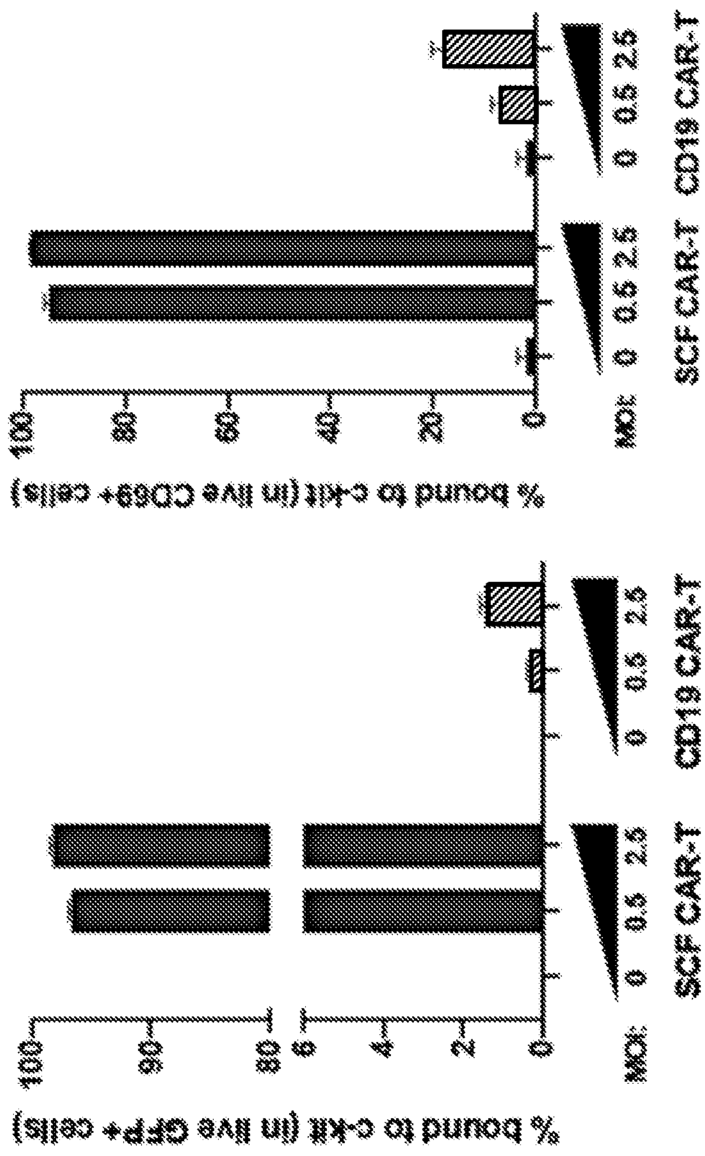

Binding of the c-kit receptor Fc to the transduced Jurkat cells was detected by binding of the secondary antibody via flow cytometry. When stained with the c-kit receptor chimera, nearly 100% of the SCF CAR transduced cells (GFP+) bound to c-kit, whereas less than 2% of the CD19 CAR transduced Jurkats bound (FIG. 21A top panel, FIG. 21B). Furthermore, nearly 100% of the CD69+ cells were bound to the c-kit chimera in the SCF CAR-Jurkats, whereas less than 20% of the CD19 CAR Jurkats were bound (FIG. 21A bottom panel, 21C). Interestingly, in the SCF CAR-Jurkats, it was found that more GFP+ cells were also binding to more c-kit chimera (FIG. 21A, top middle panel), and similarly the more CD69+ cells were binding to more of the chimera protein as well (FIG. 21A, bottom middle panel). This not only confirms the co-expression of GFP and the CAR construct, but it also shows that the SCF CAR is specific to the c-kit receptor, whereas the CD19 CAR is not.

Figure 22A:
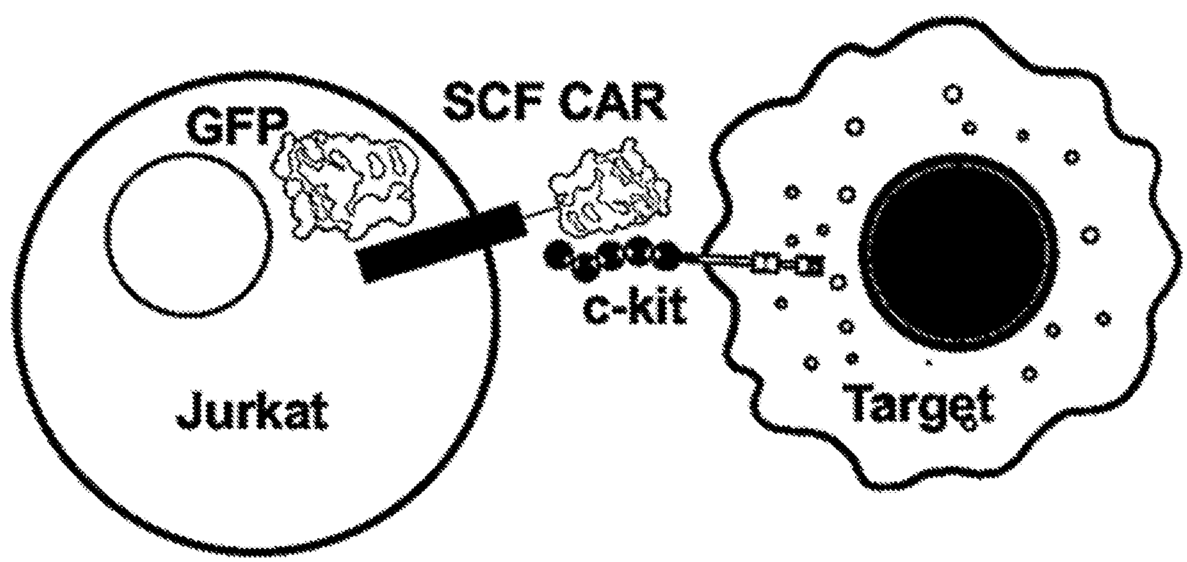
FIG. 22A-C shows that SCF CAR specifically activates Jurkats upon binding c-kit+ AML cell lines. Schematic showing the Jurkat activation assay (A) is shown. SCF CAR and CD19 CAR transduced Jurkats at an MOI of 2.5 were co-cultured with Kasumi-1 cells (B, top panels) or 697 cells (B, bottom panel) at an effector-to-target (E:T) ratio of 1:1, 1:5, or 1:10 for four hours. Cells were then stained to detect CD69 and analyzed on the Cytek Aurora. Representative flow plots are shown for cells co-cultured at the 1:1 ratio only (n=1). Cumulative data from B are provided (C) (n=1, error bars are replicates within the one experiment).
Figure 22B:
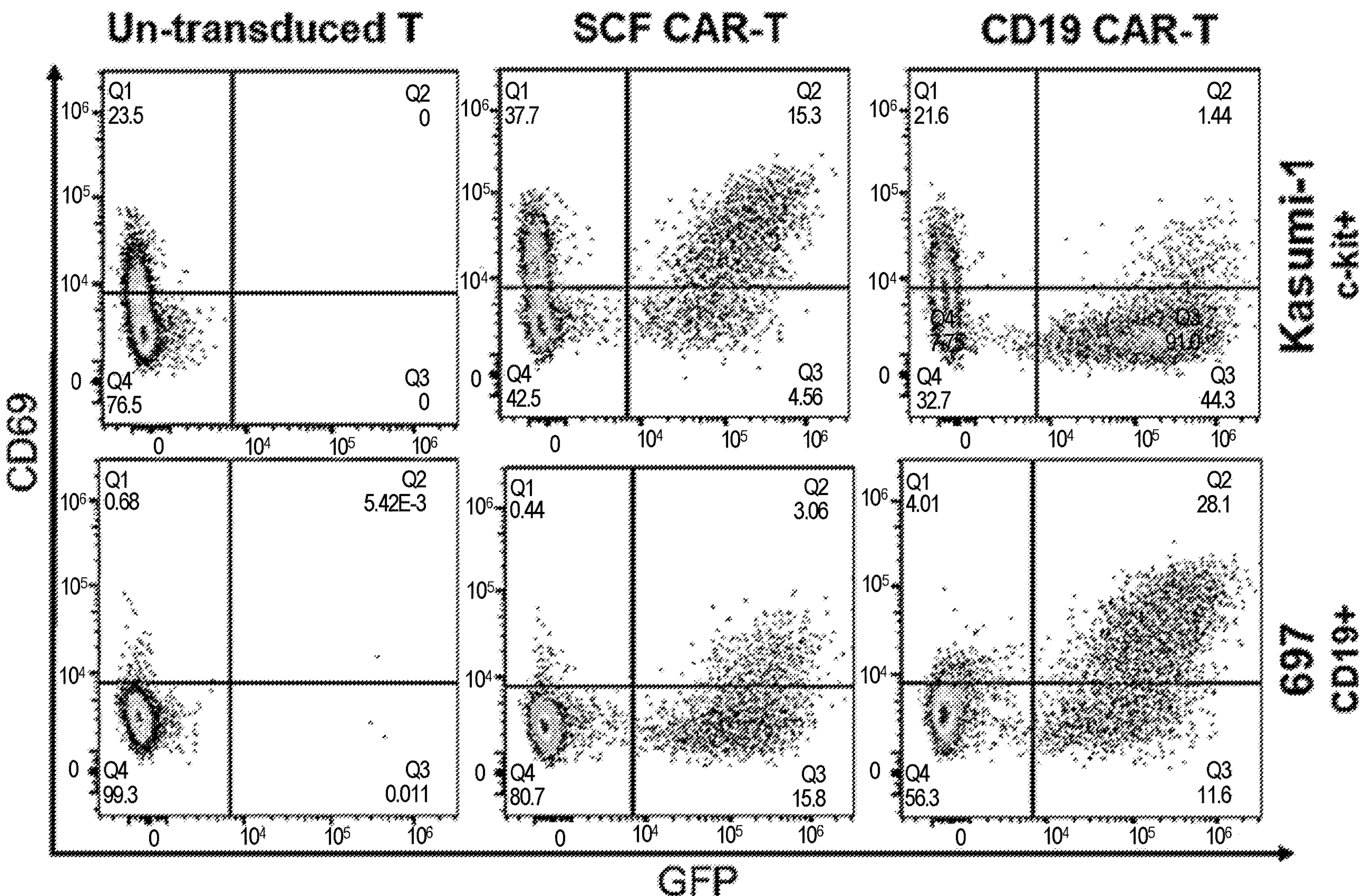
Figure 22C:
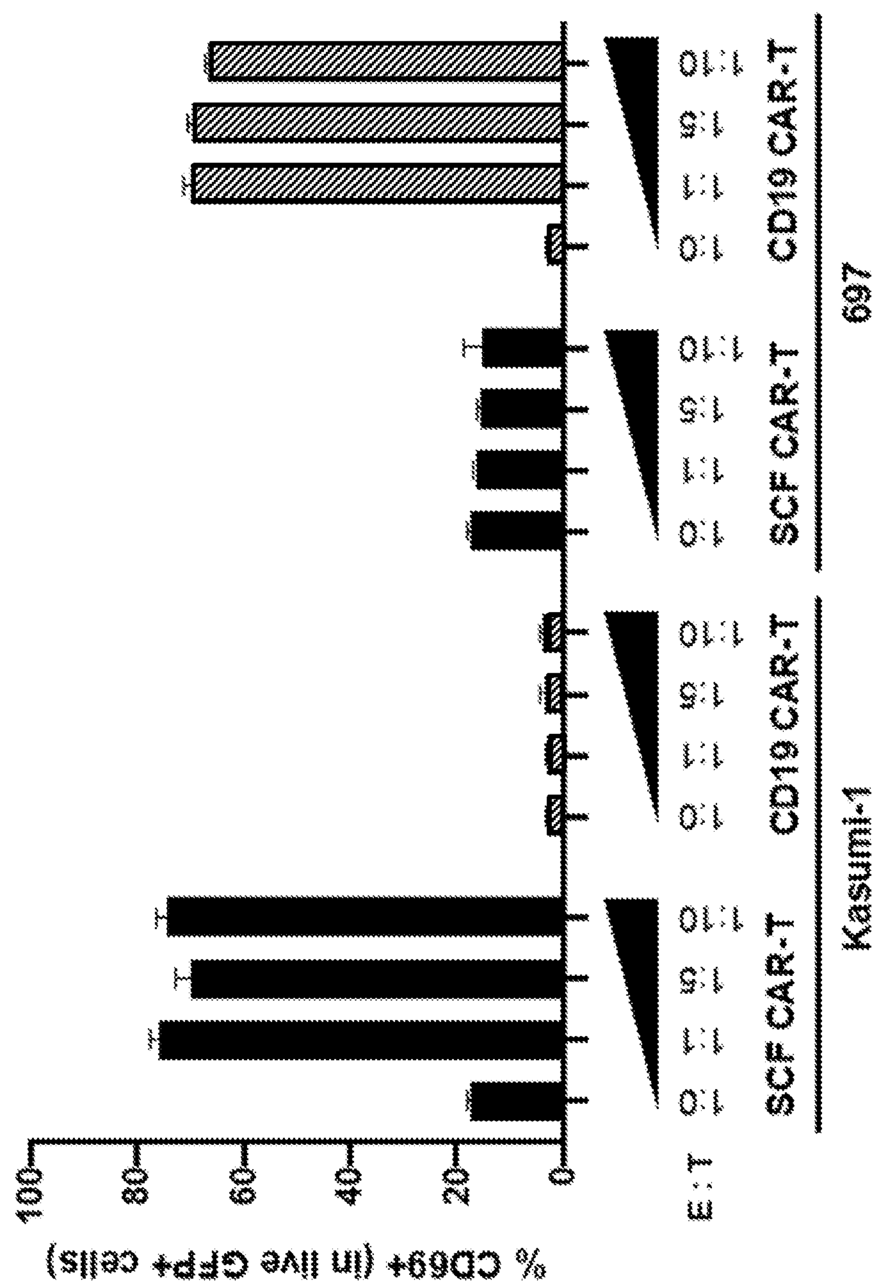

Finally, a Jurkat activation assay was performed to determine the activation potential of Jurkats on c-kit+ AML cell lines (FIG. 22A). SCF CAR and CD19 CAR transduced Jurkats were incubated with Kasumi-1 cells (c-kit+, AML cell line) or 697 cells (CD19+, B-ALL cell line), at effector-to-target ratios of 1:1, 1:5, and 1:10 for four hours. Cells were then stained to detect CD69 via flow cytometry. Co-culture of the SCF CAR-Jurkats with the Kasumi-1 cells resulted in an increase in CD69 expression on the Jurkats, as can be seen by the upward shift in the GFP+ cells, whereas this was not seen with the CD19 CAR-Jurkats (FIG. 22B, top panel, FIG. 22C). Furthermore, co-culture of the SCF CAR-Jurkats with the 697 cells did not result in an increase in CD69 expression, whereas co-culture with the CD19 CAR-Jurkats caused a significant increase in activation (FIG. 22B, bottom panel, FIG. 22C). This shows that the SCF CAR can induce activation of Jurkats when co-cultured with a c-kit+ cell line, but not a c-kit negative cell line. Further, it is important to note that the activation of the SCF CAR-Jurkats on the Kasumi-1 cells mimics the activation seen on the CD19 CAR Jurkats on the 697 cells, which not only shows that the SCF CAR can active Jurkats to the same level as the CD19 CAR can, but that the SCF CAR is specific to c-kit positive cell lines.

Primary T Cell Studies

Human primary T cells were isolated from frozen PBMCs using the STEMCELL T cell isolation kit via a negative selection method and grown in XVIVO-15 media supplemented with 10% fetal bovine serum (FBS), 1% penicillin-streptomycin (pen-strep), 3000 IU/mL IL-2, and 5 ng/mL IL-7. Isolated T cells were then stimulated in complete media with CD3/CD28 Dynabeads for 24 hours. The following day, T cells ($3.6\times10^5$) were transduced using a lentiviral vector for SCF CAR, with mock transduced cells and an irrelevant NRTN CAR transduced cells as a control at an MOI of 25 for 18 hours. The next day, media was changed, and the cells were cultured every 3 days. GFP images and cytotoxicity assays were performed after day 5.

Figure 23A:
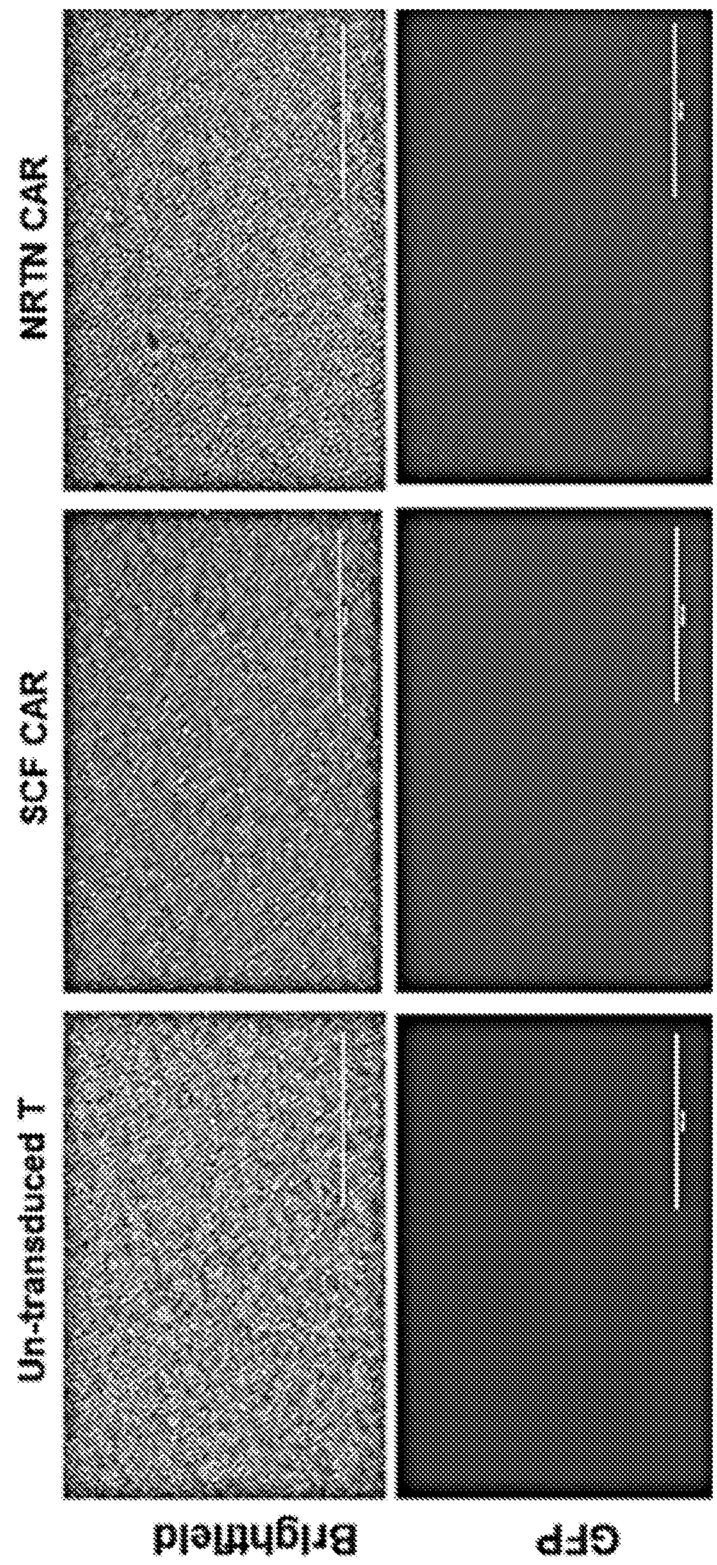
FIG. 23A-B show transgene expression in primary T cells. GFP images (A) of SCF CAR and NRTN CAR transduced primary T cells were taken on day 24 post-transduction. GFP content via flow cytometry performed on day 20 post-transduction (B).
Figure 23B:
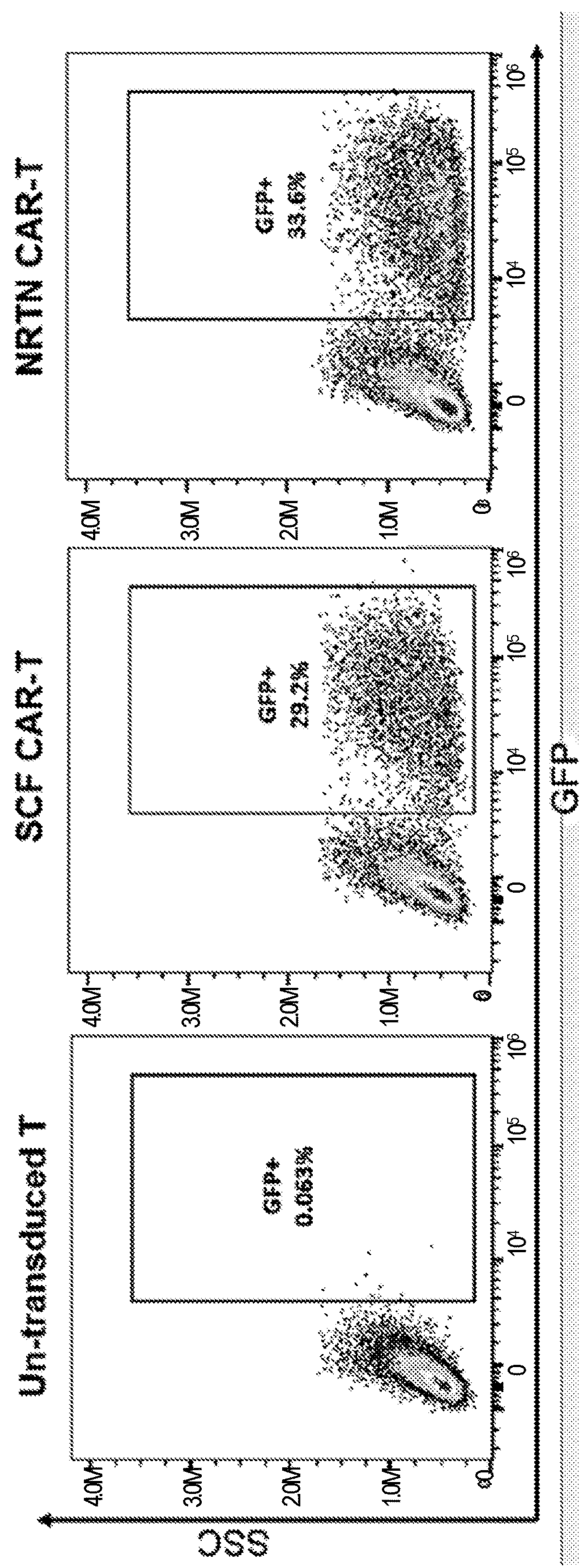
Figure 24B:
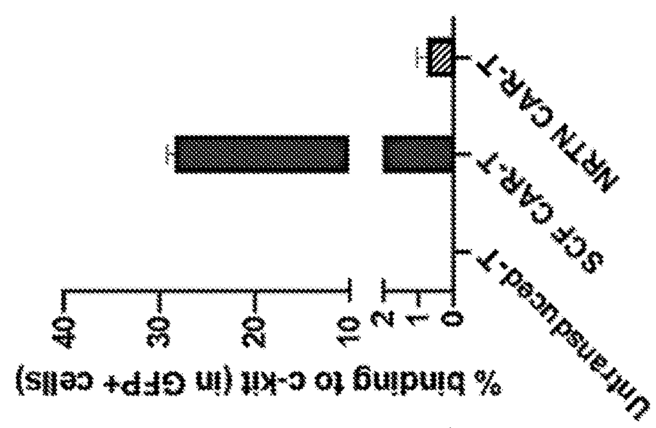
FIGS. 24A-B show that SCF CAR is specific to the c-kit receptor in human primary T cells. SCF CAR transduced T cells and non-related tumor antigen (NRTN) CAR transduced control T cells were incubated with 20 ng of the receptor c-kit Fc chimera for 30 minutes at 4° C., then washed with 3 volumes of FACS Buffer. Cells were then stained with secondary amIgG for 15 minutes at 4° C., then washed again with 3 volumes of FACS buffer. Cells were analyzed on the Cytek Aurora (A) (n=1). Cumulative data from A are shown (B) (n=1, error bars are replicates within the one experiment). These data show that the SCF CAR specifically binds the c-kit chimera, whereas the control NRTN CAR does not.
Figure 24A:
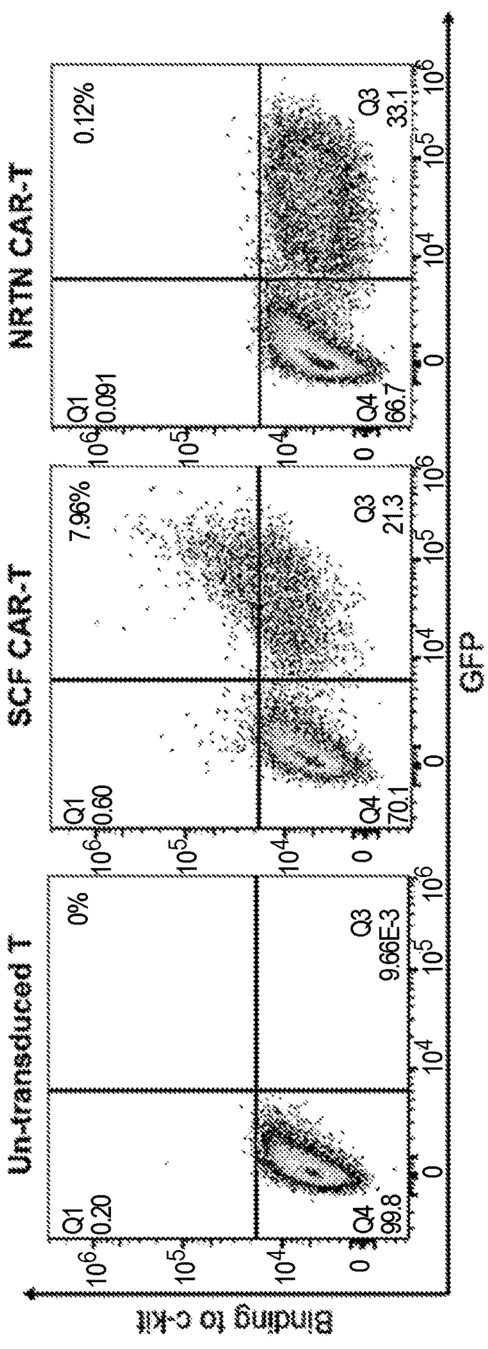

GFP images taken on day 28 post transduction (FIG. 23A) and flow for GFP on day 20 (FIG. 23B) show transgene expression in primary T cells. Transduced primary T cells were then stained with the c-kit chimera Fc protein and secondary antibody. Analysis by flow cytometry reveals 30% of SCF CAR-T cells bind to the c-kit chimera, while less than 2% of the irrelevant NRTN CAR binding (FIG. 24A, B).

Figure 25A:
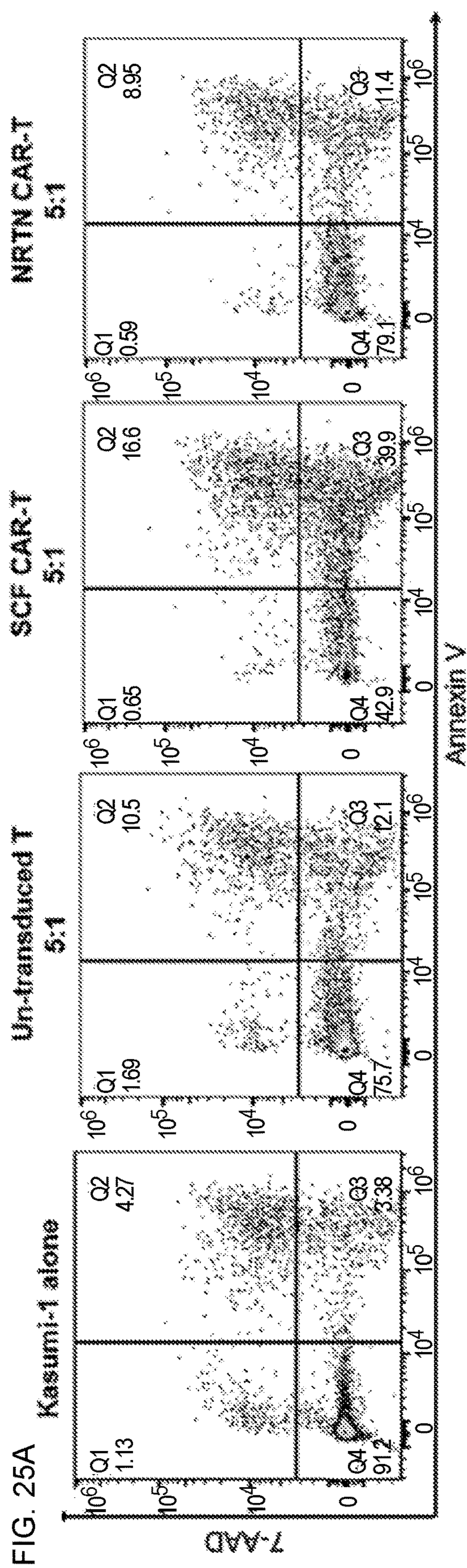
FIGS. 25A-B show that SCF CAR is specifically cytotoxic against the c-kit+ AML cell line Kasumi-1. SCF CAR and NRTN CAR transduced primary T cells at an MOI of 25 were co-cultured with Kasumi-1 cells at an effector-to-target (E:T) ratio of 5:1 for four hours. Cells were then stained to detect cell death by Annexin V and 7-AAD and analyzed on the Cytek Aurora (A) (n=1). Cumulative data from A are shown (B) (n=1, error bars are replicates within the one experiment).
Figure 25B:
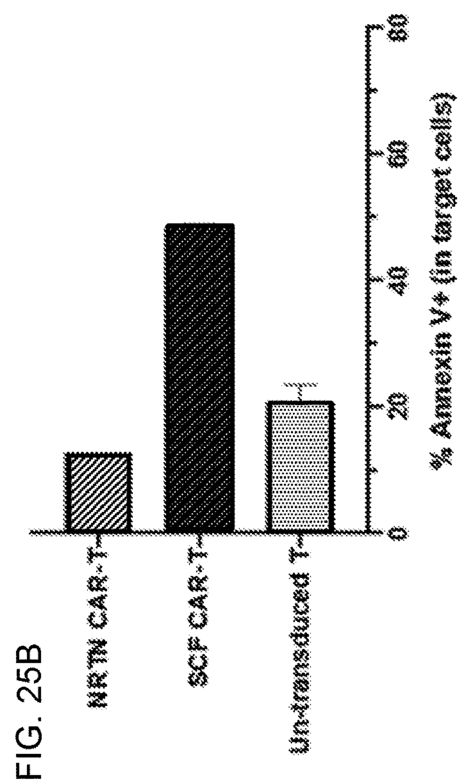
Figure 26A:
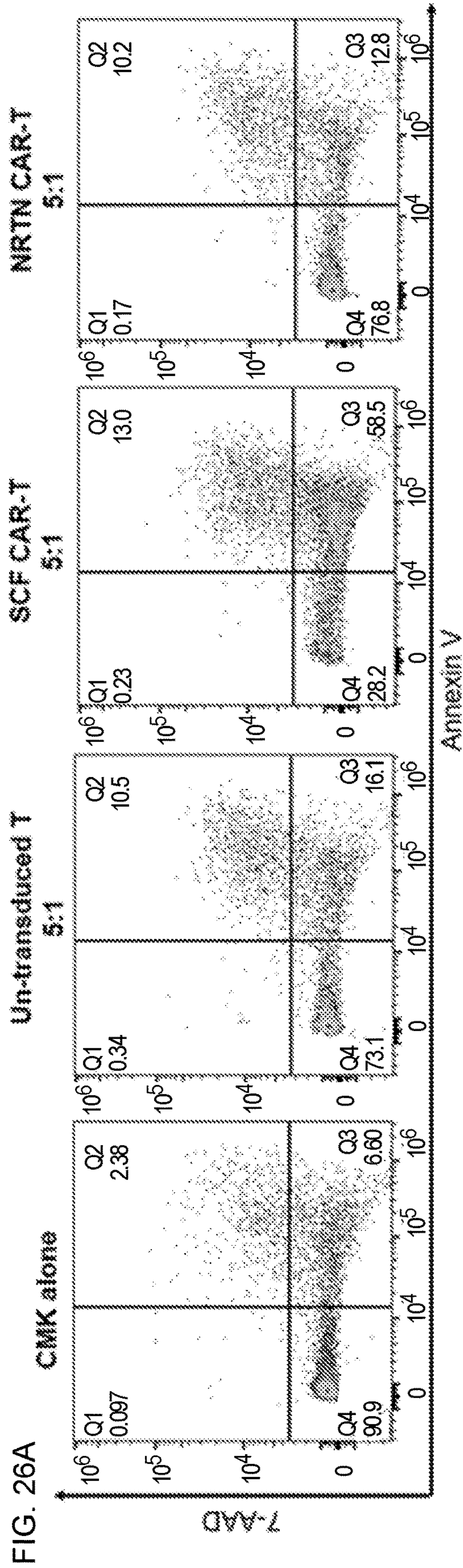
FIGS. 26A-B show that SCF CAR is specifically cytotoxic against the c-kit+ megakaryocytic cell line CMK. SCF CAR and NRTN CAR transduced primary T cells at an MOI of 25 were co-cultured with Kasumi-1 cells at an effector-to-target (E:T) ratio of 5:1 for four hours. Cells were then stained to detect cell death by Annexin V and 7-AAD and analyzed on the Cytek Aurora (A) (n=1). Cumulative data from A are shown (B) (n=1, error bars are replicates within the one experiment).
Figure 26B:
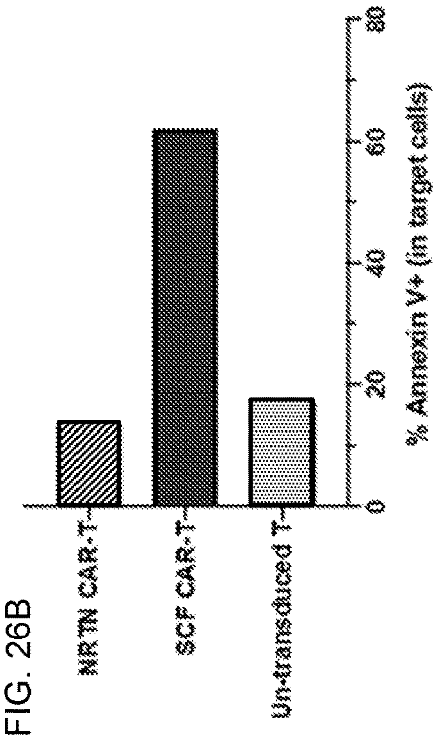

Next, a cytotoxicity assay was performed with SCF CAR-T and NRTN CAR-T cells on both Kasumi-1 cells (FIG. 25) and CMK cells (FIG. 26). Target cell lines were first stained with VPD450 24 hours before analyzed via flow cytometry. CAR-T effector cells and target cell lines were co-cultured at a 5:1 effector-to-target ratio for four hours, and then target cell death was visualized by Annexin V and 7-AAD staining, and then visualized by flow cytometry.

When Kasumi-1 cells were co-cultured with SCF CAR-T cells, their cell death rose to about 50% above background (FIG. 25A, B), while not seen when these cells were co-cultured with the NRTN CAR or the un-transduced-T cells. Similarly, when SCF CAR-T cells were co-cultured with CMK cells, target cell death rose to about 60% above background cell death (FIG. 26A, B), while this was not seen in neither the NRTN CAR-T or un-transduced-T co-cultures. It is important to note that the target cell death of both target cells co-cultured with the NRTN CAR-T cells mimic the cell death seen when co-cultured with the untransduced-T cells, while the cell death rose significantly when co-cultured with the SCF CAR. This shows that the SCF CAR induces specific cytotoxicity against c-kit positive cell lines.

Example IV

Figure 27:
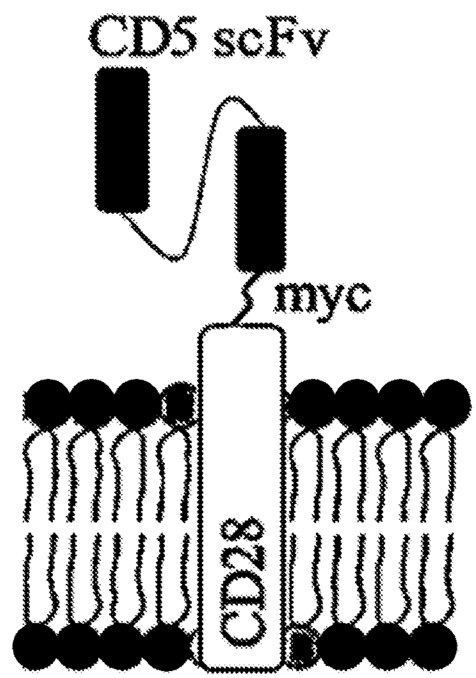
FIG. 27 is a schematic of a non-signaling CAR (NSCAR) targeting CD5 antigen. The NSCAR contains the extracellular antigen targeting domain and the CD28 transmembrane domain with only 2 amino acids of the CD28 intracellular domain. NSCAR lacks an intracellular signaling domain.
Figure 28:
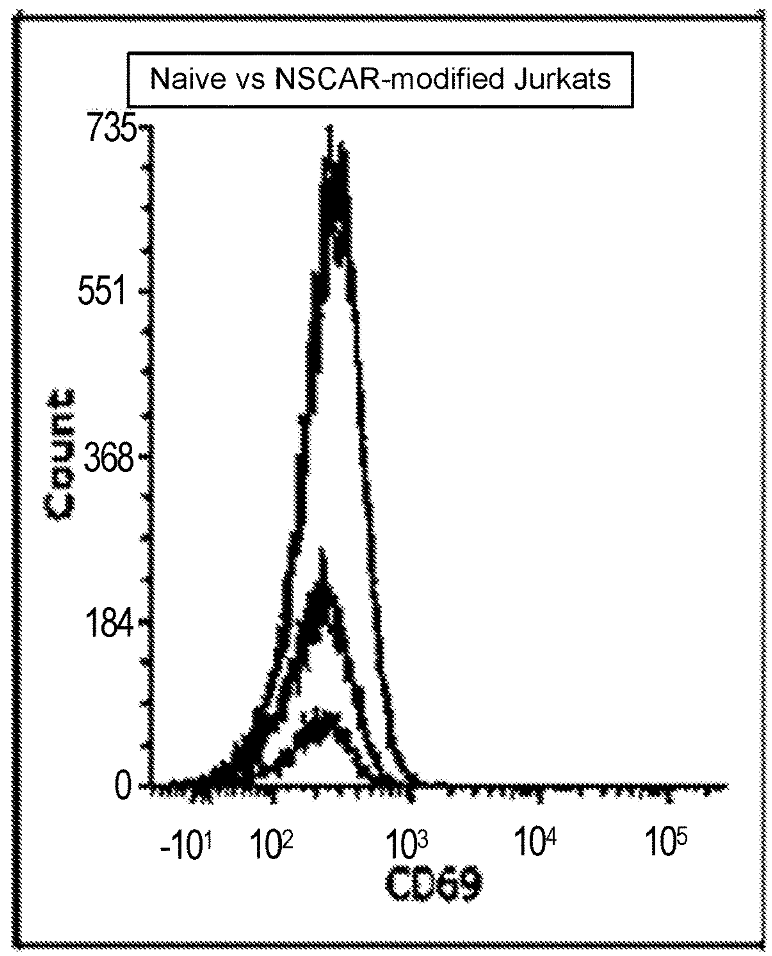
FIG. 28 shows that CD69 is a marker of activation, which is not upregulated in NSCAR modified cells, indicating the NSCAR is non-stimulating. The top line represents NSCAR cells, the middle line unmodified cells, and the bottom line mock modified cells.

Disclosed herein is the development and utility of a non-signaling chimeric antigen receptor (NSCAR) to enhance γδ T-cell cytotoxicity against tumor cells. Although chimeric antigen receptor (CAR) strategies are useful for the treatment of cancer when these constructs are introduced into T cells, especially alpha beta T cells, oftentimes CAR T-cell therapy for the treatment of T-cell malignancies involves the targeting of a protein that is both on the cancer T cells and the T cells being used to kill the targeted cancer cells. Therefore, a problem exists where the CAR-modified T cells can kill themselves during the manufacturing of the CAR product (known as fratricide), which can drastically reduce the effectiveness of the cell product. A NSCAR with the same extracellular components as a CAR was designed, but the construct lacks the intracellular signaling domains (FIG. 27) that are normally part of a CAR. Expression of a CD5-targeting NSCARs in the Jurkat T cell line (which expresses CD5) does not activate the modified cells, which is different from a CAR that activates modified T cells by interacting with the target antigen in nearby cells (FIG. 28). Therefore NSCAR-modified γδ T cells recognize cell surface CD5, but do not become activated.

Figure 29:
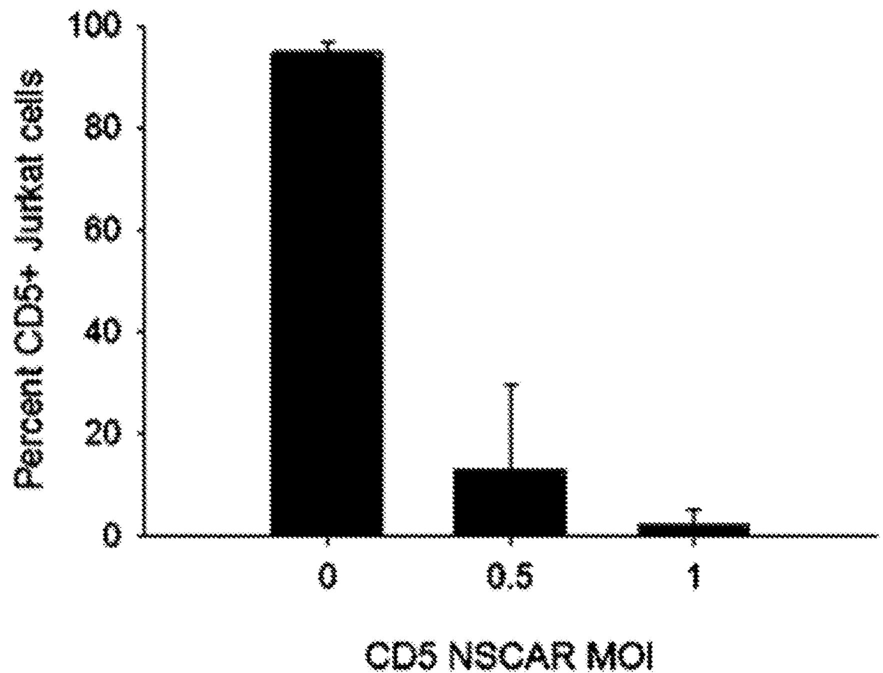
FIG. 29 shows that target antigen is down-regulated by NSCAR, which is similar to results obtained when using CARs (i.e., a signaling CAR).

Results showed that expression of NSCARs in gamma delta T cells increased their ability to kill target cells. This is likely because γδ T cells, unlike of up T cells, are not MHC dependent, and their killing is through interaction with stress ligands or Fas, which is an intrinsic ability to kill tumor cell targets. Therefore, if gamma delta T cells are modified so that they are more likely to contact, and stay in contact, with target cells, they will have enhanced killing. A serum-free protocol for γδ T-cell expansion from PBMCs was developed, resulting in a population of up to 90% γδ T cells. As describe above, to reduce fratricide, an anti-CD5 NSCAR, which contains the scFv and transmembrane portions of the CAR, but not the intracellular activation domains, was designed and tested. Expression of the NSCAR virtually eliminated CD5 surface expression (FIG. 29) and did not affect γδ T-cell expansion.

Figure 30:
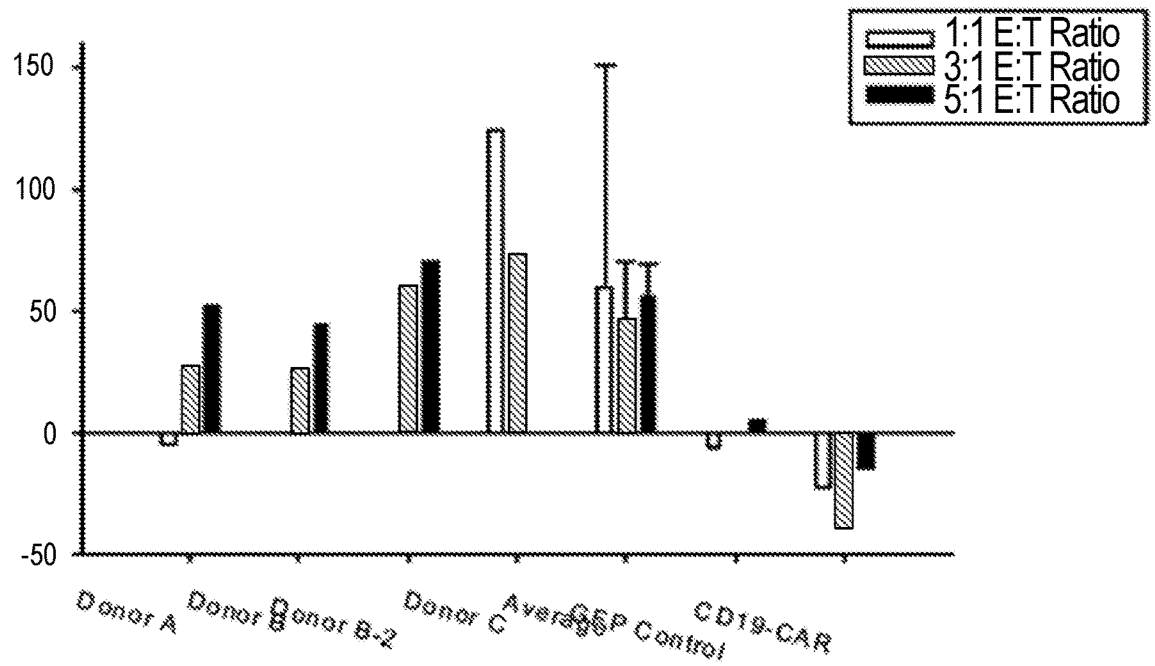
FIG. 30 shows killing of CD5 positive T cells by NSCAR modified gamma delta T cells. Three donors were used for gamma delta T cells expansion (donors A-C), and the modified cells were mixed with CD5 positive leukemic T cells (Jurkat T cells at ratios of 1:1 to 5:1 modified cells to target cells). GFP and CD19CAR modified cells were used as controls.
Figure 31:
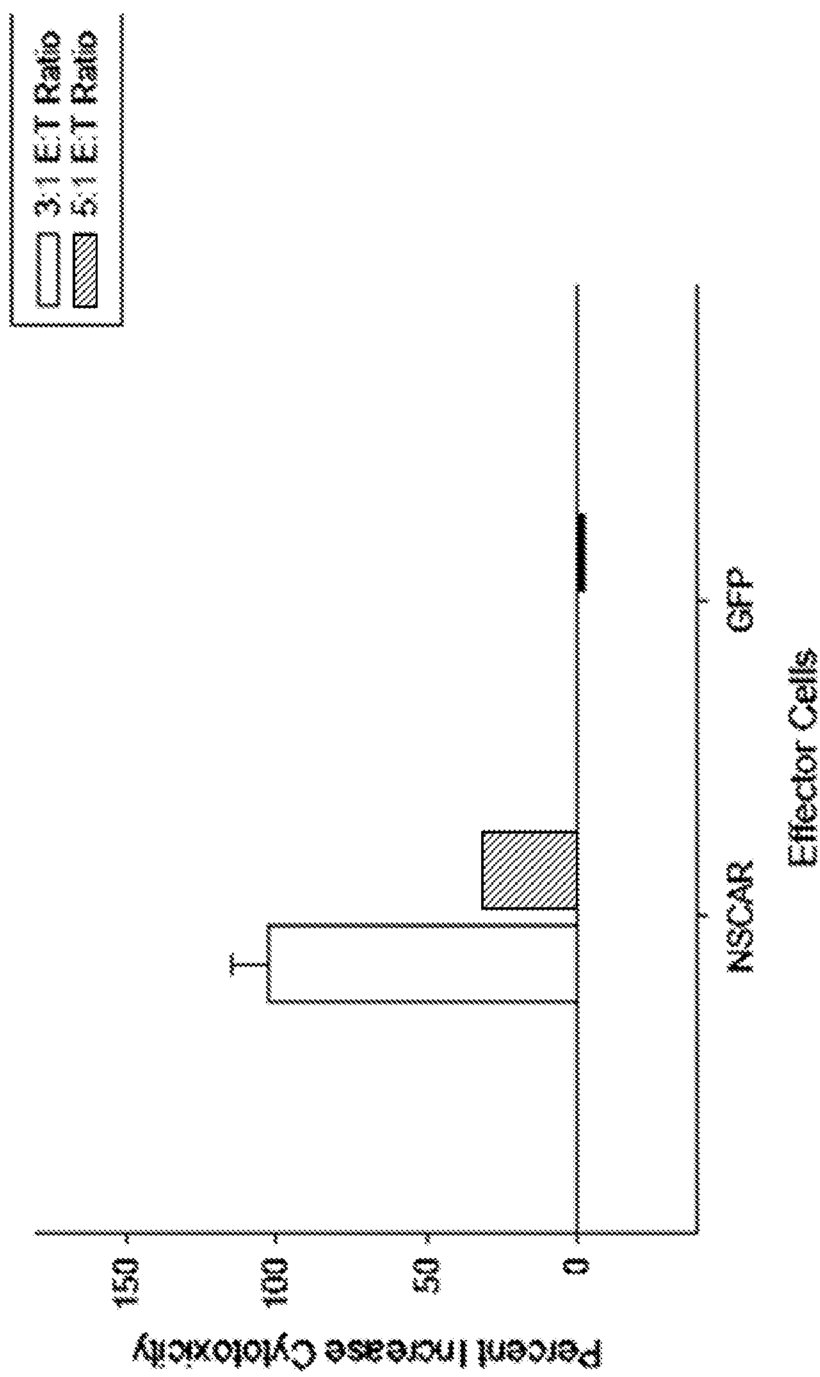
FIG. 31 shows that NSCAR-modified gamma delta T cells kill Molt-4 cells significantly better than GFP modified cells.

NSCAR-modified γδ T cells exhibited enhanced cytotoxicity of CD5-expressing T-ALL cell lines compared to that of naïve cells (FIG. 30). A second CD5 positive cell line, Molt-4 cells, was also tested. At 3:1 and 5:1 NSCAR to target cells there was a dramatic increase in cell killing, which was not observed with cells modified with GFP (FIG. 31).

These results show that the expression of the anti-CD5-NSCAR in γδ T cells extends the time γδ T cells are in close proximity to their targets, permitting interactions between the inherent cytotoxicity mechanisms of γδ T cells and cancer cells, likely involving FasL/Fas, NKG2D, TNFα and TCR. The NSCAR could provide a mechanism to modulate endogenous CD5 expression while minimizing activation of the effector cells, thereby eliminating the potential issues of fratricide, and introducing a binding mechanism to facilitate innate mechanisms of cytotoxicity.

Example V

While some therapies have been successful in treating B-cell malignancies, there are additional challenges to translating CAR therapy for the treatment of T-cell malignancies. Many pre-clinical studies have developed strategies to treat T-cell malignancies, including CARs targeting antigens such as CD5, CD7, CD4, and CD3. However, shared expression of these antigens on the CAR T cells as well as cancer cells can result in fratricide, or CAR T cells killing other CAR T cells. Additionally, a recent report demonstrated evidence of product contamination resulting in clonal expansion of a single leukemic blast that had been modified with the CD19-CAR. The CD19-CAR masked the CD19 antigen from CAR T cells, causing resistance to the therapy. Furthermore, a memory response against T-cell antigens resulting in T-cell aplasia is lethal and is therefore not an option. While therapies targeting B-cell malignancies result in potentially lifelong B-cell aplasia due to a memory response against the targeted antigen, these patients can be treated with intravenous immunoglobulin (IVIG) to overcome this condition. However, due to increased demand for IVIG over recent years, the United States is currently experiencing a shortage of immunoglobulin.

Many groups have developed solutions to overcome these challenges to treating T-cell malignancies using CAR therapy. One option is to targeting an antigen that is absent or expressed at low levels on normal T cells. Unfortunately, the majority of T-cell malignancies do not have high expression of these antigens, which limits their usefulness. An alternative strategy is to utilize donor-derived cells, which eliminates the risk of product contamination, as isolating normal T cells from malignant T cells is a significant obstacle. NK cells and γδ T cells are non-alloreactive and can be used in an allogeneic setting without additional modifications. Additionally, the NK-derived lymphoma cell line, NK-92 cells, can be used as an alternative to T cells for CAR therapy. However, the expansion of NK or NK-92 cells is time-consuming, genetic engineering can be challenging, and they are particularly sensitive to cryopreservation. Strategies to avoid T-cell aplasia have included incorporation of suicide genes and switches into CAR constructs to regulate their expression, provide control over robust responses and prevent memory cell formation, but they are not uniformly effective, and escape of a modified cancer clone could be problematic.

Few strategies that address all three challenges have been evaluated. Provided herein are non-signaling CARs (NSCARs) that, when introduced into γδ T cells, enhance target cell killing while sparing the healthy, engineered cells. NSCARs were expressed in γδ T cells, since donor-derived γδ T cells can be used to prevent product contamination. Also, NSCARs lack signaling/activation domains, but retain antigen-specific tumor cell-targeting capability.

Cell Lines

The Jurkat cell line clone E6-1 was purchased from American Type Culture Collection (ATCC, Manassas, VA). As previously described, the Molt-4 and 697 cell lines were from Dr. Douglas Graham (Emory University). CD5-edited Jurkat T cells were generated as previously described. All cell lines were cultured in RPMI (Corning, Manassas, VA) supplemented with 10% fetal bovine serum (FBS) and 1% penicillin/streptomycin.

Engineering the NSCAR Sequences

The CD5-CAR sequence, as previously described (Raikar et al., "Development of chimeric antigen receptors targeting T-cell malignancies using two structurally different anti-CD5 antigen binding domains in NK and CRISPR-edited T cell lines," *Oncoimmunology,* 2018. 7(3): p. e1407898), was truncated to remove the CD3ζ signaling domain as well as the intracellular portion of CD28. The entire transmembrane domain of CD28 as well as two intracellular amino acids remain. Additionally, a unique 21 base-pair sequence on the cytoplasmic end of the truncated CD28 was included for genetic determination of the proviral sequence. The vector is a bicistronic lentiviral construct, facilitating dual expression of enhanced green fluorescent protein (eGFP) and the NSCAR transgene using a p2a peptide sequence. The CD19-NSCAR was similarly generated by truncation of the CD19-CAR after the first two intracellular amino acids of CD28. Similar to the CD5-NSCAR, this vector is a bicistronic lentiviral construct, expressing eGFP and the NSCAR transgene using a p2a peptide sequence. However, the CD19-NSCAR has the CD8α hinge where the CD5-NSCAR has the myc tag. The CD19-scFv sequence was generated from codon optimization of a published CD19-scFv sequence produced in a mouse hybridoma cell line. Nucleic acid sequences for the constructs are set forth as SEQ ID NOs: 46, 48, 50, 52, 54, 56, 58 and 60. Amino acid sequences for the constructs are set forth as SEQ ID NOs: 47, 49, 51, 53, 55, 57, 59 and 61. Codon optimized CD5 are set forth as SEQ ID NOs: 62-65. Codon optimized CD19 constructs are set forth as SEQ ID NOs: 66-69.

Generation of CAR- and NSCAR-Encoding Lentiviral Vectors

HIV-1-based recombinant lentiviral vectors for all CAR and NSCAR constructs were produced and titered, as previously described (Raikar et al.).

Lentiviral Vector Transduction of Cell Lines

Lentiviral vector transduction was carried out as previously described using 6 μg/mL polybrene (EMD Millipore, Billerica, MA) (Raikar et al.). The transduced cells were cultured for at least five days prior to being used for downstream applications. Jurkat T cells were transduced at multiplicity of infection (MOI) of 0.5 or 1.

Expansion of γδ T Cells from Healthy Donor Blood

Blood was obtained from consented, healthy adults with the assistance of the Emory Children's Clinical and Translational Discovery Core. PBMCs were isolated from 30-50 mL healthy donor blood using Ficoll-Paque density gradient and centrifugation following the manufacturer's protocol. PBMCs were expanded in serum-free conditions as previously described [50] for up to 13 days in vitro. On days 0 and 3, 5 μg/mL zoledronic acid and 500 IU/mL IL-2 was added to the culture. Beginning on day 6, 1000 IU/mL IL-2 was added to the culture medium. Cells were cultured at $1.5\times10^6$ cells/mL.

Expansion of αβ T Cells from Healthy Donor Blood

PBMCs were isolated from healthy donor blood as described above. A Pan T-cell isolation was performed using Miltenyi's Pan T-cell Isolation kit (Miltenyi Biotech, Germany) and the T cells were expanded in X-VIVO 15 media (Lonza, Switzerland) supplemented with 10% FBS, 1% penicillin/streptomycin, 50 ng/mL IL-2 and 5 ng/mL IL-7. Following T-cell isolation, cells were stimulated with CD3/CD28 Dynabeads at a 1:1 ratio for 24 hours (Thermo Fisher Scientific, Waltham, MA). Cells were cultured at $1\times10^6$ cells/mL.

Lentiviral Vector Transduction of γδ T Cells

Lentiviral vector transduction was carried out between days 7 and 9 of expansion. Cells were incubated with 60% vector in culture medium supplemented with 6 μg/mL polybrene for 18-24 hours, at which point culture medium was replaced with fresh medium. The transduced cells were cultured for 3-5 days before being used for downstream applications.

Lentiviral Vector Transduction of αβ T Cells

Lentiviral vector transduction was carried out immediately upon removal of the CD3/CD28 Dynabeads. Cells were incubated with 60% vector in culture medium supplemented with 6 μg/mL polybrene for 18-24 hours, at which point culture medium was replaced with fresh medium. The transduced cells were cultured for 6 days before being used for downstream applications.

Flow Cytometry Analysis

Analysis was performed using a BD LSRII Flow Cytometer (BD Biosciences, San Jose, CA). Data was analyzed using FCS Express 6 software. Antibodies used included anti-CD5 PerCP/Cy5.5, anti-CD3 BV421, anti-γδ TCR PE and anti-CD69 APC-Cy7 (BD Biosciences, San Jose, CA). CD5-Fc fusion protein (G&P Biosciences, Santa Clara, CA) and CD19-Fc fusion protein (ACROBiosystems, Newark, DE) were used to detect anti-CD5 constructs and anti-CD19 constructs, respectively, with a secondary anti-IgG Fc antibody (Jackson Immunoresearch Laboratories, West Grove, PA), as previously described (Raikar et al.). Violet Proliferation Dye 450 (VPD450) was used to label the target cells in the cytotoxicity and co-culture studies, and cell death was assessed using eFluor 780 (described below). Degranulation of γδ T cells was detected using anti-CD107a APC (BD Biosciences, San Jose, CA).

Western Blotting

Jurkat T cells were lysed using RIPA buffer (Sigma-Aldrich, St. Louis, MO) and a protease inhibitor cocktail (Sigma-Aldrich, St. Louis, MO). Quantification of protein, separation by SDS-PAGE, and transfer to a nitrocellulose membrane were performed as previously described (Raikar et al.). The blocked membrane was incubated with an anti-CD5 mAb and HRP-labeled secondary antibody as previously described (Raikar et al.) Densitometry was performed using ImageJ.

Co-Culture Assay Using NSCAR-Modified Jurkat T Cells and CD5-Edited Jurkat T Cells Naïve and CD5-edited Jurkat T cells were transduced with the bicistronic lentiviral vector encoding CD5-NSCAR at MOI 1. After 18-24 hours, culture medium was replaced with fresh medium and on day 5, flow cytometry using BD LSRII Flow Cytometer (BD Biosciences, San Jose, CA) confirmed transduction by both eGFP and CD5-Fc binding. Transduced cells were cultured with naïve or CD5-edited Jurkat T cells previously labeled with VPD450 at modified to non-modified ratios of 1:1 and 1:3. Non-modified cells were labeled according to the manufacturer's protocol (BD Biosciences, San Jose, CA). The cells were cultured for 14 hours at final concentrations of $5\times10^5$ cells/mL. Changes in NSCAR expression on modified cells and CD5 expression on non-modified cells were assessed by flow cytometry.

Cytotoxicity Assay

Cytotoxicity assays were performed on days 12 or 13 of γδ T-cell expansion, or on day 6 post-ap T-cell transduction. Target cells were labeled with VPD450 using the manufacturer's protocol (BD Biosciences, San Jose, CA). Effector cells remained unstained. Effector (E) and target (T) cells were mixed in 12×75 mm FACS tubes at E:T ratios of 3:1 and 5:1 in a total volume of 250 μL. γδ T-cell cytotoxicity assays were incubated for 4 hours at 37° C. in 5% $CO_2$ and αβ T-cell cytotoxicity assays were incubated for 12 hours at 37° C. in 5% $CO_2$. Following incubation, the cells were washed and stained with eFluor 780 (Thermo Fisher Scientific, Waltham, MA). The double positive eFluor 780 and VPD450 cells were assessed using flow cytometry.

Protein Shedding Assay

On day 1 post-transduction, culture medium was changed on γδ T cells and they were cultured for 48 hours under standard conditions as described above. After 48 hours, the supernatants were collected and filtered through a 0.22 micron, low-protein binding PVDF filter (MilliporeSigma, Burlington, MA). Jurkat T cells or 697 cells were then cultured for four hours in the filtered γδ T-cell supernatants. Conditions involving incubation of Jurkat T cells and 697 cells in complete RPMI were included. Additional experiments were performed pre-incubating the γδ T-cell supernatant with CD5-Fc or CD19-Fc for thirty minutes prior to using it to culture the cell lines. Following four hours, Jurkat T cells and 697 cells were washed to remove free proteins and stained with anti-CD5 or anti-CD19 antibodies, respectively, for flow cytometry.

Degranulation Assay

CD19-CAR- and CD19-NSCAR-modified γδ T cells were cultured with 697 cells in 12×75 mm FACS tubes at an E:T ratio of 5:1 in a total volume of 250 μL and incubated for 12 hours at 37° C. in 5% $CO_2$. 697 cells were labeled with VPD450 using the manufacturer's protocol prior to co-culture. Following the incubation, cells were stained for flow cytometry to analyze cell surface expression of CD107a using antibodies including anti-CD3 BV421, anti-γδ TCR PE, anti-CD107a APC (BD Biosciences, San Jose, CA) and viability dye eFluor 780 (Thermo Fisher Scientific, Waltham, MA).

Ifnγ ELISA

CD19-NSCAR-modified γδ T cells were cultured with 697 cells as described above for the degranulation assay. Following the 12-hour incubation, cell culture supernatants were collected and stored at −80° C. for 48 hours. IFNγ secretion was quantified by ELISA (Thermo Fisher Scientific, Waltham, MA) according to the manufacturer's protocol.

Statistical Analysis

Statistical significance was determined using unpaired 2-tailed Student's t test and One-way ANOVA. All ρ-values were calculated with SigmaPlot, version 14.0 (Systat Software, Chicago, IL), and ρ<0.05 was considered statistically significant.

Results

Figure 32:
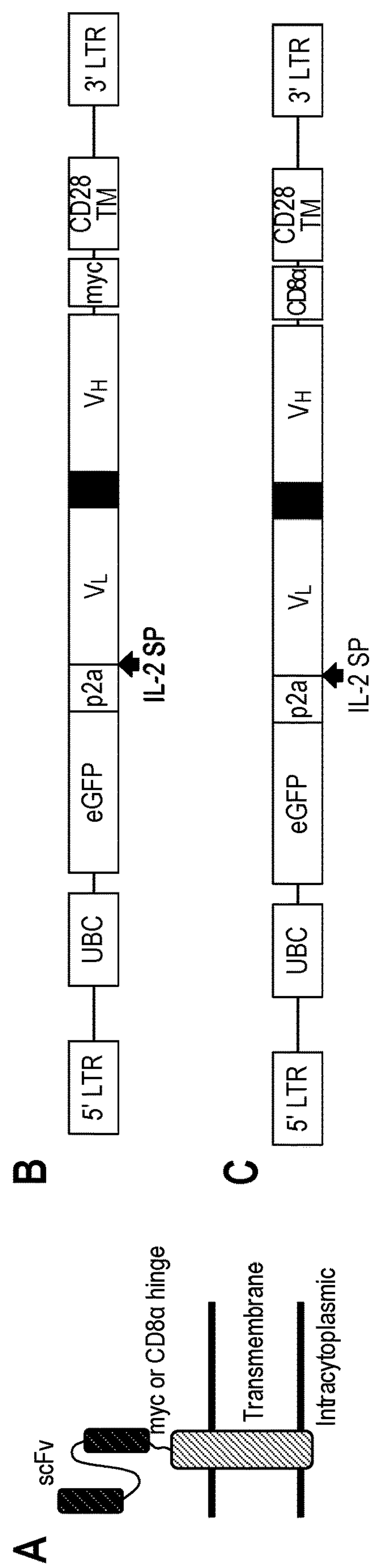
FIGS. 32A-C are schematics of CD5-based and CD19-based NSCAR constructs. NSCAR structure with CD28 transmembrane domain, truncated after two amino acids on the intracellular tail is shown (A). Bicistronic NSCAR transgenes in lentiviral vectors expressing enhanced green fluorescent protein (eGFP) and the NSCARs through the inclusion of a p2a sequence (B and C). Expression of both sequences are driven by the human ubiquitin C promoter (hUBC) with an interleukin-2 signal peptide (IL2-SP). The CD5-NSCAR (B) includes a myc epitope tag, whereas the CD19-NSCAR (C) includes the CD8α hinge.

NSCARs lack the intracellular signaling domains typically present in a CAR (FIG. 32A). As a result, NSCARs are non-activating. While expression of a non-signaling CAR is not expected to affect αβ T-cell cytotoxicity against tumor cells, it was hypothesized that NSCARs can enhance γδ T-cell cytotoxicity. In contrast to αβ T cells, γδ T cells possess alternative mechanisms of cytotoxicity and do not require stimulation through CD3ζ in order to initiate target cell killing. In addition, ex vivo expanded γδ T cells are relatively short-lived with little expansion in vivo, which can help control cytokine release syndrome (CRS) and other adverse events resulting from CAR T-cell therapy. Furthermore, γδ T cells are unlikely to cause GvHD as they interact with antigen independent of MHC-recognition, permitting use in an allogeneic setting. It was hypothesized that NSCARs can act as anchors to tether the γδ T cells to tumor cells expressing the targeted antigen. While the cells are in close proximity, the cytotoxic mechanisms endogenous to γδ T cells can engage, ultimately resulting in tumor cell death.

Two distinct NSCARs: CD5-NSCAR (FIG. 32B) and CD19-NSCAR (FIG. 32C) were designed. γδ T-cell expansion in naïve and NSCAR-modified populations were compared and the cytotoxicity of NSCAR-modified γδ T cells against T-ALL and B-ALL cell lines was assessed. Additionally, the effect of CD5-NSCAR expression on the cytotoxicity of αβ T cells was evaluated. The CD19-NSCAR was compared to the more traditional CD19-CAR. The results described herein demonstrate proof-of-concept that NSCAR expression in γδ T cells enhances antigen-directed killing, and the mechanisms involved are fundamentally and biologically different in αβ T cells.

CD5 Antigen and CD5-NSCAR are Down-Regulated in CD5-NSCAR-Modified Jurkat T Cells without Altering Activation To determine if CD5 down-regulation occurs upon CD5-NSCAR expression, Jurkat T cells were transduced with the CD5-NSCAR at MOIs 0.5 and 1 and CD5 expression was measured by flow cytometry. A significant reduction in the percentage of CD5-positive Jurkat T cells, likely due to interactions with CD5-NSCAR on self and neighboring cells, was detected. As NSCARs do not contain a signaling cytoplasmic tail, it was determined that these interactions causing CD5 down-regulation were not coupled with intracellular signaling. Even at low MOIs, detection of CD5 expression was reduced in transduced cells (MOI 0.5 and MOI 1: ρ<0.001). At MOI 1, <5% of the cells remained CD5-positive (FIG. 33A).

It was demonstrated CD5-CAR expression on CD5-positive Jurkat T cells results in increased activation, as measured by CD69, due to interactions between the CAR and the CD5 antigen (Raikar et al.) However, it was hypothesized that the CD5-NSCAR would not affect the activation levels of the cells since the NSCAR lacks the intracellular signaling domains typically found in a CAR construct. By flow cytometry, it was determined there is no change in CD69 expression in CD5-NSCAR-modified Jurkat T cells compared to the levels of CD69 in naïve Jurkat T cells (FIG. 33B).

Similar experiments were performed with CD19-CAR- and CD19-NSCAR-modified Jurkat T cells. Jurkat T cells modified with the CD19-CAR or CD19-NSCAR did not demonstrate any change in detection of CD5 expression, with 95% of the cells expressing CD5, suggesting the down-regulation observed in CD5-NSCAR-modified Jurkat T cells is due to interactions between the NSCAR and cognate antigen (FIG. 33C). Jurkat T cells do not express CD19 and, as expected, there is no change in Jurkat T-cell activation, as measured by CD69 by flow cytometry, when modified with either a CD19-CAR or CD19-NSCAR (FIG. 33D).

Figure 35A:
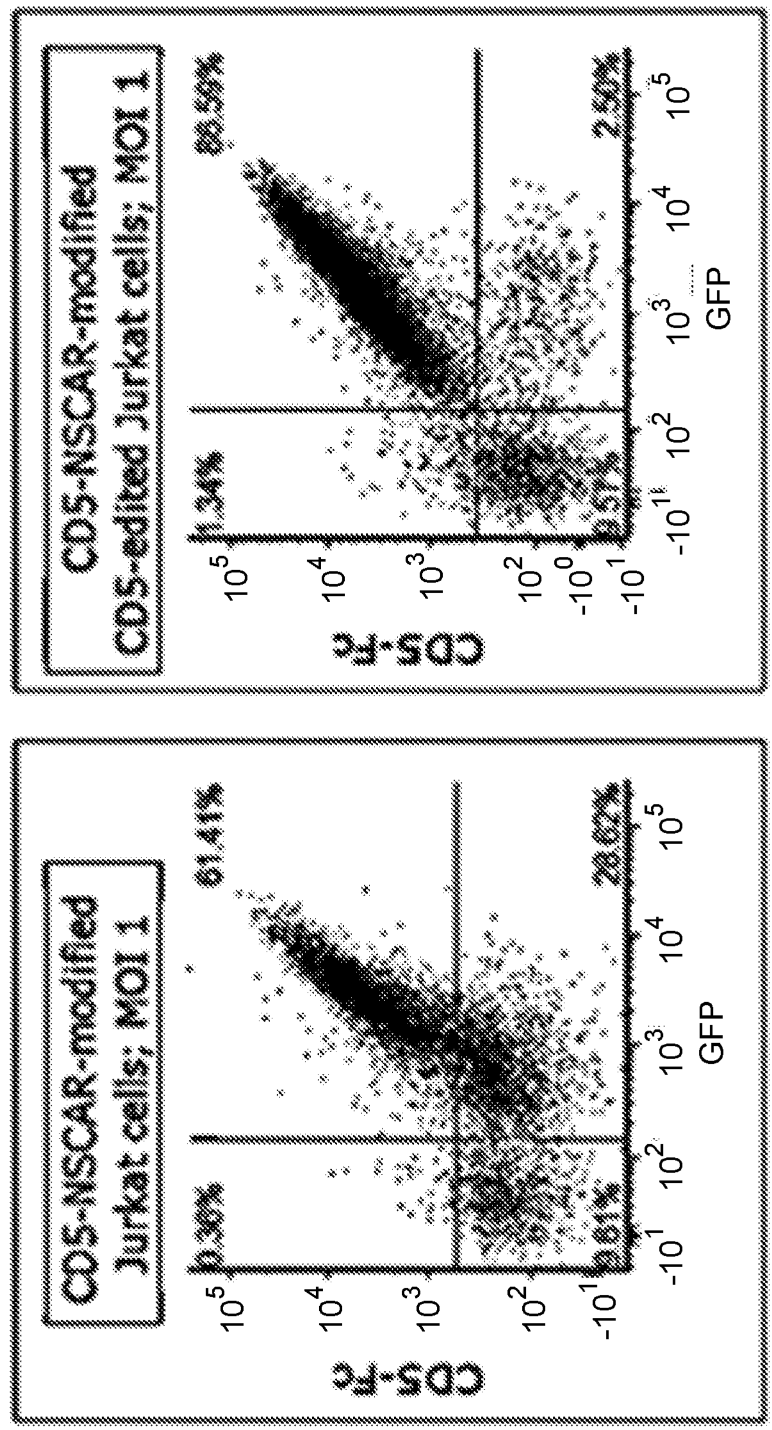

The CD5-NSCAR-modified Jurkat T cells and CD5-edited Jurkat T cells were analyzed for CD5-Fc surface expression using flow cytometry. CD5-edited Jurkat T cells were developed in our laboratory using CRISPR-Cas9 genome editing. The CD5-negative fraction of cells were isolated using FACS with >98% purity and expanded under standard Jurkat T-cell culture conditions, as described previously (Raikar et al.). Jurkat T cells transduced at an MOI 0.5 were, on average, 25% NSCAR-positive, whereas Jurkat T cells transduced at an MOI 1 were, on average, 70% NSCAR-positive. However, CD5-edited Jurkat T cells have a much higher percentage of NSCAR-expressing cells detected by flow cytometry when transduced with the CD5-NSCAR at the same MOIs. At MOIs 0.5 and 1, ~65% and ~90%, respectively, of CD5-edited Jurkat T cells were NSCAR-positive (FIG. 34A). The emergence of a population of GFP-positive, CD5-NSCAR-negative Jurkat T cells was seen following transduction of CD5-expressing cells, however, this population is substantially reduced in CD5-NSCAR-modified, CD5-edited Jurkat T cells (FIG. 35A). This suggests that CD5 expression on Jurkat T cells blocks or reduces expression of the CD5-NSCAR. These results are consistent with previous findings using CD5-CAR-modified Jurkat T cells (Raikar et al.).

To determine if the expression of the CD5-NSCAR and CD5 antigen in Jurkat T cells vary over time, NSCAR and CD5 expression on non-edited and CD5-edited Jurkat T cells were measured by flow cytometry on days 5 and 15 post-transduction. On day 5, approximately 20% NSCAR-positive cells at MOI 0.5 and approximately 50% NSCAR-positive cells at MOI 1 were observed. However, by day 15, the percentage of NSCAR-expressing Jurkat T cells was reduced to ~5% (MOI 0.5) and ~20% (MOI 1) (FIG. 35B). Nevertheless, the percentage of GFP-positive cells remained unchanged, suggesting the transduced cells were not dying or diluted in the culture. Furthermore, while the CD5 expression levels on Jurkat T cells five days post-transduction were very low, such a drastic down-regulation was not observed ten days later, suggesting the balance between CD5 expression and CD5-NSCAR expression shifts over time (FIG. 35C). The increase in CD5 antigen expression correlates with a decrease in CD5-NSCAR expression. In contrast, CD5-NSCAR expression on CD5-edited Jurkat T cells was much less variable between days 5 and 15, decreasing from 65% and 80% to 60% and 77%, at MOIs 0.5 and 1, respectively. To confirm the flow cytometry data, Western blot analysis was performed using an anti-CD5 antibody with whole cell lysates from Jurkat T cells or CD5-edited Jurkat T cells modified with the CD5-NSCAR. Whole cell lysates were collected on day 15 post-transduction. Western blot and densitometry revealed only slightly lower levels of CD5 protein in whole cell lysates of CD5-NSCAR-modified Jurkat T cells compared to CD5 protein levels in naïve Jurkat T cells (FIG. 35D). Non-modified and CD5-NSCAR-modified, CD5-edited Jurkat T cells displayed no signs of CD5 protein expression, as expected.

Figure 36A:
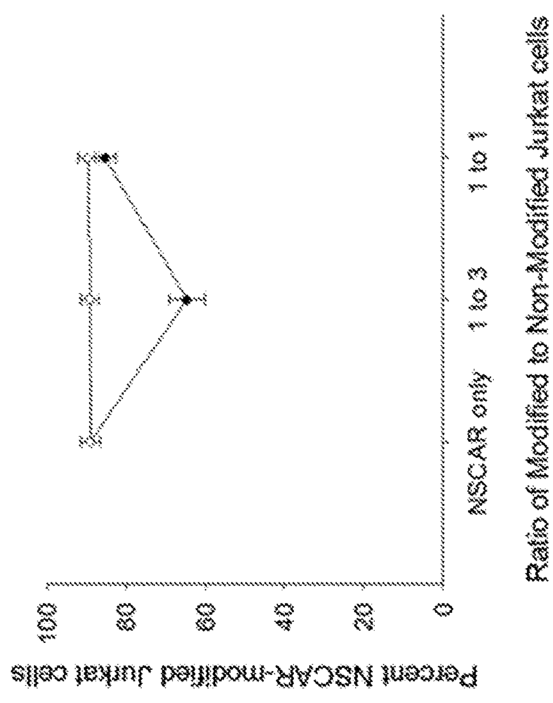
FIGS. 36A-B show CD5-NSCAR-modified, CD5-edited Jurkat T cells cultured with non-modified Jurkat T cells for 14 hours at 0:1, 1:3 and 1:1 ratios of modified to non-modified cells. Flow cytometry was used to detect CD5-Fc binding and CD5 antigen expression. CD5-NSCAR expression on CD5-edited Jurkat T cells cultured with either naïve Jurkat T cells (solid circles) or CD5-edited Jurkat T cells (open circles) is shown (A). CD5 expression on non-modified Jurkat T cells when cultured with CD5-NSCAR-modified, CD5-edited Jurkat T cells is shown (B). Data represent means and standard deviations of four independent replicates.

Co-Culture of CD5-NSCAR-Modified Jurkat T Cells with Non-Modified Jurkat T Cells Leads to CD5 Antigen Down-Regulation in Non-Modified Cells and CD5-NSCAR Down-Regulation in Modified Cells It was hypothesized that the CD5-NSCAR expressed on Jurkat T cells can interact with the CD5 antigen on self and neighboring cells, resulting in down-regulation of both proteins. To explore this further, a 14-hour co-culture to observe changes in CD5-NSCAR expression in Jurkat T cells when cultured with non-modified Jurkat T cells, as well as changes in CD5 antigen expression in the non-modified Jurkat T cells was established. CD5-NSCAR-modified and non-modified Jurkat T cells were cultured at 1:1 and 1:3 modified to non-modified ratios. After 14 hours, a significant down-regulation in CD5-NSCAR expression was observed when the cells were cultured at a low ratio of 1:3 with Jurkat T cells ($\rho<0.001$). Despite a lack of statistical significance at the 1:1 ratio, the same trend was observed ($\rho=0.078$). However, when CD5-NSCAR modified cells were cultured with non-modified, CD5-edited Jurkat T cells, there was no change in CD5-NSCAR expression at either ratio (FIG. 34B). The CD5 antigens on non-modified Jurkat T cells can interact with the CD5-NSCAR on the modified Jurkat T cells, resulting in NSCAR-down-regulation. Therefore, there is a greater reduction in CD5-NSCAR expression in cultures with a higher percentage of non-modified, CD5-expressing cells. Transduction of CD5-edited Jurkat T cells with the CD5-NSCAR produced similar results to those described above when cultured with non-edited Jurkat T cells or CD5-edited Jurkat T cells (At 1:3, $\rho<0.001$; at 1:1, $\rho=0.058$) (FIG. 36A).

Figure 36B:
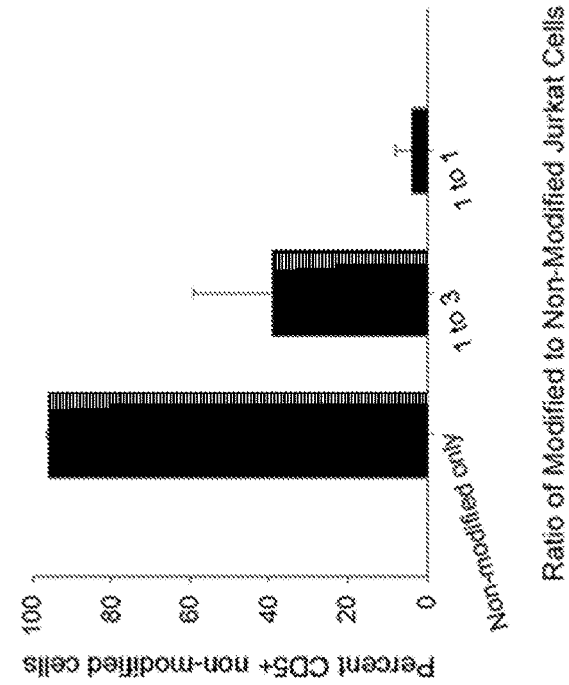

Additionally, the CD5 expression on the non-modified Jurkat T cells in the co-culture was measured. The data demonstrated a significant decline in CD5 expression as the percentage of CD5-NSCAR-modified Jurkat T cells in the culture increased (at 1:3, $\rho=0.097$; at 1:1, $\rho<0.001$), with fewer than 20% of the cells expressing CD5 on the cell surface at the 1:1 ratio (FIG. 34C). This suggests that when there are more CD5-NSCAR-expressing Jurkat T cells in the culture, there is an overall increase in the interactions between the CD5-NSCAR and CD5 antigen, resulting in greater down-regulation of the CD5 antigen on non-modified cells. Similar results were obtained when culturing CD5-edited, CD5-NSCAR-modified Jurkat T cells with non-modified Jurkat T cells. However, the CD5 on the non-modified Jurkat T cells down-regulated to a greater degree when they were cultured with CD5-edited, CD5-NSCAR-modified Jurkat T cells (95% reduction at the 1:1 ratio) compared to when they were in culture with non-edited, CD5-NSCAR-modified Jurkat T cells (80% reduction at the 1:1 ratio) (FIG. 36B).

Figure 37A:
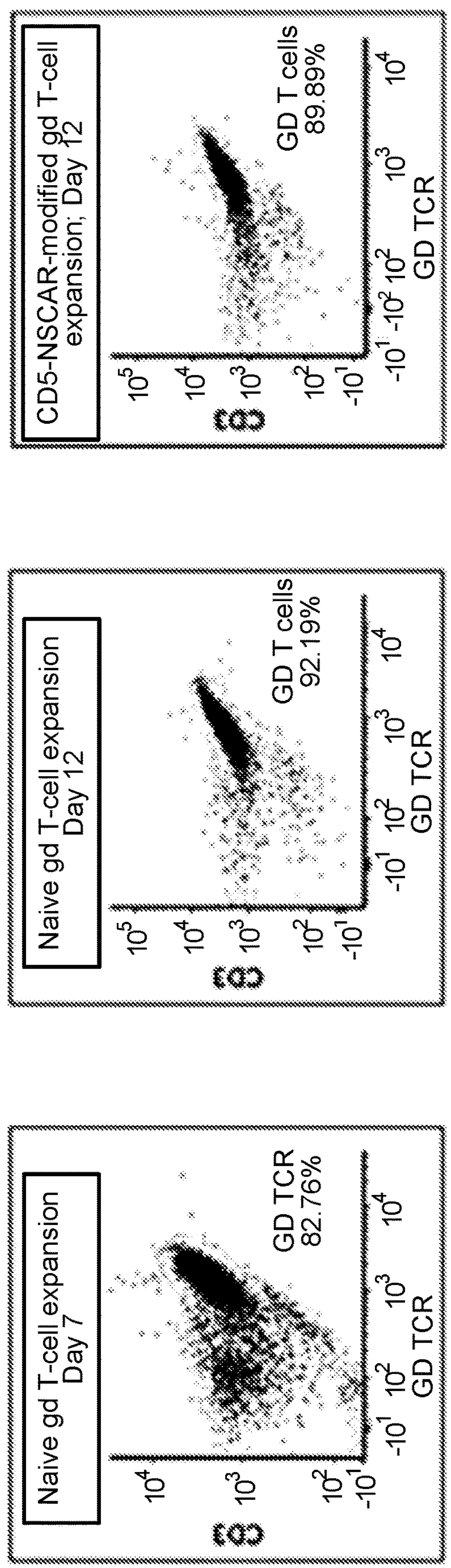
FIGS. 37A-E show NSCAR-modified γδ T-cell expansion and CD5 down-regulation. Representative flow cytometry plots of γδ T-cell expansion are shown. The percentage of γδ T cells on day 7 (A, left) is compared to the percentage of γδ T cells on day 12 in naïve cells (A, middle) and CD5-NSCAR-modified γ6 T cells (A, right). Percentage of γδ T cells in a population of naïve (B, solid circles) and CD5-NSCAR-modified γδ T cells (B, open circles) are shown between day of transduction (7-9) and day of cytotoxicity assay (12-13); n=3. Fold expansion of naïve, GFP-modified, CD5-NSCAR-modified and CD19-NSCAR-modified γδ T cells is shown (C) (Naïve: n=5; GFP and CD5-NSCAR: n=3; CD19-NSCAR: n=2). Representative flow cytometry plots of CD5 expression in CD5-NSCAR-modified (D, left) and CD19-NSCAR-modified γδ T cells (D, right) (Black curve: naïve; gray curve: NSCAR-modified). Graphical representation of CD5 expression in naïve and modified γδ T cells is shown (E) (Naïve: n=8; GFP and CD19-NSCAR: n=2; CD5-NSCAR: n=5). Statistics were performed using 2-tailed Student's t test and one-way ANOVA with Dunnett's method to compare to the naïve control group. Each replicate represents an independent donor.
Figure 37B:
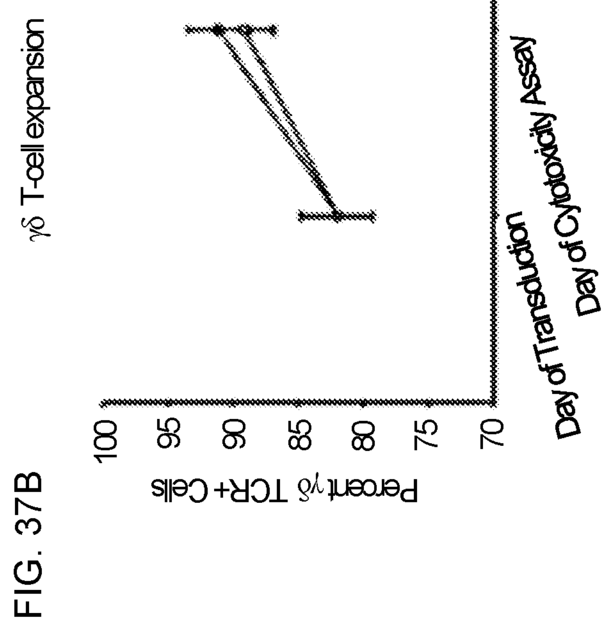
Figure 37C:
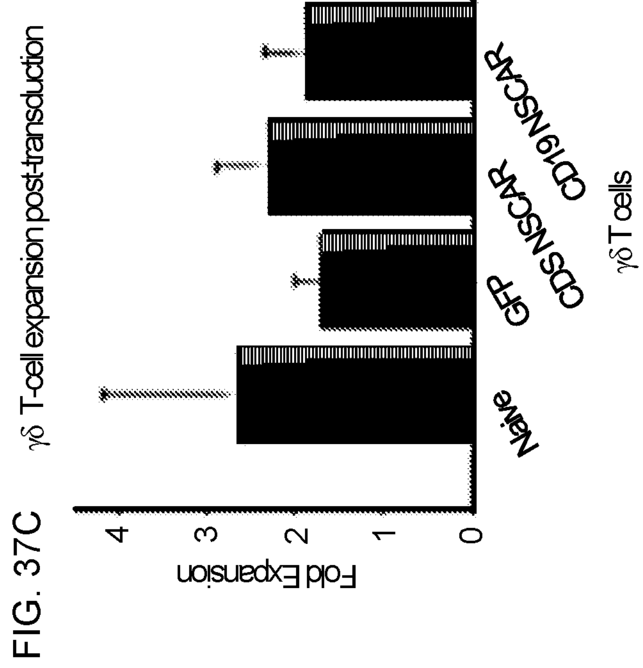

NSCAR Modification does not Impede γδ T-Cell Expansion and, Contrary to CD19-NSCAR Expression, CD5-NSCAR Expression Down-Regulates CD5 Antigen Expression γδ T cells were expanded in serum-free conditions from healthy donor blood using IL-2 and zoledronate. On days 7-9 of expansion, flow cytometry was performed to determine the percentage of γδ T cells and CD5 expression within the γδ T-cell population. For each expansion, γδ T cells were plated for lentiviral vector transduction and a non-transduced well was plated simultaneously. The expansion of naïve and NSCAR-modified γδ T cells was monitored through day 12. The percentage of γδ T cells in the population expanded consistently in both the naïve and CD5-NSCAR-modified cultures, with no significant differences in expansion ($\rho=0.353$) (FIG. 37A and FIG. 37B). Both populations of cells expanded ~2.5-fold in the 4-5 days post-transduction suggesting expression of the CD5-NSCAR does not hinder γδ T-cell expansion nor overall proliferation of the culture, despite the presence of CD5 antigen (FIG. 37C). Similarly, expansion of γδ T cells modified with the CD19-NSCAR or GFP control lentiviral vectors on days 7-9 was evaluated for 4-5 days post-transduction. The control lentiviral vector encodes eGFP driven by the EF1α promoter. CD19-NSCAR- and GFP-modified γδ T cells expanded comparable to naïve γδ T cells (~2-fold) (FIG. 37C). While γδ T cells do not express CD19, these data provide evidence for the hypothesis that transduction alone does not affect γδ T-cell expansion.

Figure 37E:
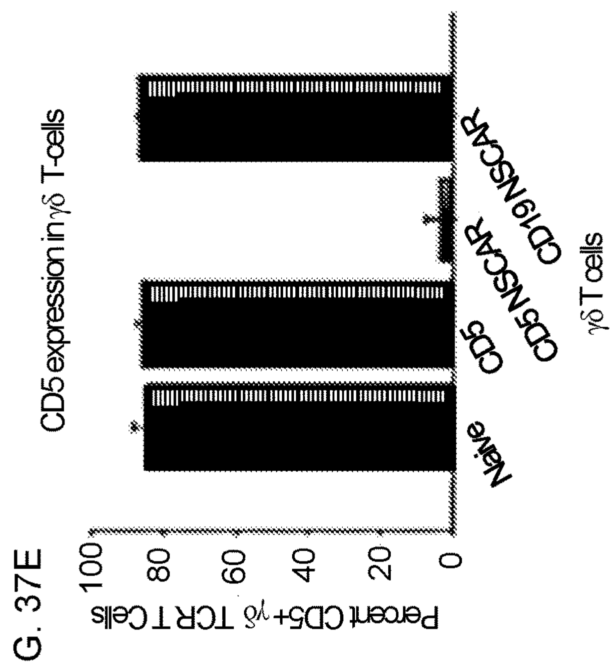
Figure 37D:
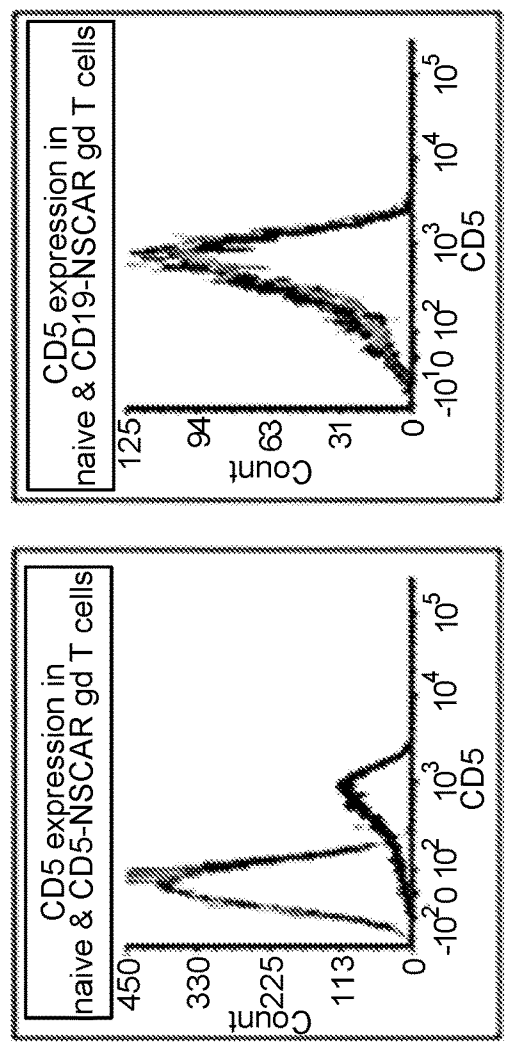

As the studies in Jurkat T cells indicate, interactions between CD5 antigen and CD5-NSCAR results in the apparent down-regulation of CD5. To determine if this occurs in γδ T cells, CD5 expression on the cell surface of naïve and CD5-NSCAR-modified γδ T cells was measured by flow cytometry. A significant decrease in the detection of CD5-expressing, CD5-NSCAR-modified γδ T cells was observed compared to the detection of CD5-positive naïve γδ T cells, with fewer than 10% of the cells expressing CD5 on the cell surface; $\rho<0.001$. However, there was no significant down-regulation of CD5 expression in γδ T cells modified with the CD19-NSCAR or GFP lentiviral vectors (ρ>0.05) (FIGS. 37D and 37E).

NSCAR-Modified γδ T Cells Exhibit Enhanced Antigen-Directed Cytotoxicity

Figure 38A:
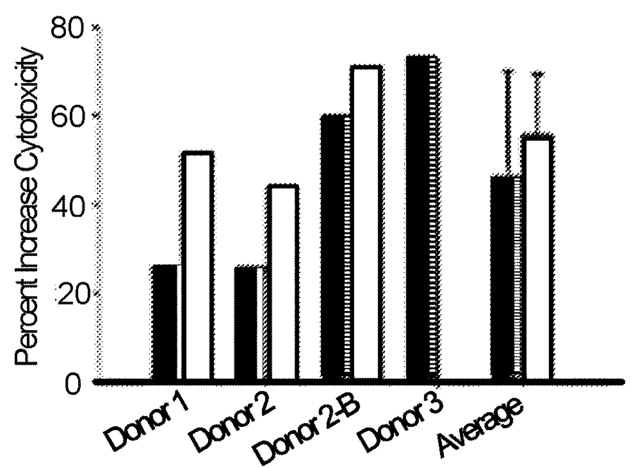
FIGS. 38A-D show NSCAR-modified γδ T-cell cytotoxicity against T-ALL and B-ALL cell lines. Effector cells and target cells were cultured at 3:1 (black bars) and 5:1 (white bars) effector to target (E:T) ratios for four hours. The percent increase in cytotoxicity by modified γδ T cells compared to that of naïve γδ T cells is graphed to account for donor variability in baseline cytotoxicity. The baseline is represented as the cytotoxicity of naive γδ T cells. Flow cytometry was used to measure eFluor780, VPD450 and GFP. γδ T-cell cytotoxicity against CD5-positive Jurkat cells is shown (A). Three different donors modified with the CD5-NSCAR are shown separately, including the overall average cytotoxicity. One donor was repeated. γδ T-cell cytotoxicity against CD5-positive Molt-4 cells is shown (B). Cells from two donors were modified with CD5-NSCAR lentiviral vector. CD19-NSCAR-modified γδ T-cell cytotoxicity against CD19-positive 697 cells is shown for cells from two donors (C). One donor was repeated. Results are shown for 12-hour co-culture of CD19-NSCAR-modified γδ T cells with 697 cells. CD107a expression was measured by flow cytometry six days post-transduction (D, left). ELISA was used to quantify IFNγ secretion by CD19-CAR- and CD19-NSCAR-modified γδ T cells six days post-transduction (D, right). This experiment was performed in triplicate. Statistics were performed using a 2-tailed Student's t test to compare CD19-NSCAR degranulation or IFNγ secretion in co-culture with 697 cells compared to that of naïve cells cultured with 697 cells.
Figure 38B:
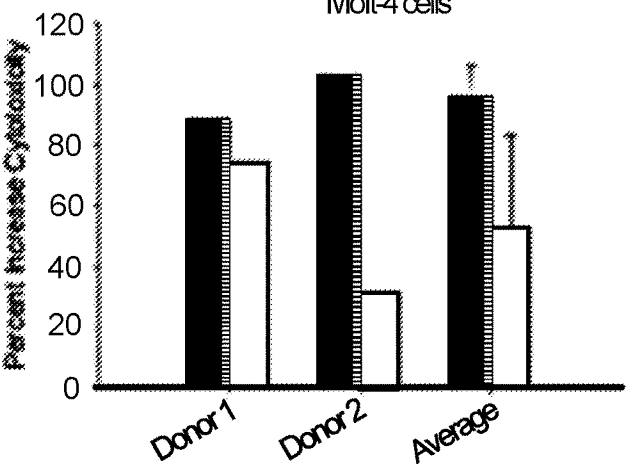
Figure 38C:
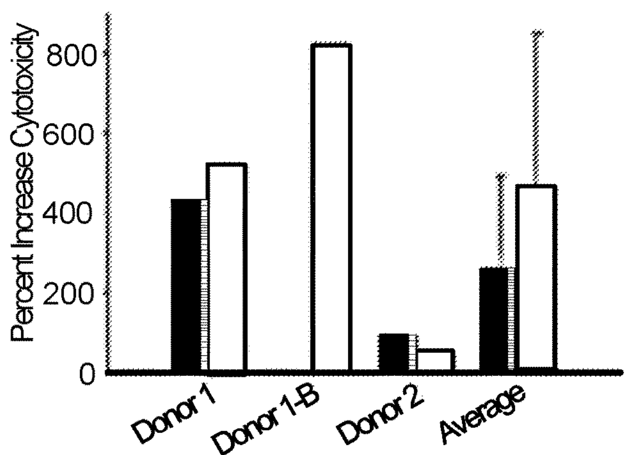
Figure 39:
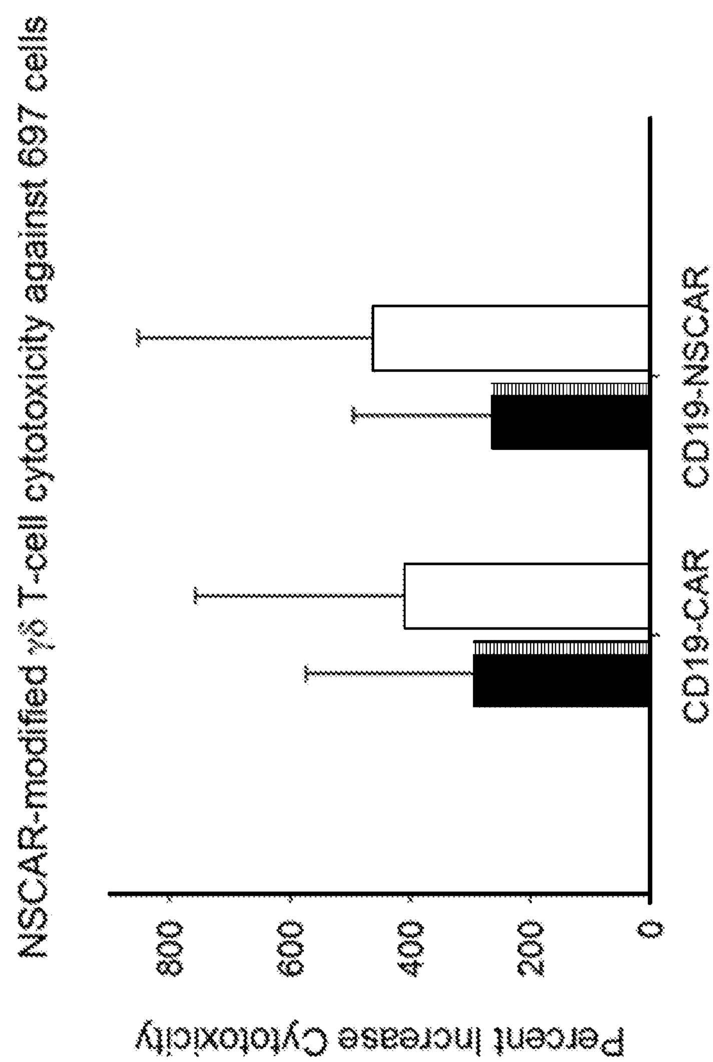
FIG. 39 shows CD19-NSCAR- and CD19-CAR-modified γδ T-cell cytotoxicity against 697 cells at 3:1 (black bars) and 5:1 (white bars) E:T ratios. Means and standard deviations are represented. N=3 for CAR-modified cells; however one donor was also assessed in duplicate at 5:1 ratio. N=2 for NSCAR-modified cells; however, at the 5:1 ratio, one donor was also assessed in duplicate. Statistics were performed using a 2-tailed Student's t test.

To determine if the CD5-NSCAR enhances the cytotoxicity of γδ T cells, a cytotoxicity assay with Jurkat T cells and Molt-4 T cells, and two CD5-positive/CD19-negative T-cell lines was prepared. Cytotoxicity assays were also performed using CD19-NSCAR-modified cells and 697 target cells, which is a CD19-positive/CD5-negative B-ALL cell line. Co-cultures were established at 3:1 or 5:1 effector to target (E:T) ratios and incubated for 4 hours at 37° C. The percent increase in cytotoxicity compared to non-modified γδ T cells is shown in FIG. 5. There was an increase in the cytotoxicity by CD5-NSCAR-modified γδ T cells against both CD5-positive target cell lines compared to non-modified cells (FIG. 38A and FIG. 38B). Additionally, the cytotoxicity of GFP-modified γδ T cells against Jurkat T cells was measured. The data demonstrated donor variability, resulting in cells from half the donors exhibiting a decrease or no change in cytotoxicity upon GFP-modification, while the other half exhibited enhanced cytotoxicity. The greatest change in cytotoxicity was a 75% increase, however, the percentage of dead Jurkats only increased from 6% to 10.5%. On average, at the 5:1 E:T ratio, the CD5-NSCAR-modified γδ T cells cultured with Jurkat T cells or Molt-4 cells resulted in 40% and 35% dead target cells, respectively, both of which correspond to a 50-60% increase in cytotoxicity compared to that of naïve γδ T cells. Furthermore, the CD19-NSCAR enhanced cytotoxicity against 697 cells compared to that of naive γδ T cells, killing on average 32% of the target cells at the 5:1 E:T ratio, which was a 450% increase in killing compared to that of non-modified cells (FIG. 38C). This data validates two NSCARs targeting different tumor-cell antigens demonstrating they can increase γδ T-cell anti-tumor cytotoxicity in vitro. Moreover, the CD19-NSCAR expressed on γδ T cells demonstrates similar cytotoxicity against 697 cells as compared to CD19-CAR-modified γδ T cells (ρ=0.905 and ρ=0.857 at 3:1 and 5:1 E:T ratios, respectively) (FIG. 39). There was a high degree of donor variability in baseline cytotoxicity, consistent with previous findings, however an increase in cytotoxicity by NSCAR-modified γδ T cells was routinely observed.

Figure 38D:
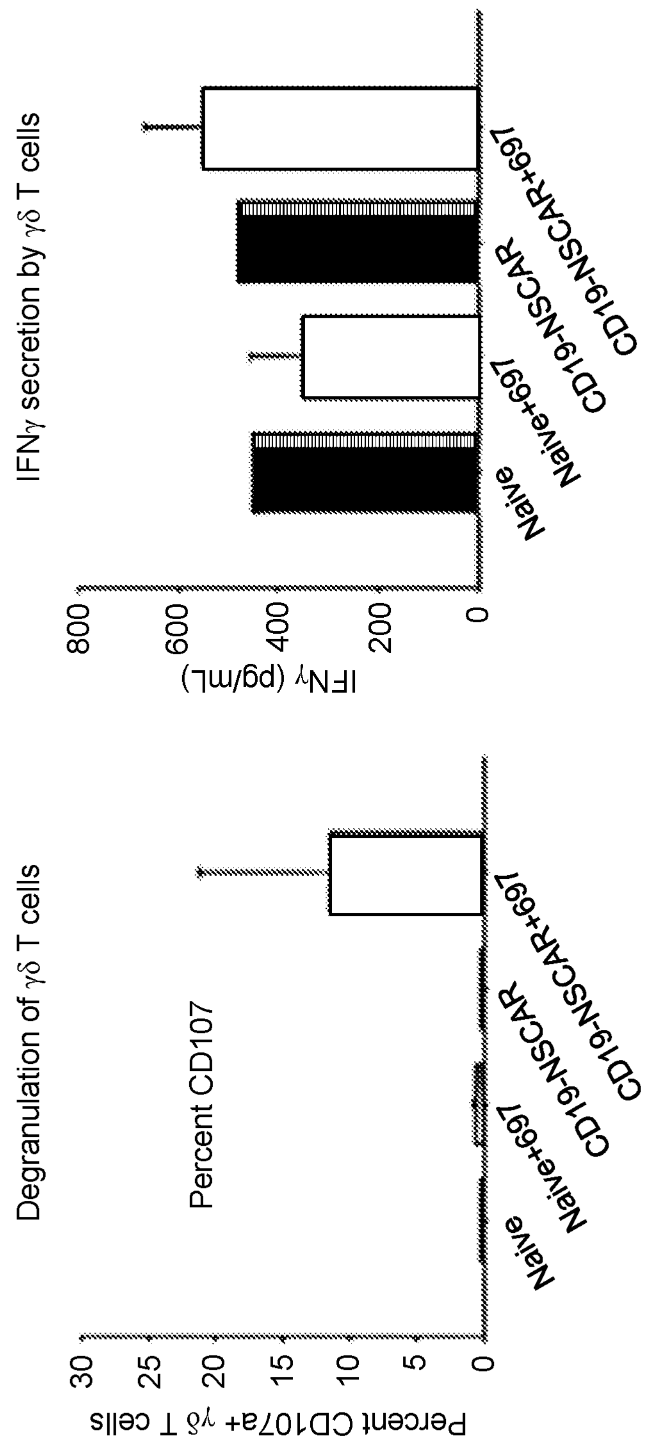

It was hypothesized that the NSCAR-modified γδ T cells exhibit their cytotoxic activity through mechanisms endogenous to the γδ T cell, specifically through the release of perform and granzyme B as well as IFNγ. To evaluate this further, CD19-NSCAR-modified γδ T cells were co-cultured with 697 target cells at a 5:1 E:T ratio and the cells were incubated for 12 hours at 37° C. Following the incubation period, cells were evaluated for degranulation and supernatants were collected and analyzed for IFNγ secretion by ELISA. Upon co-culture with CD19-expressing target cells, there is significantly greater degranulation of CD19-NSCAR-modified γδ T cells compared to degranulation of naïve γδ T cells (ρ=0.0182). The IFNγ ELISA demonstrates a trend towards increased IFNγ secretion by CD19-NSCAR-modified γδ T cells in co-culture with 697 cells compared to secretion by control cells, however, this data was not statistically significant (ρ=0.101) (FIG. 38D).

NSCAR-Modified αβ T Cells do not have Enhanced Anti-Tumor Cytotoxicity

Figure 40:
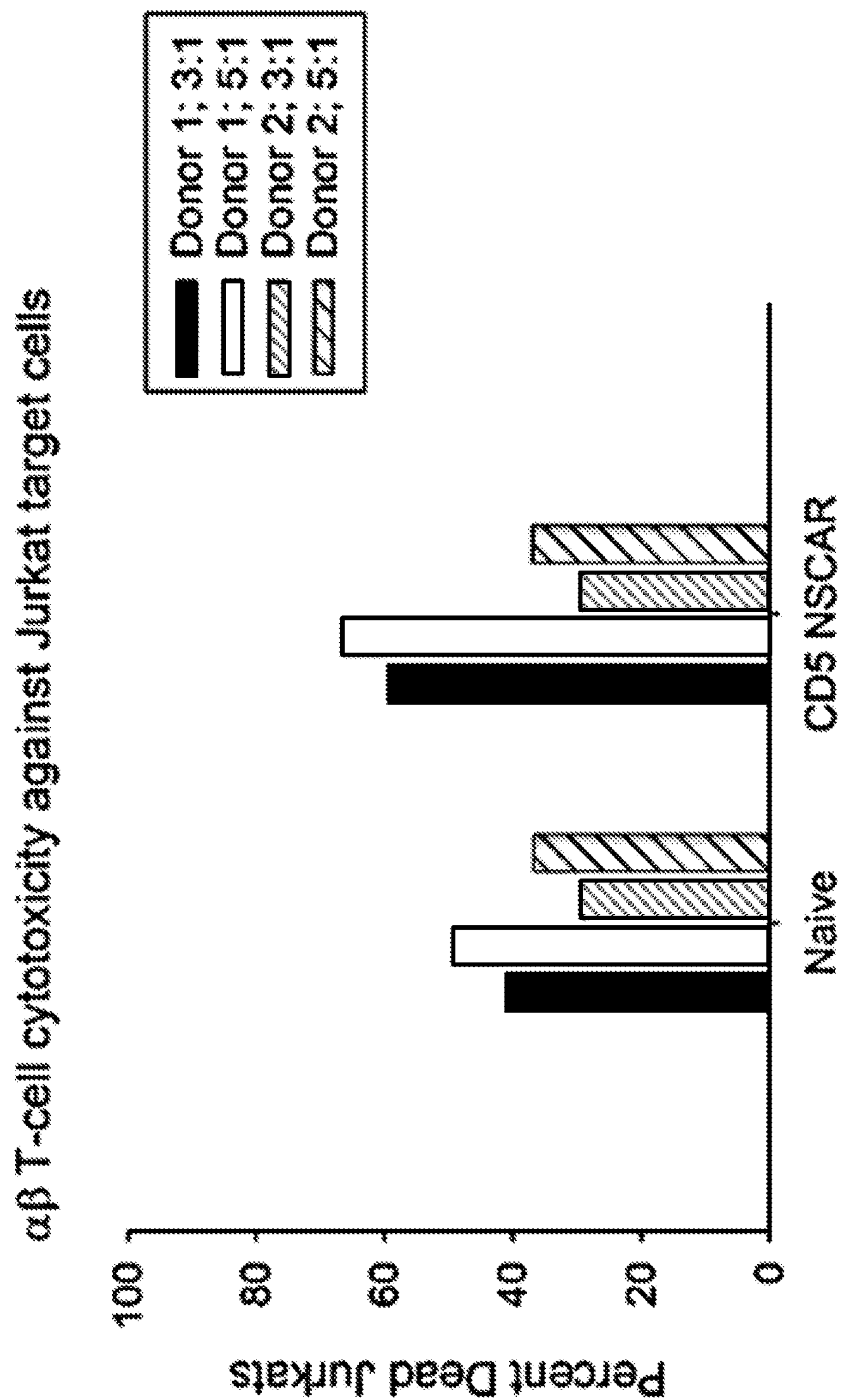
FIG. 40 shows CD5-NSCAR-modified αβ T-cell cytotoxic activity. Effector cells and target cells were cultured at 3:1 (black bars) and 5:1 (white bars) effector to target (E:T) ratios for 12 hours. Cytotoxicity of naïve and CD5-NSCAR-modified αβ T cells in culture with Jurkat T cells was determined by flow cytometry measuring eFluor780, VPD450 and GFP. Solid bars represent donor 1 and slashed bars represent donor 2. Statistics were performed using a 2-tailed Student's t test to compare cytotoxicity at each E:T ratio among donors.
Figure 41A:
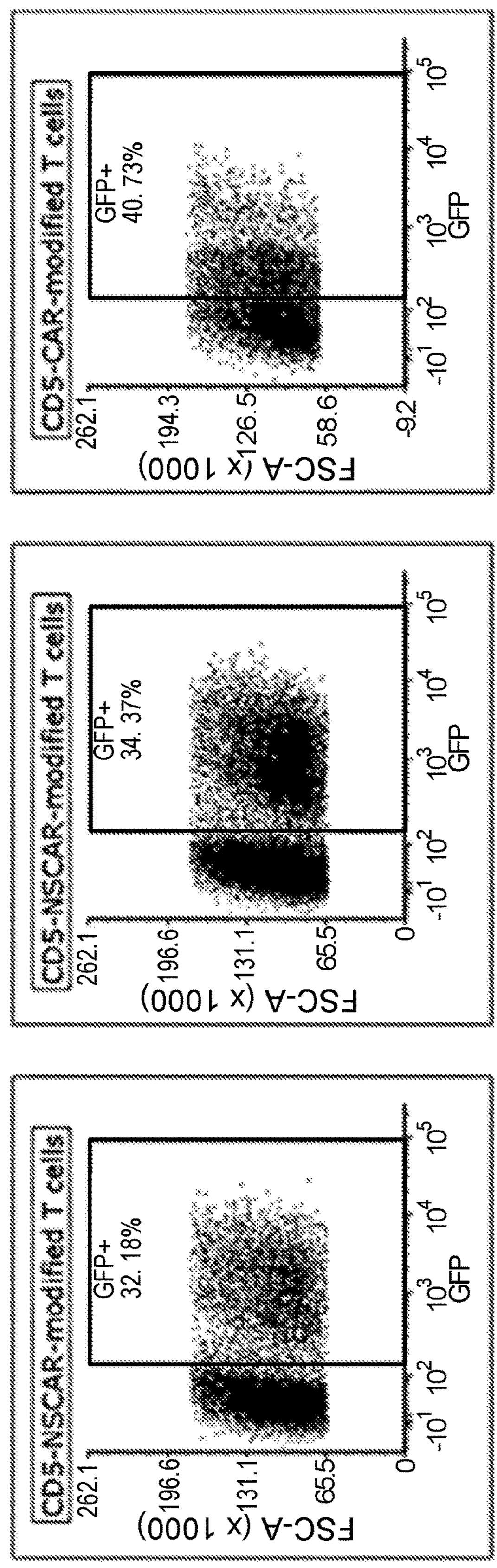
FIGS. 41A-B show CD5-NSCAR- and CD5-CAR-modified αβ T cells. GFP expression is shown in CD5-NSCAR-modified αβ T cells from donor 1 (A, left) and donor 2 (A, middle) and in CD5-CAR-modified αβ T cells from donor 1 (A, right) on day 6 post-transduction. Results for a CD5-CAR-modified αβ T-cell cytotoxicity assay against Jurkat T cells is shown at a 3:1 E:T ratio (B).
Figure 41B:
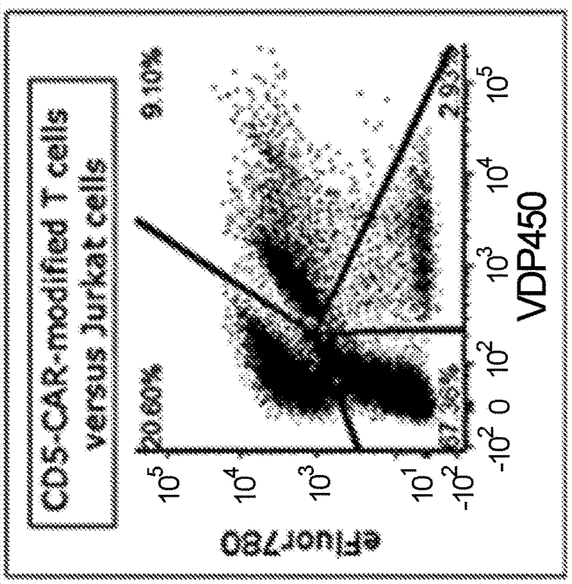

To test the hypothesis that NSCAR expression requires MHC-independent mechanisms of cytotoxicity in order to affect cellular killing in an antigen-specific manner, cytotoxicity assay were performed by culturing CD5-NSCAR-modified αβ T cells with Jurkat target cells at 3:1 and 5:1 E:T ratios. It was predicted the CD5-NSCAR would not affect αβ T-cell cytotoxicity. Others have previously published studies using constructs similar to the NSCAR and demonstrated the truncated CAR does not increase T-cell activation as measured by CD25, nor does it affect cellular proliferation or viability. The data provided herein demonstrate there was no difference in naïve αβ T-cell cytotoxicity against Jurkat T cells compared to the cytotoxicity of CD5-NSCAR-modified αβ T cells against Jurkat T cells, with both resulting in 40-45% dead targets at each E:T ratio (3:1 E:T ratio: ρ=0.618; 5:1 E:T ratio: ρ=0.639) (FIG. 40). Both donors were transduced equally by the CD5-NSCAR lentiviral vector and one donor was additionally modified with the CD5-CAR (FIG. 41A). CD5-CAR-modified αβ T cells killed 80% of the Jurkat target cells (FIG. 41B), a 78% increase in cytotoxicity compared to that of naïve αβ T cells.

Figure 42A:
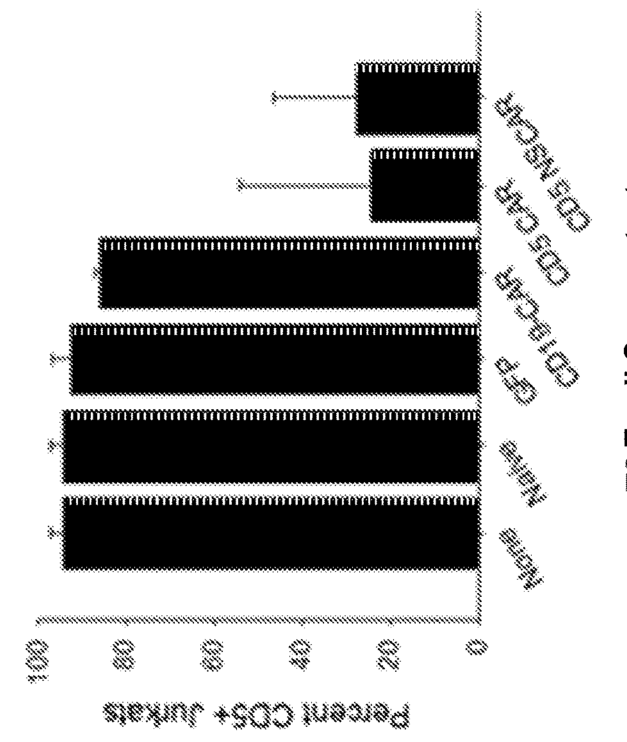
FIGS. 42A-D CD5 and CD19 expression on Jurkat T cells (A and B) and 697 cells (C and D), respectively, when cultured in γδ T-cell supernatant. γδ T cells were cultured for 48 hours prior to supernatant collection. Jurkat T cells and 697 cells were subsequently cultured in γδ T-cell supernatant for four hours. Flow cytometry was used to measure antigen expression. CD5 expression on Jurkat T cells cultured in γδ T-cell supernatant is shown (A). Sample size of groups: none and naïve: n=5; GFP and CD5-NSCAR: n=4; CD19-CAR and CD5-CAR: n=2. CD5 expression on Jurkat T cells are shown when γδ T-cell supernatant was pre-incubated with CD5-Fc prior to Jurkat T-cell culture in the supernatant (B). These experiments were performed using cells from two donors. CD19 expression on 697 cells cultured in γδ T-cell supernatant is shown (C) (n=2). CD19 expression on 697 cells is shown when γδ T-cell supernatant was pre-incubated with CD19-Fc prior to 697 cell culture in the supernatant (D) (n=2). One-way ANOVA was performed using the Holm-Sidak method to compare to the naïve control group (A) or pairwise (B). One-way ANOVA with Dunnett's method was used to compare to the naïve control group (C and D). Each replicate represents an independent donor.
Figure 42B:
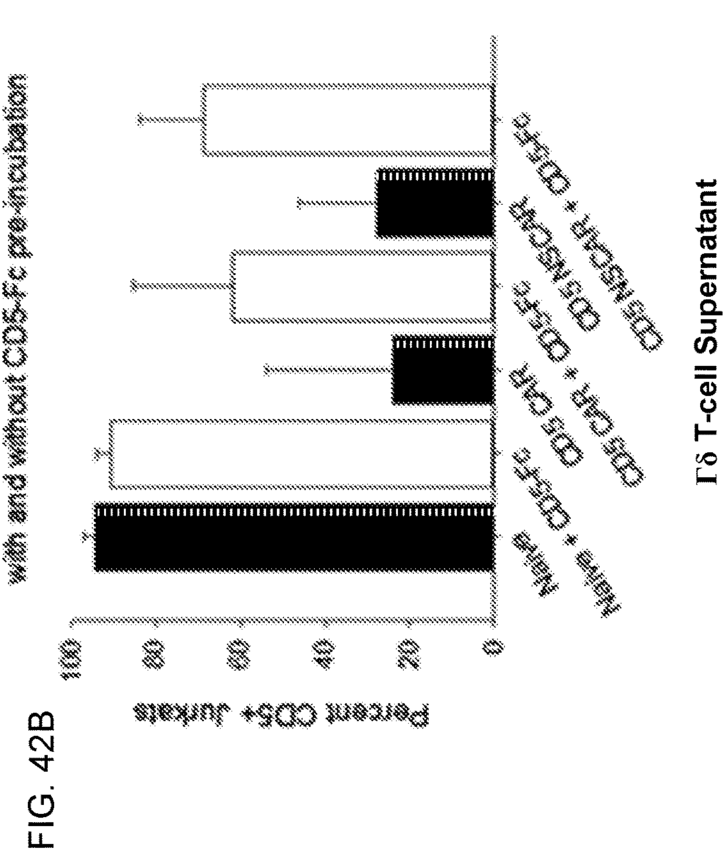

NSCAR Shed from the Cell Surface into the Supernatant can Interact with Target Cells It was hypothesized that the apparent down-regulation of the NSCAR may be due, in part, to protein shedding from modified γδ T cells resulting in lower NSCAR on the cell surface. To determine if shedding was occurring, γδ T cells were cultured in fresh media on day 1 post-transduction. Non-modified cells were cultured under the same conditions and 48 hours later, the supernatants were collected and filtered. Jurkat T cells were cultured in the γδ T-cell supernatant for four hours. Flow cytometry was performed to determine the CD5 expression levels on Jurkat T cells following culture in γδ T-cell supernatant. Jurkat T cells cultured in their own media, or supernatant from naive γδ T cells, GFP-transduced γδ T cells, or CD19-CAR-transduced γδ T cells all expressed high levels of CD5 as measured by flow cytometry. However, Jurkat T cells cultured in the supernatant of CD5-CAR- or CD5-NSCAR-modified γδ T cells demonstrated a significant reduction in CD5 antigen detection to ~25%. This suggests there was a factor in the supernatant of both CD5-CAR- and CD5-NSCAR-modified γδ T cells that interacted with the Jurkat T cells, resulting in CD5 down-regulation or blocking of anti-CD5 antibody from binding CD5 on the T-cell surface (CAR and NSCAR: ρ<0.001) (FIG. 42). It was hypothesized that the extracellular portion of the CAR/NSCAR was cleaved from the cell surface and interacting with its cognate antigen. To test this, the γδ T-cell supernatant was preincubated for thirty minutes with CD5-Fc, which is a soluble CD5 fused to the Fc portion of an IgG, prior to culturing the Jurkat T cells in the supernatants. Jurkat T cells cultured in the pre-incubated CD5-CAR- or CD5-NSCAR-modified γδ T-cell supernatant no longer exhibited decreased detection of CD5 (ρ=0.240 and ρ=0.402, respectively). CD5 expression was measured at 60% and 70% of the population, respectively. Additionally, the pre-incubation did not affect the percentage of CD5-positive Jurkat T cells cultured in naïve γδ T-cell supernatant (ρ=0.956). Furthermore, upon CD5-Fc pre-incubation, the percentage of CD5-expressing Jurkat T cells cultured in supernatants of CD5-CAR- or CD5-NSCAR-modified γδ T cells did not significantly differ from that of cells cultured in pre-incubated naïve γδ T-cell supernatants (ρ=0.407 and ρ=0.584, respectively) (FIG. 42B).

Similar experiments were performed to determine if this effect was CD5-NSCAR-specific or if the CD19-NSCAR behaved similarly. γδ T cells transduced with a CD19-NSCAR were cultured for 24-48 hours and the supernatants were then used to culture 697 cells for four hours as previously described. Following the four-hour incubation, CD19-positive 697 cells were measured by flow cytometry.

Figures 42C, 42D:
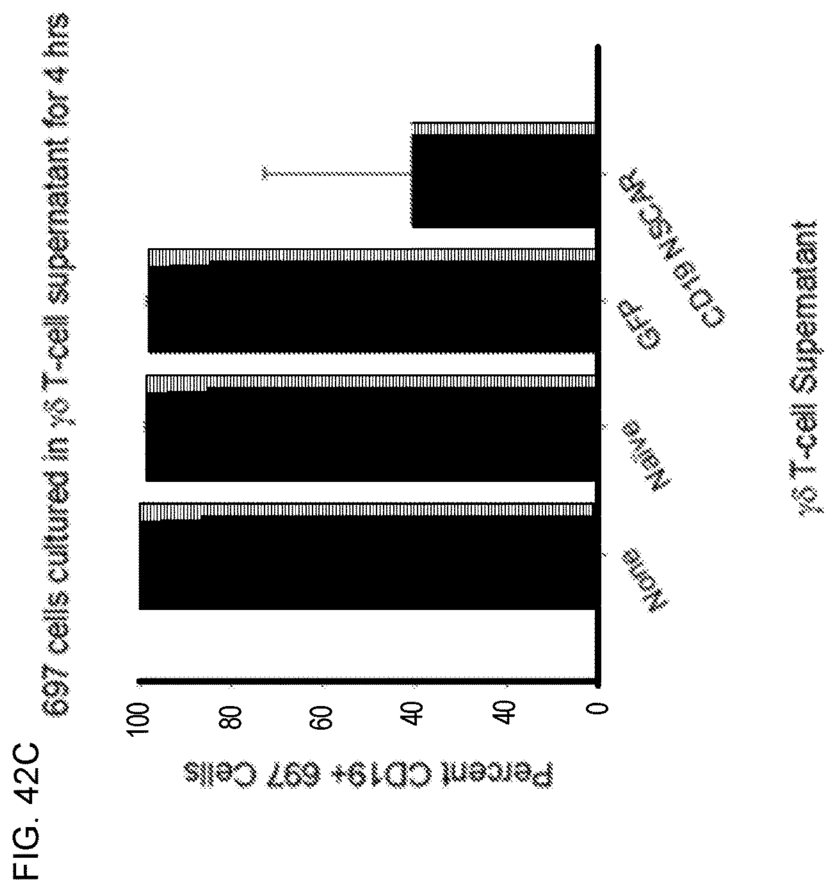

697 cells cultured in their own media or supernatant from naïve or GFP-modified γδ T cells demonstrated no change in CD19 detection. However, there was a significant decrease in CD19 detection when 697 cells were cultured in supernatant from CD19-NSCAR-modified γδ T cells (ρ=0.048), suggesting this effect is not specific to the CD5-NSCAR, nor to T-cell antigens (FIG. 42C). As described, reduction in CD19 detection could be due to down-regulation or blockade of antibody-binding due to CD19-NSCAR interactions with the CD19 antigen. CD19 expression had been reduced to 40% of 697 cells cultured in supernatant from CD19-NSCAR-modified γδ T cells. Furthermore, pre-incubation of γδ T-cell supernatant with soluble CD19-Fc under the conditions previously described prevented this reduction in CD19-expressing 697 cells. CD19 was detected in ~80% of the cells cultured in CD19-Fc pre-incubated supernatant from CD19-NSCAR-modified γδ T cells. There is no difference between the percentage of CD19-expressing 697 cells cultured in the pre-incubated naïve γδ T-cell supernatant compared to that of 697 cells cultured in the pre-incubated CD19-NSCAR-modified γδ T-cell supernatant (FIG. 42D).

NSCARs have potential as an alternative to CAR therapy, particularly in settings of T-cell malignancies using donor-derived cells, due to their ability to enhance γδ T-cell cytotoxicity in an antigen-directed manner, without self-activating and hindering cellular proliferation. In the appropriate clinical setting, NSCARs have the potential to surpass CARs as a viable therapy, increasing anti-tumor efficacy and minimizing off-tumor cytotoxicity.

It is understood that the examples and embodiments described herein are for illustrative purposes only and that various modifications or changes in light thereof will be suggested to persons skilled in the art and are to be included within the spirit and purview of this application and scope of the appended claims.

Example VI

Figure 43:
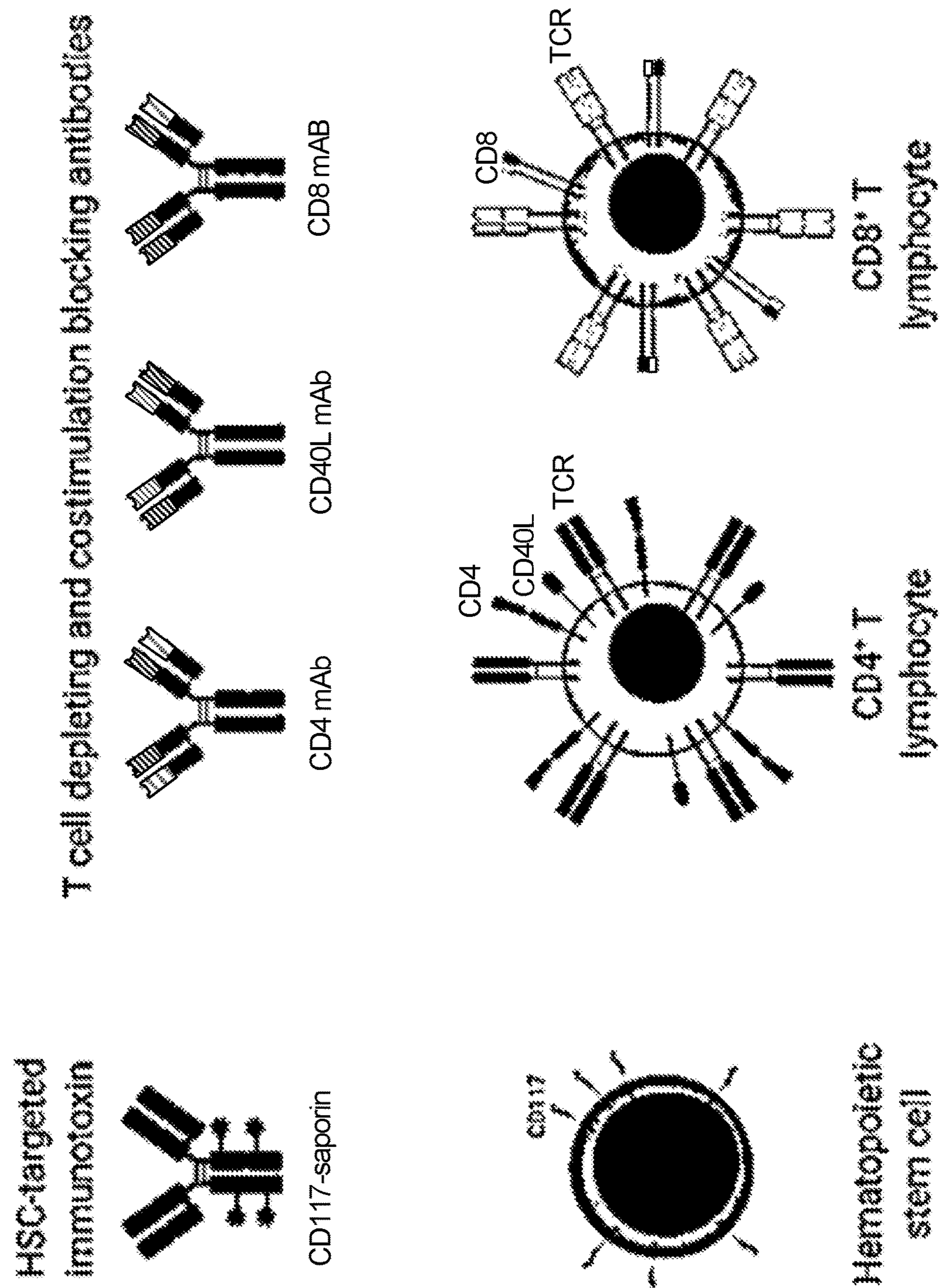
FIG. 43 is a schematic of the components of an antibody-based conditional regimen and target cells. CD117-saporin immunotoxin specifically targets and depletes HSCs to condition the bone marrow for engraftment of transplanted cells. T cell-targeted monoclonal antibodies transiently deplete CD4+ and CD8+ T cells and inhibit T cell costimulation by blocking CD40/CD40L interactions. Together, this combination enables stable engraftment of gene-modified cells by preventing graft rejection and humor immune responses.

A non-genotoxic conditioning regimen using antibody-based technology that can be used to prepare subjects for hematopoietic stem cell transplantation (HSCT) with autologous gene-modified cells or allogeneic healthy donor cells was developed. The regimen does not possess the acute toxicities and long-term adverse effects associated with conventional genotoxic HSCT preparative regimens and, therefore, represents a safer alternative to the current clinical state of the art. A combination therapy approach to non-genotoxic HSCT conditioning was developed. This therapy was specifically designed to accomplish both depletion of endogenous hematopoietic stem and progenito cells (HSPCs), as well as transient immune suppression to facilitate engraftment and immune tolerance of gene-modified or allogeneic donor cells (FIG. 43). The regimen combines a saporin-based immunotoxin, which selectively targets and kills HSCs through binding of the CD117 receptor, with unconjugated monoclonal antibodies (mAbs) against T cell receptors CD4 and CD8 and the T cell costimulatory molecule CD40 ligand (CD40L). CD4 and CD8 mAbs cause transient depletion of host T cells whereas anti-CD40L prevents activation of residual host T cells by blocking an important costimulatory signal. The regimen is effective at enabling high-level engraftment of HSPCs genetically modified to express blood coagulation factor VIII (fVIII), preventing graft rejection and humoral responses to the transgene in fVIII-naïve hemophilia A (HA) mice.

Figure 44A:
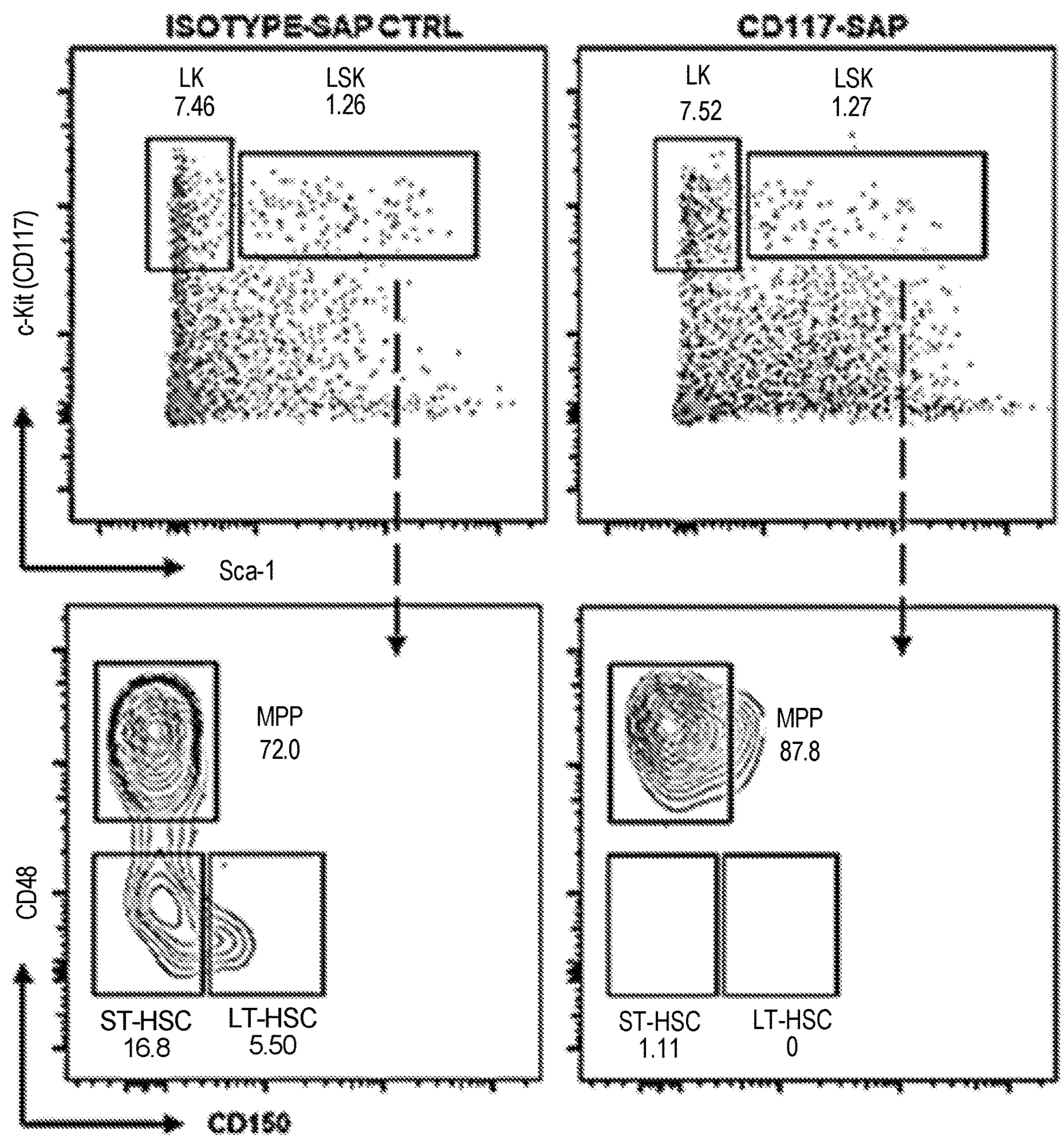
FIGS. 44A-B show depletion of bone marrow HSC populations by a CD117-saporin immunotoxin. Representative flow cytometry plots (A) show robust depletion in short-term (LSK CD48− CD150−) and long-term (LSK CD48− CD150+) JSC compartments after conditioning with CD117-saporin. Quantification of HSC depletion after CD117-saporin treatment compared to control is shown (B).
Figure 44B:
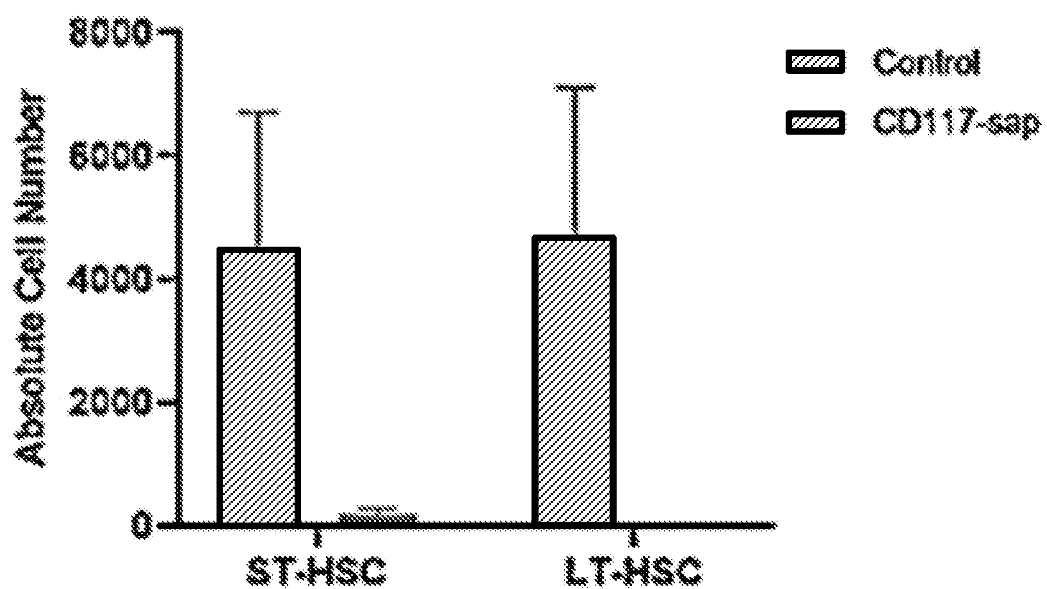
Figure 45:
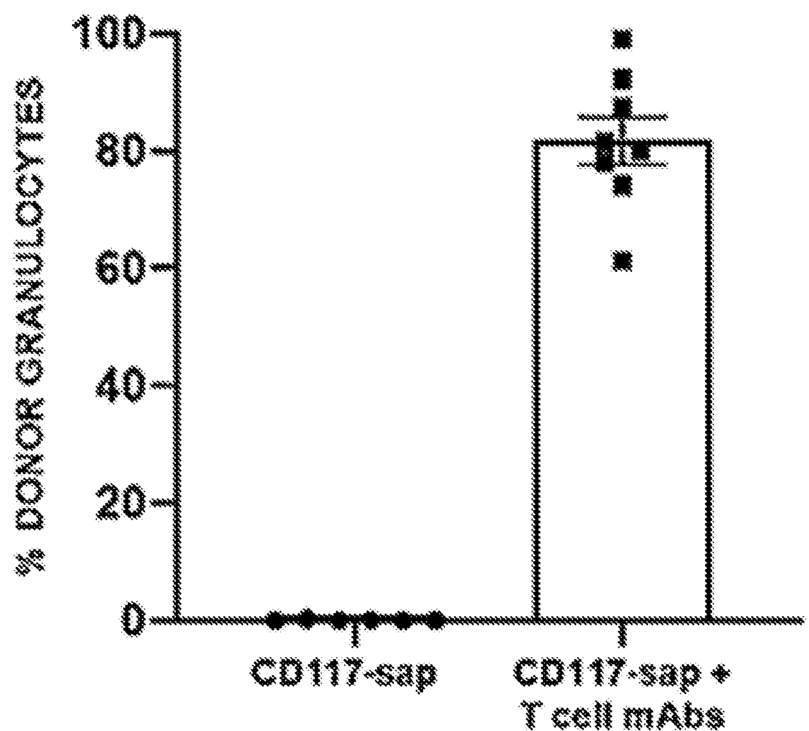
FIG. 45 shows that T cell-targeted monoconal antibodies are required for engraftment of fVIII gene-modified HSPCs. CD117-saporin alone failed to enable engraftment of genetically modified cells, whereas addition of T cell mAbs enabled high-level donor myeloid engraftment in all Hemophilia A (HA) recipients 7 weeks post-transplantation.
Figure 46:
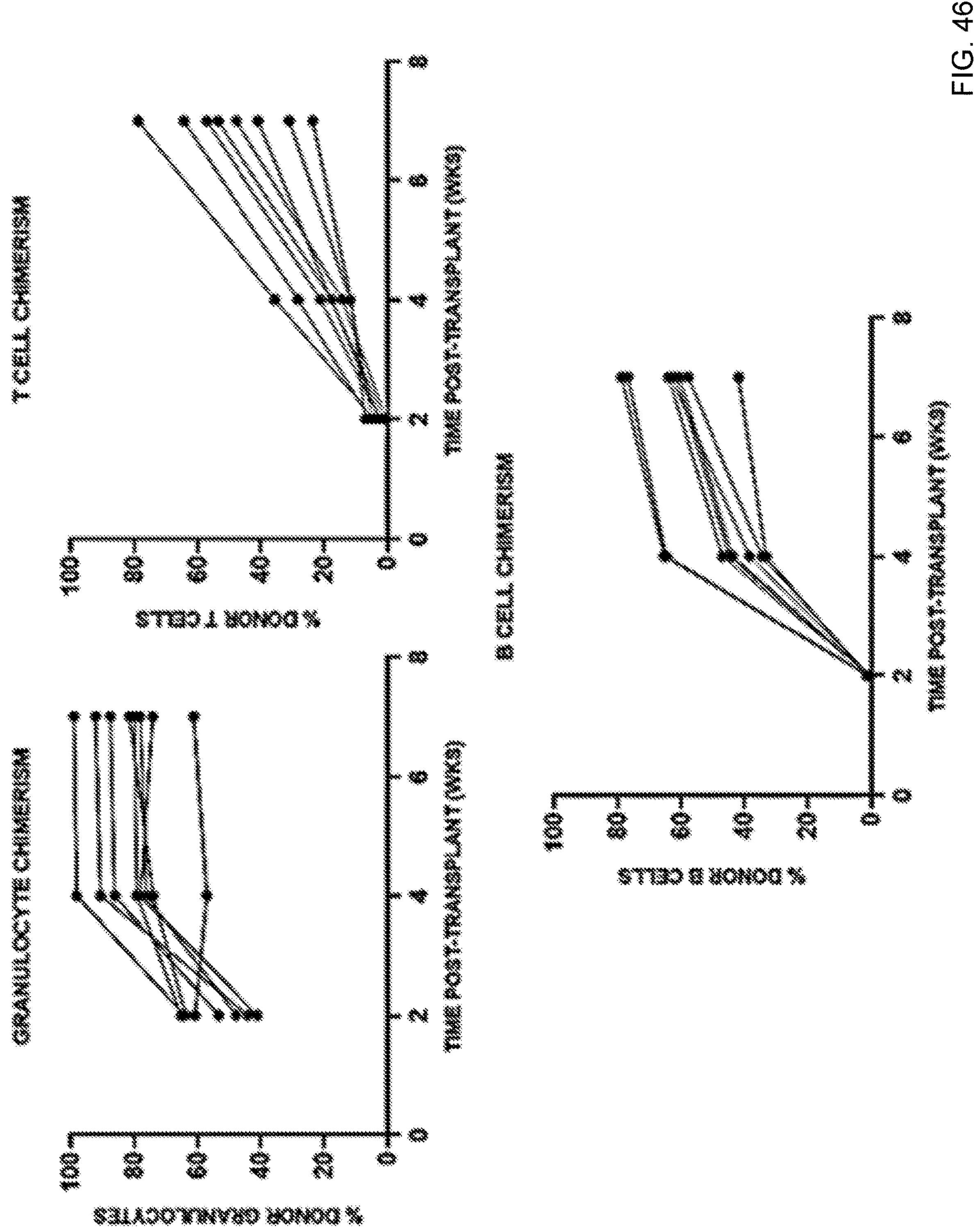
FIG. 46 shows that multilineage chimerism of fVIII gene-modified cells was achieved using a non-genotoxic conditioning regimen. fVIII gene-modified HSPCs engrafted in mice conditioned with CD117-saporin and T cell-targeted mAbs and reconstituted multilineage hematopoiesis show no evidence of immunological reaction.
Figure 47:
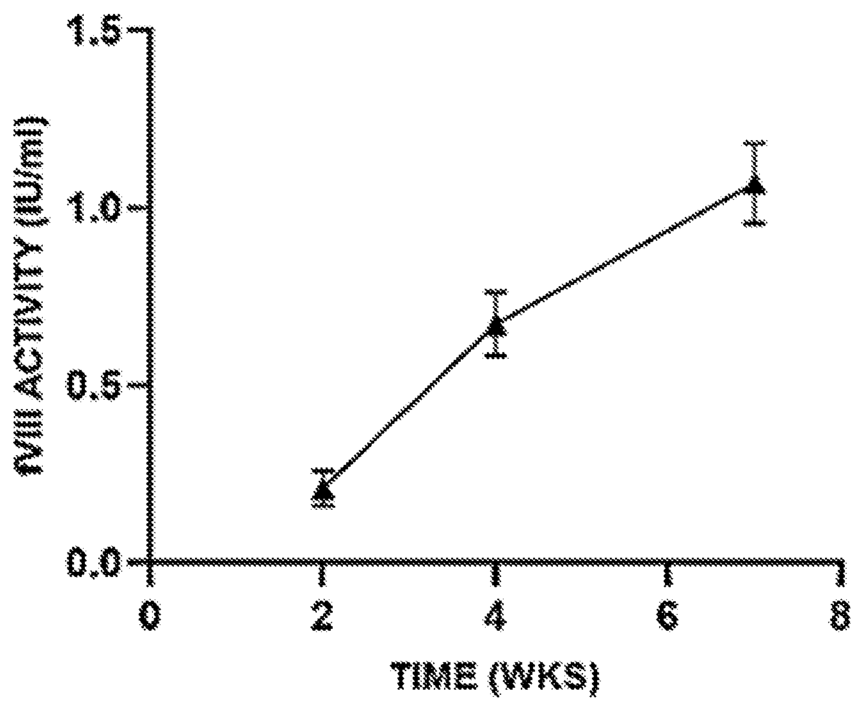
FIG. 47 shows fVIII activity in HA recipients conditioned with non-genotoxic regimen. Therapeutic levels of fVIII activity were achieved in mice engrafted with fVIII gene-modified HSPCs after conditioning with CD117-saporin and T cell-targeted mAbs.

The immunotoxin comprises a mAb targeting the CD117 receptor coupled to the ribosome-inactivating protein toxin payload saporin. Cytotoxic specificity is accomplished due to restricted hematopoietic expression of CD117 on HSPCs, as well as inefficient cell entry by saporin in the absence of an antibody moiety to facilitate endocytosis. Therefore, non-specific killing of $CD117^{-}$ cells is eliminated. When CD117-saporin (CD117-sap) immunotoxin is administered intravenously before HSCT, robust and specific depletion of short- and long-term hematopoietic stem cell (HSC) compartments in the recipient bone marrow was accomplished (FIG. 44). Other HSC-targeted immunotoxins could have similar endogenous stem cell-depleting properties. These can include mAbs or antibody-fragments targeting different antigens or epitopes on HSCs (e.g. various clones of CD117, CD45, CD110 mAbs) and/or exploit different cytotoxic payload moieties (e.g. other plant-derived toxins such as a ricin A chain or gelonin; bacteria-derived toxins, such as diphtheria toxin or *Pseudomonas* exotoxin; fungi-derived toxins such as amatoxins; or marine-derived toxins such as auristatins). HSC-directed gene therapy involves ex vivo genetic modification of HSCs by lentiviral vector delivery. Gene-modified HSCs express a transgenic protein that can be recognized as foreign to the recipient immune system, evoking an immune response that can result in rejection of the gene-modified cells and/or formation of antibodies directed against the transgenic protein product. These findings demonstrate that, without transient immune suppression, fVIII gene-modified HSPCs do not engraft in HA mice conditioned with CD117-sap immunotoxin alone (FIG. 45). Combining CD117-sap with a combination of mAbs designed to modulate the T cell response in the early post-transplant period is effective at facilitating engraftment of fVIII gene-modified cells, thus enabling multilineage hematopoietic donor chimerism (FIG. 46) and expression of therapeutic levels of circulating fVIII activity (FIG. 47). This regimen is also useful in the setting of allogeneic HSCT to achieve donor cell engraftment and tolerance to allogeneic cells and tissue grafts. Other combinations of mAb, Fab fragments and/or fusion proteins can also be used to modulate T cell activity including, but not limited to CD3 mAb depletion, CTLA4-Ig, or CD28/B7 blockade.

```
SEQUENCES
TPO - CAR with CD8 stalk spacer
                                                      (SEQ ID NO: 1)
PAPPACDLRVLSKLLRDSHVLHSRLSQCPEVHPLPTPVLLPAVDFSLGEWKTQMEETKAQDIL

GAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELPNRTSGLLETNFTAS

ARTTGSGLLKWQQGFRAKIPGLLNQTSRSLDQIPGYLNRIHELLNGTRGLFPGPSRRTLGAPDI

SSGTSDTGSLPPNLQPGYSPSPTHPPTGQYTLFPLPPTLPTPVVQLHPLLPDPSAPTPTPTSPLLN
```

-continued

TSYTHSQNLSQEGGGGGSGGGGSGGGGSDVVMTQSPLSLPVSLGDQASISCRSSQRLVHSNG

NTYLHWYLQKPGQSPKLLIYRVSNRFPGVPDRFSGSGSGTDFTLKISRVEAEDLGIYFCSQSTH

VPYTFGGGTKLEIKRSDPTTTPAPRPPTPAPTIASQPLSLRPEACRPAAGGAVHTRGLDFACDIF

WVLVVVGGVLACYSLLVTVAFIIFWVRSKRSRLLHSDYMNMTPRRPGPTRKHYQPYAPPRD

FAAYRSRDQRLPPDAHKPPGGGSFRTPIQEEQADAHSTLAKIRVKFSRSADAPAYQQGQNQL

YNELNLGRREEYDVLDKRRGRDPEMGGKPRRKNPQEGLYNELQKDKMAEAYSEIGMKGER

RRGKGHDGLYQGLSTATKDTYDALHMQALPPR

TPO-CAR with H-CH2-CH3pvaa spacer (SEQ ID NO: 2)

PAPPACDLRVLSKLLRDSHVLHSRLSQCPEVHPLPTPVLLPAVDFSLGEWKTQMEETKAQDIL

GAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELPNRTSGLLETNFTAS

ARTTGSGLLKWQQGFRAKIPGLLNQTSRSLDQIPGYLNRIHELLNGTRGLFPGPSRRTLGAPDI

SSGTSDTGSLPPNLQPGYSPSPTHPPTGQYTLFPLPPTLPTPVVQLHPLLPDPSAPTPTPTSPLLN

TSYTHSQNLSQEGGGGGSGGGGSGGGGSDVVMTQSPLSLPVSLGDQASISCRSSQRLVHSNG

NTYLHWYLQKPGQSPKLLIYRVSNRFPGVPDRFSGSGSGTDFTLKISRVEAEDLGIYFCSQSTH

VPYTFGGGTKLEIKRSDPAEPKSPDKTHTCPPCPAPPVAGPSVFLFPPKPKDTLMIARTPEVTC

VVVDVSHEDPEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVKGFYPSDIAVEWES

NGQPENNYKTTPPVLDSDGSFFLYSKLTVDKSRWQQGNVFSCSVMHEALHNHYTQKSLSLS

PGKKDPKFWVLVVVGGVLACYSLLVTVAFIIFWVRSKRSRLLHSDYMNMTPRRPGPTRKHY

QPYAPPRDFAAYRSRDQRLPPDAHKPPGGGSFRTPIQEEQADAHSTLAKIRVKFSRSADAPAY

QQGQNQLYNELNLGRREEYDVL

TPO-CAR with IgG1 hinge spacer (SEQ ID NO: 3)

PAPPACDLRVLSKLLRDSHVLHSRLSQCPEVHPLPTPVLLPAVDFSLGEWKTQMEETKAQDIL

GAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELPNRTSGLLETNFTAS

ARTTGSGLLKWQQGFRAKIPGLLNQTSRSLDQIPGYLNRIHELLNGTRGLFPGPSRRTLGAPDI

SSGTSDTGSLPPNLQPGYSPSPTHPPTGQYTLFPLPPTLPTPVVQLHPLLPDPSAPTPTPTSPLLN

TSYTHSQNLSQEGGGGGSGGGGSGGGGSDVVMTQSPLSLPVSLGDQASISCRSSQRLVHSNG

NTYLHWYLQKPGQSPKLLIYRVSNRFPGVPDRFSGSGSGTDFTLKISRVEAEDLGIYFCSQSTH

VPYTFGGGTKLEIKRSDPAEPKSPDKTHTCPPCPKDPKFWVLVVVGGVLACYSLLVTVAFIIF

WVRSKRSRLLHSDYMNMTPRRPGPTRKHYQPYAPPRDFAAYRSRDQRLPPDAHKPPGGGSF

RTPIQEEQADAHSTLAKIRVKFSRSADAPAYQQGQNQLYNELNLGRREEYDVLDKRRGRDPE

MGGKPRRKNPQEGLYNELQKDKMAEAYSEIGMKGERRRGKGHDGLYQGLSTATKDTYDA

LHMQALPPR

Truncated TPO (SEQ ID NO: 4)

SPAPPACDLRVLSKLLRDSHVLHSRLSQCPEVHPLPTPVLLPAVDFSLGEWKTQMEETKAQDI

LGAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNEL

-continued

Codon optimized TPO CAR amino acid sequence (* = stop codon, BOLD = only different aa's from the non-codon optimized CAR sequence, corresponds to CH3 hinge & MscI site):

(SEQ ID NO: 5)

SPAPPACDLRVLSKLLRDSHVLHSRLSQCPEVHPLPTPVLLPAVDFSLGEWKTQMEETKAQDI

LGAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELASEPKSCDKTHTCP

GQPREPQVYTLPPSREEMTKNQVSLTCLVKGFYPSDIAVEWESNGQPENNYKTTPPVLD

SDGSFFLYSKLTVDKSRWQQGNVFSCSVMHEALHNHYTQKSLSLSPGKDNEKSNGTIIHV

KGKHLCPSPLFPGPSKPFWVLVVVGGVLACYSLLVTVAFIIFWVRSKRSRLLHSDYMNMTPR

RPGPTRKHYQPYAPPRDFAAYRSSRSADAPAYQQGQNQLYNELNLGRREEYDVLDKRRGRD

PEMGGKPRRKNPQEGLYNELQKDKMAEAYSEIGMKGERRRGKGHDGLYQGLSTATKDTYD

ALHMQALPPR

Non-codon optimized TPO CAR amino acid sequence (* = stop codon, BOLD = only different aa's from LCO, corresponds to CD8a hinge & NheI site):

(SEQ ID NO: 6)

SPAPPACDLRVLSKLLRDSHVLHSRLSQCPEVHPLPTPVLLPAVDFSLGEWKTQMEETKAQDI

LGAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELASTTTPAPRPPTPA

PTIASQPLSLRPEACRPAAGGAVHTRGLDFACDIDNEKSNGTIIHVKGKHLCPSPLFPGPSK

PFWVLVVVGGVLACYSLLVTVAFIIFWVRSKRSRLLHSDYMNMTPRRPGPTRKHYQPYAPPR

DFAAYRSSRSADAPAYQQGQNQLYNELNLGRREEYDVLDKRRGRDPEMGGKPRRKNPQEG

LYNELQKDKMAEAYSEIGMKGERRRGKGHDGLYQGLSTATKDTYDALHMQALPPR*

Human SCF (SEQ ID NO: 7)

Italics: signal peptide; bold: receptor binding domain; underlined: transmembrane domain; normal text: cytoplsamic domain

*MKKTQTWILTCIYLQLLLFNPLVKT*EGICRNRVTNNVKDVTKLVANLPKDYMITLKYVPGM

DVLPSHCWISEMVVQLSDSLTDLLDKFSNISEGLSNYSIIDKLVNIVDDLVECVKENSSKD

LKKSFKSPEPRLFTPEEFFRIFNRSIDAFKDFVVASETSDCVVSSTLSPEKDSRVSVTKPFM

LPPVAA <u>SSLRNDSSSSNRKAKNPPGDSSLHWAAMALPALFSLIIGFAFGALYW</u>

KKRQPSLTRAVENIQINEEDNEISMLQEKEREFQEV

Codon-optimized SCF CAR amino acid sequence (* = stop codon):

(SEQ ID NO: 8)

KEICGNPVTDNVKDITKLVANLPNDYMITLNYVAGMDVLPSHCWLRDMVIQLSLSLTTLLDK

FSNISEGLSNYSIIDKLGKIVDDLVLCMEENAPKNIKESPKRPETRSFTPEEFFSIFNRSIDAFKDF

MVASDTSDCVLSSTLGPEKDSRVSVTKPFMLPPVAAASTTTPAPRPPTPAPTIASQPLSLRPEA

CRPAAGGAVHTRGLDFACDIDNEKSNGTIIHVKGKHLCPSPLFPGPSKPFWVLVVVGGVLAC

YSLLVTVAFIIFWVRSKRSRLLHSDYMNMTPRRPGPTRKHYQPYAPPRDFAAYRSSRSADAP

AYQQGQNQLYNELNLGRREEYDVLDKRRGRDPEMGGKPRRKNPQEGLYNELQKDKMAEA

YSEIGMKGERRRGKGHDGLYQGLSTATKDTYDALHMQALPPR*

Truncated CD28 amino acid sequence:

(SEQ ID NO: 9)

DNEKSNGTIIHVKGKHLCPSPLFPGPSKPFWVLVVVGGVLACYSLLVTVAFIIFWVRSKRSRL

LHSDYMNMTPRRPGPTRKHYQPYAPPRDFAAYRS

-continued

CD3ζ amino acid sequence:

(SEQ ID NO: 10)

SRSADAPAYQQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPR

CD8α hinge sequence (SEQ ID NO: 11)

ASTTTPAPRPPTPAPTIASQPLSLRPEACRPAAGGAVHTRGLDFACD

IL-2 signal peptide amino acid sequence:

(SEQ ID NO: 12)

MYRMQLLSCIALSLALVTNS

Full length hTPO amino acid sequence (from codon optimized and non-optimized nucleic acid sequences):

(SEQ ID NO: 13)

SPAPPACDLRVLSKLLRDSHVLHSRLSQCPEVHPLPTPVLLPAVDFSLGEWKTQMEETKAQDI

LGAVTLLLEGVMAARGQLGPTCLSSLLGQLSGQVRLLLGALQSLLGTQLPPQGRTTAHKDPN

AIFLSFQHLLRGKVRFLMLVGGSTLCVRRAPPTTAVPSRTSLVLTLNELPNRTSGLLETNFTAS

ARTTGSGLLKWQQGFRAKIPGLLNQTSRSLDQIPGYLNRIHELLNGTRGLFPGPSRRTLGAPDI

SSGTSDTGSLPPNLQPGYSPSPTHPPTGQYTLFPLPPTLPTPVVQLHPLLPDPSAPTPTPTSPLLN

TSYTHSQNLSQEG

Non-codon optimized truncated TPO sequence (SEQ ID NO: 14)

AGCCCGGCTCCTCCTGCTTGTGACCTCCGAGTCCTCAGTAAACTGCTTCGTGACTCCCAT

GTCCTTCACAGCAGACTGAGCCAGTGCCCAGAGGTTCACCCTTTGCCTACACCTGTCCTG

CTGCCTGCTGTGGACTTTAGCTTGGGAGAGTGGAAAACCCAGATGGAGGAGACCAAGGCA

CAGGACATTCTGGGAGCAGTGACCCTTCTGCTGGAGGGAGTGATGGCAGCACGGGGACAA

CTGGGACCCACTTGCCTCTCATCCCTCCTGGGGCAGCTTTCTGGACAGGTCCGTCTCCTC

CTTGGGGCCCTGCAGAGCCTCCTTGGAACCCAGCTTCCTCCACAGGGCAGGACCACAGCT

CACAAGGATCCCAATGCCATCTTCCTGAGCTTCCAACACCTGCTCCGAGGAAAGGTGCGT

TTCCTGATGCTTGTAGGAGGGTCCACCCTCTGCGTCAGGCGGGCCCCACCCACCACAGCT

GTCCCCAGCAGAACCTCTCTAGTCCTCACACTGAACGAGCTC

Codon-optimized truncated TPO sequence:

(SEQ ID NO: 15)

TCTCCCGCCCCTCCCGCTTGTGATCTGAGAGTGCTGAGCAAGCTGCTGCGCGACTCCCAC

GTGCTGCACAGCAGACTGTCCCAGTGCCCTGAGGTGCACCCACTGCCAACCCCCGTGCTG

CTGCCTGCTGTGGACTTCAGCCTGGGGGAGTGGAAGACCCAGATGGAGGAAACCAAGGCT

CAGGACATCCTGGGAGCTGTGACCCTGCTGCTGGAGGGCGTGATGGCTGCTAGGGGACAG

CTGGGACCAACCTGCCTGTCCAGCCTGCTGGGCCAGCTGAGCGGACAAGTGAGGCTGCTG

CTGGGGGCTCTGCAGTCCCTGCTGGGGACCCAGCTGCCTCCGCAGGGAAGGACCACCGCT

CACAAGGACCCCAACGCCATCTTCCTGAGCTTCCAGCACCTGCTGCGGGGCAAAGTGAGG

TTCCTGATGCTGGTGGGCGGGTCCACCCTGTGCGTGCGCCGCGCCCCTCCGACCACCGCC

GTGCCCAGCCGGACCTCCCTGGTGCTGACCCTGAACGAGCTG

Co-stimulatory sequences (SEQ ID NOs: 21-27)

CD28

(SEQ ID NO: 21)

LDNEKSNGTIIHVKGKHLCPSPLFPGPSKPFWVLVVVGGVLACYSLLVTVAFIIFWVRSKRSR

LLHSDYMNMTPRRPGPTRKHYQPYAPPRDFAAYRS

-continued 4-1BB (SEQ ID NO: 22)

KRGRKKLLYIFKQPFMRPVQTTQEEDGCSCRFPEEEEGGCEL

OX40

(SEQ ID NO: 23)

ALYLLRRDQRLPPDAHKPPGGGSFRTPIQEEQADAHSTLAKI

CD40

(SEQ ID NO: 24)

KKVAKKPTNKAPHPKQEPQEINFPDDLPGSNTAAPVQETLHGCQPVTQEDGKESRISVQERQ

ICOS (SEQ ID NO: 25)

WLTKKKYSSSVHDPNGEYMFMRAVNTAKKSRLTDVTL

CD27

(SEQ ID NO: 26)

QRRKYRSNKGESPVEPAEPCHYSCPREEEGSTIPIQEDYRKPEPACSP

CD40L (SEQ ID NO: 27)

MIETYNQTSPRSAATGLPISMKIFMYLLTVFLITQMIGSALFAVYL

Cytochrome b5 tail anchor (SEQ ID NO: 28)

WWKNLKWWTNWVIPAISAVAVALMYRLYMAEDSRMNGTEGPNFYVPFSNKTVC

CD137 anchor (SEQ ID NO: 29)

PGESGTSGWRGGDTPSPLCLLLLLLLLILRLLRIL

Duffy antigen/receptor for chemokines (DARC)

(SEQ ID NO: 30)

MASSGYVLQA ELSPSTENSS QLDFEDVWNS SYGVNDSFPD GDYGANLEAAAPCHSCNLLD

DSALPFFILT SVLGILASST VLFMLFRPLF RWQLCPGWPVLAQLAVGSAL FSIVVPVLAP

GLGSTRSSAL CSLGYCVWYG SAFAQALLLGCHASLGHRLG AGQVPGLTLG

LTVGIWGVAA LLTLPVTLAS GASGGLCTLIYSTELKALQA THTVACLAIF VLLPLGLFGA

KGLKKALGMG PGPWMNILWAWFIFWWPHGV VLGLDFLVRS KLLLLSTCLA

QQALDLLLNL AEALAILHCVATPLLLALFC HQATRTLLPS LPLPEGWSSH LDTLGSKS

GPI Anchors (SEQ ID NOs 31-41)

(SEQ ID NO: 31)

PGESGTSGWRGGDTPSPLCLLLLLLLLILRLLRIL (SEQ ID NO: 32)

ESAEPSRGENAAQTPRIPSRLLAILLFLLAMLLTL (SEQ ID NO: 33)

YAAAMSGAGPWAAWPFLLSLALMLLWLLS (SEQ ID NO: 34)

PEVRVLHSIGHSAAPRLFPLAWTVLLLPLLLLQTP (SEQ ID NO: 35)

SVRGINGSISLAVPLWLLAASLLGLLLPAFGILVYLEF (SEQ ID NO: 36)

DSEGSGALPSLTCSLTCSLTPLGLALVLWTVLGPC (SEQ ID NO: 37)

VSQVKISGAPTLSPSLLGLLLPAFGILVYLEF (SEQ ID NO: 38)

QVPKLEKSISGTSPKREHLPLAVGIAFFLMTFLA (SEQ ID NO: 39)

TTDAAHPGRSVVPALLPLLAGTLLLLETATAP

-continued (SEQ ID NO: 40)
EAPEPIFTSNNSCSSPGGCRLFLSTIPVLWTLLGS (SEQ ID NO: 41)
TNATTKAAGGALQSTASLFVVSLSLLHLYS Native Murine SCF
Italics: signal peptide; bold: receptor binding domain; underlined: transmembrane domain; normal text: cytoplasmic domain (SEQ ID NO: 42)
*MKKTQTWIITCIYLQLLLFNPLVKT*KEICGNPVTDNVKDITKLVANLPNDYMITLNYVAGMD

VLPSHCWLRDMVIQLSLSLTTLLDKFSNISEGLSNYSIIDKLGKIVDDLVLCMEENAPKNI

KESPKRPETRSFTPEEFFSIFNRSIDAFKDFMVASDTSDCVLSSTLGPEKDSRVSVTKPFM

LPPVAASSLRNDSSSSNRKAAKAPEDSGLQWTAMALPALISLVIGFAFGALYW

KKKQSSLTRAVENIQINEEDNEISMLQQKEREFQEV

Murine SCF CAR Sequence Used In Examples
Italics: IL-2 signal peptide; bold: SCF receptor binding domain; underlined: CD28-CD3zeta transmembrane and intracellular costimulatory and signaling domains (SEQ ID NO: 43)
*MYRMQLLSCIALSLALVTNSGAP*KEICGNPVTDNVKDITKLVANLPNDYMITLNYVAGMDV

LPSHCWLRDMVIQLSLSLTTLLDKFSNISEGLSNYSIIDKLGKIVDDLVLCMEENAPKNIK

ESPKRPETRSFTPEEFFSIFNRSIDAFKDFMVASDTSDCVLSSTLGPEKDSRVSVTKPFMLP

PVAAASTTTPAPRPPTPAPTIASQPLSLRPEACRPAAGGAVHTRGLDFACDIDNEKSNGTIIHV

KGKHLCPSPLFPGPSKPFWVLVVVGGVLACYSLLVTVAFIIFWVRSKRSRLLHSDYMNMTPR

RPGPTRKHYQPYAPPRDFAAYRSSRSADAPAYQQGQNQLYNELNLGRREEYDVLDKRRGRD

PEMGGKPRRKNPQEGLYNELQKDKMAEAYSEIGMKGERRRGKGHDGLYQGLSTATKDTYD

ALHMQALPPR

Murine SCF (SCF receptor binding domain)

(SEQ ID NO: 44)
KEICGNPVTDNVKDITKLVANLPNDYMITLNYVAGMDVLPSHCWLRDMVIQLSLSLTTLLDK

FSNISEGLSNYSIIDKLGKIVDDLVLCMEENAPKNIKESPKRPETRSFTPEEFFSIFNRSIDAFKDF

MVASDTSDCVLSSTLGPEKDSRVSVTKPFMLPPVAA

Human SCF (SCF receptor binding domain)

(SEQ ID NO: 45)
EGICRNRVTNNVKDVTKLVANLPKDYMITLKYVPGMDVLPSHCWISEMVVQLSDSLTDLLD

KFSNISEGLSNYSIIDKLVNIVDDLVECVKENSSKDLKKSFKSPEPRLFTPEEFFRIFNRSIDAFK

DFVVASETSDCVVSSTLSPEKDSRVSVTKPFMLPPVAA

CD5 scFv CAR nucleotide sequence (SEQ ID NO: 46)
ATGTACAGGATGCAACTCCTGTCTTGCATTGCACTAAGTCTTGCACTTGTCACGAATTCG

GGCGCGCCTGAAATTCAGTTGGTGCAAAGCGGAGGTGGCCTTGTGAAGCCAGGAGGCAG

TGTGCGAATTAGTTGTGCAGCCTCCGGTTACACGTTCACCAACTATGGCATGAACTGGGT

GAGACAGGCCCCCGGCAAGGGGTTGGAATGGATGGGCTGGATTAACACACATACGGGCG

AACCGACATACGCCGACAGCTTTAAAGGTCGATTTACTTTTAGCTTGGACGATTCCAAAA

ATACGGCATACCTGCAAATAAACTCACTGCGGGCAGAGGATACGGCCGTATATTTTTGTA

CGCGGAGAGGGTACGATTGGTACTTTGATGTCTGGGGACAGGGGACGACAGTAACCGTG

TCTAGTGGCGGGGGAGGATCAGGTGGTGGCGGTAGCGGTGGAGGTGGAAGTGATATCCA

GATGACACAATCACCGAGTTCCCTGTCCGCGTCAGTAGGGGATCGGGTGACAATTACAT

GTAGAGCATCTCAAGACATCAATAGCTACCTGAGCTGGTTTCAGCAAAAGCCCGGAAAA

GCTCCGAAAACTCTGATTTATCGGGCCAATCGCCTTGAGTCTGGGGTGCCAAGTAGATTT

-continued

TCAGGCTCCGGGAGCGGGACGGACTATACGTTGACCATATCAAGTCTTCAGTACGAGGA
CTTCGGGATATACTATTGCCAACAGTACGATGAGAGCCCGTGGACCTTCGGGGGTGGGA
CAAAGTTGGAGATCAAAGCTAGCGAGCAGAAGCTGATCAGCGAGGAGGACCTGGACAA
TGAGAAGAGCAATGGAACCATTATCCATGTGAAAGGGAAACACCTTTGTCCAAGTCCCC
TATTTCCCGGACCTTCTAAGCCCTTTTGGGTGCTGGTGGTGGTTGGTGGAGTCCTGGCTTG
CTATAGCTTGCTAGTAACAGTGGCCTTTATTATTTTCTGGGTGAGGAGTAAGAGGAGCAG
GCTCCTGCACAGTGACTACATGAACATGACTCCCAGGAGGCCTGGGCCAACCCGCAAGC
ATTACCAGCCCTATGCCCCACCACGCGACTTCGCAGCCTATCGCTCCAGCAGGAGCGCAG
ACGCTCCCGCGTACCAGCAGGGCCAGAACCAGCTCTATAACGAGCTCAATCTAGGACGA
AGAGAGGAGTACGATGTTTTGGACAAGAGACGTGGCCGGGACCCTGAGATGGGAGGCA
AGCCGAGAAGGAAGAACCCTCAGGAAGGCCTGTACAATGAACTGCAGAAAGATAAGAT
GGCGGAGGCCTACAGTGAGATTGGGATGAAAGGCGAGCGCCGGAGGGGCAAGGGGCAC
GATGGCCTTTACCAGGGTCTCAGTACAGCCACCAAGGACACCTACGACGCCCTTCACATG
CAGGCCCTGCCTCCTCGCTGA

CD5 scFv CAR amino acid sequence (SEQ ID NO: 47)

MYRMQLLSCIALSLALVTNSGAPEIQLVQSGGGLVKPGGSVRISCAASGYTFTNYGMNWVR
QAPGKGLEWMGWINTHTGEPTYADSFKGRFTFSLDDSKNTAYLQINSLRAEDTAVYFCTRR
GYDWYFDVWGQGTTVTVSSGGGGSGGGGSGGGGSDIQMTQSPSSLSASVGDRVTITCRASQ
DINSYLSWFQQKPGKAPKTLIYRANRLESGVPSRFSGSGSGTDYTLTISSLQYEDFGIYYCQQY
DESPWTFGGGTKLEIKASEQKLISEEDLDNEKSNGTIIHVKGKHLCPSPLFPGPSKPFWVLVVV
GGVLACYSLLVTVAFIIFWVRSKRSRLLHSDYMNMTPRRPGPTRKHYQPYAPPRDFAAYRSS
RSADAPAYQQGQNQLYNELNLGRREEYDVLDKRRGRDPEMGGKPRRKNPQEGLYNELQKD
KMAEAYSEIGMKGERRRGKGHDGLYQGLSTATKDTYDALHMQALPPR eGFP-P2A-CD5 scFv CAR nucleotide sequence (SEQ ID NO: 48)

ATGGTGAGCAAGGGCGAGGAGCTGTTCACCGGGGTGGTGCCCATCCTGGTCGAGCTGGA
CGGCGACGTAAACGGCCACAAGTTCAGCGTGTCCGGCGAGGGCGAGGGCGATGCCACCT
ACGGCAAGCTGACCCTGAAGTTCATCTGCACCACCGGCAAGCTGCCCGTGCCCTGGCCCA
CCCTCGTGACCACCCTGACCTACGGCGTGCAGTGCTTCAGCCGCTACCCCGACCACATGA
AGCAGCACGACTTCTTCAAGTCCGCCATGCCCGAAGGCTACGTCCAGGAGCGCACCATCT
TCTTCAAGGACGACGGCAACTACAAGACCCGCGCCGAGGTGAAGTTCGAGGGCGACACC
CTGGTGAACCGCATCGAGCTGAAGGGCATCGACTTCAAGGAGGACGGCAACATCCTGGG
GCACAAGCTGGAGTACAACTACAACAGCCACAACGTCTATATCATGGCCGACAAGCAGA
AGAACGGCATCAAGGTGAACTTCAAGATCCGCCACAACATCGAGGACGGCAGCGTGCAG
CTCGCCGACCACTACCAGCAGAACACCCCCATCGGCGACGGCCCCGTGCTGCTGCCCGA
CAACCACTACCTGAGCACCCAGTCCGCCCTGAGCAAAGACCCCAACGAGAAGCGCGATC
ACATGGTCCTGCTGGAGTTCGTGACCGCCGCCGGGATCACTCTCGGCATGGACGAGCTGT
ACAAGGGATCTGGAGCAACAAACTTCTCACTACTCAAACAAGCAGGTGACGTGGAGGAG
AATCCCGGGCCTTCTAGAATGTACAGGATGCAACTCCTGTCTTGCATTGCACTAAGTCTT
GCACTTGTCACGAATTCGGGCGCGCCTGAAATTCAGTTGGTGCAAAGCGGAGGTGGCCTT
GTGAAGCCAGGAGGCAGTGTGCGAATTAGTTGTGCAGCCTCCGGTTACACGTTCACCAA

-continued

CTATGGCATGAACTGGGTGAGACAGGCCCCCGGCAAGGGGTTGGAATGGATGGGCTGGA

TTAACACACATACGGGCGAACCGACATACGCCGACAGCTTTAAAGGTCGATTTACTTTTA

GCTTGGACGATTCCAAAAATACGGCATACCTGCAAATAAACTCACTGCGGGCAGAGGAT

ACGGCCGTATATTTTTGTACGCGGAGAGGGTACGATTGGTACTTTGATGTCTGGGGACAG

GGGACGACAGTAACCGTGTCTAGTGGCGGGGGAGGATCAGGTGGTGGCGGTAGCGGTGG

AGGTGGAAGTGATATCCAGATGACACAATCACCGAGTTCCCTGTCCGCGTCAGTAGGGG

ATCGGGTGACAATTACATGTAGAGCATCTCAAGACATCAATAGCTACCTGAGCTGGTTTC

AGCAAAAGCCCGGAAAAGCTCCGAAAACTCTGATTTATCGGGCCAATCGCCTTGAGTCT

GGGGTGCCAAGTAGATTTTCAGGCTCCGGGAGCGGGACGGACTATACGTTGACCATATC

AAGTCTTCAGTACGAGGACTTCGGGATATACTATTGCCAACAGTACGATGAGAGCCCGT

GGACCTTCGGGGGTGGGACAAAGTTGGAGATCAAAGCTAGCGAGCAGAAGCTGATCAGC

GAGGAGGACCTGGACAATGAGAAGAGCAATGGAACCATTATCCATGTGAAAGGGAAAC

ACCTTTGTCCAAGTCCCCTATTTCCCGGACCTTCTAAGCCCTTTTGGGTGCTGGTGGTGGT

TGGTGGAGTCCTGGCTTGCTATAGCTTGCTAGTAACAGTGGCCTTTATTATTTTCTGGGTG

AGGAGTAAGAGGAGCAGGCTCCTGCACAGTGACTACATGAACATGACTCCCAGGAGGCC

TGGGCCAACCCGCAAGCATTACCAGCCCTATGCCCCACCACGCGACTTCGCAGCCTATCG

CTCCAGCAGGAGCGCAGACGCTCCCGCGTACCAGCAGGGCCAGAACCAGCTCTATAACG

AGCTCAATCTAGGACGAAGAGAGGAGTACGATGTTTTGGACAAGAGACGTGGCCGGGAC

CCTGAGATGGGAGGCAAGCCGAGAAGGAAGAACCCTCAGGAAGGCCTGTACAATGAAC

TGCAGAAAGATAAGATGGCGGAGGCCTACAGTGAGATTGGGATGAAAGGCGAGCGCCG

GAGGGGCAAGGGGCACGATGGCCTTTACCAGGGTCTCAGTACAGCCACCAAGGACACCT

ACGACGCCCTTCACATGCAGGCCCTGCCTCCTCGCTGA eGFP-P2A-CD5 scFv CAR amino acid sequence (SEQ ID NO: 49)

MVSKGEELFTGVVPILVELDGDVNGHKFSVSGEGEGDATYGKLTLKFICTTGKLPVPWPTLV

TTLTYGVQCFSRYPDHMKQHDFFKSAMPEGYVQERTIFFKDDGNYKTRAEVKFEGDTLVNR

IELKGIDFKEDGNILGHKLEYNYNSHNVYIMADKQKNGIKVNFKIRHNIEDGSVQLADHYQQ

NTPIGDGPVLLPDNHYLSTQSALSKDPNEKRDHMVLLEFVTAAGITLGMDELYKGSGATNFS

LLKQAGDVEENPGPSRMYRMQLLSCIALSLALVTNSGAPEIQLVQSGGGLVKPGGSVRISCA

ASGYTFTNYGMNWVRQAPGKGLEWMGWINTHTGEPTYADSFKGRFTFSLDDSKNTAYLQI

NSLRAEDTAVYFCTRRGYDWYFDVWGQGTTVTVSSGGGGSGGGGSGGGGSDIQMTQSPSS

LSASVGDRVTITCRASQDINSYLSWFQQKPGKAPKTLIYRANRLESGVPSRFSGSGSGTDYTL

TISSLQYEDFGIYYCQQYDESPWTFGGGTKLEIKASEQKLISEEDLDNEKSNGTIIHVKGKHLC

PSPLFPGPSKPFWVLVVVGGVLACYSLLVTVAFIIFWVRSKRSRLLHSDYMNMTPRRPGPTRK

HYQPYAPPRDFAAYRSSRSADAPAYQQGQNQLYNELNLGRREEYDVLDKRRGRDPEMGGK

PRRKNPQEGLYNELQKDKMAEAYSEIGMKGERRRGKGHDGLYQGLSTATKDTYDALHMQ

ALPPR

CD5 scFv NSCAR nucleotide sequence (SEQ ID NO: 50)

ATGTACAGGATGCAACTCCTGTCTTGCATTGCACTAAGTCTTGCACTTGTCACGAATTCG

GGCGCGCCTGAAATTCAGTTGGTGCAAAGCGGAGGTGGCCTTGTGAAGCCAGGAGGCAG

TGTGCGAATTAGTTGTGCAGCCTCCGGTTACACGTTCACCAACTATGGCATGAACTGGGT

GAGACAGGCCCCCGGCAAGGGGTTGGAATGGATGGGCTGGATTAACACACATACGGGCG

-continued

AACCGACATACGCCGACAGCTTTAAAGGTCGATTTACTTTTAGCTTGGACGATTCCAAAA
ATACGGCATACCTGCAAATAAACTCACTGCGGGCAGAGGATACGGCCGTATATTTTTGTA
CGCGGAGAGGGTACGATTGGTACTTTGATGTCTGGGGACAGGGGACGACAGTAACCGTG
TCTAGTGGCGGGGGAGGATCAGGTGGTGGCGGTAGCGGTGGAGGTGGAAGTGATATCCA
GATGACACAATCACCGAGTTCCCTGTCCGCGTCAGTAGGGGATCGGGTGACAATTACAT
GTAGAGCATCTCAAGACATCAATAGCTACCTGAGCTGGTTTCAGCAAAAGCCCGGAAAA
GCTCCGAAAACTCTGATTTATCGGGCCAATCGCCTTGAGTCTGGGGTGCCAAGTAGATTT
TCAGGCTCCGGGAGCGGGACGGACTATACGTTGACCATATCAAGTCTTCAGTACGAGGA
CTTCGGGATATACTATTGCCAACAGTACGATGAGAGCCCGTGGACCTTCGGGGGTGGGA
CAAAGTTGGAGATCAAAGCTAGCGAGCAGAAGCTGATCAGCGAGGAGGACCTGGACAA
TGAGAAGAGCAATGGAACCATTATCCATGTGAAAGGGAAACACCTTTGTCCAAGTCCCC
TATTTCCCGGACCTTCTAAGCCCTTTTGGGTGCTGGTGGTGGTTGGTGGAGTCCTGGCTTG
CTATAGCTTGCTAGTAACAGTGGCCTTTATTATTTTCTGGGTGAGGAGTGAATGGCCGGG
AAAGGTACGCTGA

CD5 scFv NSCAR amino acid sequence (SEQ ID NO: 51)

MYRMQLLSCIALSLALVTNSGAPEIQLVQSGGGLVKPGGSVRISCAASGYTFTNYGMNWVR
QAPGKGLEWMGWINTHTGEPTYADSFKGRFTFSLDDSKNTAYLQINSLRAEDTAVYFCTRR
GYDWYFDVWGQGTTVTVSSGGGGSGGGGSGGGGSDIQMTQSPSSLSASVGDRVTITCRASQ
DINSYLSWFQQKPGKAPKTLIYRANRLESGVPSRFSGSGSGTDYTLTISSLQYEDFGIYYCQQY
DESPWTFGGGTKLEIKASEQKLISEEDLDNEKSNGTIIHVKGKHLCPSPLFPGPSKPFWVLVVV
GGVLACYSLLVTVAFIIFWVRSEWPGKVR eGFP-P2A-CD5 scFv NSCAR nucleotide sequence (SEQ ID NO: 52)

ATGGTGAGCAAGGGCGAGGAGCTGTTCACCGGGGTGGTGCCCATCCTGGTCGAGCTGGA
CGGCGACGTAAACGGCCACAAGTTCAGCGTGTCCGGCGAGGGCGAGGGCGATGCCACCT
ACGGCAAGCTGACCCTGAAGTTCATCTGCACCACCGGCAAGCTGCCCGTGCCCTGGCCCA
CCCTCGTGACCACCCTGACCTACGGCGTGCAGTGCTTCAGCCGCTACCCCGACCACATGA
AGCAGCACGACTTCTTCAAGTCCGCCATGCCCGAAGGCTACGTCCAGGAGCGCACCATCT
TCTTCAAGGACGACGGCAACTACAAGACCCGCGCCGAGGTGAAGTTCGAGGGCGACACC
CTGGTGAACCGCATCGAGCTGAAGGGCATCGACTTCAAGGAGGACGGCAACATCCTGGG
GCACAAGCTGGAGTACAACTACAACAGCCACAACGTCTATATCATGGCCGACAAGCAGA
AGAACGGCATCAAGGTGAACTTCAAGATCCGCCACAACATCGAGGACGGCAGCGTGCAG
CTCGCCGACCACTACCAGCAGAACACCCCCATCGGCGACGGCCCCGTGCTGCTGCCCGA
CAACCACTACCTGAGCACCCAGTCCGCCCTGAGCAAAGACCCCAACGAGAAGCGCGATC
ACATGGTCCTGCTGGAGTTCGTGACCGCCGCCGGGATCACTCTCGGCATGGACGAGCTGT
ACAAGGGATCTGGAGCAACAAACTTCTCACTACTCAAACAAGCAGGTGACGTGGAGGAG
AATCCCGGGCCTTCTAGAATGTACAGGATGCAACTCCTGTCTTGCATTGCACTAAGTCTT
GCACTTGTCACGAATTCGGGCGCGCCTGAAATTCAGTTGGTGCAAAGCGGAGGTGGCCTT
GTGAAGCCAGGAGGCAGTGTGCGAATTAGTTGTGCAGCCTCCGGTTACACGTTCACCAA
CTATGGCATGAACTGGGTGAGACAGGCCCCCGGCAAGGGGTTGGAATGGATGGGCTGGA
TTAACACACATACGGGCGAACCGACATACGCCGACAGCTTTAAAGGTCGATTTACTTTTA

-continued

GCTTGGACGATTCCAAAAATACGGCATACCTGCAAATAAACTCACTGCGGGCAGAGGAT

ACGGCCGTATATTTTTGTACGCGGAGAGGGTACGATTGGTACTTTGATGTCTGGGGACAG

GGGACGACAGTAACCGTGTCTAGTGGCGGGGGAGGATCAGGTGGTGGCGGTAGCGGTGG

AGGTGGAAGTGATATCCAGATGACACAATCACCGAGTTCCCTGTCCGCGTCAGTAGGGG

ATCGGGTGACAATTACATGTAGAGCATCTCAAGACATCAATAGCTACCTGAGCTGGTTTC

AGCAAAAGCCCGGAAAAGCTCCGAAAACTCTGATTTATCGGGCCAATCGCCTTGAGTCT

GGGGTGCCAAGTAGATTTTCAGGCTCCGGGAGCGGGACGGACTATACGTTGACCATATC

AAGTCTTCAGTACGAGGACTTCGGGATATACTATTGCCAACAGTACGATGAGAGCCCGT

GGACCTTCGGGGGTGGGACAAAGTTGGAGATCAAAGCTAGCGAGCAGAAGCTGATCAGC

GAGGAGGACCTGGACAATGAGAAGAGCAATGGAACCATTATCCATGTGAAAGGGAAAC

ACCTTTGTCCAAGTCCCCTATTTCCCGGACCTTCTAAGCCCTTTTGGGTGCTGGTGGTGGT

TGGTGGAGTCCTGGCTTGCTATAGCTTGCTAGTAACAGTGGCCTTTATTATTTTCTGGGTG

AGGAGTGAATGGCCGGGAAAGGTACGCTGA eGFP-P2A-CD5 scFv NSCAR amino acid sequence (SEQ ID NO: 53)

MVSKGEELFTGVVPILVELDGDVNGHKFSVSGEGEGDATYGKLTLKFICTTGKLPVPWPTLV

TTLTYGVQCFSRYPDHMKQHDFFKSAMPEGYVQERTIFFKDDGNYKTRAEVKFEGDTLVNR

IELKGIDFKEDGNILGHKLEYNYNSHNVYIMADKQKNGIKVNFKIRHNIEDGSVQLADHYQQ

NTPIGDGPVLLPDNHYLSTQSALSKDPNEKRDHMVLLEFVTAAGITLGMDELYKGSGATNFS

LLKQAGDVEENPGPSRMYRMQLLSCIALSLALVTNSGAPEIQLVQSGGGLVKPGGSVRISCA

ASGYTFTNYGMNWVRQAPGKGLEWMGWINTHTGEPTYADSFKGRFTFSLDDSKNTAYLQI

NSLRAEDTAVYFCTRRGYDWYFDVWGQGTTVTVSSGGGGSGGGGSGGGGSDIQMTQSPSS

LSASVGDRVTITCRASQDINSYLSWFQQKPGKAPKTLIYRANRLESGVPSRFSGSGSGTDYTL

TISSLQYEDFGIYYCQQYDESPWTFGGGTKLEIKASEQKLISEEDLDNEKSNGTIIHVKGKHLC

PSPLFPGPSKPFWVLVVVGGVLACYSLLVTVAFIIFWVRSEWPGKVR

CD19 scFv CAR nucleotide sequence (SEQ ID NO: 54)

ATGTACAGGATGCAACTCCTGTCTTGCATTGCACTAAGTCTTGCACTTGTCACGAATTCG

GGCGCGCCTGAGGTCAAGCTCCAAGAATCTGGGCCTGGTTTGGTCGCGCCCTCTCAGTCT

TTGTCCGTCACTTGTACTGTTTCCGGCGTTTCTCTGCCCGATTACGGAGTCTCTTGGATAC

GGCAGCCCCCACGAAAGGGGTTGGAGTGGTTGGGCGTTATATGGGGATCAGAAACAACG

TATTACAACTCCGCGCTCAAGAGCAGACTTACTATTATAAAGGATAACAGTAAATCACA

GGTGTTCCTGAAAATGAACTCTTTGCAAACCGATGATACGGCGATCTACTATTGTGCGAA

GCACTATTACTACGGTGGTAGCTACGCGATGGACTATTGGGGCCAAGGGACGTCTGTCAC

AGTATCATCTGGTGGAGGTGGGAGTGGAGGAGGCGGCAGTGGAGGCGGGGGGAGTGAC

ATCCAGATGACGCAGACGACTTCTTCACTCTCTGCATCTTTGGGAGATCGGGTGACTATC

AGTTGCAGGGCGTCCCAGGACATATCAAAGTACCTTAACTGGTACCAGCAGAAACCCGA

TGGGACAGTAAAACTTCTTATATATCATACTTCTCGGCTGCATTCCGGTGTGCCATCTAG

GTTTTCAGGTTCTGGCTCTGGAACCGACTACTCCTTGACGATTTCTAACCTCGAACAAGA

GGACATAGCTACCTATTTTTGTCAGCAGGGAAACACTCTCCCGTACACGTTTGGAGGGGG

AACTAAACTGGAGATCACGCGGGCTGACGCGGCTCCAACTGTGAGTATCTTCCCACCGTC

CTCAAATGCTAGCACCACTACCCCGGCCCCTAGGCCCCCTACTCCAGCGCCAACTATAGC

ATCACAGCCTTTGAGCTTGAGGCCCGAAGCTTGCAGACCGGCGGCAGGGGGGGCTGTGC

-continued

ATACAAGGGGCCTCGACTTTGCCTGCGACATCGATAATGAGAAGAGCAATGGAACCATT

ATCCATGTGAAAGGGAAACACCTTTGTCCAAGTCCCCTATTTCCCGGACCTTCTAAGCCC

TTTTGGGTGCTGGTGGTGGTTGGTGGAGTCCTGGCTTGCTATAGCTTGCTAGTAACAGTG

GCCTTTATTATTTTCTGGGTGAGGAGTAAGAGGAGCAGGCTCCTGCACAGTGACTACATG

AACATGACTCCCAGGAGGCCTGGGCCAACCCGCAAGCATTACCAGCCCTATGCCCCACC

ACGCGACTTCGCAGCCTATCGCTCCAGCAGGAGCGCAGACGCTCCCGCGTACCAGCAGG

GCCAGAACCAGCTCTATAACGAGCTCAATCTAGGACGAAGAGAGGAGTACGATGTTTTG

GACAAGAGACGTGGCCGGGACCCTGAGATGGGAGGCAAGCCGAGAAGGAAGAACCCTC

AGGAAGGCCTGTACAATGAACTGCAGAAAGATAAGATGGCGGAGGCCTACAGTGAGATT

GGGATGAAAGGCGAGCGCCGGAGGGGCAAGGGGCACGATGGCCTTTACCAGGGTCTCA

GTACAGCCACCAAGGACACCTACGACGCCCTTCACATGCAGGCCCTGCCTCCTCGCTGA

CD19 scFv CAR amino acid sequence (SEQ ID NO: 55)

MYRMQLLSCIALSLALVTNSGAPEVKLQESGPGLVAPSQSLSVTCTVSGVSLPDYGVSWIRQP

PRKGLEWLGVIWGSETTYYNSALKSRLTIIKDNSKSQVFLKMNSLQTDDTAIYYCAKHYYYG

GSYAMDYWGQGTSVTVSSGGGGSGGGGSGGGGSDIQMTQTTSSLSASLGDRVTISCRASQDI

SKYLNWYQQKPDGTVKLLIYHTSRLHSGVPSRFSGSGSGTDYSLTISNLEQEDIATYFCQQGN

TLPYTFGGGTKLEITRADAAPTVSIFPPSSNASTTTPAPRPPTPAPTIASQPLSLRPEACRPAAGG

AVHTRGLDFACDIDNEKSNGTIIHVKGKHLCPSPLFPGPSKPFWVLVVVGGVLACYSLLVTV

AFIIFWVRSKRSRLLHSDYMNMTPRRPGPTRKHYQPYAPPRDFAAYRSSRSADAPAYQQGQN

QLYNELNLGRREEYDVLDKRRGRDPEMGGKPRRKNPQEGLYNELQKDKMAEAYSEIGMKG

ERRRGKGHDGLYQGLSTATKDTYDALHMQALPPR eGFP-P2A-CD19 scFv CAR nucleotide sequence (SEQ ID NO: 56)

ATGGTGAGCAAGGGCGAGGAGCTGTTCACCGGGGTGGTGCCCATCCTGGTCGAGCTGGA

CGGCGACGTAAACGGCCACAAGTTCAGCGTGTCCGGCGAGGGCGAGGGCGATGCCACCT

ACGGCAAGCTGACCCTGAAGTTCATCTGCACCACCGGCAAGCTGCCCGTGCCCTGGCCCA

CCCTCGTGACCACCCTGACCTACGGCGTGCAGTGCTTCAGCCGCTACCCCGACCACATGA

AGCAGCACGACTTCTTCAAGTCCGCCATGCCCGAAGGCTACGTCCAGGAGCGCACCATCT

TCTTCAAGGACGACGGCAACTACAAGACCCGCGCCGAGGTGAAGTTCGAGGGCGACACC

CTGGTGAACCGCATCGAGCTGAAGGGCATCGACTTCAAGGAGGACGGCAACATCCTGGG

GCACAAGCTGGAGTACAACTACAACAGCCACAACGTCTATATCATGGCCGACAAGCAGA

AGAACGGCATCAAGGTGAACTTCAAGATCCGCCACAACATCGAGGACGGCAGCGTGCAG

CTCGCCGACCACTACCAGCAGAACACCCCCATCGGCGACGGCCCCGTGCTGCTGCCCGA

CAACCACTACCTGAGCACCCAGTCCGCCCTGAGCAAAGACCCCAACGAGAAGCGCGATC

ACATGGTCCTGCTGGAGTTCGTGACCGCCGCCGGGATCACTCTCGGCATGGACGAGCTGT

ACAAGGGATCTGGAGCAACAAACTTCTCACTACTCAAACAAGCAGGTGACGTGGAGGAG

AATCCCGGGCCTTCTAGAATGTACAGGATGCAACTCCTGTCTTGCATTGCACTAAGTCTT

GCACTTGTCACGAATTCGGGCGCGCCTGAGGTCAAGCTCCAAGAATCTGGGCCTGGTTTG

GTCGCGCCCTCTCAGTCTTTGTCCGTCACTTGTACTGTTTCCGGCGTTTCTCTGCCCGATT

ACGGAGTCTCTTGGATACGGCAGCCCCCACGAAAGGGGTTGGAGTGGTTGGGCGTTATA

TGGGGATCAGAAACAACGTATTACAACTCCGCGCTCAAGAGCAGACTTACTATTATAAA

-continued

GGATAACAGTAAATCACAGGTGTTCCTGAAAATGAACTCTTTGCAAACCGATGATACGG

CGATCTACTATTGTGCGAAGCACTATTACTACGGTGGTAGCTACGCGATGGACTATTGGG

GCCAAGGGACGTCTGTCACAGTATCATCTGGTGGAGGTGGGAGTGGAGGAGGCGGCAGT

GGAGGCGGGGGGAGTGACATCCAGATGACGCAGACGACTTCTTCACTCTCTGCATCTTTG

GGAGATCGGGTGACTATCAGTTGCAGGGCGTCCCAGGACATATCAAAGTACCTTAACTG

GTACCAGCAGAAACCCGATGGGACAGTAAAACTTCTTATATATCATACTTCTCGGCTGCA

TTCCGGTGTGCCATCTAGGTTTTCAGGTTCTGGCTCTGGAACCGACTACTCCTTGACGATT

TCTAACCTCGAACAAGAGGACATAGCTACCTATTTTTGTCAGCAGGGAAACACTCTCCCG

TACACGTTTGGAGGGGGAACTAAACTGGAGATCACGCGGGCTGACGCGGCTCCAACTGT

GAGTATCTTCCCACCGTCCTCAAATGCTAGCACCACTACCCCGGCCCCTAGGCCCCCTAC

TCCAGCGCCAACTATAGCATCACAGCCTTTGAGCTTGAGGCCCGAAGCTTGCAGACCGGC

GGCAGGGGGGGCTGTGCATACAAGGGGCCTCGACTTTGCCTGCGACATCGATAATGAGA

AGAGCAATGGAACCATTATCCATGTGAAAGGGAAACACCTTTGTCCAAGTCCCCTATTTC

CCGGACCTTCTAAGCCCTTTTGGGTGCTGGTGGTGGTTGGTGGAGTCCTGGCTTGCTATA

GCTTGCTAGTAACAGTGGCCTTTATTATTTTCTGGGTGAGGAGTAAGAGGAGCAGGCTCC

TGCACAGTGACTACATGAACATGACTCCCAGGAGGCCTGGGCCAACCCGCAAGCATTAC

CAGCCCTATGCCCCACCACGCGACTTCGCAGCCTATCGCTCCAGCAGGAGCGCAGACGCT

CCCGCGTACCAGCAGGGCCAGAACCAGCTCTATAACGAGCTCAATCTAGGACGAAGAGA

GGAGTACGATGTTTTGGACAAGAGACGTGGCCGGGACCCTGAGATGGGAGGCAAGCCGA

GAAGGAAGAACCCTCAGGAAGGCCTGTACAATGAACTGCAGAAAGATAAGATGGCGGA

GGCCTACAGTGAGATTGGGATGAAAGGCGAGCGCCGGAGGGGCAAGGGGCACGATGGC

CTTTACCAGGGTCTCAGTACAGCCACCAAGGACACCTACGACGCCCTTCACATGCAGGCC

CTGCCTCCTCGCTGA eGFP-P2A-CD19 scFv CAR amino acid sequence (SEQ ID NO: 57)

MVSKGEELFTGVVPILVELDGDVNGHKFSVSGEGEGDATYGKLTLKFICTTGKLPVPWPTLV

TTLTYGVQCFSRYPDHMKQHDFFKSAMPEGYVQERTIFFKDDGNYKTRAEVKFEGDTLVNR

IELKGIDFKEDGNILGHKLEYNYNSHNVYIMADKQKNGIKVNFKIRHNIEDGSVQLADHYQQ

NTPIGDGPVLLPDNHYLSTQSALSKDPNEKRDHMVLLEFVTAAGITLGMDELYKGSGATNFS

LLKQAGDVEENPGPSRMYRMQLLSCIALSLALVTNSGAPEVKLQESGPGLVAPSQSLSVTCT

VSGVSLPDYGVSWIRQPPRKGLEWLGVIWGSETTYYNSALKSRLTIIKDNSKSQVFLKMNSL

QTDDTAIYYCAKHYYYGGSYAMDYWGQGTSVTVSSGGGGSGGGGSGGGGSDIQMTQTTSS

LSASLGDRVTISCRASQDISKYLNWYQQKPDGTVKLLIYHTSRLHSGVPSRFSGSGSGTDYSL

TISNLEQEDIATYFCQQGNTLPYTFGGGTKLEITRADAAPTVSIFPPSSNASTTTPAPRPPTPAPT

IASQPLSLRPEACRPAAGGAVHTRGLDFACDIDNEKSNGTIIHVKGKHLCPSPLFPGPSKPFWV

LVVVGGVLACYSLLVTVAFIIFWVRSKRSRLLHSDYMNMTPRRPGPTRKHYQPYAPPRDFAA

YRSSRSADAPAYQQGQNQLYNELNLGRREEYDVLDKRRGRDPEMGGKPRRKNPQEGLYNE

LQKDKMAEAYSEIGMKGERRRGKGHDGLYQGLSTATKDTYDALHMQALPPR

CD19 scFv NSCAR nucleotide sequence (SEQ ID NO: 58)

ATGTACAGGATGCAACTCCTGTCTTGCATTGCACTAAGTCTTGCACTTGTCACGAATTCG

GGCGCGCCTGAGGTCAAGCTCCAAGAATCTGGGCCTGGTTTGGTCGCGCCCTCTCAGTCT

TTGTCCGTCACTTGTACTGTTTCCGGCGTTTCTCTGCCCGATTACGGAGTCTCTTGGATAC

-continued

GGCAGCCCCCACGAAAGGGGTTGGAGTGGTTGGGCGTTATATGGGGATCAGAAACAACG

TATTACAACTCCGCGCTCAAGAGCAGACTTACTATTATAAAGGATAACAGTAAATCACA

GGTGTTCCTGAAAATGAACTCTTTGCAAACCGATGATACGGCGATCTACTATTGTGCGAA

GCACTATTACTACGGTGGTAGCTACGCGATGGACTATTGGGGCCAAGGGACGTCTGTCAC

AGTATCATCTGGTGGAGGTGGGAGTGGAGGAGGCGGCAGTGGAGGCGGGGGGAGTGAC

ATCCAGATGACGCAGACGACTTCTTCACTCTCTGCATCTTTGGGAGATCGGGTGACTATC

AGTTGCAGGGCGTCCCAGGACATATCAAAGTACCTTAACTGGTACCAGCAGAAACCCGA

TGGGACAGTAAAACTTCTTATATATCATACTTCTCGGCTGCATTCCGGTGTGCCATCTAG

GTTTTCAGGTTCTGGCTCTGGAACCGACTACTCCTTGACGATTTCTAACCTCGAACAAGA

GGACATAGCTACCTATTTTTGTCAGCAGGGAAACACTCTCCCGTACACGTTTGGAGGGGG

AACTAAACTGGAGATCACGCGGGCTGACGCGGCTCCAACTGTGAGTATCTTCCCACCGTC

CTCAAATGCTAGCGAGCAGAAGCTGATCAGCGAGGAGGACCTGGACAATGAGAAGAGC

AATGGAACCATTATCCATGTGAAAGGGAAACACCTTTGTCCAAGTCCCCTATTTCCCGGA

CCTTCTAAGCCCTTTTGGGTGCTGGTGGTGGTTGGTGGAGTCCTGGCTTGCTATAGCTTGC

TAGTAACAGTGGCCTTTATTATTTTCTGGGTGAGGAGTGAATGGCCGGGAAAGGTACGCT

GA

CD19 NSCAR amino acid sequence (SEQ ID NO: 59)

MYRMQLLSCIALSLALVTNSGAPEVKLQESGPGLVAPSQSLSVTCTVSGVSLPDYGVSWIRQP

PRKGLEWLGVIWGSETTYYNSALKSRLTIIKDNSKSQVFLKMNSLQTDDTAIYYCAKHYYYG

GSYAMDYWGQGTSVTVSSGGGGSGGGGSGGGGSDIQMTQTTSSLSASLGDRVTISCRASQDI

SKYLNWYQQKPDGTVKLLIYHTSRLHSGVPSRFSGSGSGTDYSLTISNLEQEDIATYFCQQGN

TLPYTFGGGTKLEITRADAAPTVSIFPPSSNASEQKLISEEDLDNEKSNGTIIHVKGKHLCPSPL

FPGPSKPFWVLVVVGGVLACYSLLVTVAFIIFWVRSEWPGKVR eGFP-P2A-CD19 scFv NSCAR nucleotide sequence (SEQ ID NO: 60)

ATGGTGAGCAAGGGCGAGGAGCTGTTCACCGGGGTGGTGCCCATCCTGGTCGAGCTGGA

CGGCGACGTAAACGGCCACAAGTTCAGCGTGTCCGGCGAGGGCGAGGGCGATGCCACCT

ACGGCAAGCTGACCCTGAAGTTCATCTGCACCACCGGCAAGCTGCCCGTGCCCTGGCCCA

CCCTCGTGACCACCCTGACCTACGGCGTGCAGTGCTTCAGCCGCTACCCCGACCACATGA

AGCAGCACGACTTCTTCAAGTCCGCCATGCCCGAAGGCTACGTCCAGGAGCGCACCATCT

TCTTCAAGGACGACGGCAACTACAAGACCCGCGCCGAGGTGAAGTTCGAGGGCGACACC

CTGGTGAACCGCATCGAGCTGAAGGGCATCGACTTCAAGGAGGACGGCAACATCCTGGG

GCACAAGCTGGAGTACAACTACAACAGCCACAACGTCTATATCATGGCCGACAAGCAGA

AGAACGGCATCAAGGTGAACTTCAAGATCCGCCACAACATCGAGGACGGCAGCGTGCAG

CTCGCCGACCACTACCAGCAGAACACCCCCATCGGCGACGGCCCCGTGCTGCTGCCCGA

CAACCACTACCTGAGCACCCAGTCCGCCCTGAGCAAAGACCCCAACGAGAAGCGCGATC

ACATGGTCCTGCTGGAGTTCGTGACCGCCGCCGGGATCACTCTCGGCATGGACGAGCTGT

ACAAGGGATCTGGAGCAACAAACTTCTCACTACTCAAACAAGCAGGTGACGTGGAGGAG

AATCCCGGGCCTTCTAGAATGTACAGGATGCAACTCCTGTCTTGCATTGCACTAAGTCTT

GCACTTGTCACGAATTCGGGCGCGCCTGAGGTCAAGCTCCAAGAATCTGGGCCTGGTTTG

GTCGCGCCCTCTCAGTCTTTGTCCGTCACTTGTACTGTTTCCGGCGTTTCTCTGCCCGATT

-continued

ACGGAGTCTCTTGGATACGGCAGCCCCCACGAAAGGGGTTGGAGTGGTTGGGCGTTATA

TGGGGATCAGAAACAACGTATTACAACTCCGCGCTCAAGAGCAGACTTACTATTATAAA

GGATAACAGTAAATCACAGGTGTTCCTGAAAATGAACTCTTTGCAAACCGATGATACGG

CGATCTACTATTGTGCGAAGCACTATTACTACGGTGGTAGCTACGCGATGGACTATTGGG

GCCAAGGGACGTCTGTCACAGTATCATCTGGTGGAGGTGGGAGTGGAGGAGGCGGCAGT

GGAGGCGGGGGGAGTGACATCCAGATGACGCAGACGACTTCTTCACTCTCTGCATCTTTG

GGAGATCGGGTGACTATCAGTTGCAGGGCGTCCCAGGACATATCAAAGTACCTTAACTG

GTACCAGCAGAAACCCGATGGGACAGTAAAACTTCTTATATATCATACTTCTCGGCTGCA

TTCCGGTGTGCCATCTAGGTTTTCAGGTTCTGGCTCTGGAACCGACTACTCCTTGACGATT

TCTAACCTCGAACAAGAGGACATAGCTACCTATTTTTGTCAGCAGGGAAACACTCTCCCG

TACACGTTTGGAGGGGGAACTAAACTGGAGATCACGCGGGCTGACGCGGCTCCAACTGT

GAGTATCTTCCCACCGTCCTCAAATGCTAGCGAGCAGAAGCTGATCAGCGAGGAGGACC

TGGACAATGAGAAGAGCAATGGAACCATTATCCATGTGAAAGGGAAACACCTTTGTCCA

AGTCCCCTATTTCCCGGACCTTCTAAGCCCTTTTGGGTGCTGGTGGTGGTTGGTGGAGTCC

TGGCTTGCTATAGCTTGCTAGTAACAGTGGCCTTTATTATTTTCTGGGTGAGGAGTGAAT

GGCCGGGAAAGGTACGCTGA eGFP-P2A-CD19 NSCAR amino acid sequence (SEQ ID NO: 61)

MVSKGEELFTGVVPILVELDGDVNGHKFSVSGEGEGDATYGKLTLKFICTTGKLPVPWPTLV

TTLTYGVQCFSRYPDHMKQHDFFKSAMPEGYVQERTIFFKDDGNYKTRAEVKFEGDTLVNR

IELKGIDFKEDGNILGHKLEYNYNSHNVYIMADKQKNGIKVNFKIRHNIEDGSVQLADHYQQ

NTPIGDGPVLLPDNHYLSTQSALSKDPNEKRDHMVLLEFVTAAGITLGMDELYKGSGATNFS

LLKQAGDVEENPGPSRMYRMQLLSCIALSLALVTNSGAPEVKLQESGPGLVAPSQSLSVTCT

VSGVSLPDYGVSWIRQPPRKGLEWLGVIWGSETTYYNSALKSRLTIIKDNSKSQVFLKMNSL

QTDDTAIYYCAKHYYYGGSYAMDYWGQGTSVTVSSGGGGSGGGGSGGGGSDIQMTQTTSS

LSASLGDRVTISCRASQDISKYLNWYQQKPDGTVKLLIYHTSRLHSGVPSRFSGSGSGTDYSL

TISNLEQEDIATYFCQQGNTLPYTFGGGTKLEITRADAAPTVSIFPPSSNASEQKLISEEDLDNE

KSNGTIIHVKGKHLCPSPLFPGPSKPFWVLVVVGGVLACYSLLVTVAFIIFWVRSEWPGKVR

8TCO - CD5 scFv CAR (SEQ ID NO. 62)

atgtaccgca tgcaactcct gtcttgcatc gcactaagtc ttgcacttgt cacgaattcg ggcgcgcctg aaatccagtt ggtgcaaagc ggaggcggcc ttgtgaagcc aggaggctct gtgcgaatct cctgtgctgc ctccggttac acgttcacca actatggcat gaactgggtt agacaggccc ccggcaaggg gttggaatgg atgggctgga ttaacacaca tactggcgaa cccacatacg ccgacagctt caaaggccga ttcactttct ccttggacga ttccaaaaac acggcttacc tgcaaataaa ctcactgcgg gcagaggata ctgccgtata tttttgtacc cggagagggt acgactggta tttcgatgtc tggggacagg ggaccaccgt caccgtgtct agtggcgggg gaggatcagg tggtggcggc agcggtggag gtggaagtga tatccagatg acacagtcac cctcgtccct gtccgcgtcc gtcggggatc gggtgactat tacctgcaga gcatctcaag acatcaatag ctacctgagc tggtttcagc aaaagcccgg caaagctccg aaaactctga tttatcgggc caatcgcctc gaatctgggg tgccaagtag attttcaggc tccgggtccg ggaccgacta taccctgacc atctcatccc tgcagtacga ggacttcggg atatactatt gccaacagta cgatgaaagc ccgtggacct tcgggggtgg gacaaagttg -continued

```
gagatcaagg ctagcgagca gaagctgatc agcgaggagg acctggacaa tgagaagagc
aatggaacca tcatccatgt gaaagggaaa cacctgtgtc catctcccct cttccccgga
ccttctaagc ccttttgggt gctggtggtg gttggaggag tcctggcttg ctattcatta
ctcgtaacag tcgcctttat tatcttctgg gtgaggagta agaggagcag gctcctgcac
tccgactaca tgaacatgac tcccaggagg cctgggccaa cccgcaagca ttaccagccc
tatgccccac cacgcgactt cgctgcctat cgctcctccc gtagcgcaga cgctcccgct
taccagcagg gccagaacca gctctataac gagctaaatc tcggacgaag agaggagtac
gatgttctcg acaagcggcg tggccgggac cctgagatgg gaggcaagcc gagacgcaag
aaccctcagg aaggcctgta caatgaactg cagaaagata agatggcgga ggcctactct
gagattggga tgaaaggcga gcgccggagg ggcaaggggc acgatggcct ttaccagggt
ctctcgacag ccaccaagga cacctacgac gccctgcaca tgcaggccct gcctcctcgc
tga
```

LCO CD5 scFv CAR (SEQ ID NO: 63)

```
atgtaccgta tgcagctcct gtcttgcata gcactgagtc ttgctctcgt cacaaattcg
ggcgcgcctg aaatccagct ggtgcaaagc ggaggtggcc tggtgaagcc aggaggctct
gtgcgaatct cttgtgcagc ctccggttac acgttcacca actatggcat gaactgggtc
agacaggccc ccggcaaggg gttggaatgg atgggctgga tcaacacaca tacgggcgaa
ccgacatacg ccgacagctt caaaggtcga tttacttta gcttggacga ttccaaaaat
accgcatacc tgcaaatcaa ctcactgcgg gctgaggata cggccgtata tttttgcacc
cggcgcgggt acgattggta cttcgatgtc tggggacagg ggactacagt taccgtgtct
tccggcgggg gaggatccgg aggtggcggc agcggaggcg gtggatccga tatccagatg
actcaatcac cgagttccct gtccgcgtcc gtaggggacc gggtgaccat cacctgtaga
gcttctcaag acatcaattc ctatctgagc tggtttcagc aaaagcccgg aaaagctccc
aaaactctga tttatcgggc caaccgcctt gagtctgggg tgccatcgag attctcaggc
tccgggagcg ggactgacta taccttgacc atctcaagtc tccagtacga agacttcggg
atatactatt gccaacagta cgatgagagc ccctggacct tcgggggtgg gacaaagtta
gagatcaaag ctagcgagca gaagctgatc agcgaggagg acctggacaa tgaaaagagc
aatggaacca ttatccatgt gaaggggaaa cacctgtgtc catcgcccct cttccccgga
ccttctaagc ccttttgggt gctggtggtg gttggtggcg tcctggcttg ctattcattg
ctagtcaccg tggccttcat tattttctgg gtccgcagta agaggtccag gctcctgcac
agtgactaca tgaacatgac tcccaggcgg cctgggccaa cccgcaagca ttaccagccc
tatgccccac cacgcgactt cgcagcctat cgctcctcca ggagcgcaga cgctcccgct
taccagcagg gccagaacca gctctataac gagctaaatc tcggacgaag agaggagtac
gatgttctcg acaagagacg tggccgggac cctgagatgg gaggcaagcc gagaaggaag
aaccctcagg aaggcctgta caatgaactg cagaaagata agatggcgga ggcctactca
```

-continued gagattggga tgaaaggcga gcgccggagg ggcaaggggc acgatggcct ttaccagggc ctctctacag ccaccaagga cacctacgac gcccttcaca tgcaggccct gcctcctcgc tga gdTCO CD5 scFv NSCAR (SEQ ID NO: 64)

atgtacagga tgcaactcct gtcttgcatt gctctctccc tcgcccttgt caccaattcg ggcgcgcctg aaattcagtt ggtgcagtct ggcggtggcc ttgtgaagcc aggaggcagt gtgcgaatca gttgtgcagc ctccggctac acgttcacca actatggcat gaactgggtg agacaggccc ccggcaaggg cttggaatgg atgggctgga ttaacactca taccggcgaa cctacatacg ccgacagctt taaaggtcga tttactttca gcttggacga ttccaaaaac acggcatacc tgcagatcaa ctcactgagg gctgaggata cggccgttta tttttgtact cggagagggt acgactggta ctttgatgtc tggggacagg ggactacagt taccgtctct agtggcgggg gaggatcagg cggtggcggt agcggtggag gtggatcaga tatccagatg acacaatcac cgtcctccct gtccgcatcc gttggggatc gtgtcaccat tacatgccgt gcatctcaag acatcaatag ctacctgagc tggttccagc agaagcccgg caaagctcct aagactctga tttatcgggc caatcgcctt gagtctgggg tgccatcgag attctcaggc tccgggagcg ggacagacta taccttgacc atatcaagtt tacagtacga ggacttcggg atatactatt gccagcagta cgatgaaagc ccatggacct tcggcggcgg gaccaagcta gagatcaagg ctagcgagca gaagctgatc agcgaggagg acctggacaa tgagaagtct aacggcacca tcatccacgt gaaagggaaa cacctgtgtc caagtcccct atttcccgga ccttctaagc ccttctgggt gctggtggtg gttggaggtg tcctggcttg ctatagcctc ctcgtaacag tggcctttat tatcttctgg gtgaggtccg aatggcccgg aaaggtacgc tga LCO CD5 scFv NSCAR (SEQ ID NO: 65)

atgtacagga tgcaactcct gtcttgcatc gcactatccc ttgcattagt cacgaattcg ggcgcccctg aaattcagct ggtgcaaagc ggcggtggcc tcgtgaagcc aggaggcagt gttcgcatta gttgtgctgc ctccggctac accttcacca actatggcat gaactgggtg agacaggccc ccggcaaggg gttggaatgg atgggctgga tcaacacaca taccggcgaa ccgacatacg ccgacagctt taaaggtcga ttcactttta gccttgacga ctccaagaat accgcttacc tgcagattaa ctcactgcgt gcggaagata ctgccgtata tttctgtacc cggagggggt acgattggta cttcgatgtc tggggccagg ggactaccgt aaccgtgtct tccggcgggg gaggatcagg tggcggcggc tccggtggag gcggatccga tatccagatg acacaatcgc ctagttccct gtccgcgtca gttggggatc gggtgactat tacctgcaga gcatctcagg acatcaactc ctacctgagc tggttccagc agaagcccgg aaaagctcct aaaactctga tctatcgggc caatcgcctg gagtctgggg tgccaagtag attctcaggc tccgggagcg ggacggacta tacgttgacc atatcatctc ttcagtacga ggacttcggg atatactatt gccaacagta cgacgagtcc ccctggacct tcgggggggg gacaaagttg -continued

```
gagatcaagg ctagcgagca gaagctgatc agcgaggagg acctggacaa tgagaagagc

aacggaacca tcatccacgt gaaagggaaa cacctctgtc caagtcccct ctttcccgga

ccttctaagc ccttttgggt gctggtcgtc gttggaggtg tcctggcttg ctatagcctc

ctcgtcacag tggcctttat tatcttctgg gtgaggagcg aatggccagg aaaggtgcgc

tga
```

8TCO-CD19 scFv CAR (SEQ ID NO: 66)

```
atgtaccgaa tgcaattact gtcttgcatt gcactaagtc ttgcattagt cacaaattcg

ggcgctcctg aagtcaagct ccaagaatct ggtcctggtt tggtcgctcc atcacagtct

ctatccgtca cttgtactgt ttccggcgtt tctctgcccg attacggagt ttcttggata

cgtcagcccc cacgaaaggg gttggagtgg ttaggtgtta tttggggatc agaaacaacc

tattataact ccgccctcaa aagcagactt accattatta aggataacag taaatcacaa

gtgttcctga aaatgaactc tttgcaaacc gatgatacag cgatctacta ttgtgcaaaa

cactattatt atggtggtag ctacgcgatg gattattggg gccaaggtac atctgtcaca

gtatcatccg gtggaggtgg gagtggagga ggcggtagtg gaggcggggg gagtgacatc

cagatgacgc aaacgacatc ctcactgagt gcatctttgg gagatcgtgt gacaatcagt

tgcagggctt cccaggatat ctcaaagtac cttaattggt accagcagaa acccgatggg

acagtaaaac ttcttatcta tcatacttct cggctgcatt ccggtgtgcc atcgaggttc

tcaggtagcg gctctggaac cgattattcc ctcacgatta gcaacctgga acaagaagac

atagctacct atttttgtca gcagggaaac actttaccat acacttttgg agggggaaca

aagctggaga tcactcgggc tgacgctgct ccaactgtga gtatcttccc accgtcctca

aatgctagca ccaccacccc tgcccctagg ccacctactc cagctccaac tatagcatca

cagcctttga gccttagacc cgaagcttgt agaccggcag caggcggggc tgtgcataca

aggggcctcg attttgcctg cgacatcgat aatgagaaga gcaatggaac cattatccat

gtaaaaggaa aacacttatg tccaagtccc ctgttccccg gaccttctaa gcccttttgg

gtgctggtgg tggttggagg tgtcctggct tgctatagct tgctagtaac agtggccttt

attattttct gggtgagaag taagcgtagc cgactcctgc acagcgacta catgaacatg

actcccagga gacctgggcc aacccgcaaa cattaccagc cctatgcccc accacgcgac

ttcgcagcct atcgctccag caggagcgca gacgctcccg cataccagca gggccagaat

cagctctata acgagctaaa tctcggacga agagaggaat acgatgtttt ggacaagaga

cgtggccggg accctgagat gggaggcaag ccgagacgga agaaccctca ggaaggactg

tacaatgaac tgcaaaaaga taagatggcg gaagcctaca gtgagattgg gatgaaaggc

gagcgccgga gaggcaaggg gcacgatggc ctttaccagg gtctctcaac agccaccaag

gacacctacg acgcccttca catgcaggcc ctgcctccta gatga
```

LCO-CD19 scFv CAR (SEQ ID NO: 67)

```
atgtaccgca tgcaactgct gtcttgcatt gccctaagtc ttgcactggt cacgaattcg

ggcgcccctg aggtcaagct ccaagaatcc gggcctggtt tagtcgctcc ctctcagtct

ctgtccgtga cctgtaccgt ttccggcgtt tcgctgcccg attacggcgt ctcttggata

cggcagcccc cacgaaaggg gctggagtgg ttgggcgtca tctggggctc agaaacaacc

tactataact ccgcgctcaa gagcagactt actatcatca aggataacag caaatcccag

gtgttcctga aaatgaactc tttgcaaacc gatgatacag ccatctacta ttgtgcgaag

cactattact acggtggtag ctacgcaatg gactattggg gccaagggac ctccgtcaca
```

-continued

```
gtatcatctg gtggcggggg gagcggagga ggcggcagcg gaggcggggg gagtgacatc
cagatgacac agacgacttc ctccctctca gcatctttgg gcgatcgggt gactatcagc
tgcagggcat cccaggacat ttcaaagtac ctgaactggt accagcagaa acccgatggg
acagtgaaac tgctgatcta tcatactagt cggctgcatt ccggagtgcc atccaggttt
tcaggttctg gctctggaac cgactattcc ttgacgatct ccaacctcga acaagaggac
atcgctacct atttctgtca acagggaaac accctccctt acacgttcgg agggggaacc
aaacttgaga tcacgcgggc tgacgctgct ccaactgtga gtatcttccc accgtcctca
aatgctagca ccactacccc ggcccctagg ccccctaccc cagccccaac tatagcctcc
cagcctctga gcttacgtcc cgaagcttgc agaccggccg caggggggc tgtgcataca
aggggcctcg actttgcctg cgacatcgat aatgagaaga gcaatggaac cattatccat
gtgaaaggga aacacctgtg tcccagtccc ctatttcccg gaccttcgaa gcccttttgg
gtgctggtgg tggtgggtgg agtcctggct tgctatagcc tgcttgtaac agtggccttc
attattttct gggtgaggag taagcgaagc aggctcctgc acagcgacta catgaacatg
accccccggc gccctgggcc aacccgcaag cactaccagc cctatgcccc accacgcgac
ttcgcagcct atcgctccag caggagcgca gacgctcccg cgtaccagca gggccagaac
cagctctata acgagctaaa tctcggacga agagaggagt acgatgtttt ggacaagaga
cgtggccggg accctgagat gggaggcaag ccgagacgca agaatcctca ggaaggcctg
tacaatgaac tgcagaaaga taagatggcc gaggcctaca gtgagattgg gatgaaaggc
gagcgccgga gaggcaaggg gcacgatggc ctttaccagg gtctctcaac agccaccaag
gacacctacg acgccctgca catgcaggcc ctgcctcccc gctga
```

gdTCO CD19 scFv NSCAR (SEQ ID NO: 68)

```
atgtacagaa tgcaactcct gtcctgcatt gcactgagct tagcactggt cacaaattcg
ggcgcgcctg aggttaagct ccaagaatct gggcctggtt tggtcgcccc ctctcagagc
ctctccgtca cctgtactgt ttccggcgtt tcactgcctg attacggagt gtcgtggatc
agacagcccc cacgaaaggg gcttgaatgg ttgggcgtta tctggggatc agaaacaacc
tactataact ccgccctgaa gagcagactt accattataa aggataacag taaatcacag
gtgttcctga aaatgaacag cttgcaaacc gatgataccg ccatctacta ttgtgccaag
cactattact acggtggtag ctacgctatg gactattggg gccaggggac gtccgtcaca
gtatcatccg gtggaggtgg cagtggaggc ggcggcagtg gaggcggggg gagtgatatc
cagatgaccc agacaacttc ttcactgtct gcatctttgg gagatcgggt gactatcagt
tgcagggcct cccaggacat atcaaagtac cttaactggt atcagcagaa acccgatggg
acagtaaaac tcctgatcta tcatacatct cggctgcatt ccggtgtgcc atctcgtttt
tcaggttcgg gctctggcac cgactactcc ttgacgattt ctaacctcga acaagaggac
attgctacct atttttgtca gcagggcaac actctccctt acacgtttgg cgggggaact
aagctggaga tcacccgcgc tgacgccgct ccaactgtga gcatcttccc accttcctca
aatgctagcg agcagaagct gatcagcgaa gaggacctgg acaatgagaa gagcaatgga
```

-continued accattatcc acgtgaaagg gaaacacctt tgcccaagtc ccctatttcc cggcccttct aagcccttct gggtgctggt ggtggttgga ggtgtcctgg cttgctatag cttactagta acagtggcct tcattatttt ctgggtgagg agcgaatggc cgggaaaggt ccgctga LCO CD19 scFv NSCAR (SEQ ID NO: 69)

atgtacagga tgcaactcct gtcttgcatt gcactgtcct tggcactcgt cacaaattcg ggcgcccctg aggtgaagct ccaggaatct gggcctggct tggtcgcccc ctcccagtcg ctgtccgtca cttgtactgt gtccggcgtt agcctgcccg attacggcgt ctcttggatt cggcagcccc ctcgaaaggg gttggagtgg ttgggcgtta tctggggctc agaaacaacg tactataact ccgcgctcaa gagcagacta accatcataa aggataacag taaatcacag gtgttcctga aaatgaactc tctgcaaacc gatgatacgg ccatctacta ttgtgcgaag cactattact acggtggtag ctacgctatg gactattggg gccaagggac ttcggtcaca gtatcaagtg ggggaggggg gagtggagga ggcggcagcg gaggcggggg gagcgacatc cagatgaccc agacgacctc ttccctctcc gcaagcctcg gcgacagagt gaccatcagc tgccgtgcct cccaggacat ctcaaagtac cttaactggt accagcagaa gcccgatggg acagtgaaac tgcttatcta tcacacttct cgcctgcatt ccggtgtgcc atctcgcttt tcaggttccg gctccggaac cgactactcc ctgaccatta gcaacctcga acaagaggac atagctacct atttctgtca gcagggcaac actctcccct acacatttgg cgggggcacc aaactggaga tcacccgggc cgacgccgct ccaaccgtga gtatcttccc accgtcctca aatgctagcg agcagaagct gatcagcgag gaggacctgg acaatgagaa gagcaatgga accatcatcc atgtgaaagg gaaacacctt tgcccaagtc cctgtttcc cggaccttct aagcctttct gggtgctggt ggtggttgga ggtgtcctgg cttgctatag cttactagta acagtggcct tcattatttt ctgggtgagg agtgaatggc cgggaaaggt ccgctga

---

What is claimed is:

1. A method for treating leukemia comprising:

(a) introducing into cells obtained from a first subject a nucleic acid construct comprising a nucleic acid sequence encoding a recombinant protein comprising thrombopoietin (TPO) linked to a CH3 hinge, a transmembrane domain, and CD3-zeta signaling domain, providing cells that express the recombinant protein; wherein the thrombopoietin (TPO) linked to a CH3 hinge is encoded by a codon optimized nucleic acid having the nucleic acid sequence of SEQ ID NO: 15; and (b) administering an effective amount of the cells that express the recombinant protein to a second subject diagnosed with leukemia; wherein the cells are selected from the group consisting of: alpha beta T cells, cytotoxic T lymphocytes, T helper cells, lymphokine-activated cells, tumor-infiltrating lymphocytes, NK cells, nave T cells, memory T cells, gamma delta T cells, NKT cells, and macrophages.

2. The method of claim 1, wherein the first subject and the second subject are different subjects.

3. The method of claim 1, wherein the first subject and the second subject are the same subject.

4. The method of claim 1, wherein the second subject has leukemia associated with an increase in (myeloproliferative leukemia protein) MPL+, (proto-oncogene receptor tyrosine kinase) c-KIT+, (fms-like tyrosine kinase 3) FLT3+, (interleukin 3)IL-3 receptor+, (cluster of differentiation 34) CD34+, integrin alpha 3/beta1+, endothelial protein C receptor+ or (cluster of differentiation 90) CD90+ cells.

5. The method of claim 1, wherein the leukemia is acute myelogenous leukemia.

6. The method of claim 1, further comprising administering hematopoietic stem cells to the second subject.

7. The method of claim 1, further comprising administering chemotherapy to the second subject.

8. The method of claim 1, wherein the transmembrane domain is a CD28 transmembrane domain.

9. The method of claim 8, wherein the CD28 transmembrane domain has the amino acid sequence of SEQ ID NO: 9.

10. The method of claim 1, wherein the recombinant protein further comprises an N-terminal IL-2 signal sequence.

11. The method of claim 10, wherein the IL-2 signal sequence has the amino acid sequence of SEQ ID NO:12.

12. The method of claim 1, wherein the CD3 zeta signaling domain has the amino acid of SEQ ID NO: 10.

13. A vector comprising a nucleic acid sequence encoding a recombinant protein comprising thrombopoietin (TPO) linked to a CH3 hinge encoded by a codon optimized nucleic acid having the nucleic acid sequence of SEQ ID NO: 15.

14. The vector of claim 13, wherein the vector is a lentiviral vector or an adeno-associated viral (AAV) vector.

15. The vector of claim 13, wherein the recombinant protein comprises a CD28 transmembrane domain having the amino acid sequence of SEQ ID NO: 9.

16. The vector of claim 13, wherein the recombinant protein comprises an IL-2 signal sequence having the amino acid sequence of SEQ ID NO:12.

17. The vector of claim 13, wherein the recombinant protein comprises a CD3 zeta domain having the amino acid of SEQ ID NO: 10.

* * * * *